US008124915B2

(12) United States Patent
Bertram et al.

(10) Patent No.: US 8,124,915 B2

(45) Date of Patent: Feb. 28, 2012

(54) SEALING DEVICE

(75) Inventors: George Bertram, Oxford, CT (US); Douglas Walker, Hamden, CT (US)

(73) Assignee: Pregis Intellipack Corporation, Wilmington, DE (US)

( * ) Notice: Subject to any disclaimer, the term of this patent is extended or adjusted under 35 U.S.C. 154(b) by 0 days.

(21) Appl. No.: 11/581,219

(22) Filed: Oct. 16, 2006

(65) Prior Publication Data

US 2007/0068632 A1 Mar. 29, 2007

Related U.S. Application Data

(63) Continuation-in-part of application No. 10/623,100, filed on Jul. 22, 2003, now Pat. No. 7,213,383.

(60) Provisional application No. 60/468,988, filed on May 9, 2003.

(51) Int. Cl.

*H05B 3/06* (2006.01)
*H05B 3/20* (2006.01)
*B65B 51/30* (2006.01)

(52) U.S. Cl. ....... 219/243; 219/636; 53/370.7; 53/373.7

(58) Field of Classification Search ............... 156/379.9, 156/581, 583.1; 53/371.3, 370.7, 371.2, 53/329, 373.7, 374.2, 374.3; 219/636, 243
See application file for complete search history.

(56) References Cited

U.S. PATENT DOCUMENTS 2,621,704 A * 12/1952 Langer .......................... 156/498
2,890,836 A 6/1959 Gusmer et al.
3,087,040 A 4/1963 Van Der Meulen
3,234,072 A * 2/1966 Dreeben ....................... 156/498
3,234,074 A * 2/1966 Bryant ............................ 428/54
3,253,122 A 5/1966 Kochmer et al.
3,267,822 A 8/1966 Harrison
3,269,278 A 8/1966 Olstad
3,393,291 A 7/1968 Tucker (Continued)

FOREIGN PATENT DOCUMENTS

GB 2 291 620 1/1996

(Continued)

OTHER PUBLICATIONS

Allied Motion Emoteq Corp Engineered Motion Technology Brushless Motors and Drives found at www.emoteq.com on Feb. 20, 2003; 4 pages.

(Continued)

*Primary Examiner* — Rinaldi Rada
*Assistant Examiner* — Gloria R Weeks
(74) *Attorney, Agent, or Firm* — Smith, Gambrell & Russell, LLP

(57) ABSTRACT

A sealer to bond film having a high temperature resistance (e.g., ceramic) substrate with properly sized groove receiving a heater element as in a flat faced wire band in a tight, flush to adjacent film presentation surface arrangement. A stacked ceramic plate set with wire band within a groove defined by an intermediate stack insert is a suitable substrate. The band is retained flush by a positioner securely locking down one end while the other end is provided at a housing body access location. The sealer is suited for use as a product-in-bag sealing device (products such as air, foam, foodstuff, etc.) with the heater element in contact with film to form a seal. A drag seal arrangement, where film layers are drawn past a fixed or adjustably mounted heater element is an example.

17 Claims, 91 Drawing Sheets

U.S. PATENT DOCUMENTS

| | | | | | |
|---|---|---|---|---|---|
| 3,486,290 | A | | 12/1969 | Pretzer | |
| 3,553,059 | A | | 1/1971 | Stohlquist | |
| 3,596,428 | A | | 8/1971 | Young et al. | |
| 3,692,613 | A | | 9/1972 | Pederson | |
| 3,770,938 | A | | 11/1973 | Agarate | |
| 3,909,334 | A | * | 9/1975 | Verbeke | 156/378 |
| 3,912,575 | A | * | 10/1975 | Zelnick | 156/515 |
| 3,925,139 | A | * | 12/1975 | Simmons | 156/358 |
| 3,948,720 | A | * | 4/1976 | Reil | 156/498 |
| 3,976,230 | A | | 8/1976 | Sperry | |
| 4,115,182 | A | * | 9/1978 | Wildmoser | 156/515 |
| 4,131,395 | A | | 12/1978 | Bairunas et al. | |
| 4,154,368 | A | | 5/1979 | Gusmer et al. | |
| 4,170,440 | A | | 10/1979 | Gusmer et al. | |
| 4,199,303 | A | | 4/1980 | Gusmer et al. | |
| 4,213,031 | A | | 7/1980 | Farber | |
| 4,235,064 | A | * | 11/1980 | Wenger | 53/451 |
| 4,353,196 | A | * | 10/1982 | Beer et al. | 53/451 |
| 4,376,365 | A | | 3/1983 | Moertel | |
| 4,568,003 | A | | 2/1986 | Sperry et al. | |
| 4,630,429 | A | * | 12/1986 | Christine | 53/479 |
| 4,631,905 | A | | 12/1986 | Maloney | |
| 4,674,268 | A | | 6/1987 | Gavronsky et al. | |
| 4,704,509 | A | * | 11/1987 | Hilmersson et al. | 219/633 |
| 4,725,713 | A | | 2/1988 | Lehrke | |
| 4,761,197 | A | * | 8/1988 | Christine et al. | 156/290 |
| 4,800,708 | A | | 1/1989 | Sperry | |
| 4,854,109 | A | | 8/1989 | Pinarer et al. | |
| 4,872,942 | A | * | 10/1989 | Sharps et al. | 156/515 |
| 4,898,327 | A | | 2/1990 | Sperry et al. | |
| 4,949,846 | A | * | 8/1990 | Lakey | 206/484 |
| 4,983,007 | A | | 1/1991 | James et al. | |
| 4,999,975 | A | | 3/1991 | Willden et al. | |
| 5,027,583 | A | | 7/1991 | Chelak | |
| 5,050,776 | A | | 9/1991 | Rosenplanter | |
| 5,139,151 | A | | 8/1992 | Chelak | |
| 5,255,847 | A | | 10/1993 | Sperry et al. | 239/112 |
| 5,277,745 | A | * | 1/1994 | Williams | 156/583.1 |
| 5,284,002 | A | * | 2/1994 | Fowler et al. | 53/412 |
| 5,335,483 | A | | 8/1994 | Gavronsky et al. | |
| 5,375,743 | A | | 12/1994 | Soudan | |
| 5,376,219 | A | | 12/1994 | Sperry et al. | |
| 5,499,745 | A | | 3/1996 | Derian et al. | 222/136 |
| 5,575,435 | A | | 11/1996 | Sperry et al. | |
| 5,649,407 | A | * | 7/1997 | Blomqvist | 53/374.8 |
| 5,678,392 | A | * | 10/1997 | Konno | 53/477 |
| 5,679,208 | A | | 10/1997 | Sperry et al. | |
| 5,714,033 | A | * | 2/1998 | Hayashi et al. | 156/380.5 |
| 5,727,370 | A | | 3/1998 | Sperry | |
| 5,755,076 | A | * | 5/1998 | Otsuka | 53/373.7 |
| 5,787,681 | A | * | 8/1998 | Papina et al. | 53/373.7 |
| 5,942,076 | A | | 8/1999 | Salerno et al. | |
| 5,964,378 | A | | 10/1999 | Sperry et al. | 222/145.2 |
| 5,968,399 | A | * | 10/1999 | Selberg | 219/633 |
| 5,996,848 | A | | 12/1999 | Sperry et al. | |
| 6,003,288 | A | | 12/1999 | Sperry et al. | |
| 6,052,971 | A | * | 4/2000 | Malsam et al. | 53/451 |
| 6,131,375 | A | | 10/2000 | Sperry | |
| 6,234,777 | B1 | * | 5/2001 | Sperry et al. | 425/46 |
| 6,276,114 | B1 | * | 8/2001 | Hayashi | 53/374.2 |
| 6,283,329 | B1 | | 9/2001 | Leonard, II et al. | |
| 6,311,740 | B1 | | 11/2001 | Sperry et al. | |
| 6,315,161 | B1 | | 11/2001 | Bezaire et al. | |
| 6,472,638 | B1 | | 10/2002 | Sperry et al. | |
| 6,539,692 | B1 | * | 4/2003 | Tobolka | 53/551 |
| 6,550,229 | B2 | | 4/2003 | Sperry et al. | |
| 6,598,373 | B2 | | 7/2003 | Sperry et al. | |
| 6,656,310 | B2 | * | 12/2003 | Basque | 156/251 |
| 6,789,371 | B1 | * | 9/2004 | Buysman et al. | 53/373.7 |
| 7,156,260 | B2 | * | 1/2007 | Hayduk | 222/145.5 |
| 7,211,169 | B2 | * | 5/2007 | Noble | 156/583.1 |
| 7,213,383 | B2 | * | 5/2007 | Walker et al. | 53/329.2 |
| 7,389,626 | B2 | * | 6/2008 | Sperry et al. | 53/403 |
| 2001/0017438 | A1 | | 8/2001 | Takamatsu | |
| 2002/0044305 | A1 | | 4/2002 | Kawai et al. | |
| 2003/0042668 | A1 | | 3/2003 | Takamatsu | |
| 2003/0047860 | A1 | | 3/2003 | Takamatsu | |
| 2005/0029132 | A1 | | 2/2005 | Walker et al. | |
| 2006/0075971 | A1 | * | 4/2006 | Guenther et al. | 118/725 |

FOREIGN PATENT DOCUMENTS

| | | |
|---|---|---|
| WO | WO 84/01684 | 4/1984 |
| WO | WO 2004/101252 | 11/2004 |

OTHER PUBLICATIONS

Faulhaber Brushless DC Motor Information found at www.faulhaber.com on Apr. 23, 2002; 1 page.

AccuPak® Menu Direct Polyurethane Foam Packaging System, Flexible Products Company, (29 pages) (Nov. 1998).

Flexible Products "AccuPak Menu Direct", Supplemental Information Sheet, Attachment III, Manifold and Tubing Assembly Schematic (date not available).

SpeedyPacker™ Foam-In-Bag Packaging System, User's Guide, Sealed Air Corporation, dated Jul. 2, 1996.

AccuFlow 20D, Electronic Manual, Flexible Products Company, Revised Oct. 21, 1998, (38 pages).

Instapak 901/970 Foam Packaging System, User's Guide, (1998).

International Search Report (PCT/ISA/210) issued in connection with PCT/US2004/014515 with cover sheet of corresponding PCT Publication No. WO 2004/101245.

Web site showing TOSS Machine Components, Inc. heat seal equipment, http://www.packexpo.com/ve/37298/mainlhtml, printed off website on Jul. 15, 2003, (4 pgs).

International Search Report (PCT/ISA/210) issued in connection with PCT/US2004/014423 mailed Oct. 22, 2004.

Flexible Products "AccuPack Menu Direct", Supplemental Information Attachment I, AccuPack Menu Direct Wiring Diagram (1 page) with two pages of additional information under the heading "AccuPack 24—Heater Control Settings" (date not available) (presumed Nov. 1998).

Flexible Products "AccuPack Menu Direct", Supplemental Information Attachment II, Heater Assembly (heated channel hose and wire connector interchange) (3 pages) (date not available) (presumed Nov. 1998).

* cited by examiner

91

1108
1122
1126
1132
1125
1158
1156
1160
1128
1154
1162
1152
1161
1150
1163
1134
1140
1150
1148
RC
RB
RS
1136
Ra
1145"
1117
1146
1145'
1117'
1104
1106
1159
1182

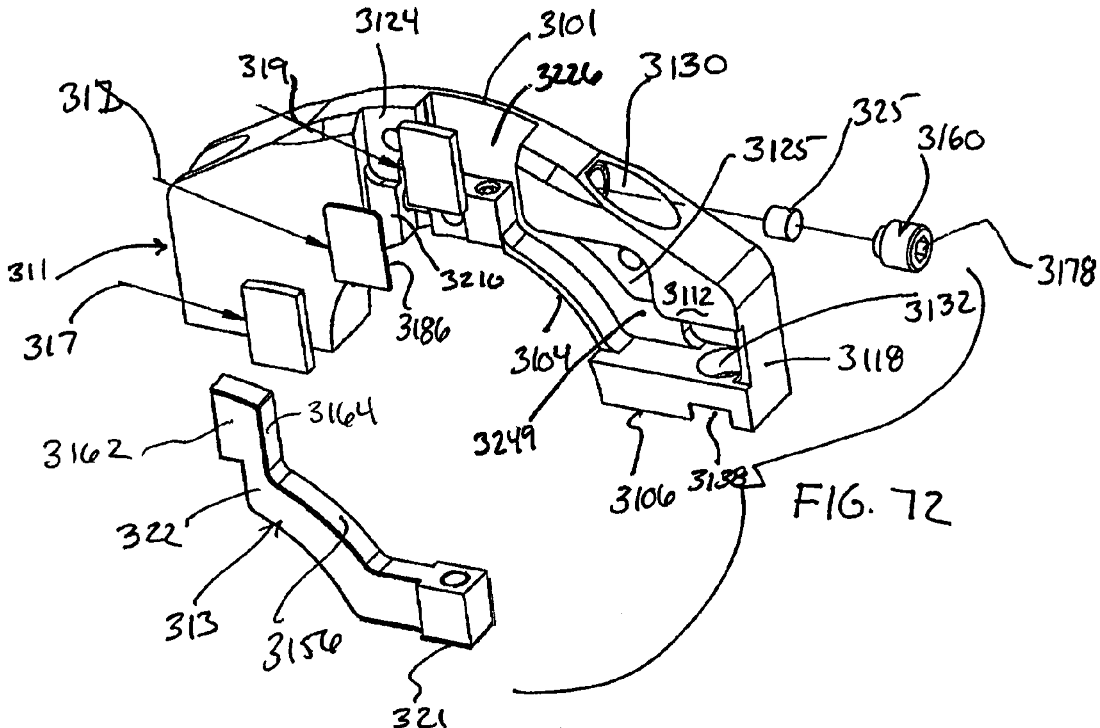
FIG. 72
FIG. 73
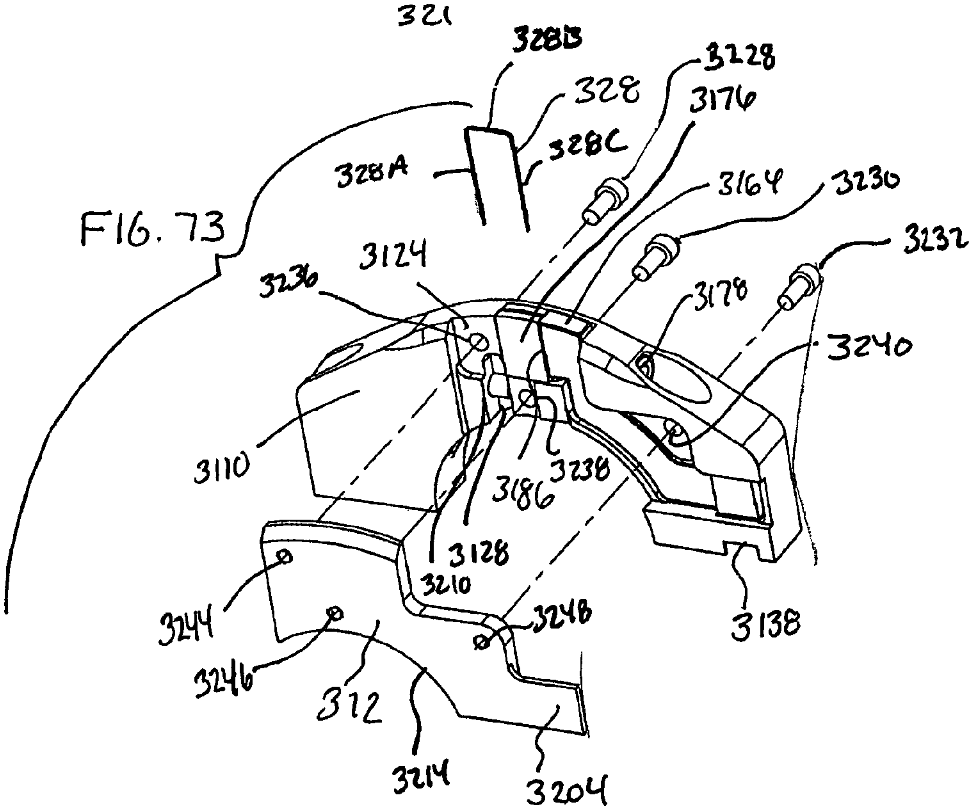

Legend

SEALING DEVICE

CROSS-REFERENCE TO RELATED APPLICATIONS

The present invention is a continuation-in-part of U.S. Ser. No. 10/623,100 filed Jul. 22, 2003, now U.S. Pat. No. 7,213,383 which claims priority of provisional application 60/468,988 filed May 9, 2003, with each of these being incorporated herein by reference.

FIELD OF INVENTION

The present invention relates to a sealing device, with a preferred embodiment being a sealer with means for localized heating to bond film material as in a resistance heating element applied to film layers such as those used in bag formation.

BACKGROUND OF THE INVENTION

Many sealing mechanisms have been created including sealing mechanisms such as those used in "Foam-In-Bag", "Air-In-Bag" and "Food (or other Product types)-In-Bag" manufacturing devices. Many endeavor to use a sealing wire, heated by electrical resistance, which rolls or drags over the material being sealed. Other sealing techniques have been attempted, including the use of hot melt glues, pressures sensitive adhesives, pressure sensitive co-adhesives, hot air jets, hot metal rollers and mechanical crimping.

Examples of heated wire "Air-in-bag" embodiments are seen in U.S. Pat. Nos. 6,598,373 and 5,942,076 which are incorporated herein by reference.

One sealing approach relative to a foam-in-bag device is represented by U.S. Pat. No. 5,679,208. In one commercialized (foam-in-bag) embodiment of U.S. Pat. No. 5,679,208 a round, 10-mil diameter, Nichrome material sealing wire is wrapped around the outside diameter of a rigid nip roller opposing a rubber nip roller. The sealing substrate, underneath the wire, is a hard plastic material as in "VESPEl" plastic, that is selected on the belief it can resist the extreme heat of the sealing wire. The sealing wire is wrapped around the roller, but the ends are separated, each end being one contact point for the flow of electrical current.

As the nip rolls turn, the electrically heated wire turns with the rigid roller, essentially rolling over an open edge of the bag, forming the edge seal during its brief contact period with the film as the film passes through the nipped section.

A problem associated with the '208 patent approach is that it requires a rotating electrical contact to supply power to the edge seal wire. Since the edge seal wire is rotating with the nip roll, direct wire connections from the edge seal wire to the non-rotating control board presents the potential for wind up and breakage after a few revolutions. This problem is addressed with a rotating electrical union, which is quite expensive and has many failure modes of its own. Also, maintenance (e.g., heater wire replacement) is difficult with this embodiment as can be seen by the high finger dexterity requirement associated with removing and replacing wires on its substrates. In addition, even with a highly skilled person with good dexterity the switching out of a defective wire for a new one is time consuming and thus also undesirable to a user from a manufacturing "down time" efficiency standpoint.

An additional edge sealer embodiment is described in U.S. Pat. No. 6,472,638 showing a snap on edge sealer that is a "drag seal" embodiment wherein a pair of downstream drive rollers pull the film past the clipped on edge sealer. This avoids having the complexity of maintaining electrical contact relative to a rotating heater wire support structure and a non-rotating support. In a commercialized embodiment of the '638 patent, the snap-on unit, called an edge seal card, can be replaced without using any tools within a few minutes. This commercialized embodiment of a drag sealer features a 10-mil, round Nichrome wire attached at the face of a thin "Delrin" card, which is machined to the same 2.5-inch radius as a receiving nip roll. A segment of the wire, of about ¼ inch long, is exposed on the edge of the card, but is covered by a layer of 3-mil Teflon tape. The Nichrome wire becomes a sealing element through electrical resistance heating. The exposed wire segment is placed in pressure contact with the rubber nip roll, and melts the film when it gets hot enough. The drive action of the two nip rolls drags the film past the hot wire, which is an example of a drag seal arrangement. A disadvantage of this commercialized embodiment of the '638 design is its short life in comparison to other designs. Even though replacement is easy and quick, the noted snap-on edge sealer is often able to only run for a few film rolls before having to be removed.

A further difficulty associated with the prior art designs is seen in the difficulty of forming and maintaining good seal production as opposed to weak or defective seals due to improper bonding temperature or surface contact, or too much contact or heat application and a resultant improper ribbon cutting (in situations where ribbon cutting is not an intended result).

Applicants believe that the following are some reasons for the failure modes in the '638 commercialized embodiment design:

1. The seal wire melts into the substrate, as in "Acetal" or "Delrin" material, causing it to lose sealing power into the substrate, leading to poor seals.

2. The seal wire burns a hole in the Teflon tape that covers it, causing the unit to make bad seals.

3. In general, seal quality is not consistent, causing the machine operator to make frequent adjustments to the temperature settings or attempts to repair the edge seal card in order to maintain seal quality.

4. The edge seal cards are not interchangeable, and the machine operator has to adjust its temperature setting every time a new one is installed.

5. When the 10-mil Nichrome wire does fail there is no easy way to replace it, which is frustrating to operators because the wire only costs a few cents while the entire card assembly is much more expensive.

6. The rubber roll will gradually wear a matching radius into the edge of the plastic edge seal card in contact with it, reducing its usefulness over time.

7. The cables that connect the edge seal card to the plug-in connector panel, frequently get caught in the nip rolls or in the sealing jaws.

The snap-on drag sealers of the '638 patent represent sealing devices that are intended to be used to seal without cutting the film (although it is a difficult task with this prior art design to maintain a good strong seal without, at the same time, cutting through one or more layers of the film); or as an edge sealer that both seals and cuts the film. For foam-in-bag embodiments where it is desirable to form gas escape vents in or adjacent an edge seal, cutting of a layer of the film is one way to produce a vent for the release of pressure. For example, a commercialized embodiment of '638 patent includes a second edge seal card, with the sealing wire positioned to contact one layer of the bag film just before it enters the roller contact zone. When this wire is powered with sufficient energy, it will cut a slit in the moving web to produce a vent inside of the edge seal in the transverse direction. The length of the vent slit, and its gas flow capacity, can be controlled by adjusting the power on time of this wire. The commercialized embodiment of the "roller seal" described above for the '208 patent features a power lowering cycle to prevent a seal formation along a section of the overall seal length, which no seal formation vent is used to vent gases.

SUMMARY OF THE INVENTION

The present invention is directed at problem reduction relative to prior art sealers such as the edge sealers described above, by avoiding, for example, some of the complexities associated with the coil wire wrap arrangement like that in the above noted '208 patent and avoiding the often replacement requirement of the above noted '638 patent embodiment. A preferred embodiment also avoids the need for a tape cover or the like (e.g., cover means used to avoid film cutting in a sealing operation not involving cutting).

An edge sealer is provided that includes a heater element designed for contact with the film material to be sealed, a substrate that supports the heater element that is preferably in the form of an insert head and a housing for receiving the insert head with heater element or, in an alternate embodiment, the substrate comprises a substrate main body not received in a housing but with suitable mounting means (e.g., bottom or side mounting means as in an adhesive layer) to secure the substrate main body to a supporting object. The heater element is preferably arranged to present a film forward face surface that is retained in a desired position as by, for example, housing positioners that maintain the insert head and associated heating element at the desired position. The edge sealer's substrate (e.g., an insert head) has a heater element reception area and additional characteristics for maintaining a desired heater element relationship with the film being bonded. Thus the edge sealer is designed to initially position the heater element at a desired (highly) efficient and consistent bond formation position and to maintain the heater element at that desired position during the life cycle for the edge sealer. As an example, an edge sealer is provided having a heater element and a substrate supporting the heater element which combination preferably features a substrate comprising an insert head and a reception housing with the sealing surface of the heater element being essentially flat and flush with the surface(s) of the substrate (e.g., the insert head and/or housing) in contact with the film or arranged for seal formation in the film. The housing preferably provides mounting means for engagement with the assembly in which the edge sealer is being used as in a housing designed for securement to a component of a bag forming assembly.

The edge sealer is well suited for use in a foam-in-bag assembly that comprises a film feed mechanism which feeds film with a film driver, a bag forming assembly which includes the edge sealer that, in a preferred embodiment, directly contacts film being fed by the film driver and which is preferably supported on a fixed (or repetitious repeat) position relative to the foam-in-bag assembly. In this way there can be maintained a desired film to heater element sealing engagement (direct contact preferred although the subject matter of the present invention is inclusive of a non-direct contact relationship but one where the heater element is close enough to effect seal formation although a direct contact, "tapeless" embodiment is preferable). A preferred embodiment also features a common plane "flush" relationship wherein a flat surface of the heater element is co-planar with the substrate's film contact surface or surfaces so that the facing surface of the heater element contacts the film at the same time as the film contacts the substrate's film contact surface(s). The edge sealer also preferably presents an essentially solid surface below the flush plane and relative to the heating element as in a rectangular heating element having received within the substrate without side gaps and any adjacent substrate component(s) avoiding side gaps in the region of the film where there is a possibility of melted film generation.

In a preferred embodiment, there is also featured a dispenser for feeding product (e.g., air or other products as in foam or food (solid or liquid)) to a bag being formed by the bag forming assembly. In addition, the present invention's edge sealer (above and below described embodiments) is well suited as a replacement for pre-existing edge sealers as in a retrofitting of the edge sealer in the air-in-bag assembly of U.S. Pat. Nos. 6,598,373, and 5,942,076.

This continuation-in-part application further features an edge sealer that is considered an improvement (hereafter "the improved edge sealer" for easier reference) relative to the prior art edge sealers discussed in the background as well as the earlier developed present invention edge sealer embodiments described in the parent application Ser. No. 10/623,100, now U.S. Publication No. 2005-0029132 A1 (see, for example, FIGS. 28 to 67—with reference below being to "earlier inventive edge sealer embodiments"). Even relative to the earlier inventive edge sealer embodiments, which provided many improvements over the prior art, there are some areas of concern such as those set forth below (which in some instances, are also areas of concern found in prior art embodiments).

1. Frequent Re-Taping Required

Relative to the "earlier inventive edge sealer embodiments" (and also many prior art devices), the tape covering (e.g., Kapton™ tape material) covering the seal wire and the insert has to be replaced frequently, to maintain seal quality, and to prevent what is known in the art as "ribbon-cutting". Ribbon-cutting occurs when the seal wire slices the outside edge away from the body of the bag, essentially forming a ribbon of film that is no longer a part of the bag itself. Ribbon-cutting occurs when the tape covering over the seal wire wears away, exposing the round wire edge to the film. The exposed wire becomes like a hot knife that cuts the film rather than creating the desired seal. Seal quality is not very good when the edge sealer is ribbon-cutting. The seals are weak, and can break under slight pressure, such as that generated from rising foam inside of a bag being manufactured by a foam-in-bag assembly, by the air pressure involved in an "air-in-bag" assembly or internal pressure involved with a "food-in-bag" assembly. In some of the earlier inventive edge sealer embodiments, tape replacement is required, on every film roll change, if not more often. Also, in an effort to maintain optimum seal quality and avoid the problems associated with ribbon-cutting, recommended tape replacement for the tape over the seal wire is every 700 to 1000 bags, which usually means multiple tape replacements per film roll. Other tape material options have been explored, other than KAPTON™ material, and the inventors have found that KAPTON™ material provides a good compromise taking into account the elements associated with well functioning tape material and successful high resistance to abrasion and heat. The avoidance of having to use any tape material is preferred under the present invention in any event.

2. Mediocre Seals Were the Norm

Under the prior art, the seals were often barely acceptable if not defective and, even with the earlier inventive edge sealer embodiments, it was often found that the quality of seals produced varied from fairly good to barely acceptable. Also, when the tape wears and burns over the seal wire the seals tend to deteriorate quickly, and weak side seals are a frequent issue with users of the edge sealer in a foam-in-bag assembly as, for many users, the bags often pop open, spewing foam all over the inside of the box and sometimes onto the product itself. The same problem can also be found in an air-in-bag assembly that results in defective (e.g., not properly cushioning) air-in-bag chains or sheets (whether filled at the manufacturing site or at the customer site).

3. Thermal Degradation and Mechanical Creep Effects on the Insert by the Seal Wire The ultimate life of the earlier inventive edge sealer embodiments is typically determined by the life of the substrate or insert which sits directly under the seal wire, providing, in some embodiments, mechanical support for its drag seal function, and in the earlier inventive edge sealer embodiments, electrical contact with the contact blocks or positioners on each side of the insert sealer support. The earlier inventive edge sealer embodiments include an embodiment where an arbor housing is provided (shaped to accommodate the shaft extension) with an insert made of VESPEL™ material, which is an expensive, very tough, hard, and high temperature resistant plastic made by the DuPont company. VESPEL™ is also easy to machine. However, despite its superior physical and thermal properties in comparison to many other plastics, the portions of the VESPEL™ insert in contact with, or in close proximity to the seal wire will eventually be destroyed by the intense thermal energy involved. By observing the seal wire's effect on the VESPEL™ insert, it is believed that it achieves surface temperatures in excess of 750° F. When VESPEL™ material is used it can handle the seal wire heat for a while, but eventually thermal degradation becomes apparent, as the VESPEI™ material becomes charred, turns black, and decomposes into powder where it contacts the wire. The destruction of the VESPEI™ material insert will eventually allow the seal wire to sink into the insert, moving the seal wire away from the sealing zone. This sinking action reduces the seal wire's ability to make adequate seals, since the seal wire becomes recessed below the surface of the insert, and thus can no longer press against the film with enough force to form a good seal. A user can compensate for this reduced sealing pressure by raising the heat setting on the edge seal drive circuit, to apply more energy to the seal wire. However, the increased energy from the wire accelerates the thermal ruin of the insert material, to exacerbate the conditions that caused the problem in the first place. Eventually, the seal wire sinks deeply enough so that the edge sealer is not able to make a seal at all. Thermal degradation of the insert material also allows the seal wire to sink into the surface of the insert at the two locations where the seal wire makes electrical connection to the contact blocks in the earlier inventive edge sealer embodiments. Thus, as the seal wire sinks into the insert, it moves away from, for example, the brass contact shoe blocks that are used in a preferred embodiment of the earlier inventive edge sealer embodiments to supply it with electrical power. It does not take much movement before the electrical connection between the seal wire and the contact blocks becomes intermittent. Intermittent electrical contact makes the resultant seals intermittent and of poor quality; at which point the edge sealer is usually considered to have failed, since air, foam or other product can leak through these incomplete seals. Frequently, an operator will run an "intermittent" edge sealer to the point where the electrical connection is totally lost, which means that the edge sealer will no longer make any edge seal, and large quantities of foam, air, or product will leak through the open edge of the bag. In addition to the thermal degradation issue (which was also a predominate problem in prior art sealers as in the snap-on edge sealers used in the industry and described in the '638 patent), the seal wire can also sink into the insert by the phenomenon known as creep, where an object that pushes onto a piece of plastic material will slowly sink into the plastic even without reaching a melting state. The effects of creep are similar to the effects of the thermal degradation described above. It is difficult to determine how much of the problem is caused by thermal degradation and how much is caused by creep, but both appear to have some influence on the degradation of the edge sealer over time.

4. Loss of Electrical Contact Due to Flexing of the Arbor Housing Body

In earlier inventive edge sealer embodiments, the housing bodies of the edge seal arbors were preferably made out of Acetal, which is an inexpensive, free machining plastic.

Acetal is inexpensive and easy to machine, but it is not as rigid or as strong as metals like steel or aluminum. Consequently, the arbor bodies of some earlier inventive edge sealer embodiments were somewhat flexible, and would bend slightly under stress. This bending can exacerbate the electrical connection issues outlined in the above section, so that edge sealers can become intermittent or simply stop working altogether when subjected to normal handling or installation stresses. Often, the effective electrical resistance of the edge sealer assembly is increased due to this flexing problem, because of shifts in the contact point between the seal wire on the face of the contact blocks. When this happens, the seal wire length is essentially lengthened, because its point of connection with the contact block will move further down the face of the arbor. In this situation, the edge sealer may continue to function, but the operator may have to adjust the heat setting in software because of the higher resistance value.

5. Abrasion on the Face of the Arbor from Film Drag

The earlier inventive edge sealer embodiments included embodiments made from materials that abraded to some degree where they contact the moving web of film. The drag of the film across the face of the edge sealer abrades and wears, for instance, the Acetal body, the seal wire itself, and the face of the VESPEI™ insert. This wear abrasion has not typically led to failure of the old style present invention edge sealer, because they usually fail for other reasons prior to the point were abrasion can become an issue. However, if the other failure modes are removed, then wear can become a limiting factor in an earlier inventive edge sealer embodiments.

6. Wire Breakage at the 90 Degree Bend

An additional issue that has arisen relative to earlier inventive edge sealer embodiments, is that in fixing a seal wire the seal wire is given a relatively sharp 90° bend at each end of the VESPEI™ insert; so that the wire can make electrical connection with each of the contact blocks. Because the seal wire has a circular cross section, it has a higher thickness to bend radius ratio than a wire with the same cross sectional area and a rectangular cross section as used in a preferred embodiment featured in the present continuation-in-part application or "new style" embodiment. Thus, the round wire of earlier inventive edge sealer embodiments, with its support arrangement, can tend to crack when bent to some critical value of bend radius. A flat band as preferred in the new style embodiment, however, as a design that can make the same bend radius without cracking—because its thickness/bend radius ratio is lower. This is one of the reasons that a flat seal band is preferably utilized in the new style relative to a round wire design. There has been seen failures in production and in the field because of the round seal wires cracking at the support bends. The cracks can start small, but grow quickly because the thermal shocks involved with rapidly heating and cooling the wire.

7. Changing Resistance of the Seal Wire with Usage

Because of the inconsistent contact resistance between the contact blocks and the seal wire, for reasons such as those discussed in the preceding sections, the total electrical resistance of even earlier inventive edge sealer embodiments could change with usage. The resistance of the edge seal device of the earlier inventive edge sealer embodiments can increase significantly over time, which changes the heat output of the wire sealing element. This resistance change can affect the quality of seals produced by the edge sealer. Also, while a machine user may be able to compensate for these changes by adjusting the power settings of the edge sealer assembly (e.g., a software change), most users are not sufficiently knowledgeable to make these adjustments correctly. Eventually, the edge sealer performance can degrade to the point that it stops sealing completely.

8. Manufacturing Difficulties with the Earlier Inventive Edge Sealer Embodiments' Arbor Design The earlier inventive edge sealer embodiments presented some difficulties in assembly into a working unit. The arbor body on the earlier inventive edge sealer embodiments included ones made of Acetal. However, the Acetal body is not very rigid, so it will bend significantly as the diagonal screws were tightened into the contact blocks of a preferred design. This bending tends to pull the contact blocks away from the VESPEl insert, and also away from contact with the seal wire, thus increasing the resistance of the edge sealer. At times, the bending of the body is enough to completely open the circuit, or the body may bend sufficiently to make the housing or arbor body of the edge sealer difficult to install in its base support. This is typically due to the plugs that extend from the bottom of the arbor body in a preferred embodiment become unparallel, and they no longer line up with their mating sockets in the base support, which are parallel. The assembler has to be very careful to not over tighten the screws, but if the screws are not tight enough, that can cause poor contact and erratic resistance. If the screws are too tight, the arbor body can be distorted so that its conductor plugs (e.g., Multilam) plugs will not fit into the pair of mating sockets in its base on the machine.

Thus with the foregoing in consideration the subject matter of the present invention includes a sealer (e.g., a plastic film bag edge sealer) for use in fusing film material that preferably comprises a heater element (e.g., a resistance wire) with a substrate support and preferably a substrate support which comprise an insert head providing direct support to the heater element and a receiving housing which supports the insert head and the heater element. The heater element has a sealing surface that is essentially flush with a presentment surface of the substrate (insert head surface(s) and/or housing surface(s)) relative to the film material being fused (e.g., heater element support means presentment surface or surfaces with all lying on a common flush plane). Thus, in a preferred embodiment, the sealing surface is a flat, planar presentment surface facing the film material and is essentially flush which includes having a maximum recess dimension below an exposed surface plane of said presentment surface of the substrate that is 30% to 100% of a film layer thickness being fused and a maximum proud dimension relative to the surface plane that is 10 to 60% of a film layer thickness (e.g., a maximum deviation from a true flush state is less than 0.0005" of an inch or less or, more preferably, 0.0002" or less).

In a preferred embodiment, the substrate comprises a ceramic insert head having an exposed surface with a reception groove that is dimensioned to receive said heater element, with the ceramic insert preferably being comprised of a plurality of stacked ceramic insert plates sized to form the groove. In an alternate embodiment, the substrate comprises a main body formed of a first material that has a reception groove formed therein and preferably has a covering formed of a second material when the main body material does not meet all the desired characteristics. When using a material covering (e.g., coating), the covering preferably comprises an electrically insulating material as in one that includes a ceramic material. An embodiment of the heater element includes one having a flat sealing surface and either a flat walled bottom region or a curved bottom region or non-flat sided bottom region received within a conforming in shape recessed region formed in the substrate as in a semi-circular configuration to match a semi-circular cross-sectioned groove shape in the main body of the support substrate.

In one embodiment the housing includes mounting means for securement of the edge sealer to a product-in-bag forming device as in a foam-in-bag or air-in-bag assembly.

The subject matter of the present invention also features a sealer device that comprises a heater element, a housing body having an insert reception recess and a heater element support stack received within said insert reception recess. The heater element support stack preferably comprises first and second plates with the first plate underlying and supporting the heater element and the second plate having a side surface in a position retention relationship relative to a side edge of said heater element. The first and second plates are formed of ceramic material and the heater element is a resistance wire and is preferably one that is band shaped with a non-fully circular cross section, and the heater element has a film sealing contact surface that is preferably planar and has an outermost surface that is within 0.005 inch of an exposed film contact edge surface of the heater element support stack. Thus, the heater element has a film contact surface that falls on a common plane with a film contact surface of the heater element support stack. Also, the first plate preferably has rounded corner edges to help avoid and crack formation in a bent heater element, and it is preferred that the first and second plates have different heights and common plane bottom and side edge surfaces. A heater element support stack that further comprises a third plate, with the first, second and third plates being in a stacked relationship and the first plate defining a recess groove relative to the other plates within which the heater element is received is a suitable stack embodiment. Thus, in a preferred embodiment the first, second and third plates are formed of ceramic material and the groove has bottom corner edges and receives a resistance wire heater element that is band shaped as in with a non-fully circular cross-section (e.g., rectangular cross-section). Also, preferably the heater element support stack comprises a stacked laminate set of first, second and third plates with the first plate being intermediate and of lesser height than said second and third plates and the heater element is supported by the first plate and has a film presentation surface that falls on a common plane with a film presentation surface of said second and third plates, and the heater element has a U-shaped configuration and is supported by the first plate positioned under the heater element, and the preferred band shape can extend around rounded upper corners in the supporting plate below.

Also, an embodiment of the invention further comprises heater element support means which includes a substrate that has an insert head and a housing which housing includes a first heater element fixation assembly which comprises a first adjustable retention member that is supported by a housing component (e.g., housing main body), and preferably a second adjustable retention member, and with the heater element being a U-shaped resistance wire and said first and second fixation devices compress respective legs of the U-shaped heater element into a compression contact relationship with the heater element support stack. Preferably the first adjustable retention member is a conductive element and the housing body is a conductive body and the sealer device further comprises a friction reducing insulating layer insulating the first adjustable retention member from the housing body, and there is preferably provided a recess formed in the housing body which receives a free end of the heater element and is dimensioned such that said heater element can be placed under tension by a pulling on the free end prior to final position fixation on the first plate.

An additional embodiment of the present invention features a heater element that has a rectangular band shape or one that has a flat upper surface and a non-fully circular cross section and a heater element support member that is a member that is either monolithic or stacked and one that either has a grooved main body with a coating or other covering means and on which the heater element rests or is free of such a coating or layering and has a groove formed in it that directly receives the heater element. The heater element preferably has a flat upper face and the rest of the body is received in a groove so that only the flat upper face is exposed as in a flush relationship with the surfaces to opposite sides of the groove formed in the substrate. The heater element preferably comprises a resistance wire either shaped originally at the time of manufacture to have the flat face to be flush with the substrate such as a rectangular cross sectioned ribbon band wire or an originally non-rectangular cross-sectioned wire as in circular wire that is processed to have a flat "exposure" sealing face (a circular diameter wire ground down to be semi-circular in cross-section). Also the substrate is preferably comprised of an insert head and a positioning housing or holding means which holds the insert head in place, although alternate substrate designs are featured as in one that comprises a stack plate or solid body equivalent that is attached directly to a supporting surface of the film processing device as in an adhesive attachment of an assembled stack plate to a component of the film feed device. Alternate substrate mounting means for mounting the substrate on an assembly involved in the film presentation to the sealing device as in a housing having mounting means for engagement to a component of a product-in-bag assembly such as to a drive roller shaft support member or a cross-cut jaw or other suitable assembly component support means.

BRIEF DESCRIPTION OF THE DRAWINGS

FIGS. 37, 39 to 41 show alternate perspective views of the edge sealer of the second embodiment.

FIG. 72 shows a view similar to 71 with additional bridge contact and stack inserts shown in an exploded view presentation with the arbor body.

FIG. 73 shows a view of an assembled FIG. 72 with additional cover plate, wire band and set screw inserts shown in an exploded view presentation.

DETAILED DESCRIPTION

Figure 1:
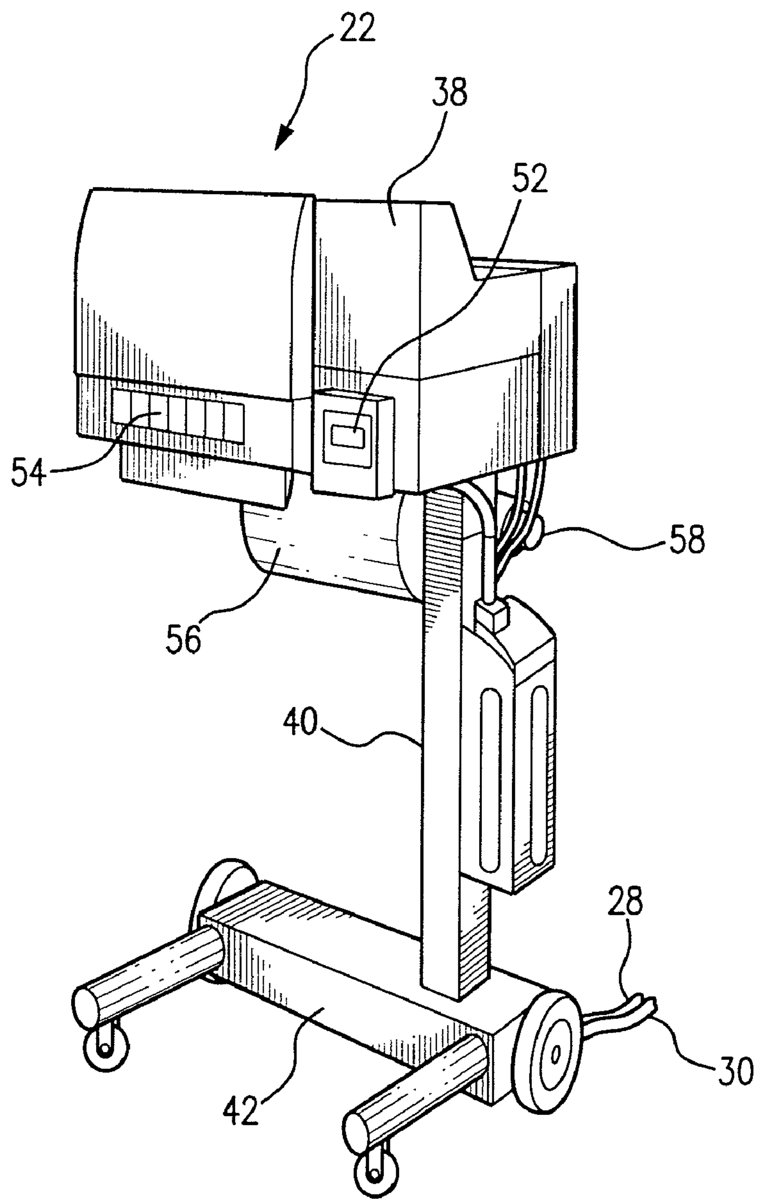
FIG. 1 shows a perspective view of a foam-in-bag manufacturing device in which a sealing device of the present invention is suited for use.

As an example of an environment in which the sealing device (edge sealer in this embodiment) of the present invention can be utilized, there is described below a dispenser system 22 having film feed means and a product dispensing means which work with the edge sealer to form a bag containing the material. FIG. 1 provides a perspective view of dispenser system 22 which includes exterior housing 38 supported by support assembly 40 which is mounted on base 42. Chemical A and Chemical B are fed into respective heater chemical hoses 28 and 30. Also shown in FIG. 1, is control console 52 with touch pad and screen and logic board(s) (inside housing). Film roll reception assembly 56 and film roll driver motor 58 extend out from support assembly 40 while housing 38 supports bag film operation adjustment pad board 54. For a more detailed discussion of the illustrated dispenser system 22 (e.g., relative to various foam-in-bag assembly sub-systems in addition to an edge sealer sub-system), reference is made to parent application U.S. Ser. No. 10/623,720 filed Jul. 22, 2003, which claims the priority of provisional application 60/468,988 filed May 9, 2003, with each of these being incorporated herein by reference.

Figure 2:
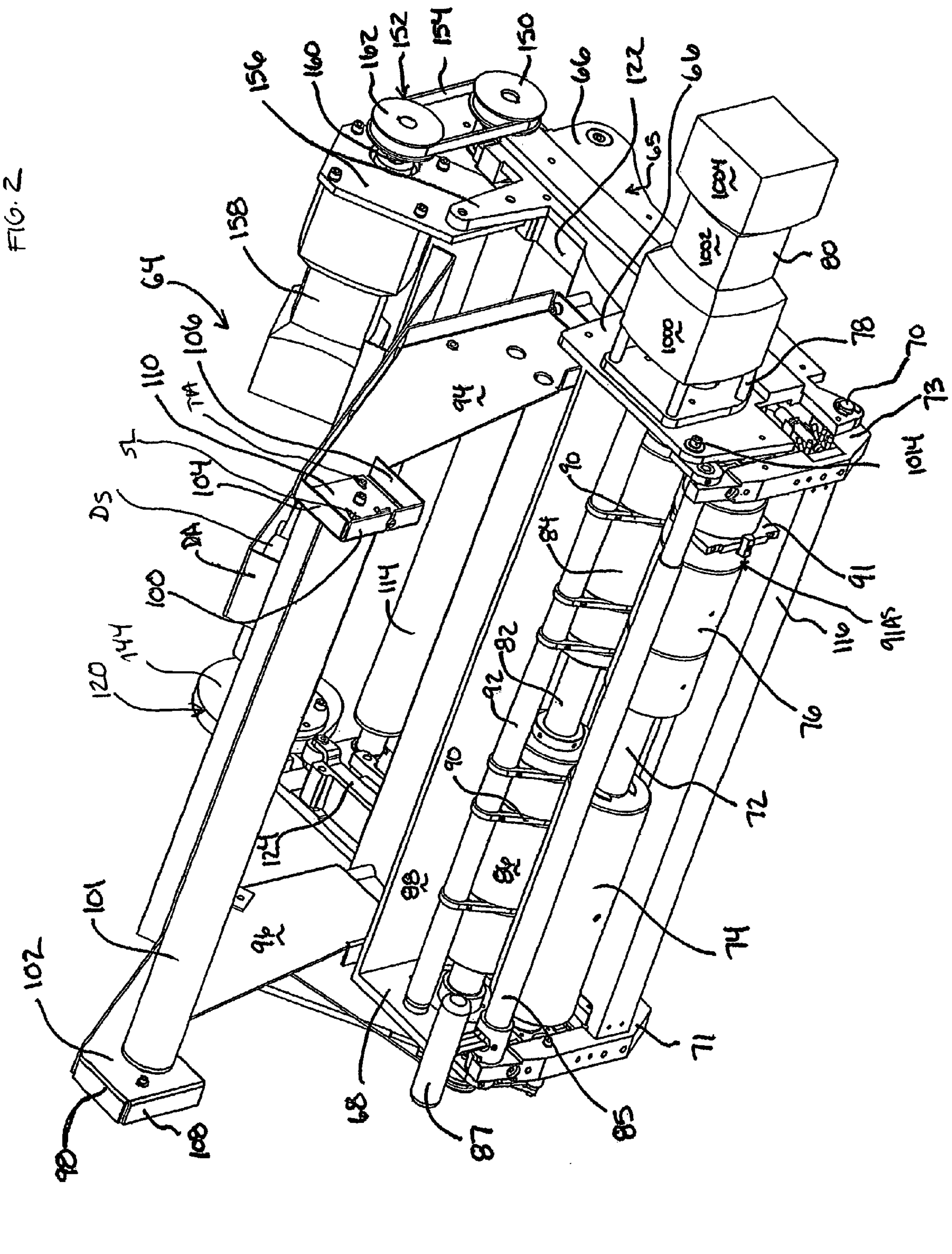
FIG. 2 shows a front perspective view of a bag forming assembly of the foam-in-bag manufacturing device of FIG. 1.
Figure 3:
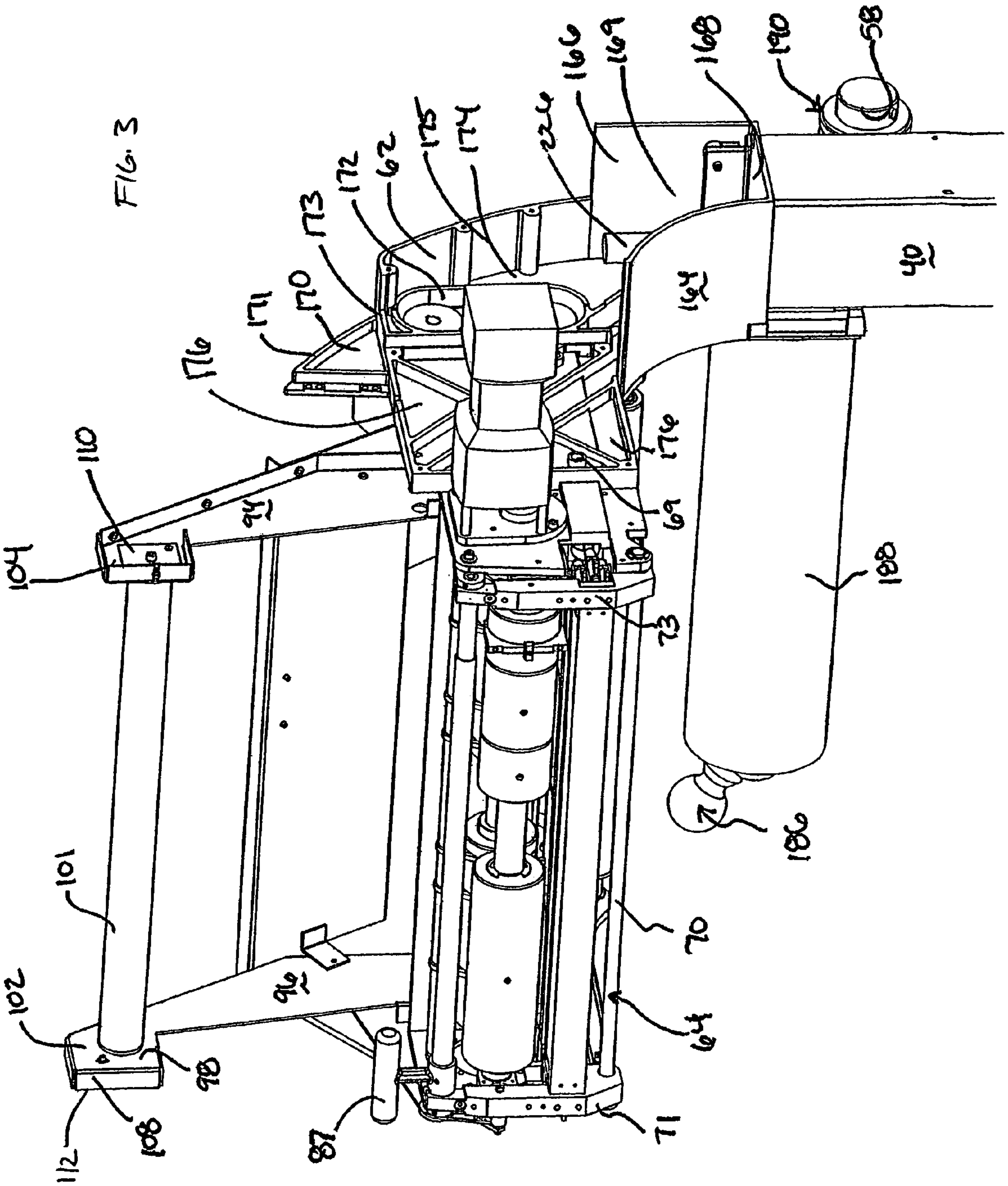
FIG. 3 shows a front perspective view of the bag forming assembly mounted on the support base.

FIGS. 2-5 shows foam-in-bag assembly or "bagger assembly" 64 (with dispenser removed for added clarity in FIGS. 2, 3 and 5) that is designed to be mounted in cantilever fashion on support mount or bracket 62 as shown in FIG. 3. Bagger assembly 64 comprises framework 65 having first side frame 66 and second side frame 68. Side frame 66 has means for mounting bagger assembly 64 to support bracket 62. Framework 65 further includes front pivot rod 70 extending between the two interior sides of side frames 66, and 68, as well as front face pivot frame sections 71 and 73 which are pivotally supported by pivot rod 70. Rod 70 also extends through the lower end of front face pivot frame sections 71 and 73 to provide a rotation support for sections 71, 73. Driver roller shaft 72, supporting left and right driven or follower nip rollers 74 and 76, also extends between and is supported by side frames 66 and 68. While in a latched state the upper ends of pivot frame sections 71, 73 are also supported (locked in closed position) by door latch rod 85 with handle latch 87.

First frame structure 66 further includes mounting means 78 for roller shaft drive motor 80 in driving engagement with drive shaft 82 extending between and supported by frame structures 66 and 68. Drive shaft 82 supports drive nip rollers 84 and 86. Framework 65 further comprises back frame structure 88. Driven roller shaft 72 and driver roller shaft 82 are in parallel relationship and spaced apart so as to place the driven nip rollers 74, 76, and drive nip rollers 84, 86 in a film drive relationship with a preferred embodiment featuring a motor driven drive roller set 84, 86 formed of a compressible, high friction material such as an elastomeric material (e.g., synthetic rubber) and the opposite, driven roller 74, 76 is preferably formed of a knurled aluminum nip roller set. The roller sets are placed in a state of compressive contact by way of the relative diameters of the nip rollers and rotation axis spacing of shafts 72 and 82 when pivot frame sections 71, 73 are in their roller drive operation state. FIG. 2 further illustrates door latch rod 85 rotatably supported at its opposite ends by pivot frame sections 71, 73 and having door latch (with handle) 87 fixedly secured to the left end of door latch rod 85. Latch 87 provides for the pivoting open of pivot frame sections 71, 73 of the hinged access door means about pivot rod 70 into an opened access mode. While in a latched state, the upper ends of pivot frame sections 71, 73 are also supported (locked in closed position) by door latch rod 85.

Drive nip rollers 84 and 86 have slots formed for receiving film pinch preventing means 90 (e.g., canes 90) that extend around rod 92 with rod 92 extending between first and second frames 66, 68 and parallel to the rotation axes of shafts 72 and 82. FIG. 2 further illustrates film edge sealer assembly 91, (a bag film edge sealer in this embodiment) shown received within a slot in roller 76 and positioned to provide edge sealing to a preferred C-fold film supply. Although not shown, other film source means are also featured under the present invention including, for example, separate source film sheets (e.g., individual sheet supply rollers) feeding to a common location or a single film roll with layered, but independent stacked sheets or a tubular film source as in one which is precut and then resealed after receiving material). In an alternate embodiment, such as a separate source film means or independent, stacked sheet source film means, there is provided a plurality of film sealer assemblies as in an opposite edge pair of edge sealer assemblies and/or one or more intermediate longitudinal film seal sealing means assemblies. An opposite edge pair is well suited for bag formation when independent (non-"C-fold" film) sheeting is utilized, while both edge and interior rows of seals are well suited for forming multiple rows of seal pockets as in a multi-pocket device as in an air cushioning device with multiple cells either in communication with each other or not, and either filled simultaneously with formation or designed for subsequent inflation as in shipping to a packing location in a non-inflated state and filled at that location.

Rear frame structure 88 has secured to its rear surface, at opposite ends, idler roller supports 94 and 96 extending up from the nip roller contact location. Idler roller supports 94, 96 include upper ends 98 and 100 each having means for receiving a respective end of upper idler roller 101. As shown in FIG. 2, ends 98, 100 present opposing parallel face walls 102, 104 and outward flanges 106, 108. Within the confines of flanges 106, and 108 there is provided first and second idler roller vertical and horizontal roller adjustment mechanisms 110, and 112 (FIG. 5) for smooth film passage. Sliding plate 110 is retained in a frictional slide relationship with surface 100 by way of slide tabs TA extending through elongated horizontal slots SL at opposite corners of the plate. On the front flange 100 FF (FIG. 4) there is supported adjustment screw SC extending into engagement with tab TA on sliding plate 110 receiving an end of the idle roller 101. Upon rotation of screw SC, plate 110 is shifted together with the end of the idler roller. The opposite side is just the same but for there being a vertical adjustment relationship.

With reference particularly to FIG. 2, second or lower idler roller 114 is shown arranged parallel to drive roller shaft 82 and supported between left and right side frames 66 and 68. Also, these figures show first (preferably fixed in position when locked in its operative position) end or cross-cut seal support block or jaw 116 positioned forward of a vertical plane passing through the nip roller contact location and below the axis of rotation of drive shaft 82. End seal jaw 116, which preferably is operationally fixed in position, is shown having a solid block base of a high strength (not easily deformed over an extended length) material that is of sufficient heat wire heat resistance (e.g., a steel block with a zinc and/or chrome exterior plating), and extends between left and right frame structures 66 and 68.

Figure 86:
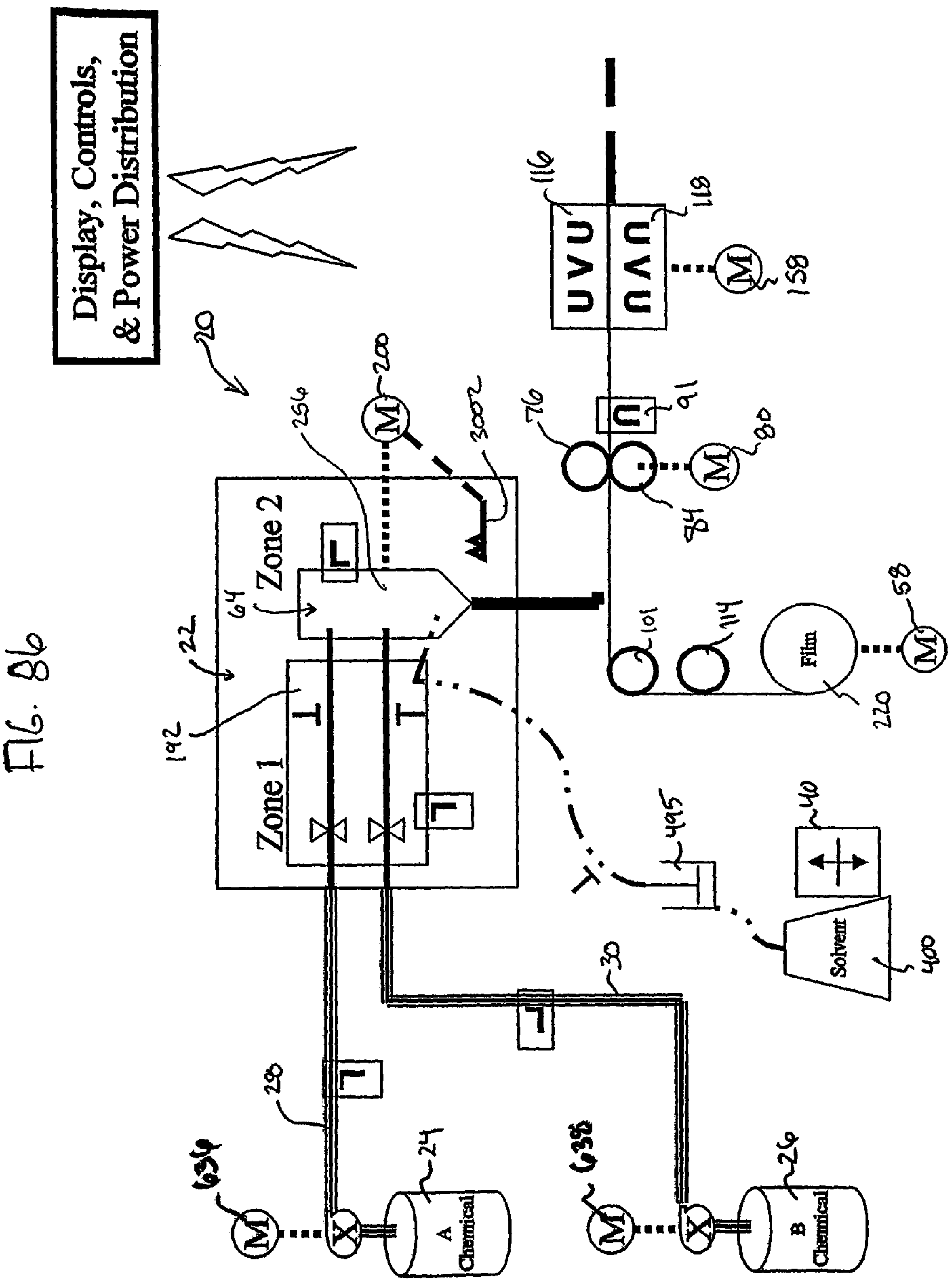
FIG. 86 shows an overall dispenser assembly sub-systems schematic view of the display, controls and power distribution for a preferred foam-in-bag dispenser embodiment.

Movable end film sealer and cutter jaw 118 (FIG. 5) is secured to end sealer shifting assembly 120 and is positioned adjacent fixed jaw 116, with fixed jaw 116 having sealer and cutter electrical supply means 119 with associated electric connections supported on the opposite ends of jaw 116 positioned closest to the front or closest to the operator. End sealer shifting assembly 120 is positioned rearward and preferably at a common central axis height level relative to end seal contact block 116. During formation of a bag, heater jaw 116 supports a cutter heated wire in-between above and below positioned seal forming wires providing the seal (SE) cut (CT) seal (SE) sequence in the bag just formed and the bag in the process of being formed. Sealer shifting assembly 120 as shown in FIG. 2, comprises first and second sealer support rod assemblies 122, 124. The heater and sealer wires are sensed and thus in communication with a controller such as one associated with a main processor for the system or a dedicated heater wire monitoring sub-processing as illustrated in FIG. 86. Venting preferably takes place on the side with the edge seal through a temporary lowering of heat below the sealing temperature as the film is fed past or some alternate means as in adjacent mechanical or heat associated slicing or opening techniques (See for example U.S. patent application Ser. No. 11/333,538 filed Jan. 18, 2006 entitled "Venting System For Use In A Foam-in-Bag System" which is incorporated herein by reference ). Block 118 also has a forward face positioned rearward (farther away from operator) of the above mentioned nip roller vertical plane when in a stand-by state and is moved into an end seal location when shifting assembly is activated and, in this way, there is provided room for bag film feed past until end sealer shifting assembly 120 is activated.

Cam shaft 4032 (FIG. 4) supports cams 144 at each end (one shown in FIG. 2) which cams are in driving relationship with track rollers 122' and 124'. The cams are shaped to generate forward and spring return retraction movement relative to moving jaw 118. The cam shaft 4032 (and attached cams) are driven by way of drive pulley 150 forming part of drive pulley assembly 152 which further includes pulley belt 154. As seen from FIG. 2, side frame 66 includes cam motor support section 156 to which cam motor 158 is secured. Cam motor drive shaft 160 is secured to drive pulley 162 of drive pulley assembly 152. Thus, activation of cam motor 158 leads to drive force transmission by transmission means (represented by the drive pulley assembly in the illustrated preferred embodiment) which in turn rotates cam shaft 4032 and cams 144 fixedly mounted thereon to provide for the pushing forward during the push forward cam rotation mode and the rearward movement guidance of jaw 118 after the sealing function is completed (can include cutting as sole means of sealing or as a component of multiple seals (non-cutting and cutting) or as a weakening for downstream separation in a bag chain embodiment through control of the level of heat and time of contact with film or a means for interconnecting cells). FIG. 2 also illustrates the preferred external support plates 156 for cam motor 158, and plate 66 for drive shaft motor 80.

With reference to FIG. 3, there is illustrated a preferred bag formation assembly mounting means featuring lifter assembly 40 and securement structure 62. Securement structure 62 comprises curved forward wall 164 and vertical back wall 166 which, together with lifter top plate 168, define cavity 169. Securement structure 62 further comprises curving interior frame member 170, which has an outer peripheral edge 171 that provides for dispenser hinge bracket support and a back curved flange section 175 extending outward and integral with frame member 170 as well as outer frame wall 174. Frame wall 174 has a pulley drive assembly reception aperture 172 formed therein.

Further longitudinally (right side-to-left side) outward of frame wall 174 is mounting plate 176 for securement of the electronics such as the system processor(s), interfaces, drive units, and external communication means such as a modem or wireless transmitter. FIG. 3 also illustrates the supporting framework for the hinged front access door assembly shown open in FIG. 5 which comprises front access door plate 180 (partially shown in FIG. 4) supported at opposite ends by pivot frame sections 71 and 73. Pivot frame sections 71 and 73 preferably have a first (e.g., lower) end which is pivotally secured to pivot rod 70 and also between which rod 70 extends.

FIG. 3 further reveals film roll support means 186 shown supporting film roll core 188 about which bag forming film is wrapped (e.g., a roll of C-fold film). Film roll support means 186 is in driving communication with film roll/web tensioning drive assembly 190 (partially shown in FIG. 3) with motor 58 shown supported on the back side of lifter assembly 40.

Figure 4:
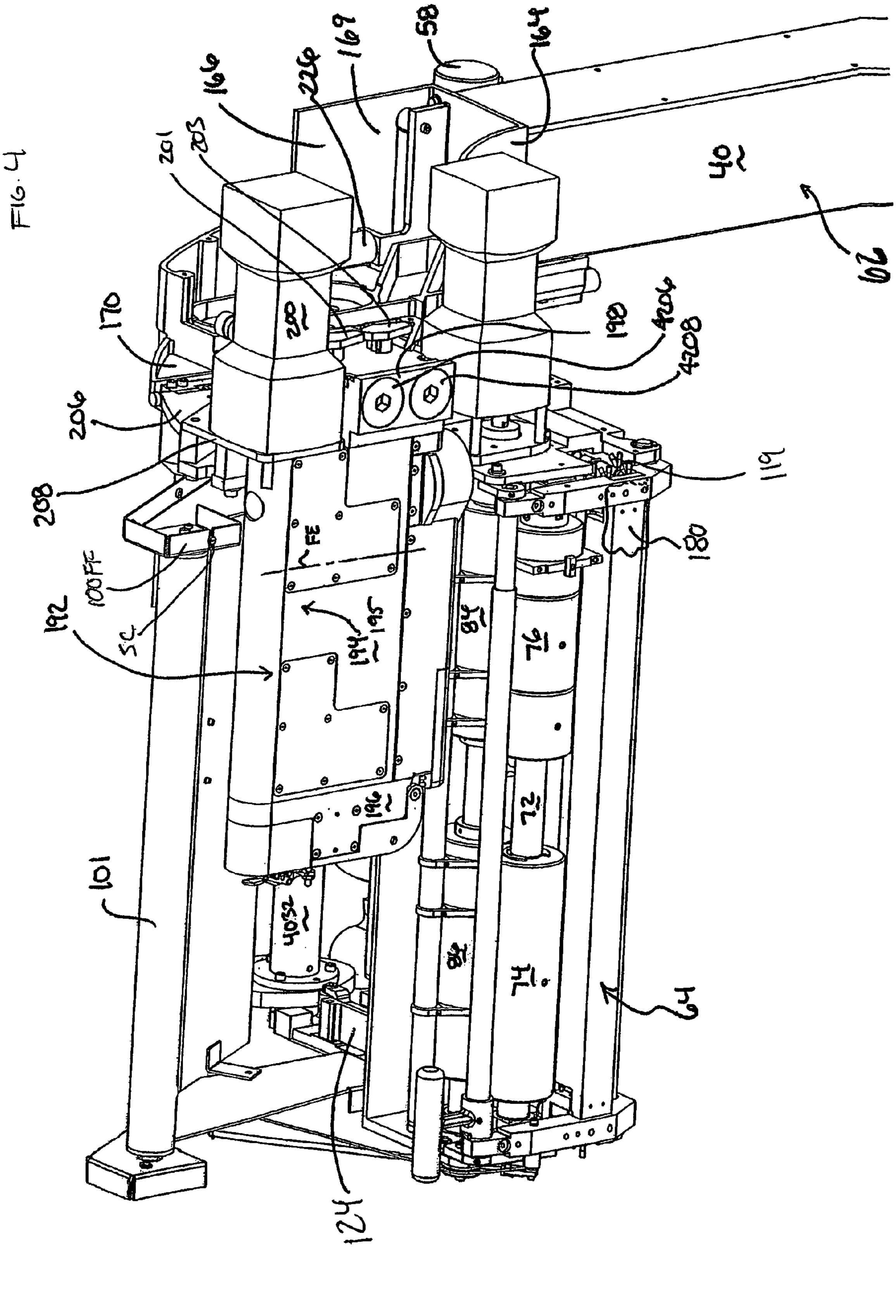
FIG. 4 shows a front perspective view of that which is shown in FIG. 3 together with a mounted dispenser apparatus (dispenser and bagger assembly combination).

FIG. 4 provides a perspective view of bagger assembly 64 mounted on mounting means 78 with dispenser apparatus 192 included (e.g., a two component foam mix dispenser apparatus is shown), which is also secured to support assembly 62 in cantilever fashion so as to have, when in its operational position, a vertical central cross-sectional plane generally aligned with the nip roller contact region positioned below it to dispense material between a forward positioned central axis of shaft 72 and a rearward positioned central axis of shaft 82. As shown in FIG. 4, dispenser assembly 192 comprises dispenser housing 194 with main housing section 195, a dispenser end or outward section 196 of the dispenser housing with the dispenser outlet preferably also being positioned above and centrally axially situated between first and second side frame structures 66, and 68. With this positioning, dispensing of material can be carried out in the clearance space defined axially between the two respective nip roller sets 74, 76 and 84, 86.

Dispenser assembly 192 further includes chemical inlet section 198 positioned preferably on the opposite side of main dispenser housing 192 relative to dispenser and section 196. The outlet or lower end of dispenser assembly 194 is further shown positioned below idler roller 101.

FIG. 4 also illustrates dispenser motor 200 used for dispenser outlet flow controlling valve rod (e.g., a flow on/flow off reciprocating valve rod reciprocating in dispenser end section). Inlet end section 198 comprises chemical shut off valves with chemical shut off valve handles 201, 203 as well as filters 4206 and 4208. In FIG. 4 there is demarcation line FE representing the most interior film edge with the opposite edge traveling forward of the free end of dispenser system 192. Thus, with a C-fold film, the bend edge is free to pass by the cantilevered dispenser assembly 192 while the interior two sides are joined together with edge sealer assembly 91 while passing along line edge FE.

Figure 5:
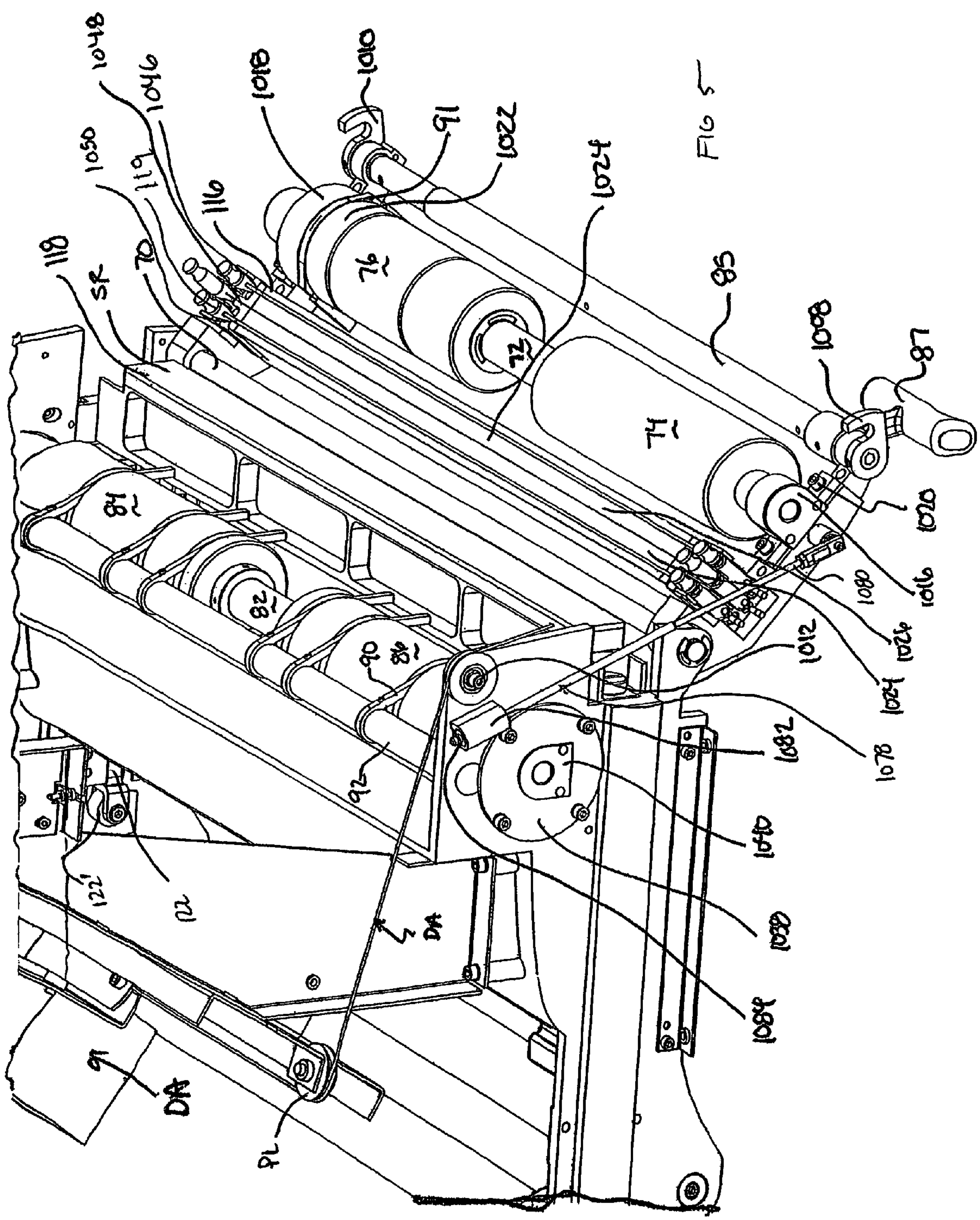
FIG. 5 shows a view of the front access panel in an open state.

FIG. 5 illustrates adjustment of the access panel into the panels exposed, service facilitating state. When rotated and locked in its upright state, the front of heater jaw assembly 1024 is in its operational position aligned with the aforementioned moving jaw 118. The preferred embodiment features having the heating wires (cutting as well as sealing in the preferred embodiment shown) used to cut and seal the end of one bag from the next on the heated jaw 1024 and to have the heated jaw 1024 fixed in position relative to moving jaw 118. A reversal or sharing as to heat wire support and/or wire backing support movement are also considered alternate embodiments of the present invention. Having the moving mechanism positioned out of the way under the bagger assembly is, however, preferable from the standpoint of stability and compactness. Also, having the heater wires on the accessible door facilitates wire servicing as described below. Heater jaw assembly 1024 is shown rigidly fixed at its ends to the front face pivot frame sections to provide a stable compression backing relative to the moving jaw 118 and is positioned, relative to the direction of elongation of frame sections 71 and 73, between the aforementioned driven roller set and the pivot bar 70 to which the bottom bearing ends of frame sections 71 and 73 are secured.

With the cam latches and handle in the front face closed mode (shown in FIG. 2 with latches 1008 and 1010 engaged with pin stubs 1012, 1014), the driven rollers are positioned in proper nip location in relationship to the drive rollers 84 and 86 that are preferably of a softer high friction material as in an elastomer (e.g., natural or synthetic rubber) to facilitate sufficient driving contact with the film being driven by the rollers and proper edge sealer placement. In addition to proper film drive positioning brought about by the latched front access door arrangement, the heater jaw is also appropriately positioned to achieve a proper cut and/or seal relationship relative to the opposite jaw.

The flip open front door access means of the present invention provides easy access to the sealing jaws, seal wires, cut wires, and the various substrates and tapes that cover the jaw face(s) and one or more edge sealer means as in edge sealer assembly 91. Opening the door provides full visibility, greatly easing the task of servicing the sealing jaws and edge sealers to provide the inevitably required periodic maintenance (e.g., cleaning of melted plastic build up and/or foam build up).

FIG. 5 also illustrates door movement limitation means or door stop 1078 which comprises connection rod 1080 extending through fixed reception member 1082 having a passage through which the rod extends and a base secured to the fixed frame 68. At the free end of rod 1080 there is provided clip 1084 to prevent a release of the rod from member 1082 and a stop means to limit the downward rotation of the fixed jaw and front access door. The opposite end of connector rod 1080 is connected to part of the flip open access door such as front face pivot frame structure 71. Thus, the hinged access door is precluded from rotating freely down into contact with fixed frame structure of the bagger assembly. Additional damping means DA is preferably also provided as illustrated in FIGS. 2 and 5 featuring a pair of constant force negator springs DS arranged in mirror image fashion to counteract forces generated by the springs at their fixed positing on the support extending up from frame structure 88. The negator springs are held in a bracket support and connected by way of a cable past the two illustrated redirection pulleys PL to connection to hinged front door.

An advantage of the access door flip open feature is easy access to the edge sealer assembly 91. Edge sealer assembly 91 is shown as part of edge sealer assembly combination 91AS with assembly 91 comprising arbor base support 1108 and edge sealer 1106, and combination 91AS including the edge sealer assembly plus additional components for integrating the edge sealer assembly in with the seal material providing means as in a bag forming assembly (e.g., a combination comprising the sub-roller set and bearing that provides for edge sealer assembly positioning relative to the driving means for the film; alternate edge sealer mounting means are also featured under the present invention). Edge sealer 1106 preferably has quick release means as in plug-in ends similar to those shown for the end sealer and cutter wires and roller connector means. Thus the access provided by the door allows for either replacement, servicing or cleaning of the entire edge sealer assembly combination 91AS or individual components thereof such as the edge sealer assembly 91 with its support base or just the double pin and heater wire combination or the below described high temperature insert head and/or heater element, with one of the standard prior art edge sealers typically requiring cutter wire servicing about every 20,000 to 30,000 bag cycles or less.

An additional not easily accessed and difficult to service component of the dispenser system is the roller canes 90 (FIG. 5) used to prevent undesired extended retention of the film on the driving nip roller. With the access made available by the access means of the present invention, an operator or service representative can readily clean or replace a cane 90.

Figure 6:
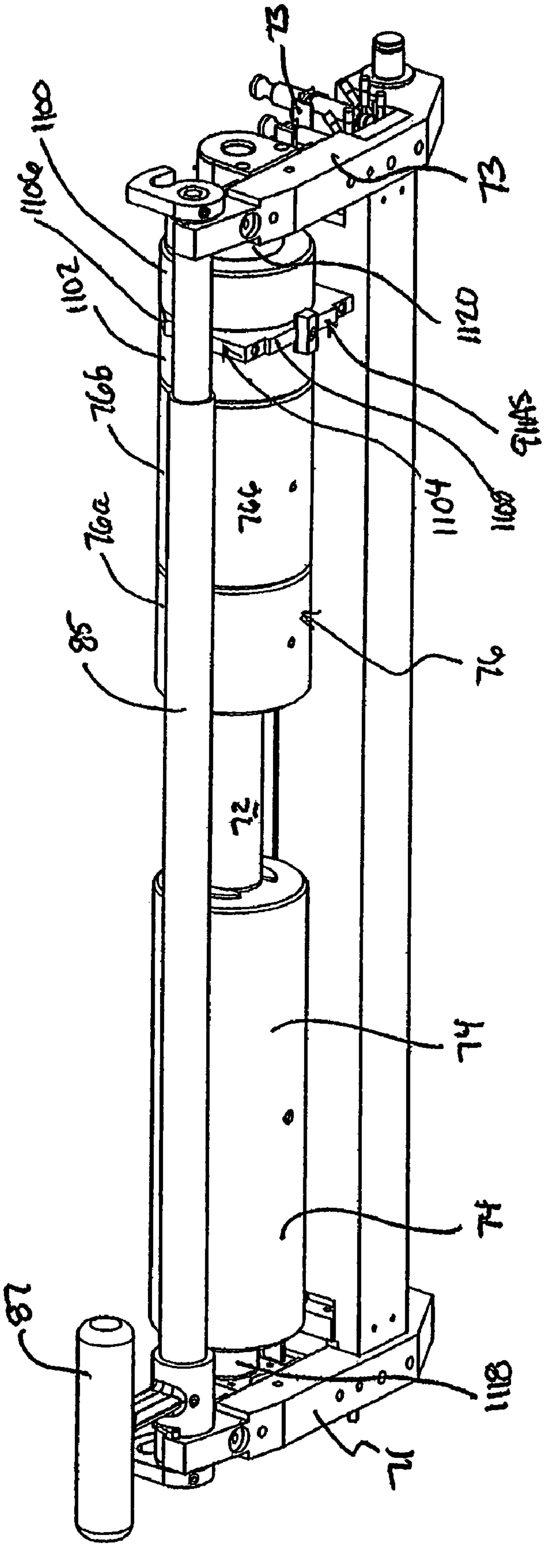
FIG. 6 shows the assembly supported by the front panel frame sections.
Figure 7:
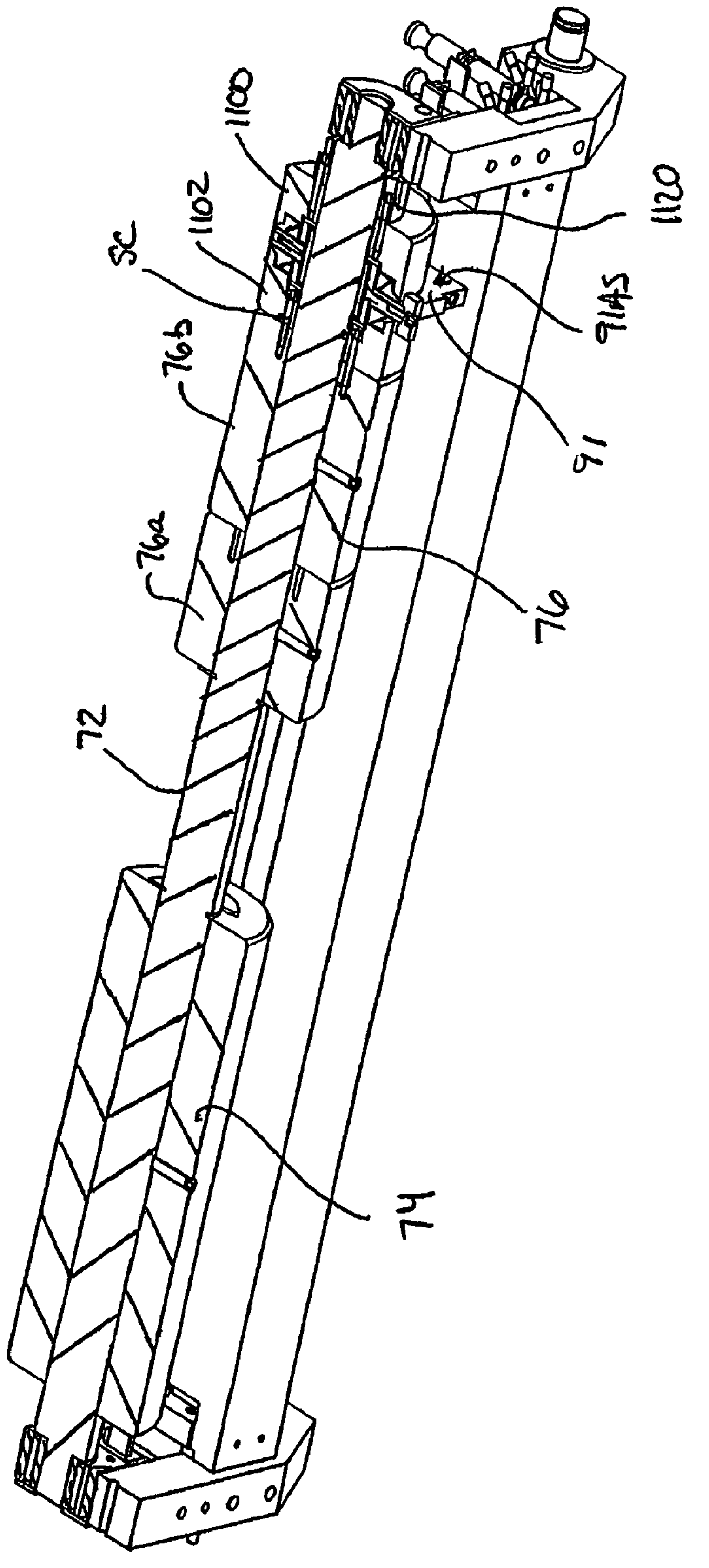
FIG. 7 shows a cross-sectional view of the roller assembly of FIG. 6.

As seen from FIG. 5, and the view of the driven roller assembly shown in FIG. 6 with driven shaft 72 and driven rollers 74 and 76, as well as the cross-sectional view of the same in FIG. 7, edge sealer assembly 91 is mounted on shaft 72 which is preferably a precision ground steel support shaft supporting aluminum (knurled) driven rollers 74 and 76. Edge sealer assembly 91 is shown as well in FIG. 2 on the right side of driven shaft 72 (viewing from the front of the bagger) in a side abutment relationship with driven roller 76. The cross sectional view of FIG. 7 shows driven roller 76 preferably being formed of multiple sub-roller sections with driven roller 76 having three individual sub-roller sections **76*a* and 76*b* and the sub-rollers 1100 and 1102 of edge seal assembly combination 91AS (e.g., in the illustrated edge seal assembly embodiment combination 91AS includes edge sealer assembly 91 and roll segments 1100 and 1102**).

Thus with this positioning, edge sealer assembly 91 is the sealer that seals the open edge side of the folded bag. The open edge side is produced by folding the film during windup of the film on core 188 (FIG. 3), so the folded side does not need to be sealed and can run external to the free end of the suspended dispenser. The present invention features other bag forming techniques such as bringing two independent films together and sealing both side edges which can be readily achieved under the design of the present invention by including an additional edge sealer assembly on the opposite driven roller such as in the addition of a seal assembly in roller **74*a*. The open side edge side of the film is open for accommodating suspended dispenser insertion and is sealed both along a direction parallel to the roller rotation axis via the aforementioned heated jaw assembly and also transversely thereto via edge sealer assembly 91**.

Figure 8:
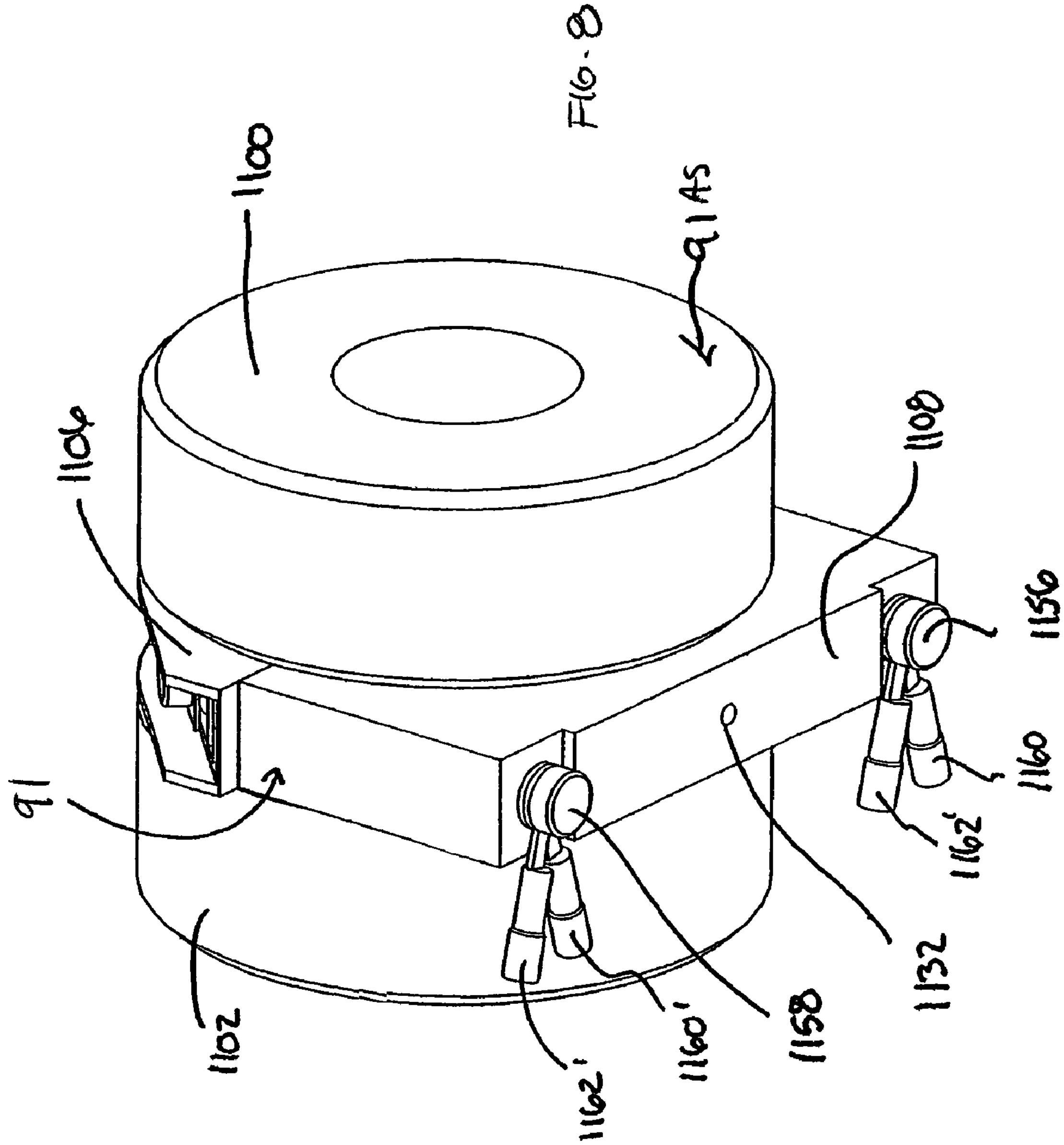
FIG. 8 shows a first perspective view of a first embodiment of edge sealer assembly from the electrical contact side.
Figure 14:
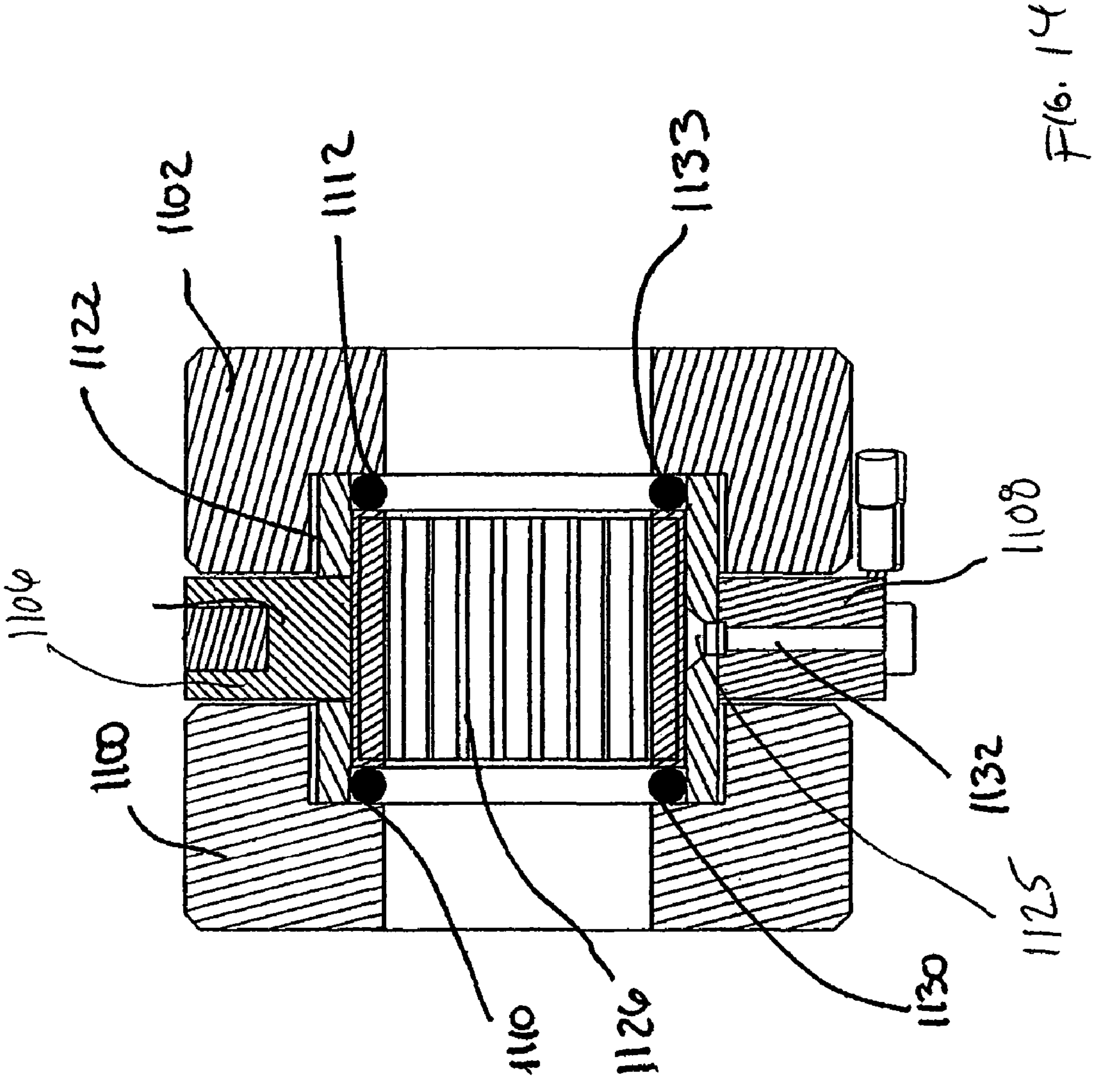
FIG. 14 shows a cross-sectional view taken along cross-section line A-A in FIG. 12.
Figure 18:
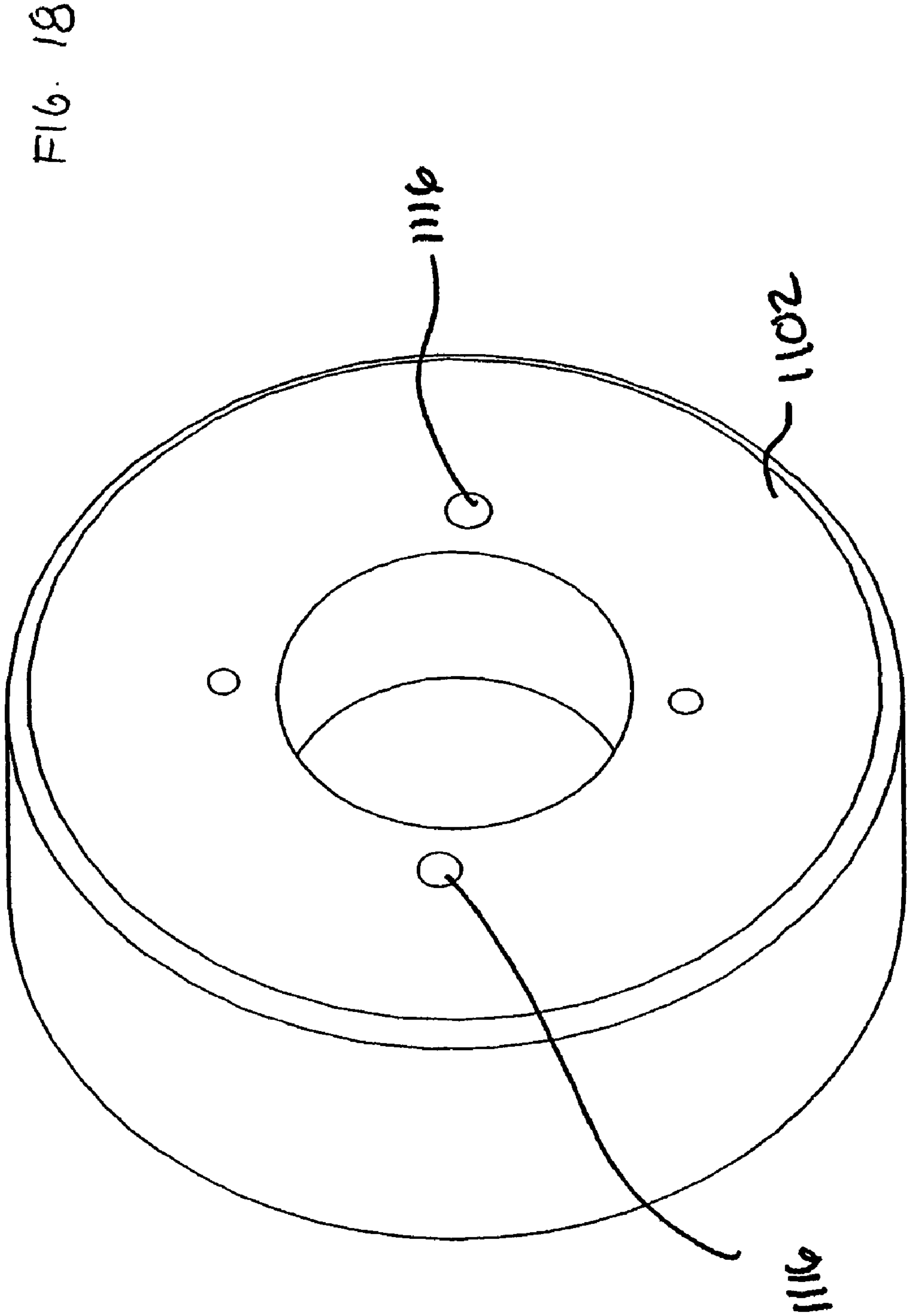
FIG. 18 shows the exterior side of one of the two sub-rollers of the first embodiment of the edge seal assembly.
Figure 19:
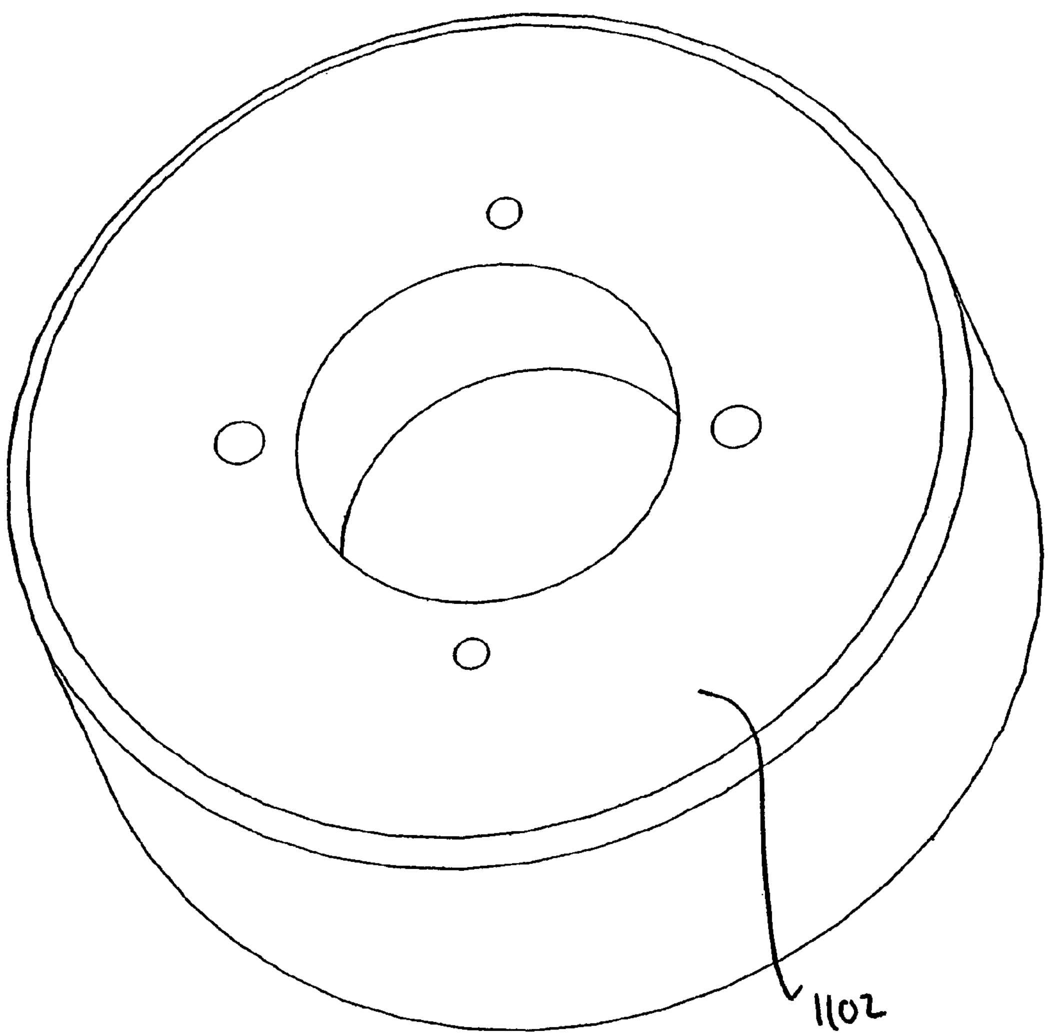
FIG. 19 shows the exterior side of one of the two sub-rollers of the second embodiment of the edge seal assembly.
Figure 20:
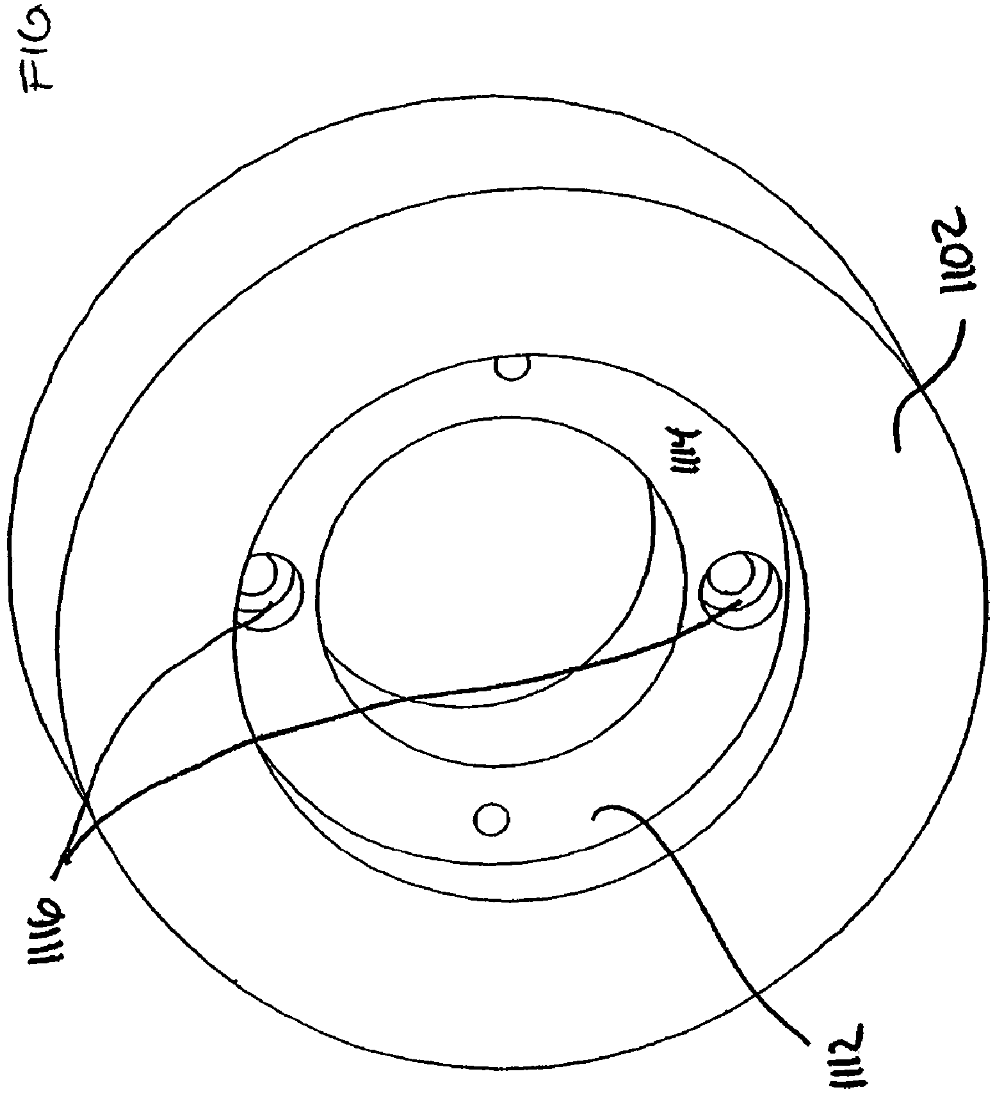
FIG. 20 shows the interior side of the sub-roller in FIG. 18.
Figure 21:
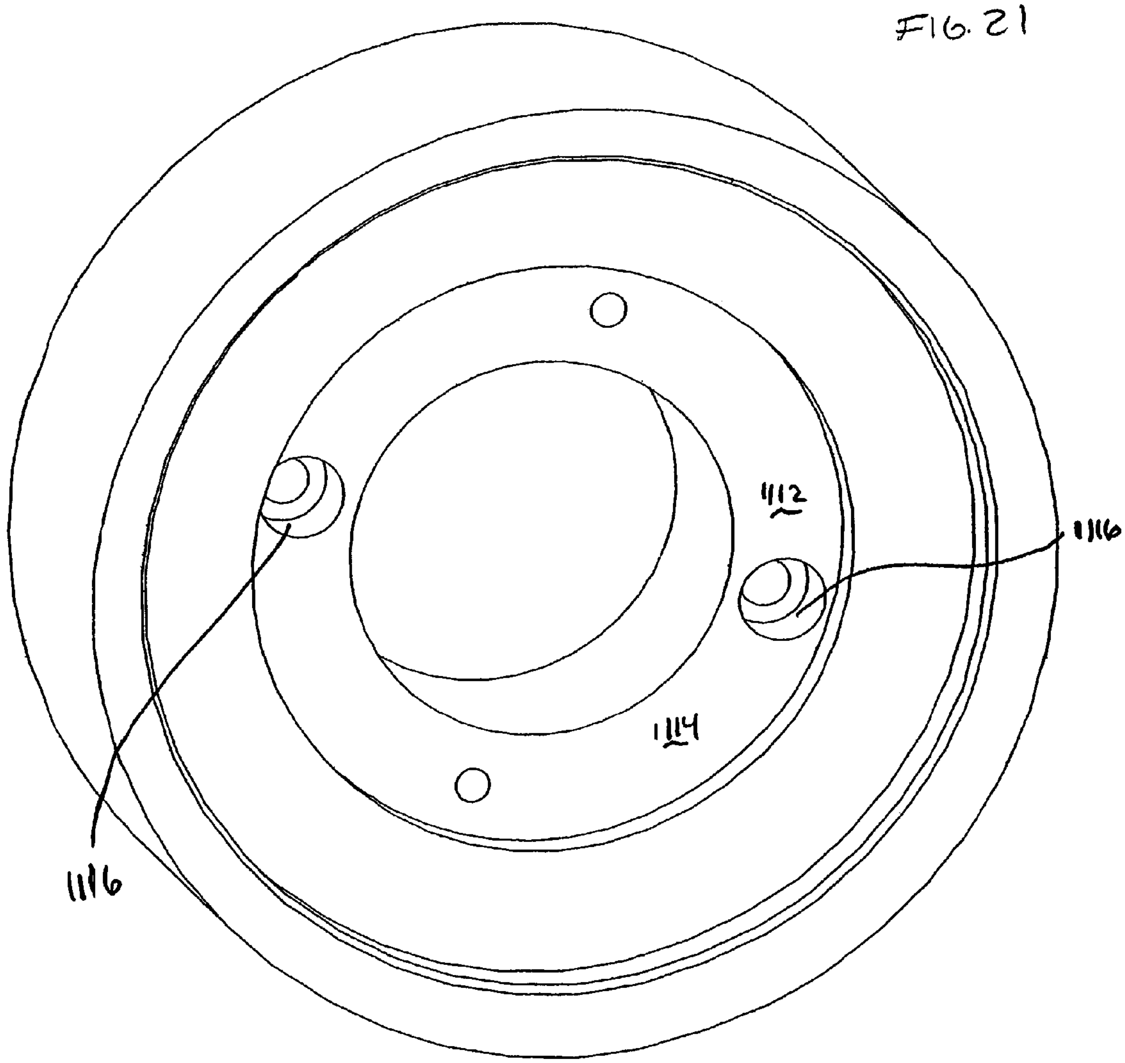
FIG. 21 shows the interior side of the sub-roller in FIG. 19.
Figure 67:
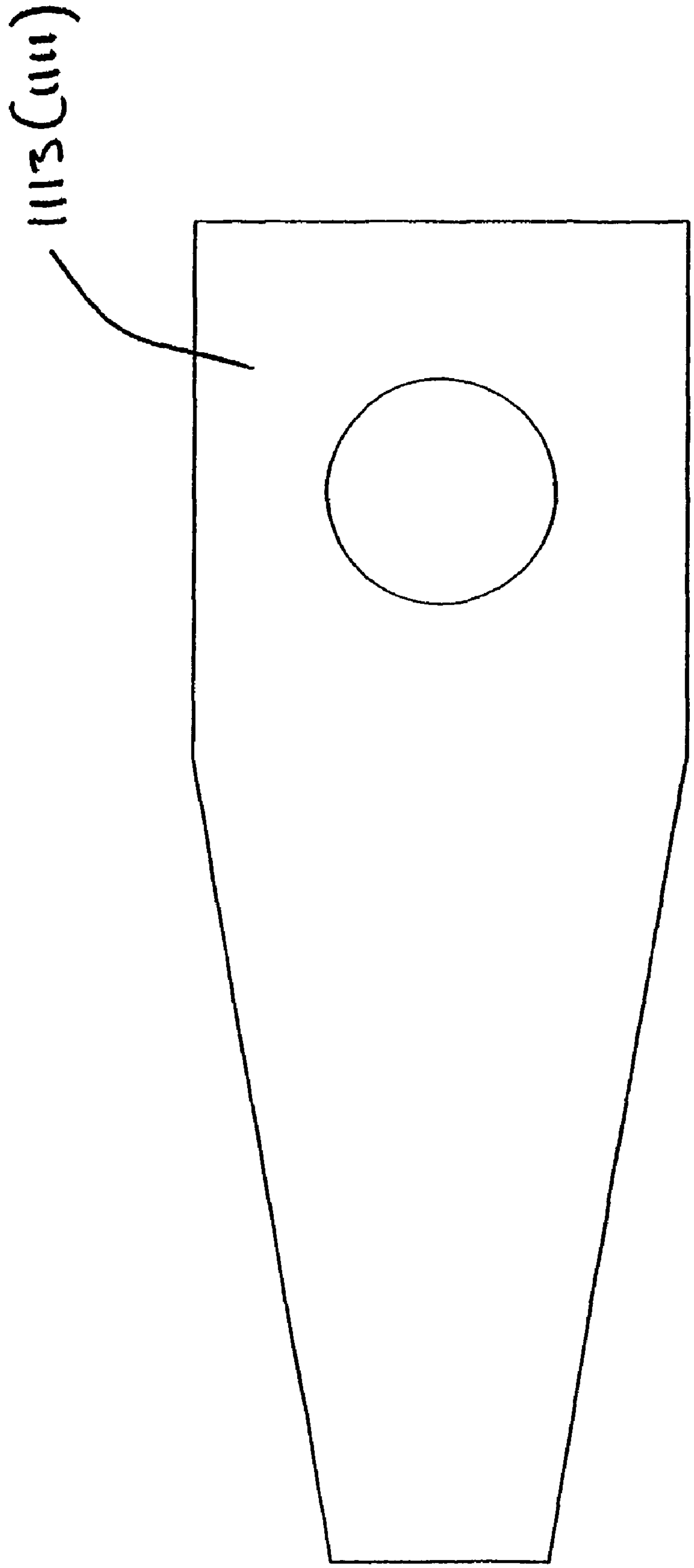
FIG. 67 shows a heater wire end connector in the wire tensioning assembly.

FIGS. 8 to 67 illustrate in greater detail an embodiment of edge sealer assembly combination 91AS (with two different edge seal types referenced as 91 and 91' with the letter “A” added to represent components of the second edge sealer assembly embodiment 91'). Edge sealer assembly combination 91AS comprises first and second sub-rollers 1100 and 1102 and edge sealer assembly 91 having edge sealer (or arbor assembly) 1106 on the film contact side of the driven roller and support base (or arbor base) 1108 on the opposite side. FIG. 14 shows each sub-roller 1100 and 1102 having a pocket cavity 1110 and 1112. FIGS. 18 and 20 illustrate sub-roller 1102 with pocket cavity and with the cavity interior surface 1114 having a pair of screw holes 1116 spaced circumferentially (diametrically) around it, that open out at the other end as shown in FIG. 18. Thus, edge seal roller 1102, which is positioned on the side of the edge seal assembly 91 that is closest to the center of elongation of shaft 72, is attached to adjacent driven sub-roller **76*b* by insertion of screws SC (FIG. 7) through screw or fastener holes 1116 and into receiving thread holes formed in driven sub-roller section 76*b*. This arrangement thus ensures that the sub-roller 1102 will not drag with the edge seal unit, causing it to rotate more slowly than the rest of the driven nip rollers. Sub rollers 76*a*** and 76*b* are each secured to shaft 72 with a fastener as shown in FIG. 7 as is roller 74. The edge seal sub-roller 1100 is positioned on the outer side closest to the adjacent most end of driven shaft 72 and is attached to the closest of the shaft collars (in FIG. 7) 1120 positioned at the end of driven shaft 72 and secured to the shaft to rotate together with it. Shaft collar 1120 forces edge seal sub roller 1100 to also rotate as a unit with the shaft 72 in unison with sub-roller 1102 but is independent of that sub-roller except for the common connection to shaft 72.

Figure 22:
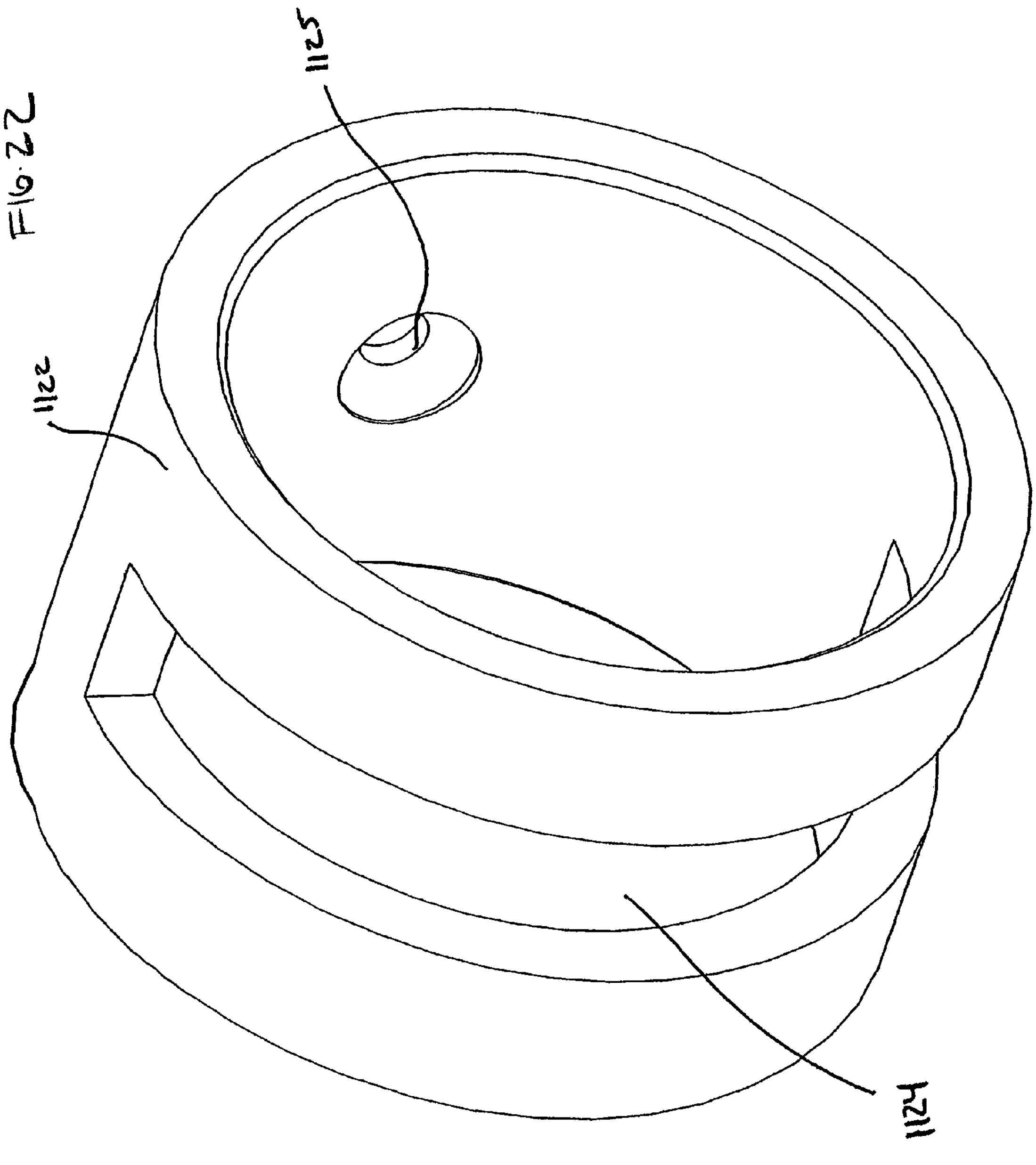
FIG. 22 shows the internal sleeve of the first embodiment of the edge seal assembly.
Figure 23:
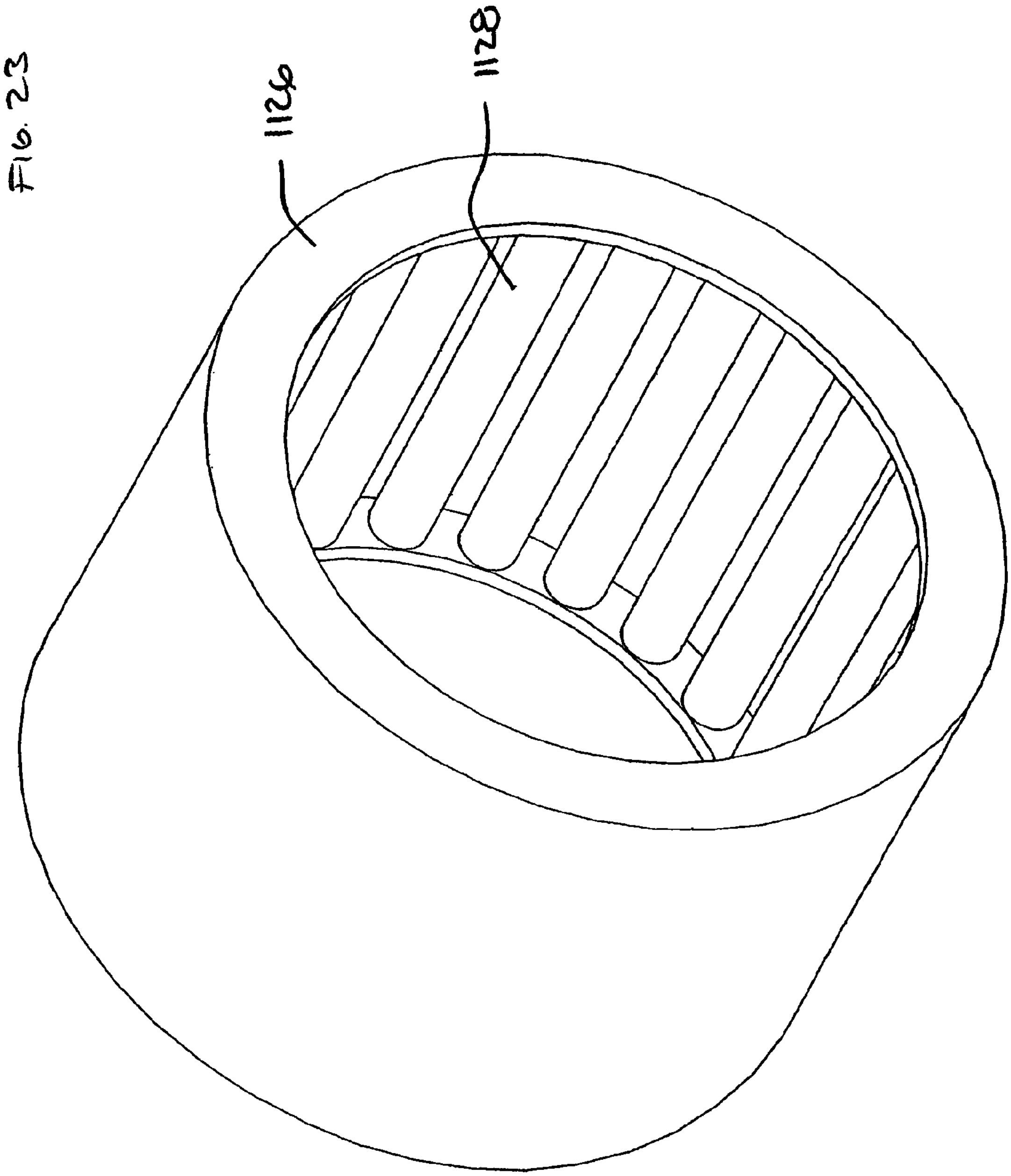
FIG. 23 shows the roller bearing of the first embodiment of the edge seal assembly which is received by the sleeve and receives the driven roller set shaft.

FIG. 14 shows that extending within and between pocket cavities 1110 and 1112 is edge seal sleeve 1122 which is shown alone in FIG. 22 and functions as a means for providing a site of attachment for support base 1108 and a positioner for edge sealer 1106. Sleeve 1122 includes a cylindrical housing having an axially centrally positioned slot 1124 that extends circumferentially around for ½ of the circumference of the sleeve 1122 and occupies about a third of the entire axially length of sleeve 1122. Sleeve 1122 further includes fastener hole 1125 positioned on the solid side of sleeve 1122 diametrically opposite to slot 1124. In addition to locating arbor base 1108, sleeve 1122 further functions as means for supporting cylindrical roller bearing 1126 which is preferably secured by way of a press fit into the sleeve and arranged so that the driven shaft 72 runs through the center of the bearing 1126 and the large radius on the bottom surface of the arbor assembly rests on the exposed (slot location) surface of the bearing's outside diameter. As shown in FIG. 23, rollers 1128 or other bearing friction reduction means are arranged around the interior or inside diameter of the roller bearing and protect the surface of the bottom surface of the edge sealer or arbor assembly 1106 so that the arbor assembly is unaffected by the rotating shaft and thus not worn down by that rotation. This provides for the feature of precision positioning and maintenance of the compression depth of the below described edge seal heater element (e.g., heater wire ribbon) into the surface of the elastomeric or compressible material of the opposite drive roller 84 (FIG. 2) to be maintained which provides for high quality seals to be formed and extends the life of arbor assembly 1106. In other words, the seal compression depth, which controls the length of the sealing zone (and venting zone) and the pressure of the sealing wire on the film has a significant influence in the quality of the edge seal. FIG. 14 further illustrates seal rings 1130, 1133 positioned around the opposite axial ends of bearing 1126.

Figure 16:
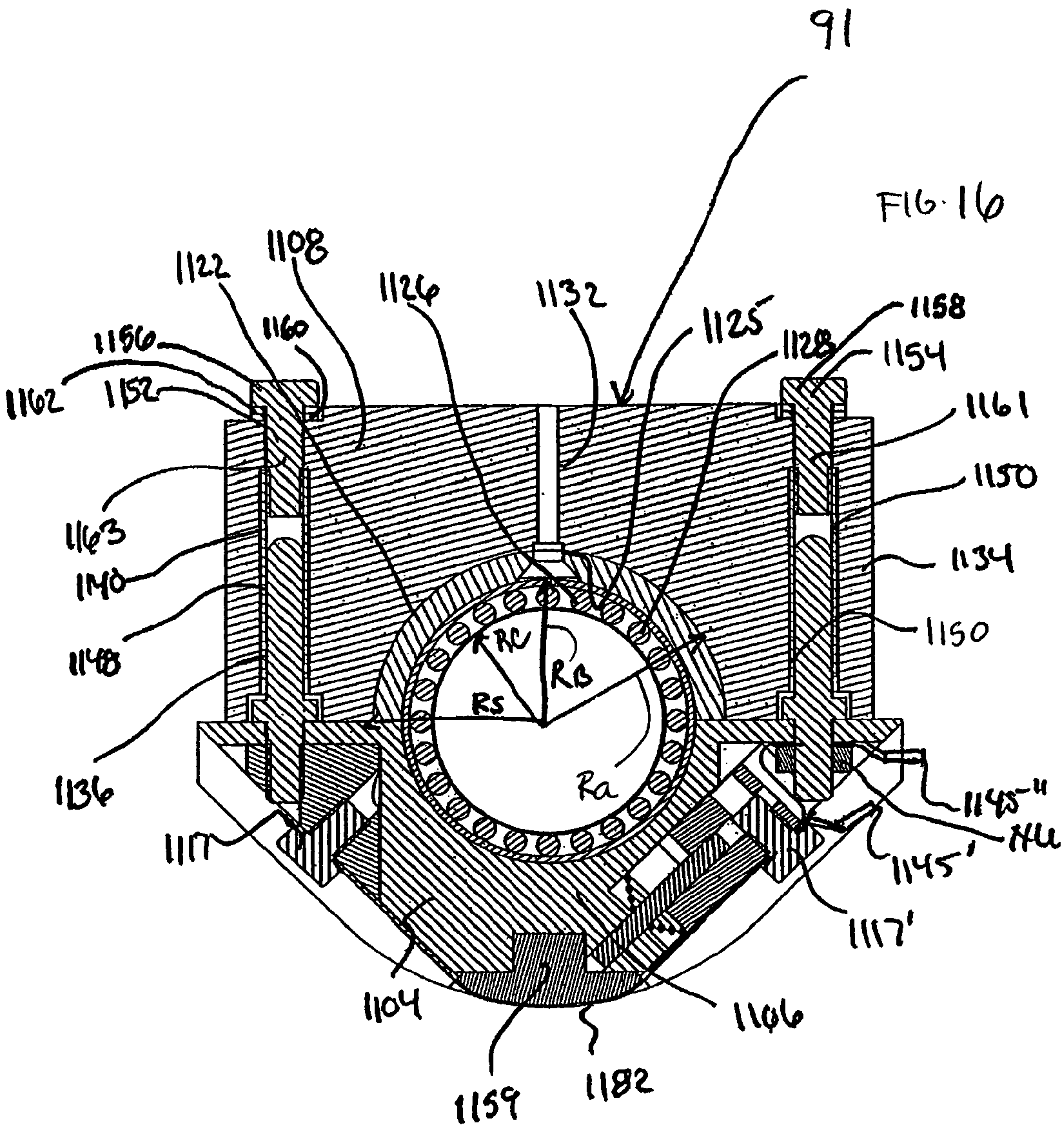
FIG. 16 shows a cross-sectional view taken along cross-section line B-B in FIG. 12.
Figure 24:
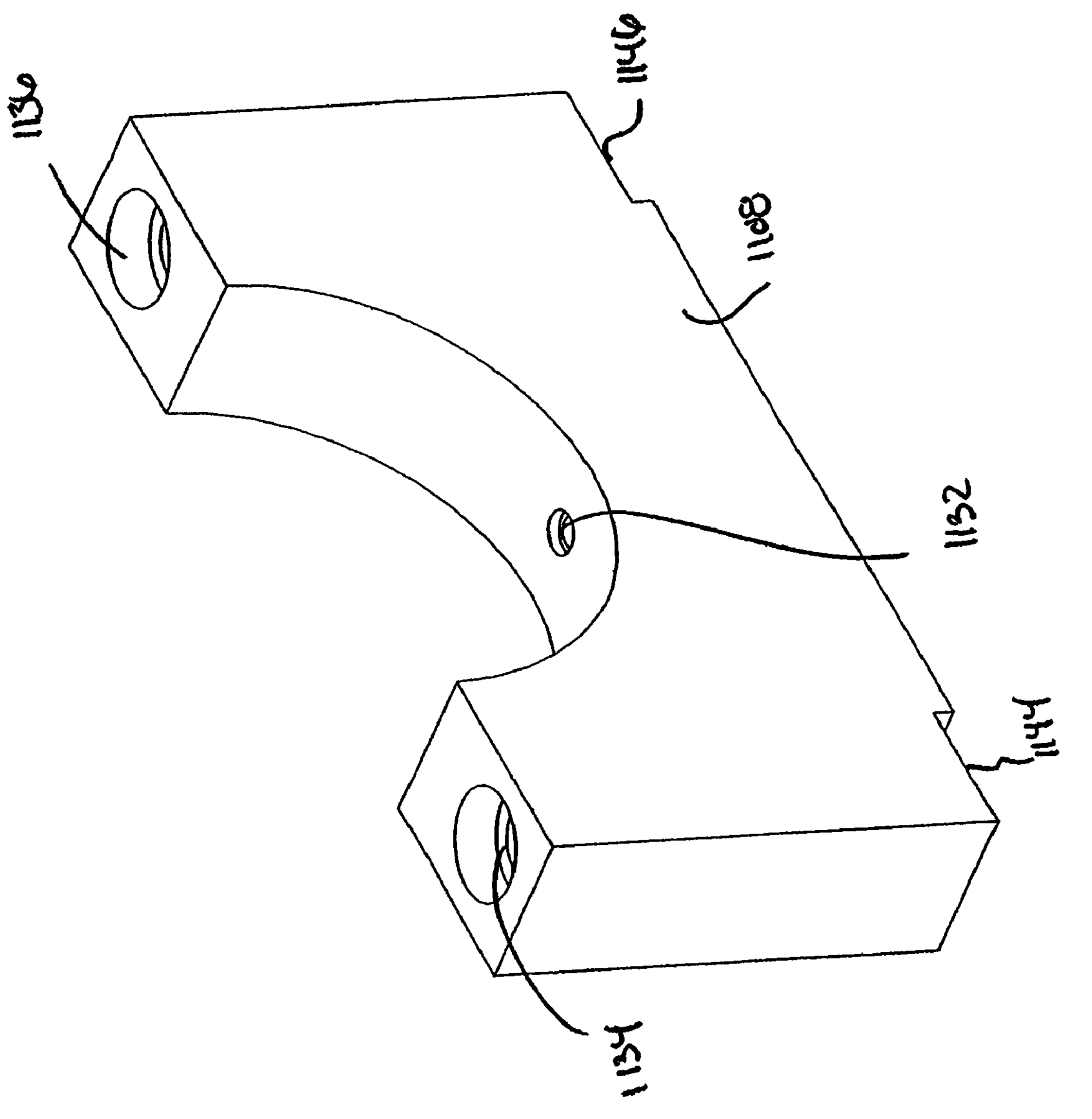
FIG. 24 shows a perspective view of the arbor support base of the first embodiment of the edge seal assembly.
Figure 26:
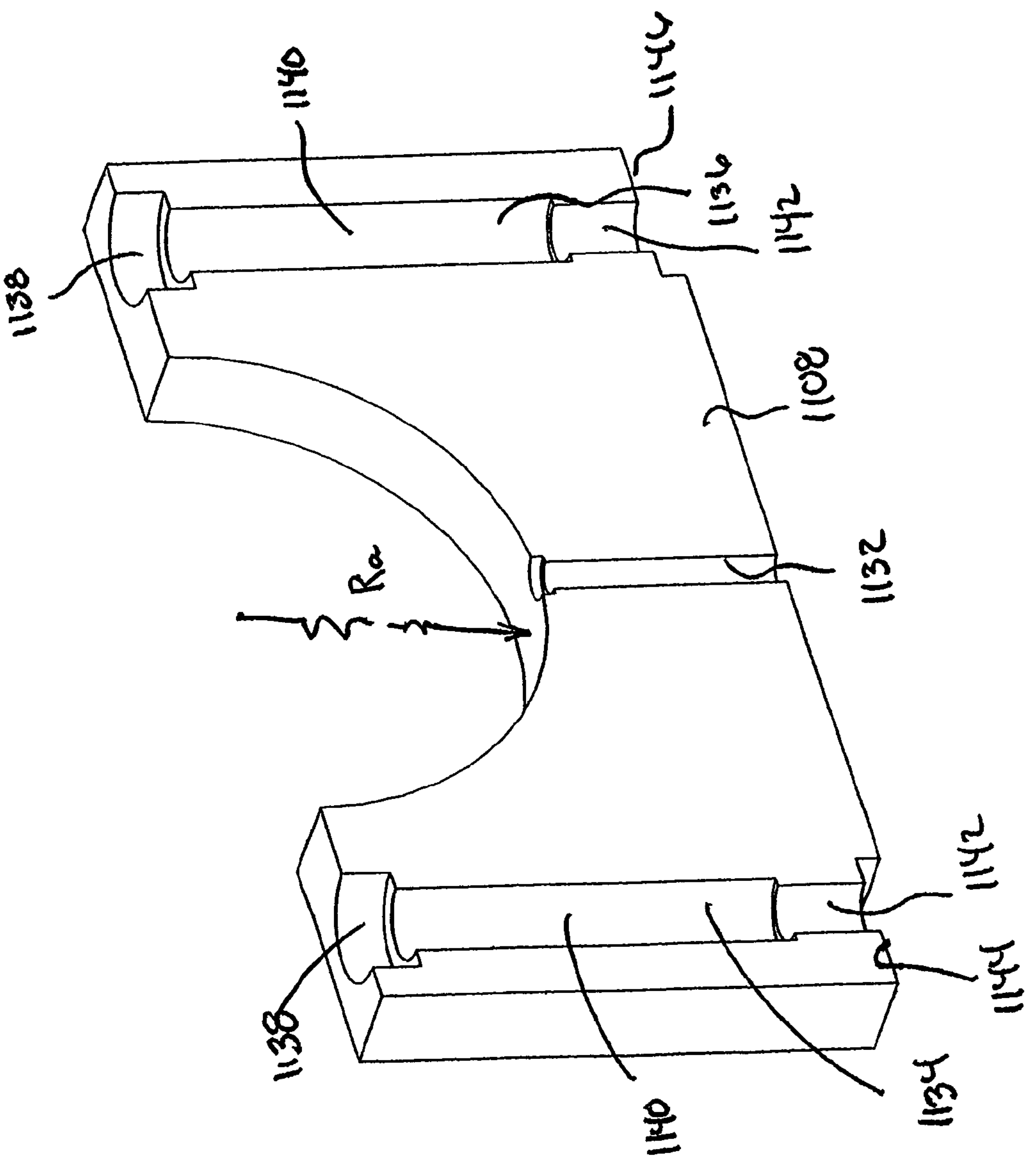
FIG. 26 shows a cross-sectional view of the arbor support base shown in FIG. 24.
Figure 27:
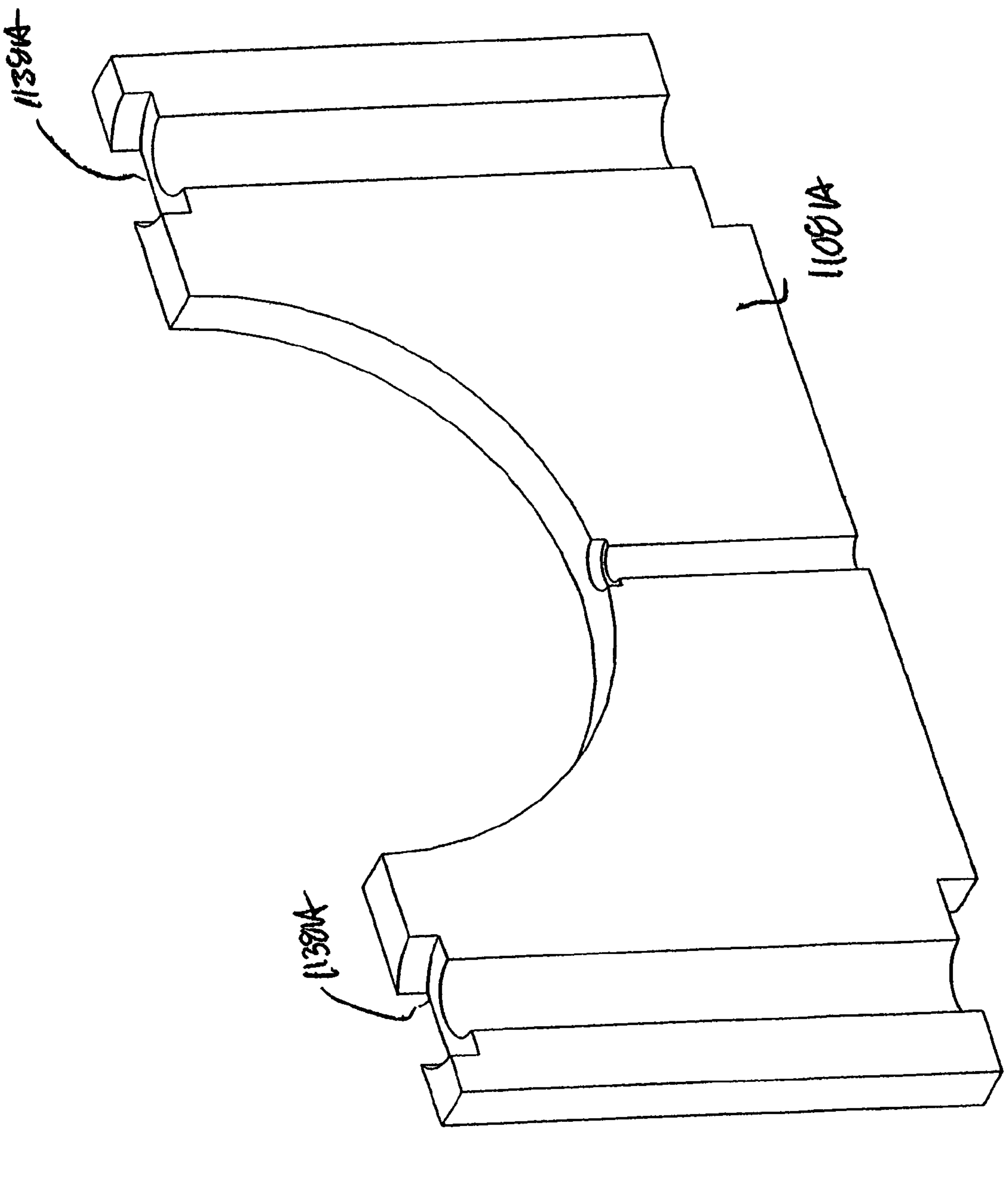
FIG. 27 shows a cross-sectional view of the arbor support base shown in FIG. 25.

FIGS. 24 and 26 illustrate support or arbor support base 1108 of edge sealer assembly 91 with FIG. 26 showing a vertically bisecting cross section of the arbor base or base support 1108 shown in FIG. 24. Arbor base 1108 functions as an edge sealer support base unit to provide a mounting base for edge sealer 1106. As shown in FIG. 16, arbor base 1108 has a central semi-circular recess that has radius Ra which is the same as the radius Rs of the exterior of sleeve. The interior radius RB of sleeve 1122 conforms to the exterior radius of bearing 1126 and with the interior radius of bearing RC conforms to the exterior radius of shaft 72 such that the edge seal unit is able to stay in place as the roller bearings accommodate the rotation of shaft 72 and as the adjacent sub-rollers 1100 and 1102 rotate. Arbor base 1108 is formed of an insulative material such as Acetyl plastic which is preferably machined to have the illustrated configuration. Fastener hole 1125 in sleeve 1122 is also in line with fastener passage 1132 formed in arbor base 1108 such that sleeve 1122 can be mounted to the arbor base 1108 with a small flat head screw, for example. FIG. 26 also shows electrical pin reception passageways 1134, 1136 formed in the enlarged side wings of arbor base 1108 with each having an enlarged upper passageway section 1138 (FIG. 26) which opens into an intermediate diameter inner passageway 1140 which in turn opens into a smaller diameter lower passageway section 1142. The lower passageway section 1142 opens out at the bottom into notch recesses 1144 and 1146.

Figure 87:
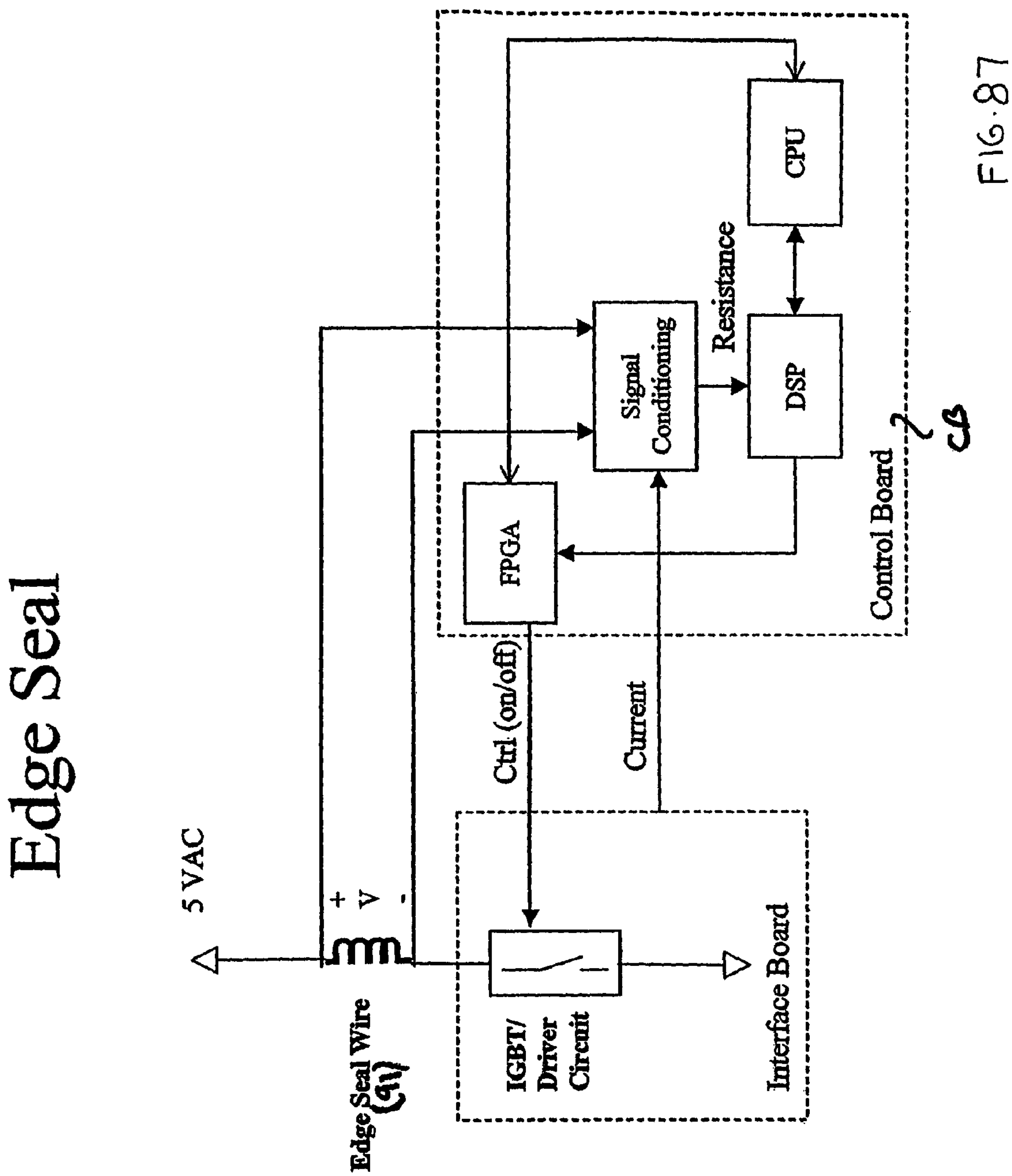
FIG. 87 shows a schematic view of the control, interface and power distribution

FIG. 16 further illustrates elongated cylindrical, electrically conductive contact socket sleeves 1148 and 1150 nested in intermediate passageway 1140 for each of the passageways 1134 and 1136. Socket sleeves 1148 and 1150 are dimensioned for mating with bottom electrical contact pins 1152 and 1154 having enlarged heads 1156, 1158 for sandwiching electrical contact leads 1160, 1162 and 160', 1162' to the base edge of the arbor base provided within a respective one of notched recesses 1144 and 1146. Thus, the electrical contact leads 1160, 1160' and 1162, 1162' are held in position and placed into electrical communication (e.g., power and/or sensing electrical lines) with the interior of sleeves 1148 and 1150 via respective contact pins 1152 and 1154. FIG. 87 illustrates the control sub-system for controlling and monitoring the performance of edge seal assembly 91.

Figure 25:
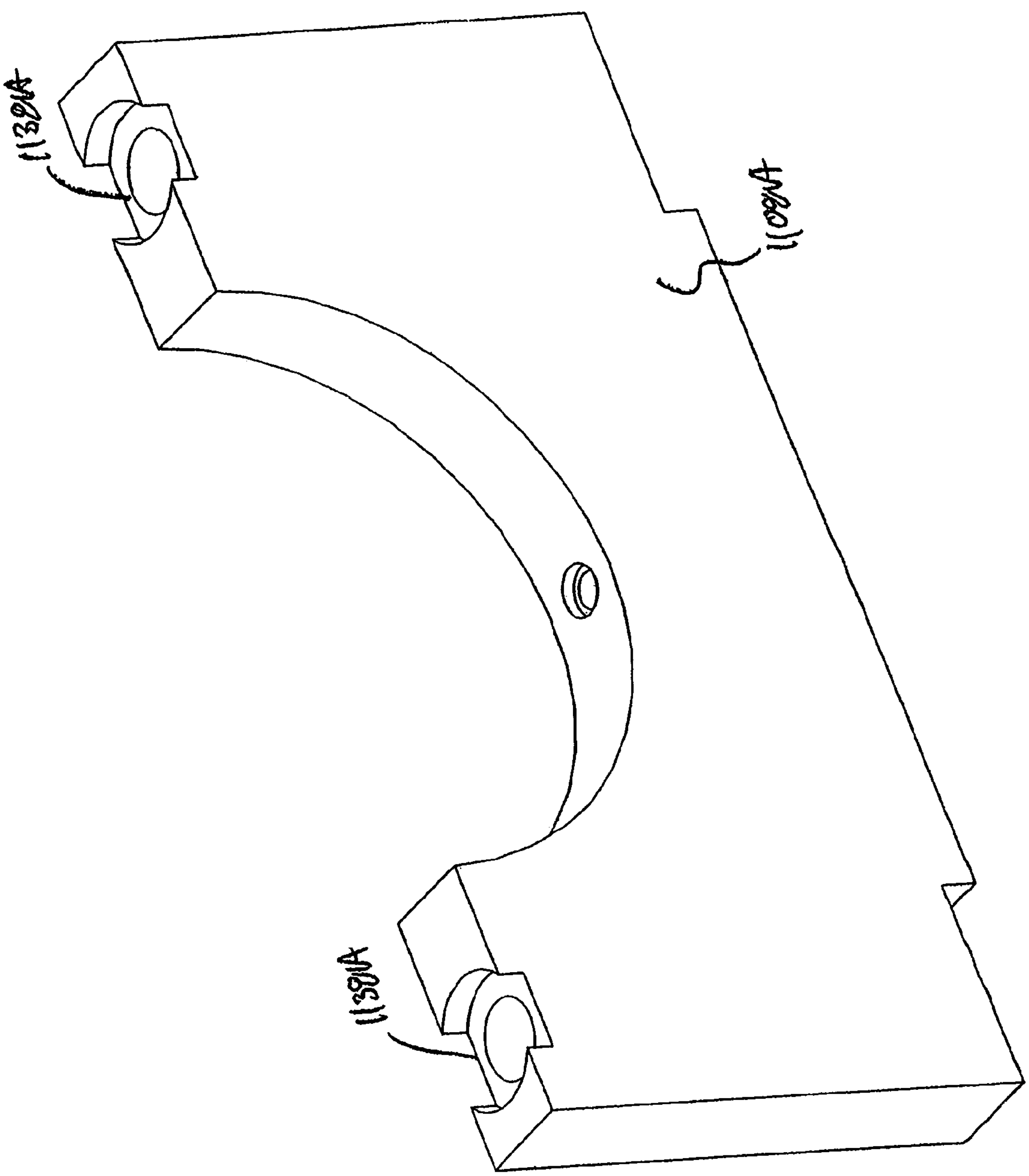
FIG. 25 shows a perspective view of the arbor support base of the second embodiment of the edge seal assembly.
Figure 50:
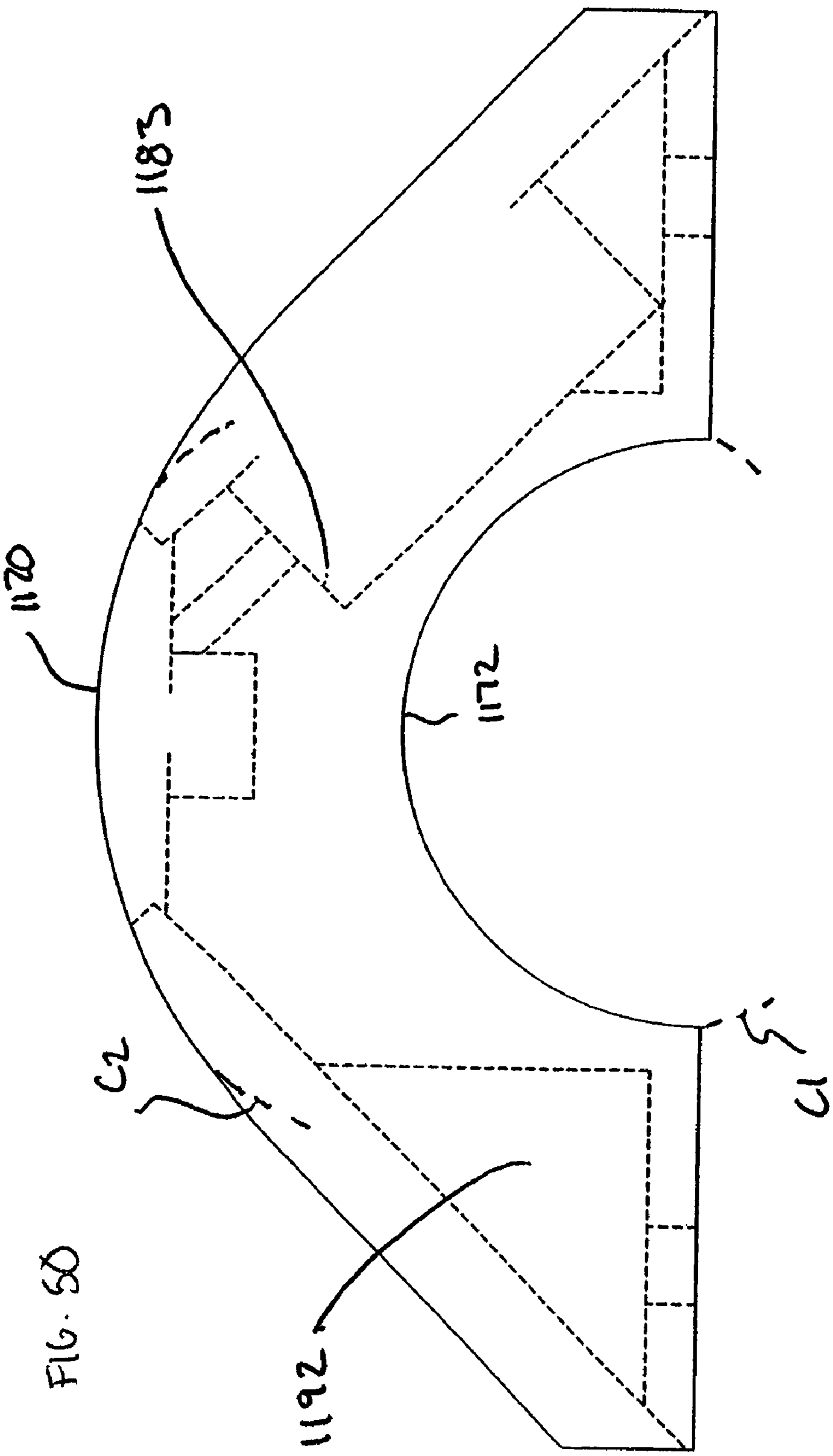
Figure 51:
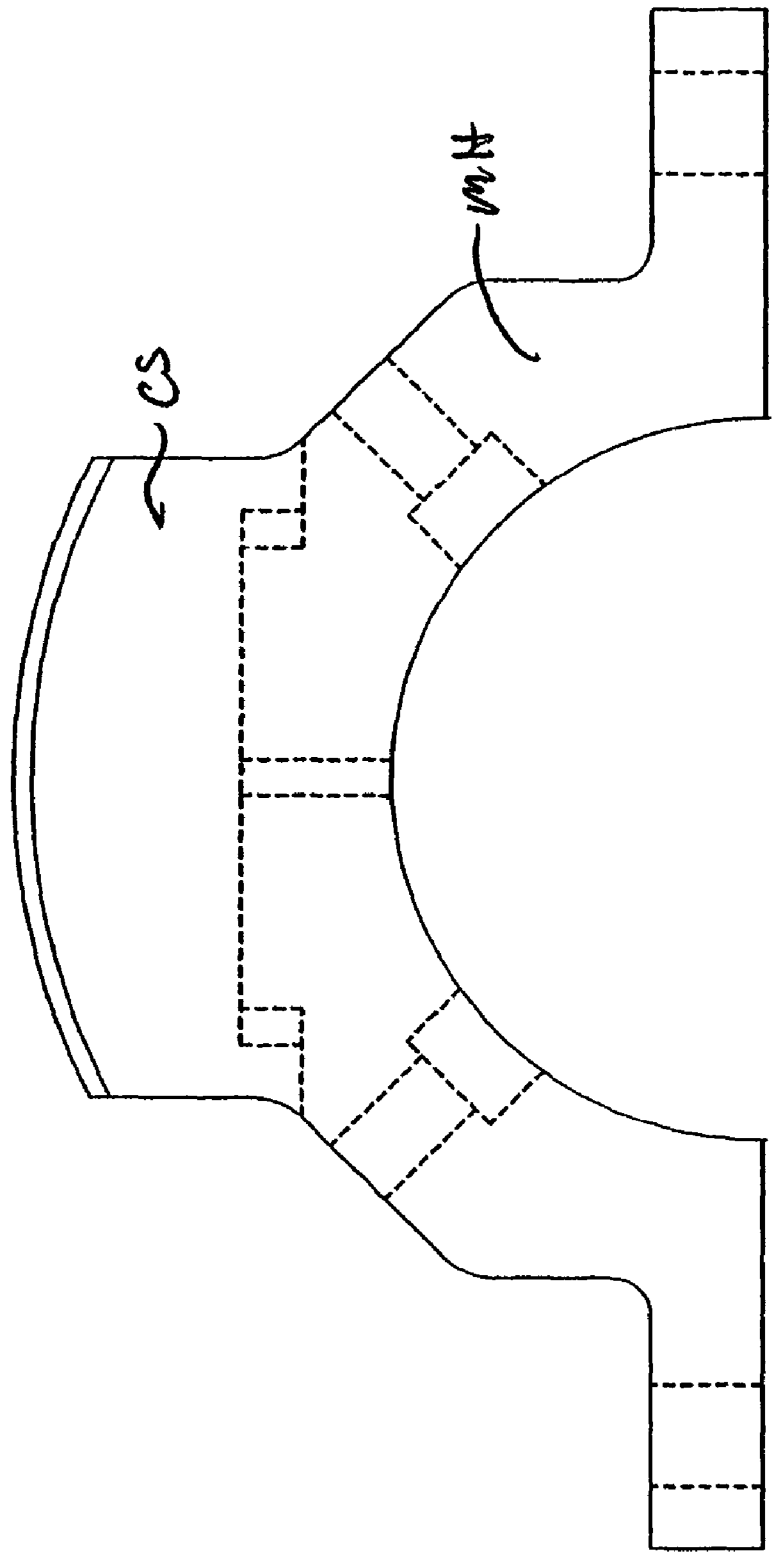
Figure 52:
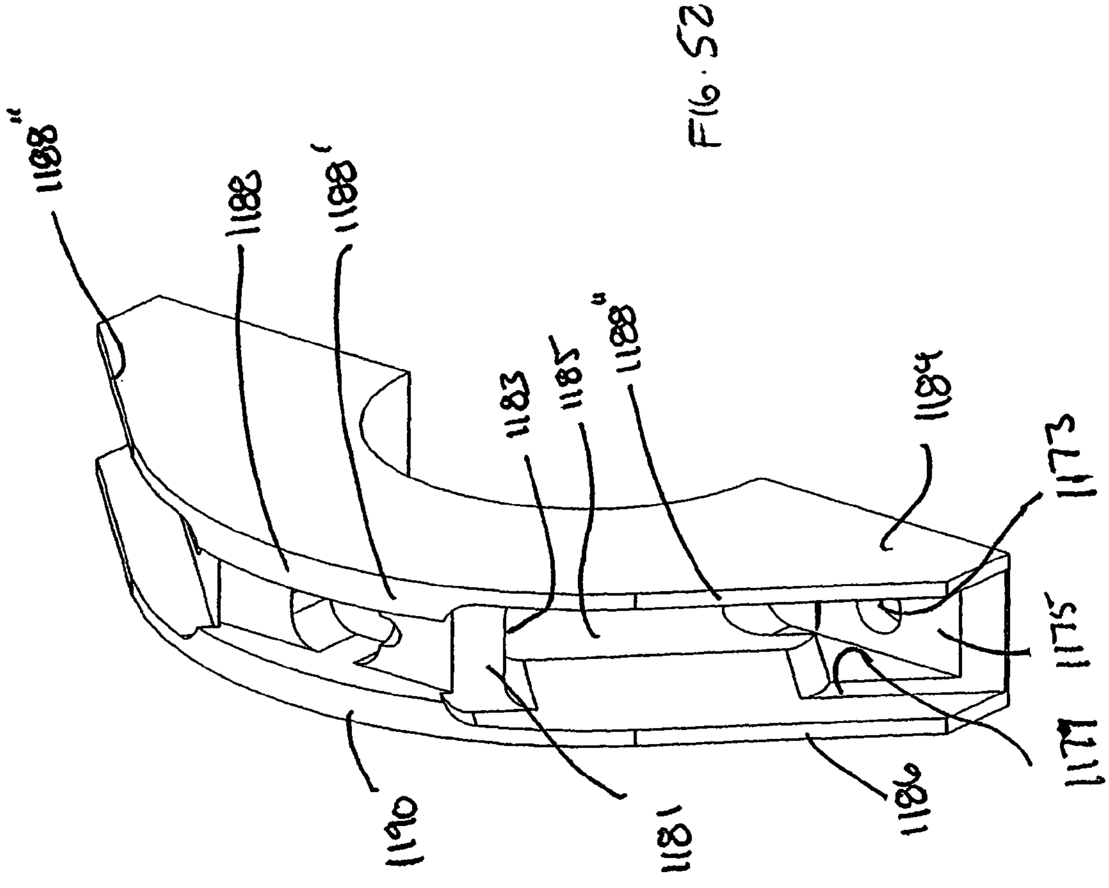

FIGS. 24 to 26 provide illustrations of base 1108, while FIGS. 28 to 67 provide various views of first and second embodiments of edge sealer 1106 which, in the illustrated embodiments, functions to position an edge seal wire 1182 in a preferably consistent (e.g., stationary) and a preferably direct contact state relative to film being fed therepast, and which is designed to provide a high quality edge seal in the bag being formed. FIGS. 28 to 40 illustrate edge sealer 1106 having arbor housing body 1168 having an outer convex upper surface 1170, central bottom concave recessed area 1172 conforming in curvature to the exterior diameter of bearing 1126 and outer extensions 1174 and 1176 which extend out to a common extent or slightly past the wing extensions of arbor base 1108. FIG. 50 illustrates a preferred arrangement for the intermediate portion of upper convex surface or profile for housing 1170 (between the straight slope sections as in 1188" described below) and concave lower surface 1172 which share a common center of circle and with FIG. 50 illustrating in part concentric circles by way of concentric sections C1 and C2 (e.g., diameters for example, of 1.25 inch for C1 and 2.5 for C2 partially shown in FIG. 50 with dashed lines).

Figure 32:
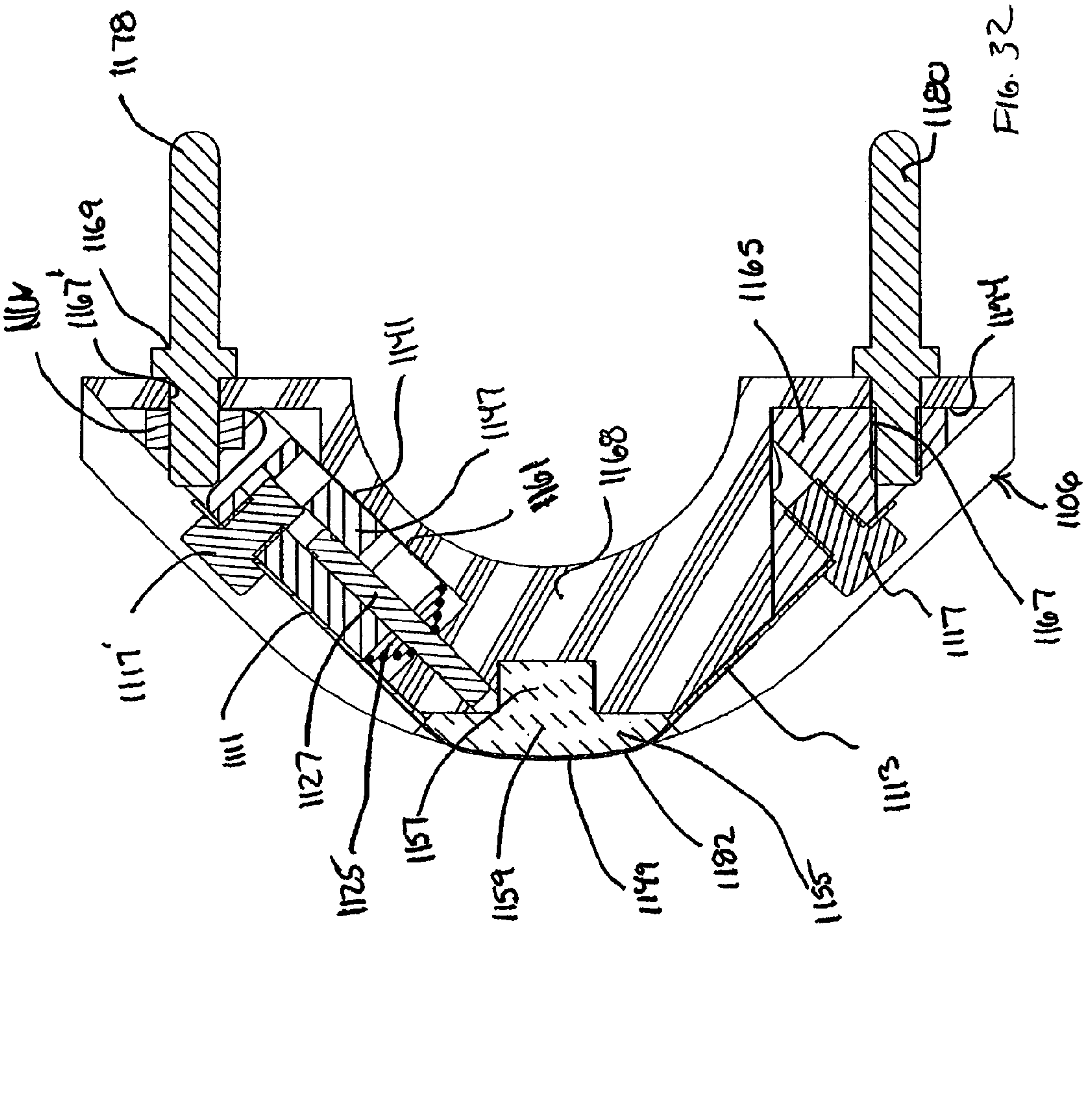
FIG. 32 shows a cross-sectional view taken along A-A in FIG. 30.

As shown in the cross-sectional view of FIG. 32, edge sealer or arbor assembly 1106 further comprises contact pins 1178 and 1180 extending down from respective outer sections 1174 and 1176, and sized to provide a friction fit connection in the arbor base 1108 in making electrical connection with respective electrical contact sleeves 1148 and 1150. Pins 1178 and 1180 are preferably very low in resistance so as to minimize alterations in the below described sensed parameters associated with the edge seal heater wire 1182 being powered via the connector pins 1178 and 1180, which are preferably of similar design as the plugs used in the end seals/cutter wires. A suitable connector features the gold sided flex pin connectors available from the Swiss Company "Multicontact" having a very low ohm characteristic. Thus, as shown by FIGS. 8 and 16, two lead wires extend out from each of the insertion holes for pins 1178 and 1180 powering the heating element (heater wire in this embodiment). Lead lines 1160 and 1160' are preferably the power source lines and more robust than parallel sensor lines 1162, 1162' which are less robust as they are designed merely as a sensor wire leading to the control center for determination of the temperature of the edge seal heater wire. A similar arrangement is utilized for each of the seal/cut bag end heater wires 1046, 1048, 1050.

The sealing device of a preferred embodiment of the present invention provides for the measurement and control of the temperature of the heating element as in a seal wire (e.g., the edge seal wire or cross-cut/seal wire(s)). This is preferably achieved through a combination of metallurgic characteristics and electronic control features as described below and provides numerous advantages over the prior art which are devoid of any direct temperature control of the sealing element. The arrangement of the present invention provides edge sealing that is more consistent, has shorter system warm-up times, more accurate sizing of the gas vents (e.g., a heating to melt an opening or a discontinuance of or lowering of temperature during edge seal formation), longer sealing element life, and longer life for the wire substrates and cover tapes, if utilized.

Under a preferred embodiment of the present invention control is achieved by calculating the resistance of the sealing wire, by precisely measuring the voltage across the wire and the current flowing through the wire. Once the current and the voltage are known, one can calculate wire resistance by the application of Ohm's law:

Resistance=Voltage/Current or $$R=V/I$$

Voltage is preferably measured by using the four-wire approach used in conventional systems, which separates the two power leads that carry the high current to the seal wire, from the two sensing wires that are principally used to measure the voltage. In this regard, reference is made to the above disclosure regarding the use of low ohm connector plugs to avoid interference with sensed voltage and current readings and the discussion above concerns leads 1060, 1060', 1062 and 1062', two of which provide the wires for sensing.

This technique of using finer sensor wires eliminates the voltage loss caused by the added resistance of the power leads, and allows a much more accurate measurement of voltage between the two sensing wire contact points. This feature of avoiding potentially measurement interfering added resistance is taken into consideration under the present invention as the measurements involve very small resistance changes, in the milliohm range, across the sealing wire (e.g., 0.005 Ω). While this discussion is directed at the monitoring and controlling of the edge seal wire, the same technique is utilized for the cross-cut and cross-seal wires. Also, while a preferred heating element is an independent heater wire, the heater element may take on other forms as in a sandwiched plate, or a different material than the support that is either an independent element or integrated in a heat-resistant means molded or embedded within a support. However, a heater wire is preferred for the described embodiment and techniques as it can be replaced as a relatively, inexpensive component and, when a TCR control is involved, pre-testing can be readily achieved.

Under a preferred embodiment, current is calculated by measuring the voltage drop across a very precise and stable resistor on the control board and using Ohm's law one more time. The voltage and current data is used by the system controls to calculate the wire resistance in accordance with Ohm's law. Resistance is preferably calculated by the ultra fast DSP chips (Digital Signal Processing) on the main control board, which are capable of calculating resistance for a sealing wire thousands of times per second.

To determine and control temperature (e.g., changes in duty cycle in the supplied current), the measured resistance values must be correlated to wire temperatures. This involves the field of metallurgy, and a preferred use of the temperature coefficient of resistance ("TCR") value for the seal wire utilized.

TCR concerns the characteristic of a metallic substance involving the notion that electrical resistance of a metal conductor increases slightly as its temperature increases. That is, the electrical resistance of a conductor wire is dependant upon collisional process within the wire, and the resistance thus increases with an increase in temperature as there are more collisions. A fractional change in resistance is therefore proportional to the temperature change or $$\frac{\Delta R}{R_0} = \alpha \Delta T$$

with "α" equal to the temperature coefficient of resistance or "TCR" for that metal.

Figure 88:
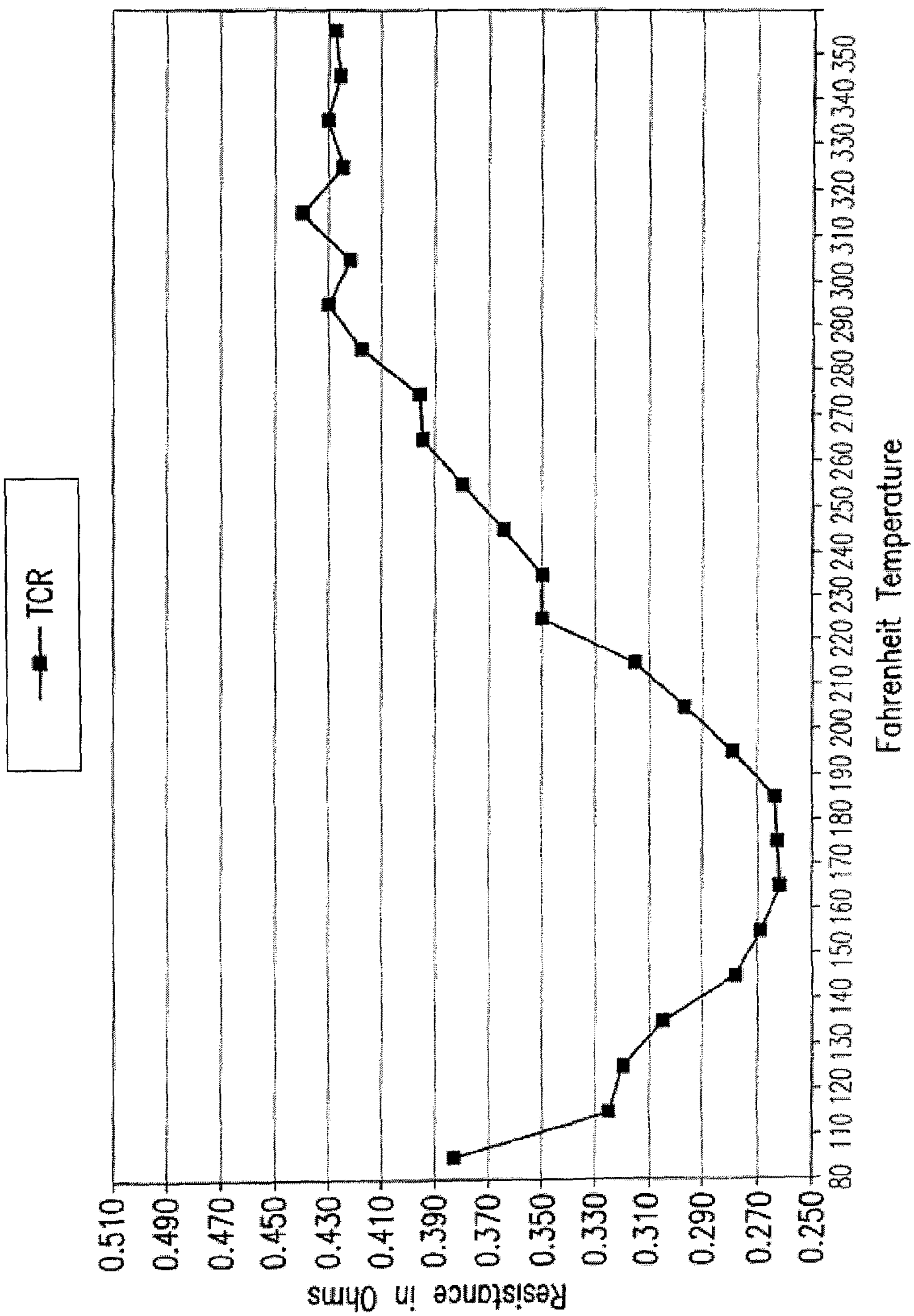
FIG. 88 illustrates a TCR resistance versus temperature plot for a particular heater wire material.

The relationship between temperature and resistance is almost (but not exactly) linear in the temperature range of consequences as represented by FIG. 88 (e.g., 350 to 400° F. sealing temperature range and 380 to 425° F. cutting temperature range for typical film material). The control system of the present invention is able to monitor and control wire temperature because it receives information as to three things about every seal wire involved in the dispenser system (edge seal and end seal/cut wires).

(1) The electrical resistance of the wire involved at the desired sealing temperature (this is achieved by choosing wires that provide a common resistance level at a desired heating wire temperature set point (with adjustment possible with exceptence of some minor deviations due to the non-exact linear TCR relationship)).

(2) Approximate slope of the resistance vs. temperature curve at sealing temperature; and (3) The measured resistance of the wire at its current conditions.

Figure 89:
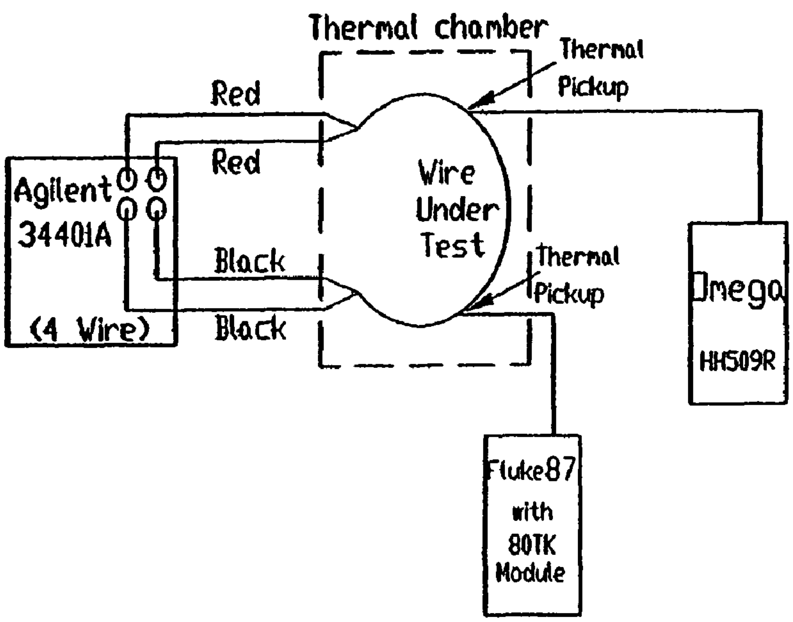
FIG. 89 shows a testing apparatus for use in testing temperature versus resistance for heater wires.
Figure 90:
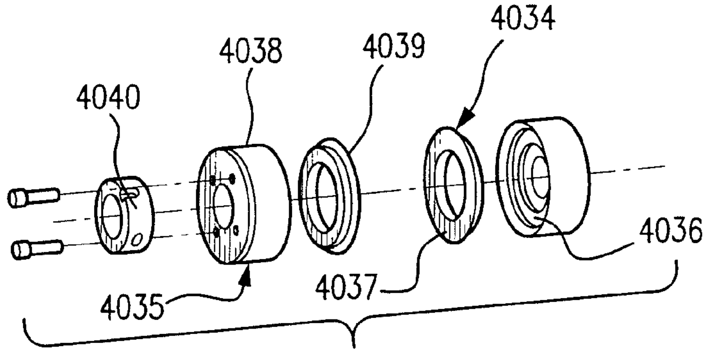
FIG. 90 shows an exploded view of a pair of sub-rollers between which is formed the edge sealer assembly insertion groove.

Thus, in controlling the edge seal or cross-cut seal and/or cutting wire under the present invention there is utilized a technique designed to maintain the seal wire at its desired resistance during the sealing cycle. This in turn maintains the wire at its desired temperature since its temperature is correlated with resistance. The slope of the R vs. T curve or data mapping of the same can also be referenced if there is a desire to adjust the set point up or down from the previous calibration point calibrated for a wire at the set point temperature (e.g., an averaged straight line of a jagged slope line). Initial wire determination (e.g., checking whether wire meets desired Resistance versus Temperature correlation) preferably involves heating the wires in an oven and checking to see whether resistance level meets desired value. Having all wires being used of the same resistance at the desired sealing temperature set point greatly facilitates the monitoring and control features but is not essential with added complexity to the controller processing (keeping in mind that a set of wires sharing a common resistance value at a first set point temperature may not have the same resistance among them at a different set point temperature due to potentially different TCR plots). In this regard, reference is made to FIG. 89 illustrating a testing system for determining temperature versus resistance values for various wires. The test system shown in FIG. 89 is designed to determine the resistance of the wires at three temperatures, Ambient, 200° F. and 350° F. This test was performed on wires in a "Tenney" thermal chamber (from Tenney Environmental Corp.) at the desired temperature. The instrumentation used to measure the resistance was an Agilent 34401A Digital multimeter using 4-Wire configuration. Temperature measurements were taken with a thermocouple attached to the wire under test. Temperature measurement was taken using the Omega HH509R instrument. Ambient temperature was set at 74.6° F. (The Fluke measurement device being replaceable with the same Omega model).

As can be seen from the forgoing and the fact that different metals and alloys have different TCR's, the proper choice of metal alloy for the sealing element can greatly facilitate the controlling and monitoring of sealing wire temperature. For a desired level of accuracy, the wire should deliver a significant resistance change so that the control circuits can detect and measure something. The above described controller circuit design can detect changes as small as a few milliohms. Thus, there can successfully be used wires with TCR's in the 10 milliohm/ohm/° F. range.

Some currently commonly used wire alloys, like Nichrome, are not well suited for the wire temperature control means and monitoring means of the present invention because they have a very small TCR (but embodiment of the invention do find them suitable for using), which means that their resistance change per ° F. of temperature change is very small and they do not give the preferred resolution which facilitates accurate temperature control. On the other hand, wires having two large a TCR jump in relation to their power requirement (also associated with resistance and having units ohms/CMF) can lead to too rapid a burn out due to the avalanching of hot spots along the length of the wire which is a problem more pronounced with longer cross-cut wires as compared to the shorter edge seal wires used under the present invention. For the edge seal of the present invention, an alloy called "Alloy 42" having a chemical composition of 42Ni, balance Fe with (for resistivity at 20° C.) an OHMS/CMF value of 390 and a TCR value 0.0010 Ω/Ω/° C. is suitable. Alloy 42 represents one preferred wire material because it has a relatively high, (yet stable) TCR characteristic. The edge seal wire has improved effectiveness when length is ½ inch or less in preferred embodiments. Another requirement of the chosen edge seal wire is consistency despite numerous temperature cycle deviations, which the Alloy 42 provides.

For lower seal heat requirements, there is the potential for alternate wire types such as MWS 294R (which has shown to have avalanche problems when heated to too high a level) and thus has limited usage potential and thus is less preferred compared to Alloy 42 despite its higher TCR value as seen from Table II. As an example of determining TCR wire characteristics, Table I below illustrates the results of tests conducted on a one inch piece of MWS 294R wire. The testing results are shown plotted in FIG. 88.

TABLE I

| EDGE SEAL WIRE MWS 294R | |
|---|---|
| TEMP | RES |
| AMB. | .383 |
| 110 F. | .325 |
| 120 F. | .320 |
| 130 F. | .305 |
| 140 F. | .278 |
| 150 F. | .269 |
| 160 F. | .262 |
| 170 F. | .263 |
| 180 F. | .264 |
| 190 F. | .279 |
| 200 F. | .297 |
| 210 F. | .316 |
| 220 F. | .350 |
| 230 F. | .350 |
| 240 F. | .365 |
| 250 F. | .380 |
| 260 F. | .392 |
| 270 F. | .396 |
| 280 F. | .418 |
| 290 F. | .430 |
| 300 F. | .422 |
| 310 F. | .440 |
| 320 F. | .425 |
| 330 F. | .430 |
| 340 F. | .426 |
| 350 F. | .428 |

As seen from the above table for the typical heater wire levels, the MWS 294R wire (29Ni, 17Co., balance Fe) shows a relatively large resistance jump per 10° F. temperature increases (with an increase of about 0.012 ohms per 10° F. being common in the plots set forth above and illustrated in FIG. 88) and features an OHMS/CMF value of 294 as seen from Table II below setting forth some wire characteristics from the MWS® Wire Industry source. Using the testing device shown in FIG. 89, a TCR plotting can be made and an X-axis to Y-axis correlation between desired temperature set point and associated resistance level can be made for use by the controller as it monitors the current resistance level of the wire and makes appropriate current adjustments to seek the desired resistance (temperature set point level). While Alloy 42 can be used for the cross-cut seal in certain settings, in a preferred embodiment a stainless steel ("SST 302") wire also available for MWS® Wire Industries is well suited to use as the cross-cut wire in providing sufficient TCR increases (TCR of 0.00017—toward the lower end of the overall preferred range of 0.00015 to 0.0035, with a more preferred range, at least for the edge seals being 0.0008 to 0.0030, and with the preferred OHMS/CMF range being 350 to 500 or more preferably 375 to 400).

TABLE II

| | | RESISTIVITY AT 20° C. | | COEFFICIENT OF LINEAR EXPANSION | TENSILE STRENGTH | | POUNDS PER CUBIC | APPROX. MELTING POINT |
|---|---|---|---|---|---|---|---|---|
| MATERIAL | COMPOSITION | OHMS/CMF | TCR 0-100° C. | BETWEEN 20-100° C. | MIN. | MAX. | INCH | (° C.) |
| MWS-875 | 22.5 Cr, 5.5 Al, .5 Si, .1 C, bal. Fe | 875 | .00002 | .000012 | 105,000 | 175,000 | .256 | 1520 |
| MWS-800 | 75 Ni, 20 Cr, 2.5 Al, 2.5 Cu | 800 | .00002 | .0000314 | 100,000 | 200,000 | .293 | 1350 |

TABLE II-continued

| MATERIAL | COMPOSITION | RESISTIVITY AT 20° C. OHMS/CMF | TCR 0-100° C. | COEFFICIENT OF LINEAR EXPANSION BETWEEN 20-100° C. | TENSILE STRENGTH MIN. | MAX. | POUNDS PER CUBIC INCH | APPROX. MELTING POINT (° C.) |
|---|---|---|---|---|---|---|---|---|
| MWS-675 | 61 Ni, 15 Cr, bal. Fe | 675 | .00013 | .0000137 | 95,000 | 175,000 | .2979 | 1350 |
| MWS-650 | 80 Ni, 20 Cr | 650 | .00010 | .00003132 | 100,000 | 200,000 | .3039 | 31400 |
| Stainless Steel | 18 Cr, 8 Ni, bal. Fe | 438 | .00017 | .000017 | 100,000 | 300,000 | .286 | 1399 |
| ALLOY 42 | 42 Ni, bal. Fe | 390 | .0010 | .0000029 | 70,000 | 150,000 | .295 | 31425 |
| MWS-294 | 55 Cu, 45 Ni | 294 | .0002* | .00003149 | 60,000 | 135,000 | .321 | 1210 |
| MWS-294R | 29 Ni, 17 Co, bal. Fe | 294 | .0033 | .0000033 | 65,000 | 150,000 | .302 | 31450 |
| Manganin | 13 Mn, 4 Ni, bal. Cu | 290 | .000015** | .0000187 | 40,000 | 90,000 | .296 | 1020 |
| ALLOY 52 | 50.5 Ni, bal. Fe | 260 | .0029 | .0000049 | 70,000 | 150,000 | .301 | 31425 |
| MWS-180 | 22 Ni, bal. Cu | 180 | .00018 | .0000159 | 50,000 | 100,000 | .321 | 1100 |
| MWS-120 | 70 Ni, 30 Fe | 120 | .0045 | .000015 | 70,000 | 150,000 | .305 | 31425 |
| MWS-90 | 12 Ni, bal. Cu | 90 | .0004 | .0000161 | 35,000 | 75,000 | .321 | 1100 |
| MWS-60 | 6 Ni, bal. Cu | 60 | .0005 | .0000163 | 35,000 | 70,000 | .321 | 1100 |
| MWS-30 | 2 Ni, bal. Cu | 30 | .0013 | .0000165 | 30,000 | 60,000 | .321 | 1100 |
| Nickel 205 | 99 Ni | 57 | .0048 | .000013 | 60,000 | 135,000 | .321 | 31450 |
| Nickel 270 | 99.98 Ni | 45 | .0067 | .000013 | 48,000 | 95,000 | .321 | 31452 |

*TCR at 25-105° C.
**TCR at 25-105° C.
Note:
Available in bare or Insulated

The temperature of the seal wire can be readily changed under the current invention by changing the duty cycle pulses of the supplied current within the range of 0 to 100%. Maintaining the sealing wire at the correct temperature helps improve the consistency of the seals, since wire temperature is the main factor in producing seal in the plastic film.

As described above, the thickness of arbor housing 1168 for the edge seal supporting the desired wire (e.g., one having resistance increase of 0.005 (more preferably 0.008) or more per 10° F. jump in temperature in the typical seal/cut temperature range of the film like that described above) is designed for insertion within slot 1124 in sleeve 1122.

Figure 42:
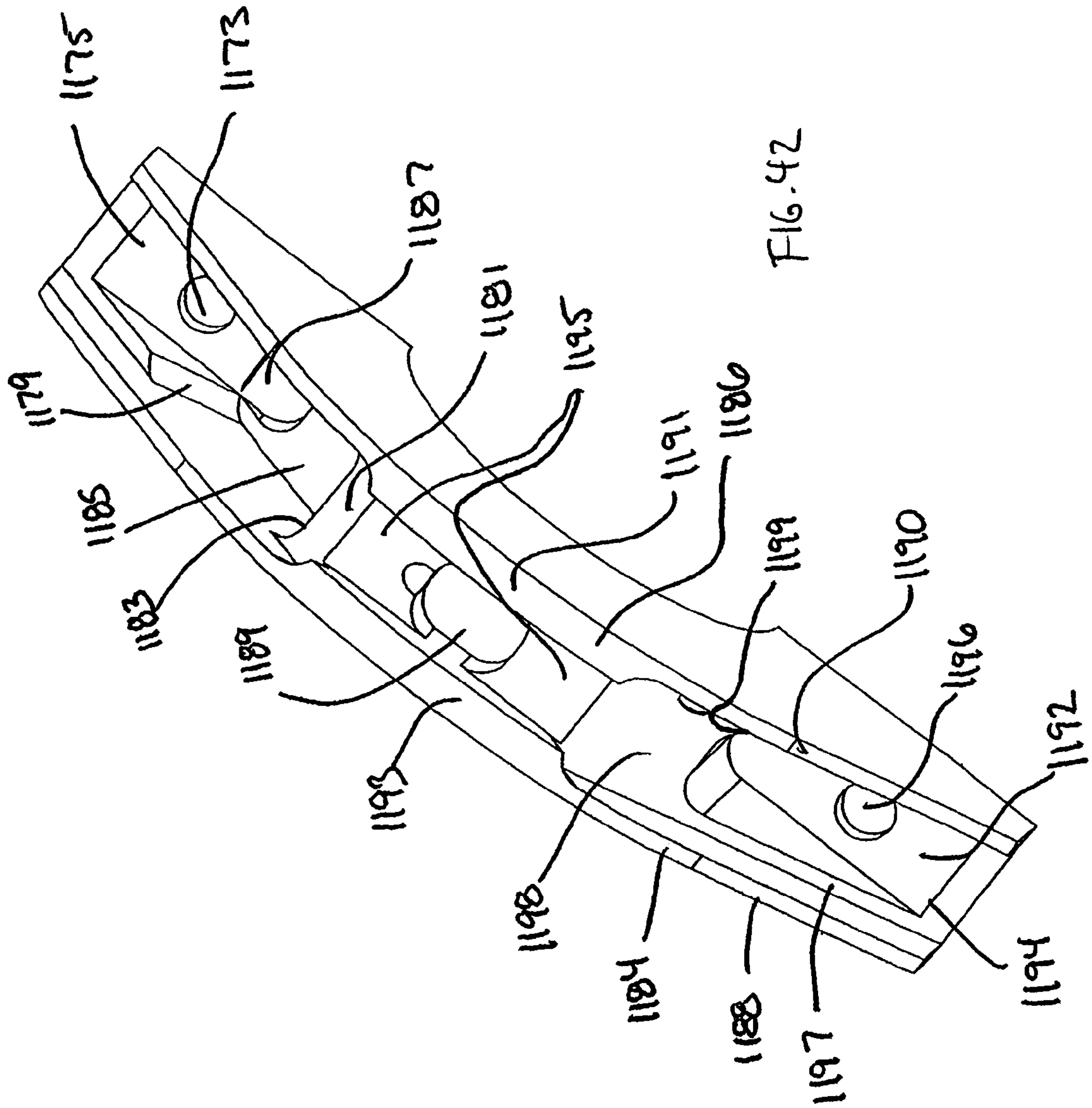
FIGS. 42, 44, 46, 48 50 and 52 show various illustrations of the arbor housing for the first embodiment with the edge seal wire and associated tensioning means removed for added clarity as to the receiving housing.
Figure 43:
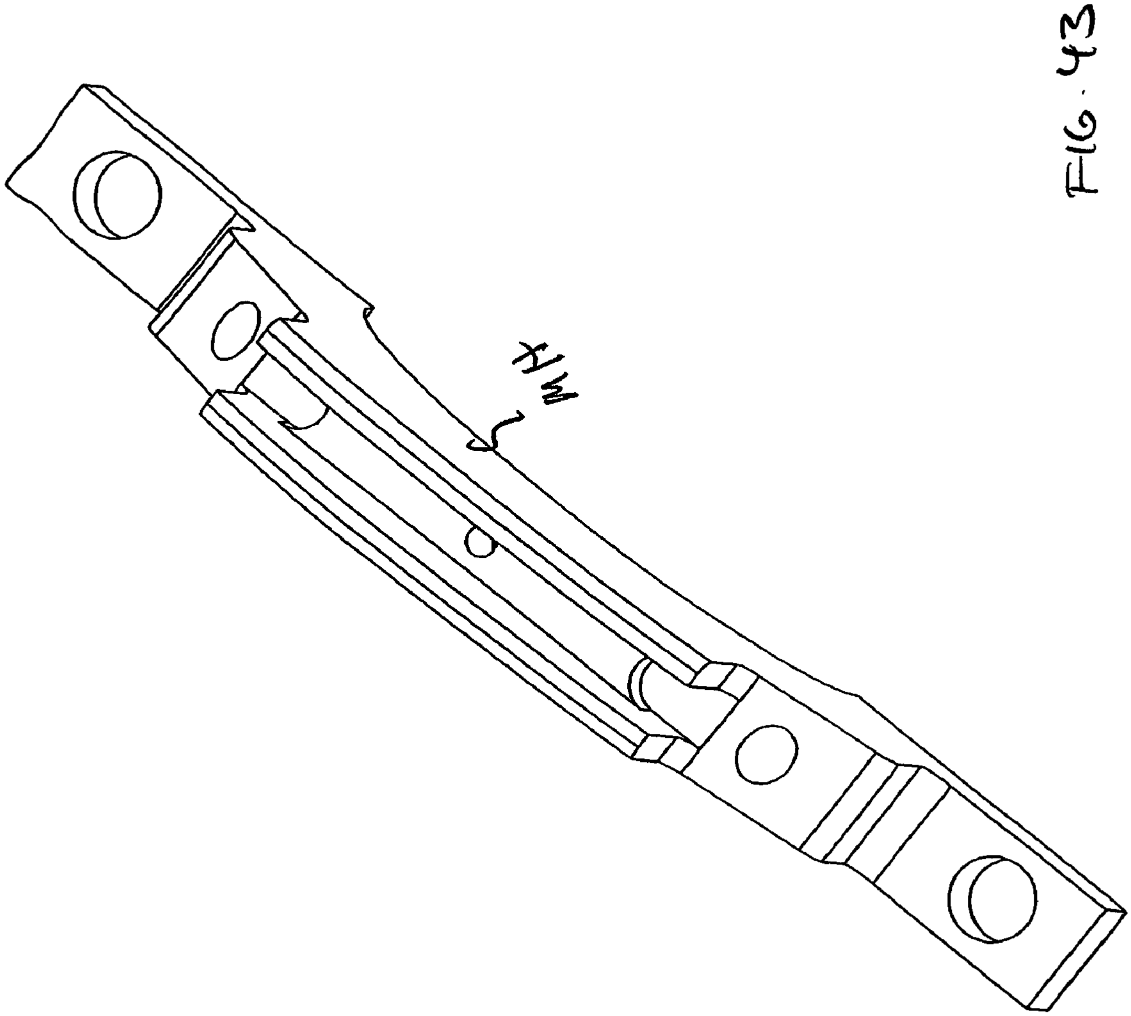
FIGS. 43, 45, 47, 49, 51 and 53 show various illustrations of the arbor housing for the second embodiment with the edge seal wire and associated shoes removed for added clearly as to the receiving housing.
Figure 44:
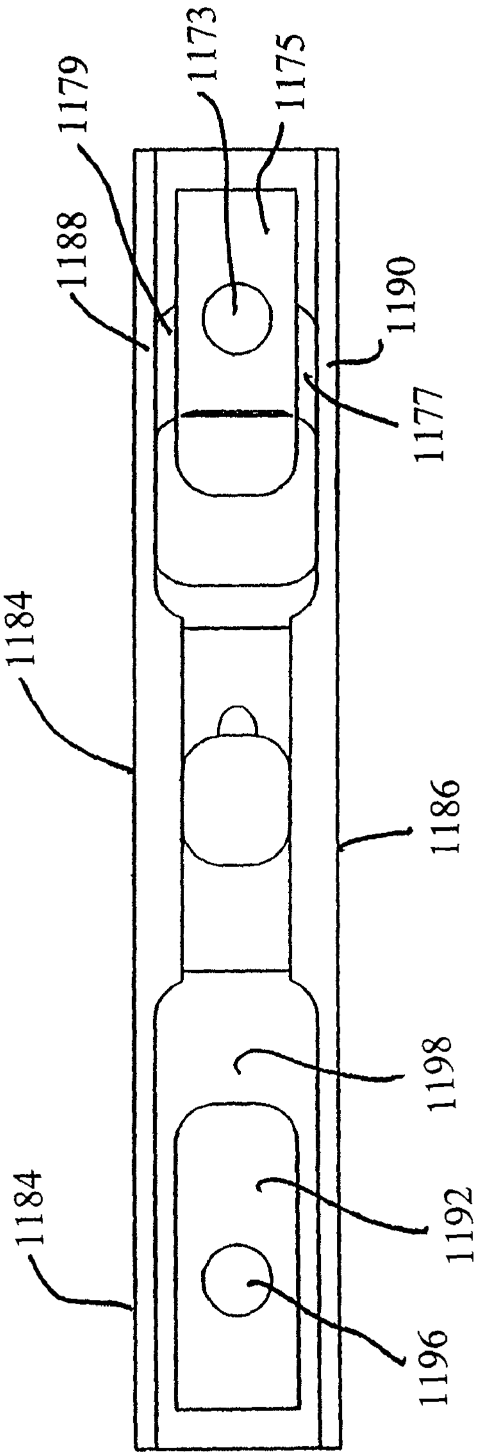
Figure 45:
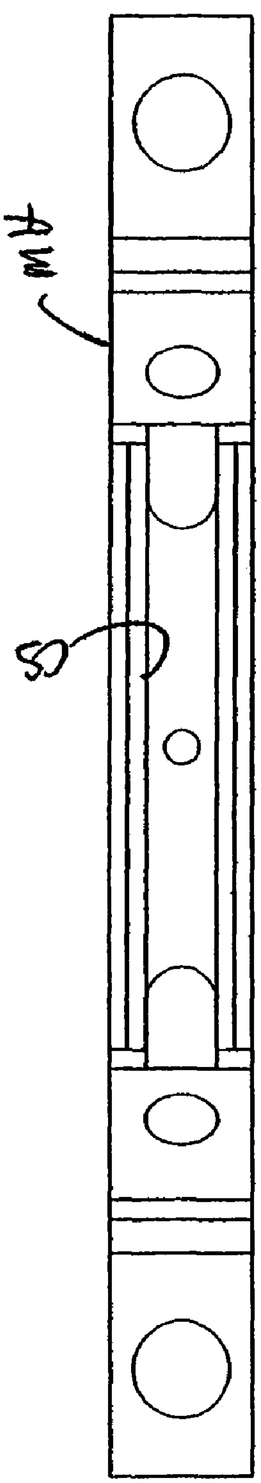
Figure 46:
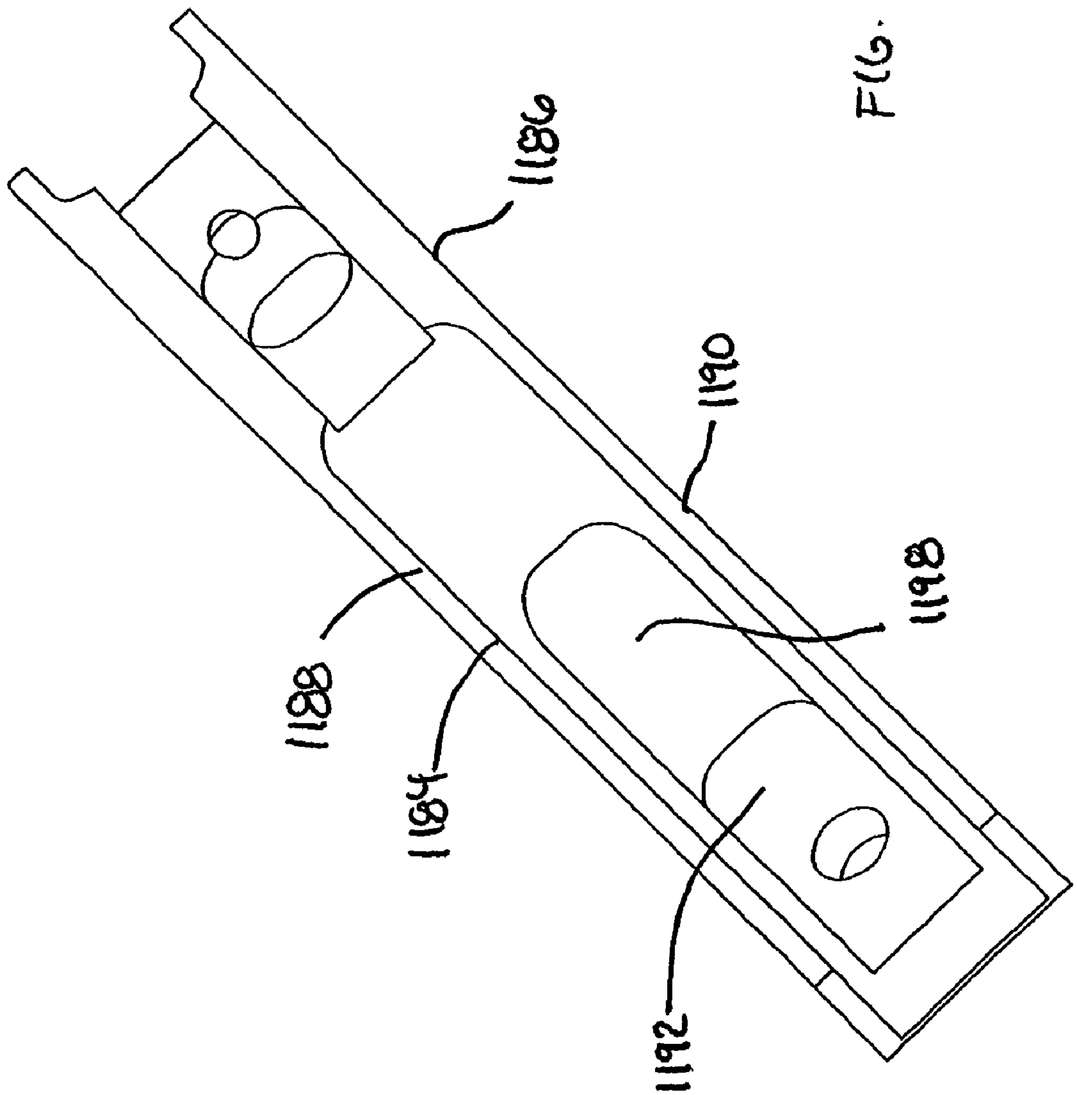
Figure 47:
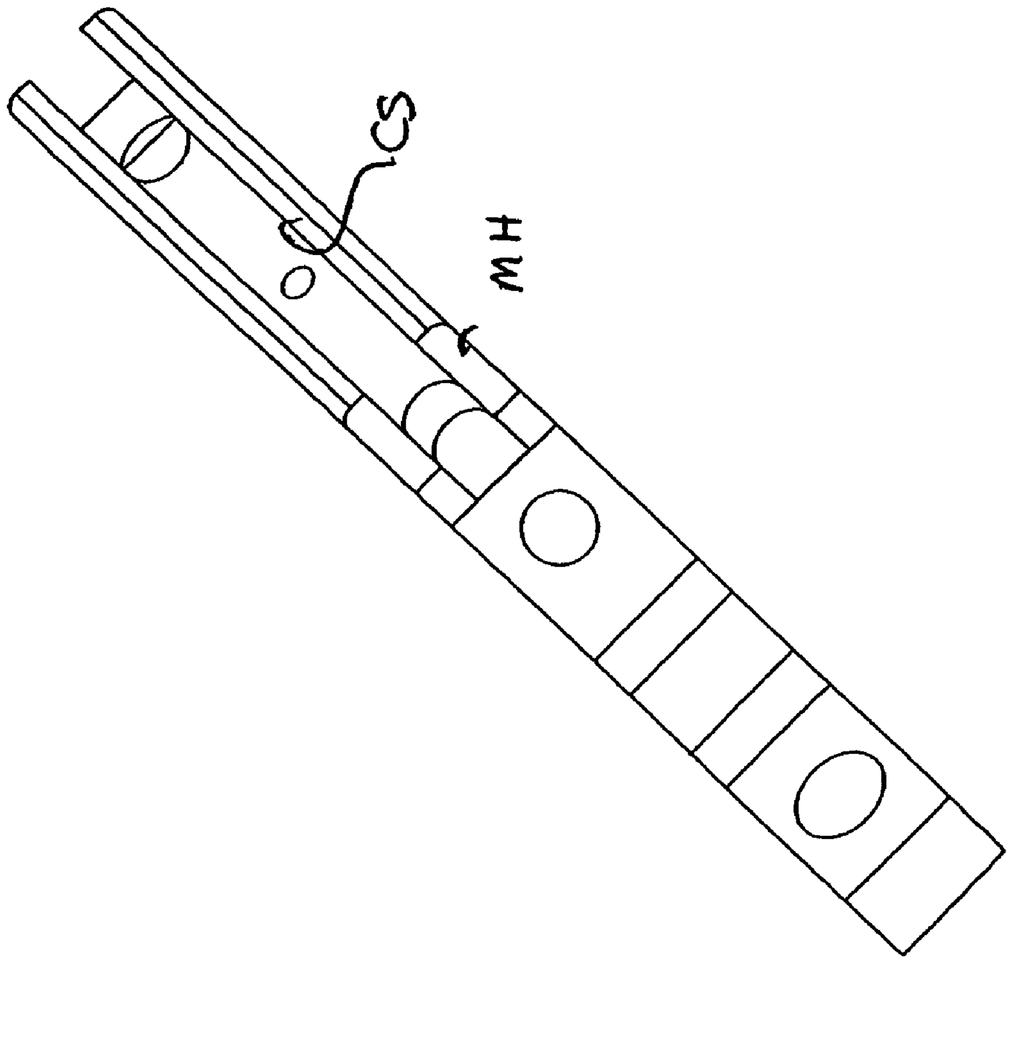
Figure 48:
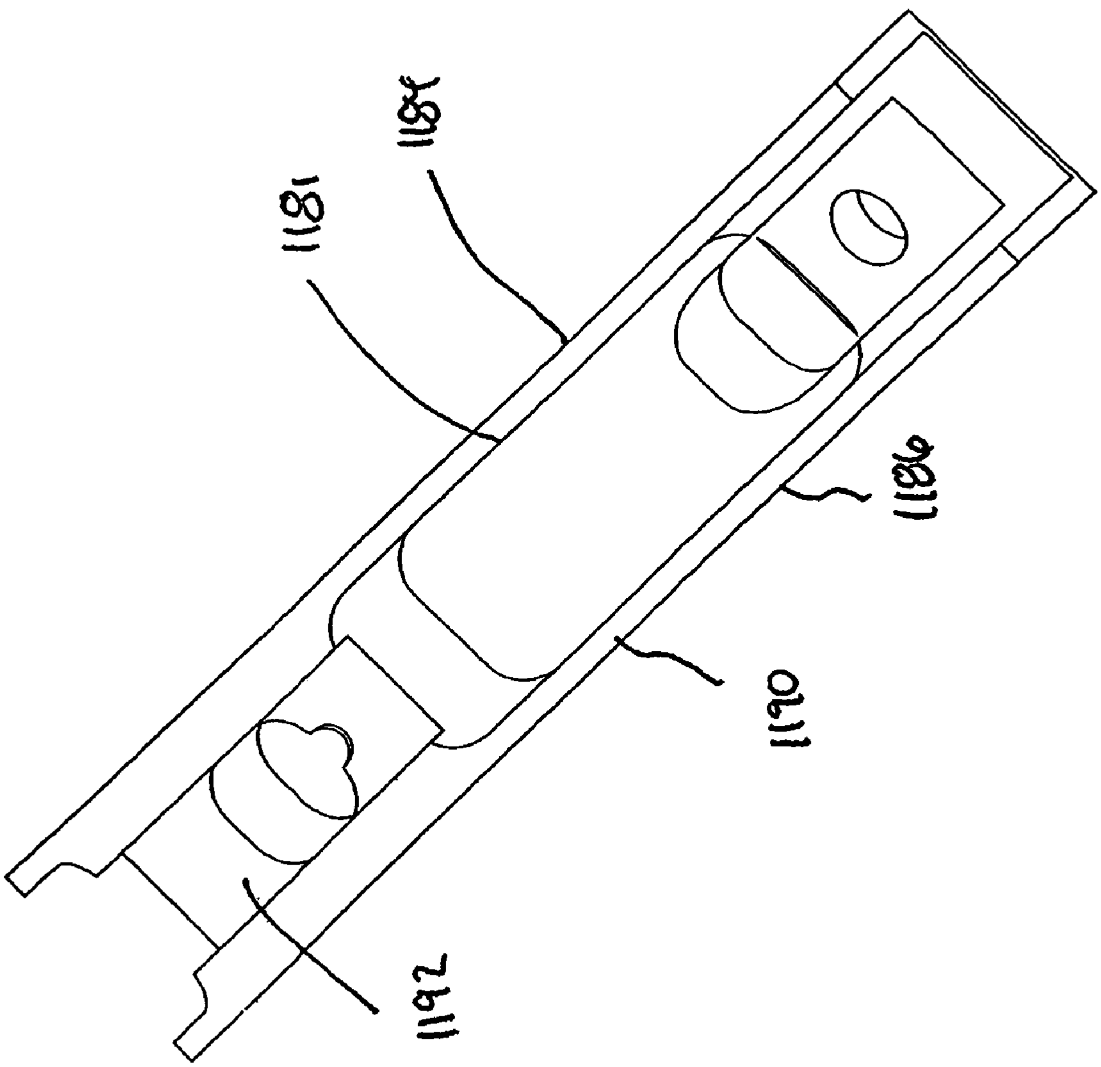
Figure 49:
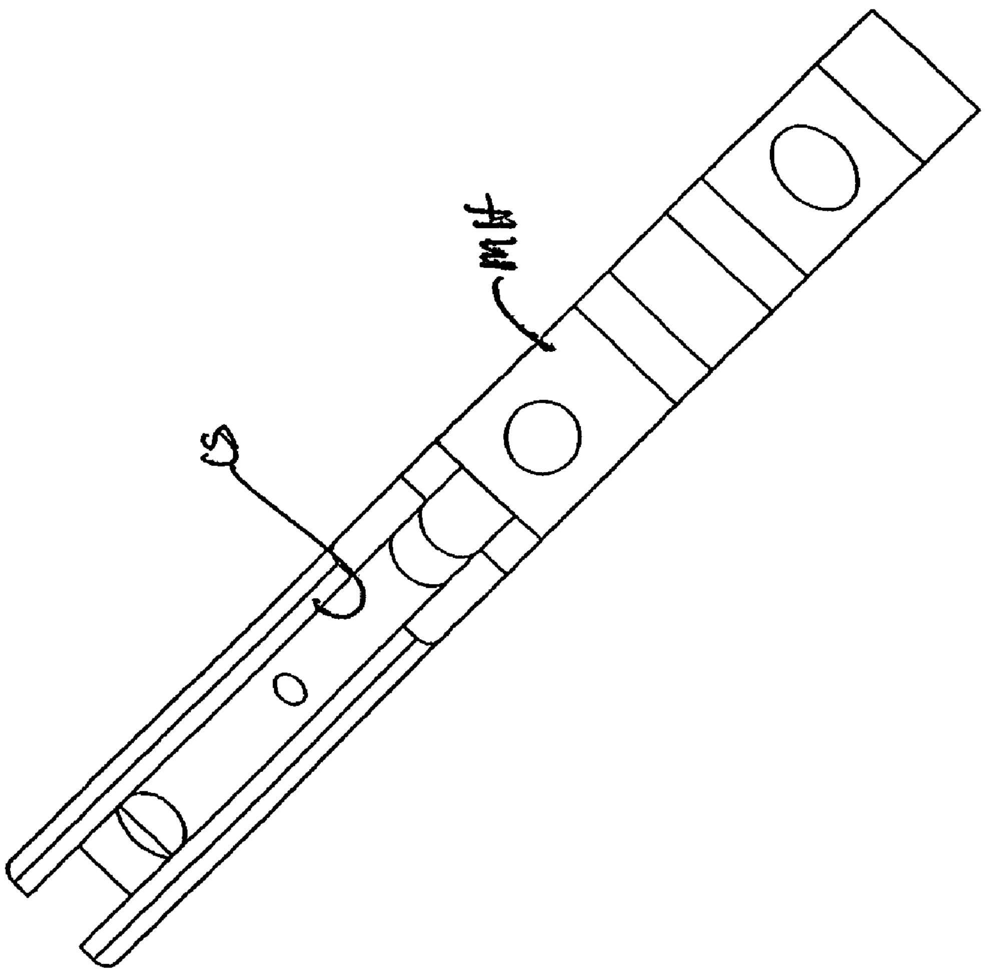

FIGS. 42 to 52 illustrate arbor housing 1168 with its bridge-like configuration having opposite side walls 1184 and 1186 with upper rims 1188 and 1190. As seen from FIG. 52, each rim has a circular intermediate section represented by 1188' and straight edge sloping sections (opposite sides) represented by 1188" which place the arbor assembly components not involved in the compression edge seal wire function removed from the elastomeric drive roller. Between rims 1188 and 1190 there is provided a series of arbor assembly reception cavities. The illustrated reception cavities include non-moving end connector reception cavity 1192 having horizontal base 1194 with pin aperture 1196, and with cavity 1192 (FIG. 42) being defined at its upper edge with enlarged base horse-shoe shaped rim 1198 being bordered on opposite sides by rails 1199 and 1197. Rim 1198 opens into intermediate reception cavity 1195 which is preferably a horizontal planar mount surface bordered by thicker side rail sections 1193 and 1191. Centrally positioned within intermediate cavity there is located central cavity 1189 which extends deeper into arbor housing 1168 than intermediate reception cavity 1195. As shown in FIG. 164, to the opposite side of intermediate section, there is provided moving end connector reception cavity 1187 which includes sliding slope surface 1185 extending out from a transverse wall 1183 having an upper edge forming the outer edge of smaller based horse-shoe shaped rim surface 1181 having notched side walls bordered by sloped outer contact surfaces 1179, 1177 (FIG. 42, 44). Further provided is second horizontal base surface 1175 with second pin aperture 1173 formed therein.

As shown in FIG. 32, pin connectors 1178, have threaded upper ends with pin 1178 having its upper threaded end receiving nut 1169 below horizontal base 1194 and extended through house cavity 1167' and fixed in position with nut NU. Pin 1180 has it upper end threaded into a threaded cavity 1167 formed in non-moving connection block 1165 having a bottom flush with horizontal base 1194. Non-moving connector block 1165 has a configuration that generally conforms to the profile of cavity 1192 so that block 1165 slides either vertically or horizontally into and out of cavity 1192 but 1192 during installation, and after that is prevented from any appreciable movement in a side to side, inward or rotational direction.

FIGS. 54 to 58 illustrate in perspective and in cross-section non-moving connector or mounting block 1165 and is preferably formed of a brass material. There is additionally formed in block 1165 sloping (down and in from an upper outward corner) reception hole 1163 having a central axis of elongation that extends transverse to the planar sloped surface 1161. As seen from FIG. 56, the side edge from which reception hole 1163 opens is a multi-sided side edge MS.

Figure 60:
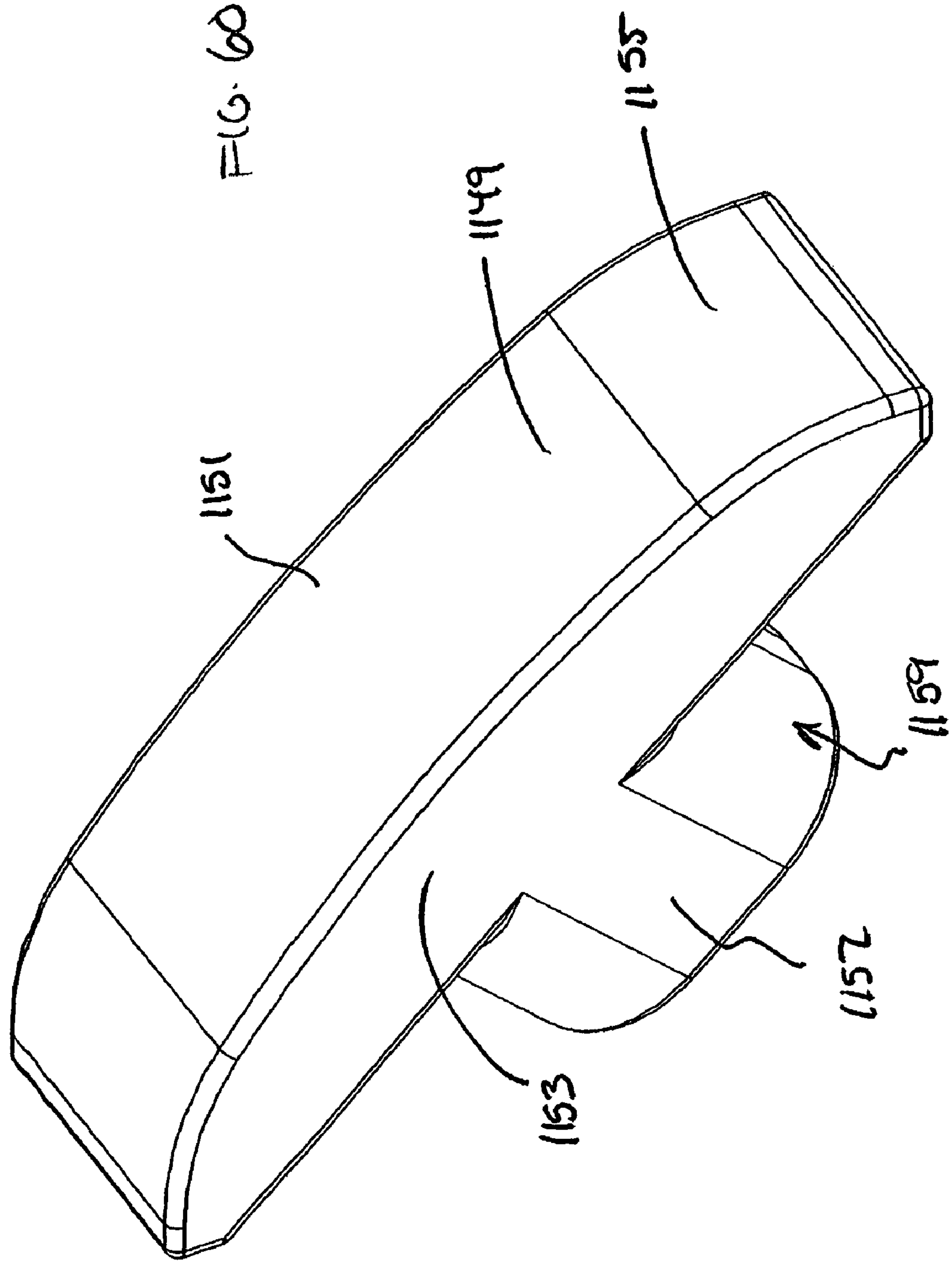
FIGS. 60 and 61 illustrate the ceramic insert head used in the arbor assembly in the first embodiment of the edge seal assembly.
Figure 61:
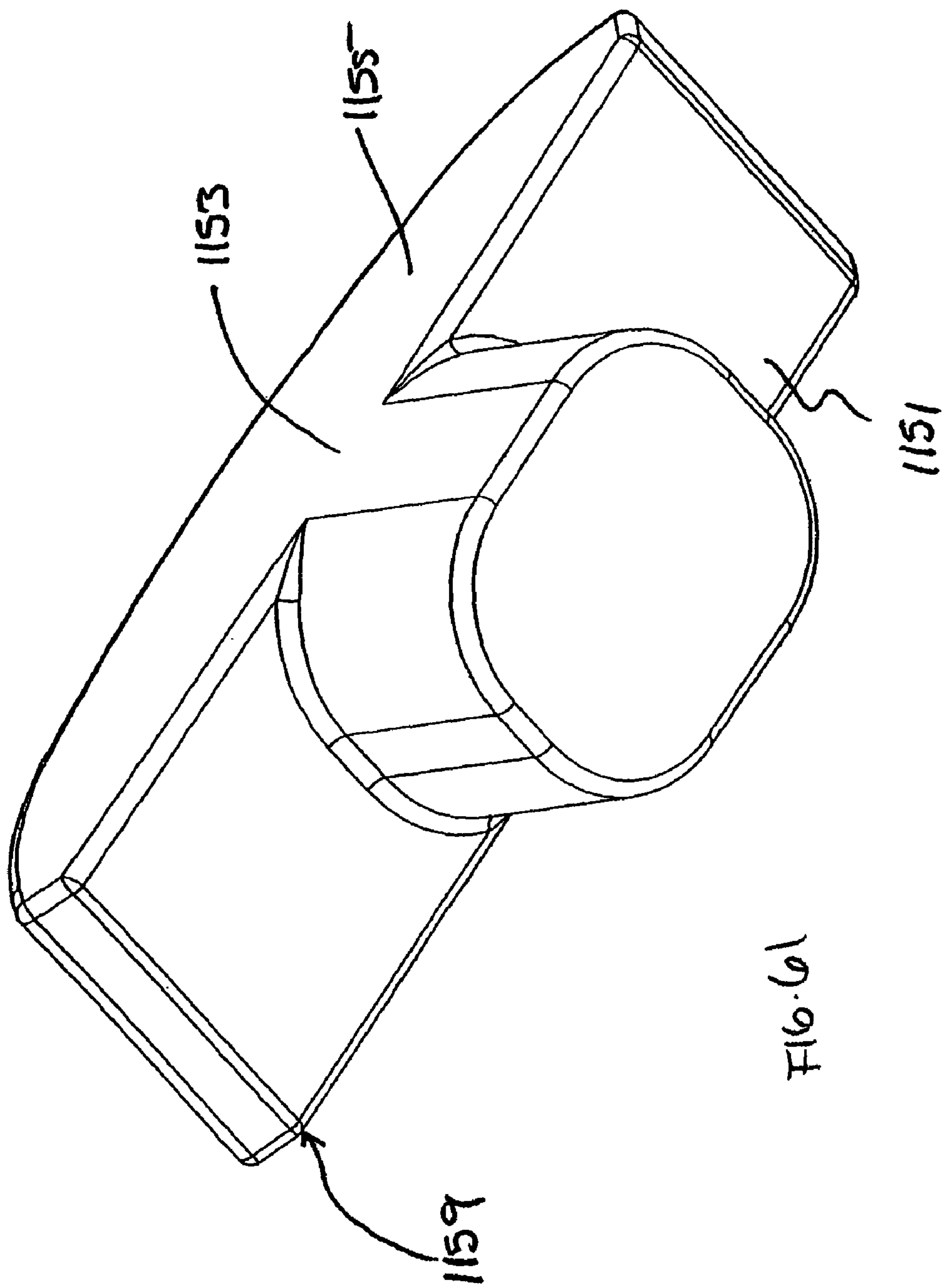

Arbor assembly 1106 further includes ceramic plug 1159 which is illustrated by itself in FIGS. 60 and 61, and has insertion projection 1157 and head 1155. Ceramic plug 1159 has side walls 1153, 1151 (includes coplanar or co-extensive surfaces for both head end plug) which are separated apart a distance that generally conforms to the opposing inner walls of thick-end rail sections 1191, 1193 for a slight friction sliding fit. Similarly, central cavity 1189 has a generally oval configuration that conforms to that of projection 1157 for a snug fit. Head 1155 has underside extension surfaces extending out from opposite sides of the top of projection 1157 and defines a surface designed to lie flush on intermediate planer surface defining intermediate cavity 1195 such as a common flush horizontal surface arrangement. Ceramic plug 1159 has an upper convex surfacer 1149 which, as shown in FIG. 32, matches the curvature of 1170 of arbor housing 1168 and terminates out its ends at the outer edges of intermediate cavity 1195.

Figure 64:
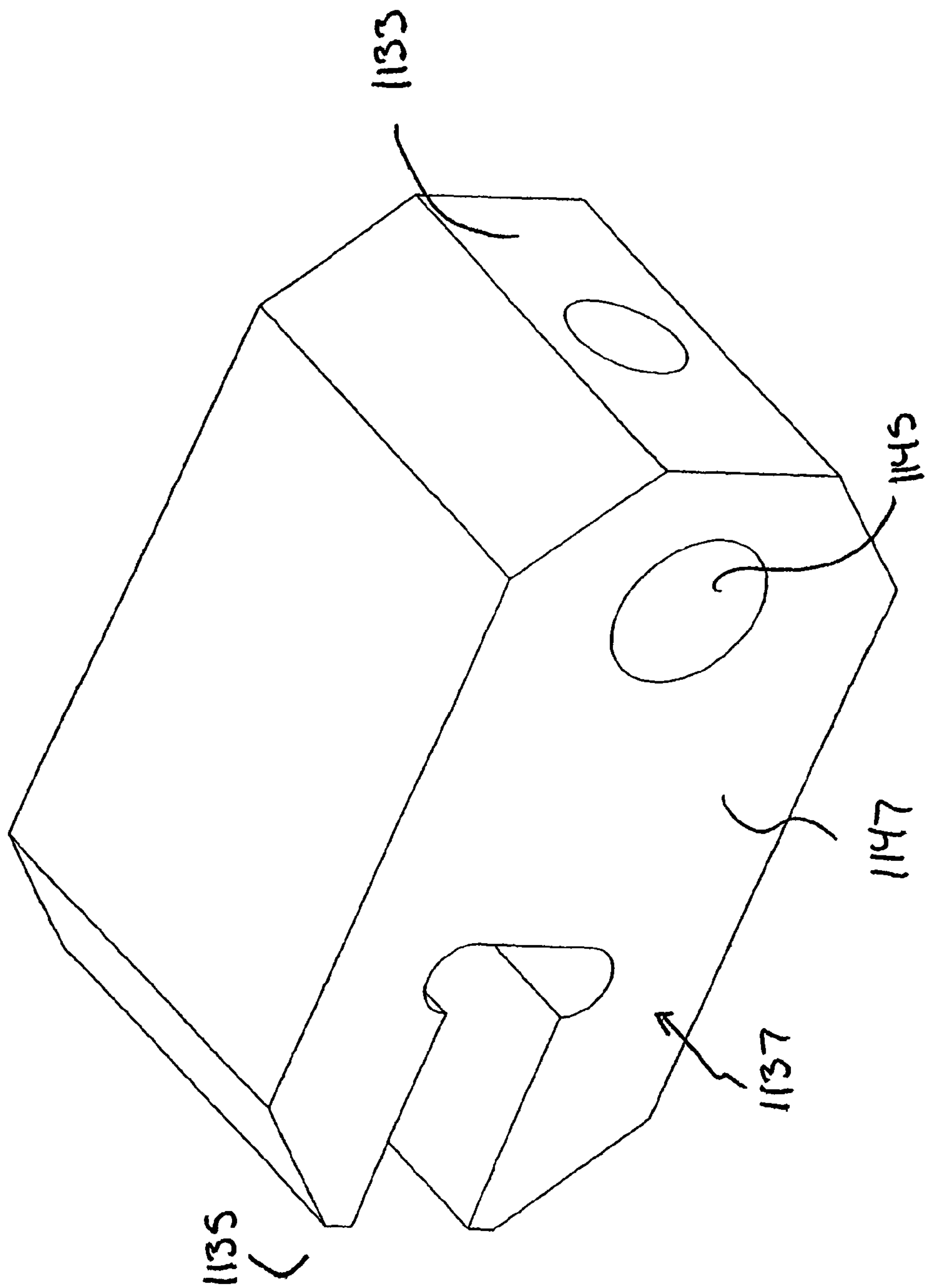
FIGS. 64 and 65 illustrate alternate perspective views of the edge wire tensioner block or moving mounting block.
Figure 65:
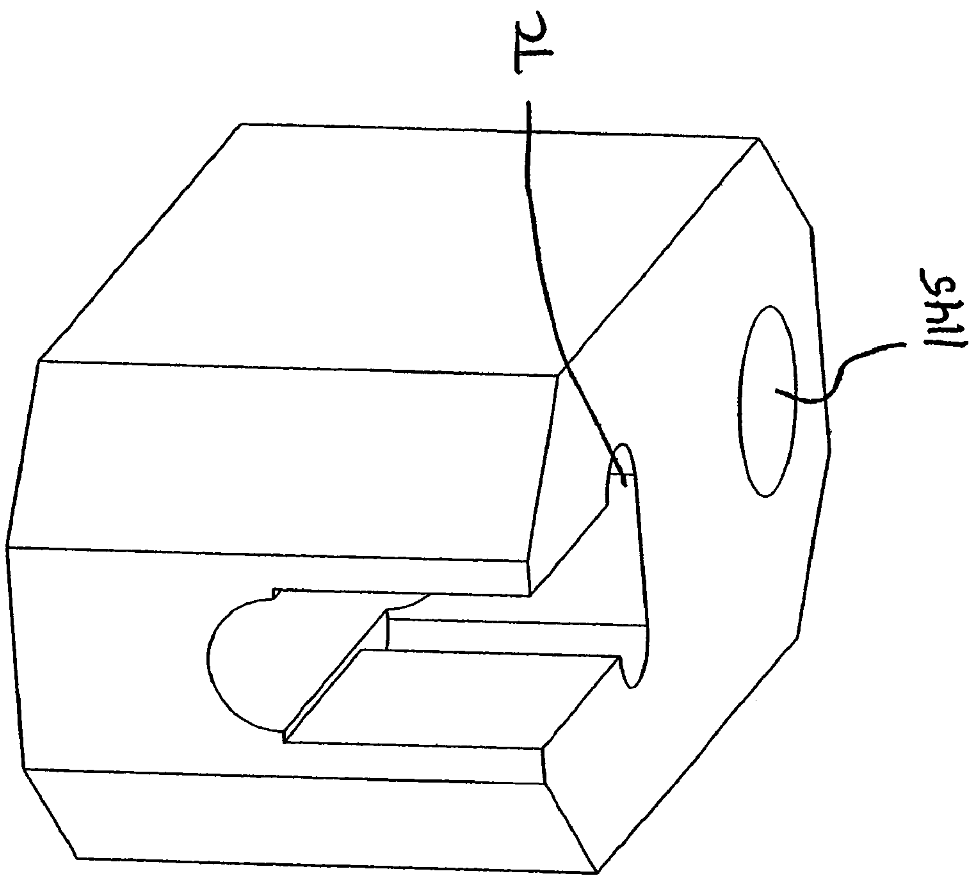
Figure 66:
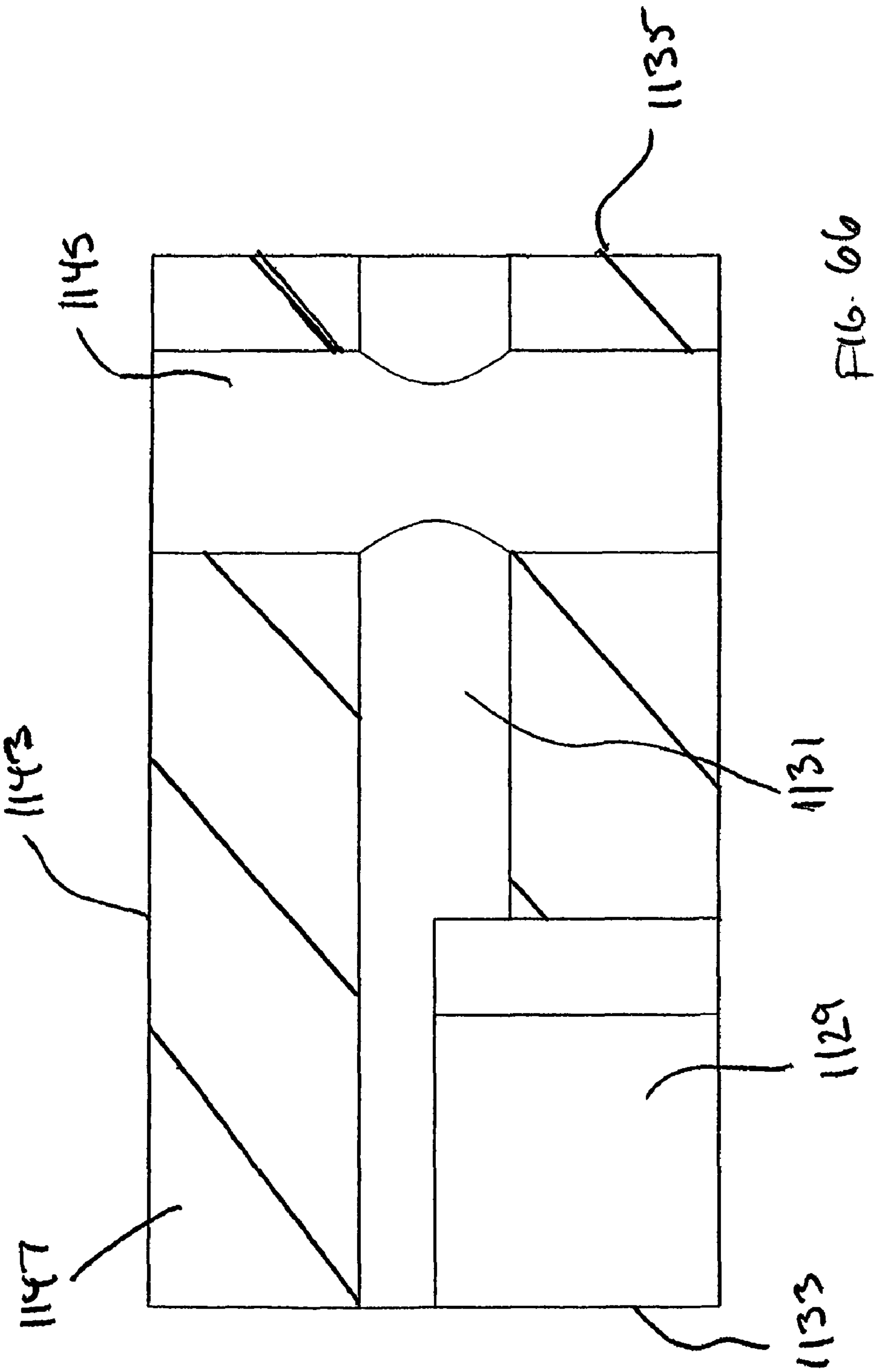
FIG. 66 shows a cross-sectional view of the tensioner block.

Arbor assembly 1106 further comprises moving mounting block 1147 illustrated in position within arbor housing 1168 and alone in FIGS. 64 to 66. As shown in FIGS. 64 to 66, moving mounting block 1147 has an electrical plug reception hole 1145 that extends transversely into moving mounting block 1147 from upper planar surface 1143. Electrical plug reception hole 1145 is preferably threaded and is designed to receive and hold an electrical connection 1117' with lead connector 1145' clamped down (FIG. 16). In similar fashion lead connector 1145 is clamped down by nut NU". Block 1147 further includes planar bottom surface 1141 which is placed flush on sloping upper surface 1161, and planar side walls 1139 and 1137 spaced apart to generally coincide with the side walls defined by arbor housing 1168. Block 1147 further includes convex (three sloping flat sides forming a general curvature) end walls 1135 and 1133. Interior passageway 1131 (FIG. 66) extends between end walls 1135 and 1133 and opens out at a central vertical location in the middle sub-wall of the convex end walls. At the end closest to the central plug 1159 there is formed notch 1129 which extends from end 1133 inward with an upper level commensurate with an upper level of passageway 1131 and downwardly to open out at bottom surface 1141. The interior end of notch 1129 includes transverse enlargements to form a T-shaped cross-section TC as shown in FIG. 64.

FIG. 32 further illustrates slide shaft 1127 received within housing 1168 at one end and designed to extend into interior passageway 1131 so as to provide a means for guiding slide movement along guide shaft 1127 in said moving mounting block 1147. Between the end surface 1183 of the arbor housing and the convex end surface 1135 of the adjacent moving mount block, there is positioned outward biasing means 1125 which in a preferred embodiment comprises conical spring which biases moving mounting block 1147 outward along slope surface 1179. The T-shaped slot facilitates adding the conical spring on to the system (e.g., allows for finger grasping in holding its position as the guide is passed through the center of the spring). FIG. 32 further shows upper nut NU which fixes conducting pin 1178 in position and sandwiches first arbor conductor lead 1145' between the planar surface 1175 and nut NU. Threaded fastener 1117' is threaded within threaded part 1145" in the moving block and through the base region of end connector plate 1113 (1111) in FIG. 67 and also through the looped end of electrical lead 1145' so as to compress them into electrical communication. Moving block 1147 is preferably formed of the same material as non-moving block 1165 as in electrically conducting base. Moving block 1147 is also sized as to have an operative position inward from the end of the conducting pin extending upward from planar surface 1175.

Heater wire assembly 1119 comprises the aforementioned heater wire 1182 connected at its ends to respective arbor assembly wire plates 1113 and 1111, which are similar to those described above for the heater wire end seal wire support plates. Plates 1111 and 1113 have an enlarged portion with conductor screw aperture and a tapering, elongated end for welded, soldered or alternate securement means to fix edge seal heater wire 1182 to the plates at opposite ends of the heater wire. Heater wire insert plugs 1117 and 1115, are preferably of a screw type for threaded attachment to the respective mounting blocks. Thus, the screws are extended through the central apertures formed in plates 1113 and 1111 so as to hold the plates and the connected wires in fixed position relative to the mounting blocks 1147 and 1165. Thus moving mounting block 1147 acts as a tensioner device in the edge seal heater wire as soon as the heater wire and plates combination are secured by the threaded screws to the respective blocks and the blocks are received within the respective arbor housing cavities (the combination of tensioning facilitator and tension state maintenance providing tension maintenance means under the present invention). The tensioner maintenance means of the present invention preferably maintains edge seal heater wire 1182 under tension at all times of use (the biasing means is preferably a relatively small spring as to avoid over tensioning and stretching the heater wire) 1182. The moving block is under spring tension and moves in a linear fashion as it is guided by the guide shaft 1127 to keep the edge seal wire taught. The movement makes up for the normal variations in wire length and for the thermal expansion of the wire while the moving block moves along the loosely fitting, preferably stainless steel guide shaft 1127 (to avoid binding).

The edge seal heater wire 1182 is centered on the curved upper head surface of insert head or plug 1159 which is formed of a high heat resistant material such as a ceramic plug. Plug 1159 is preferably able to withstand over 450° F. and more preferably over 650° F. (e.g., up to 1500° F. available in conventional ceramics) without ablation or melting of the underlying face of the plug coming into contact with the heater wire and without any Teflon taping.

Thus, as the film is driven by driven roller set through the nip region, the film is compressed against the compressible material roller and heated to a level which will bond and seal together an edge seal (or seals if more than one involved). The present invention, provides a stationary support and accurate positioning of the edge seal heater wire, both initially and over prolonged usage as in over 20,000 cycles. As the core works relatively well at precluding underlying heater wire or support backing material melting or softening, there is avoided rapidly forming deviations in the location of the edge seal and a degraded edge seal quality which are problems common in prior art designs. For example, the rapid deviation in positioning as the heater wire sank into the backing material was one of the problems leading to poor edge seal quality in prior art designing.

Figure 15:
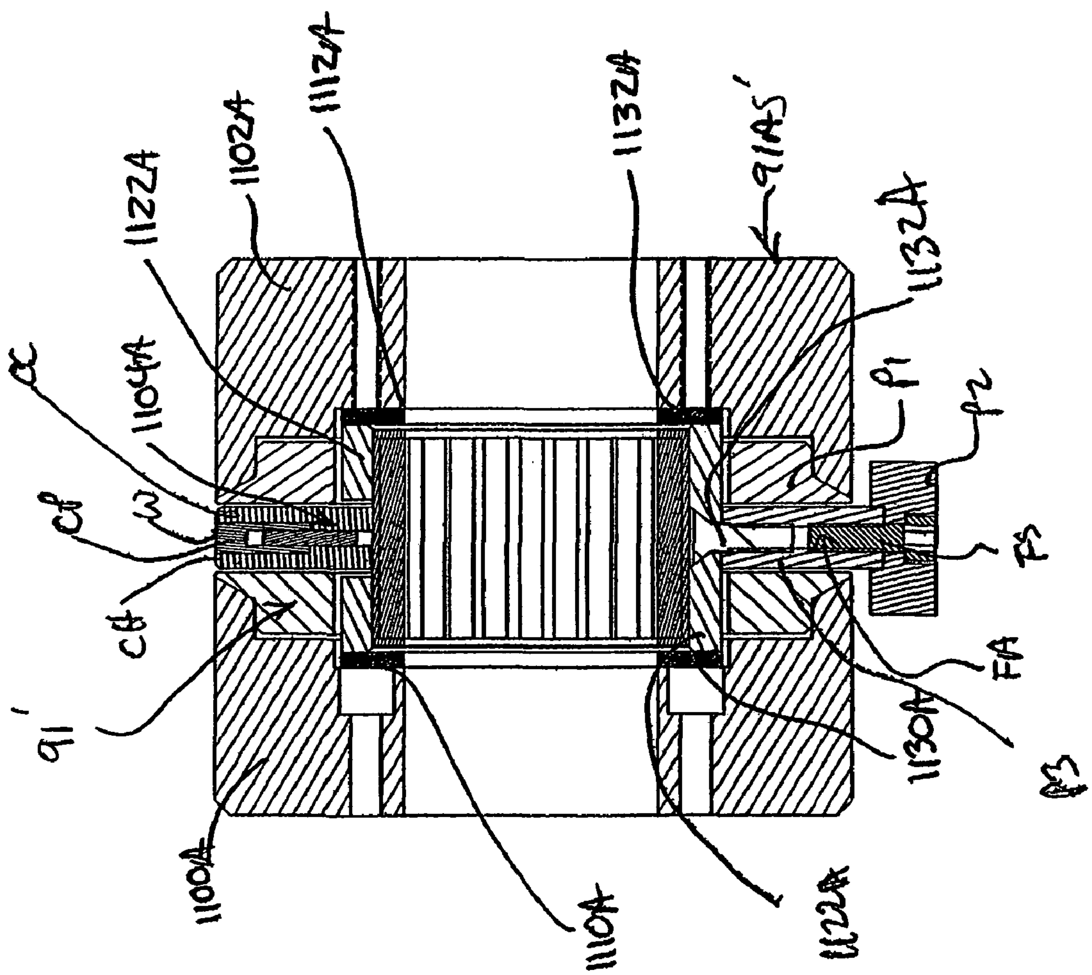
FIG. 15 shows a cross-sectional view taken along cross-section line A-A in FIG. 13.
Figure 17:
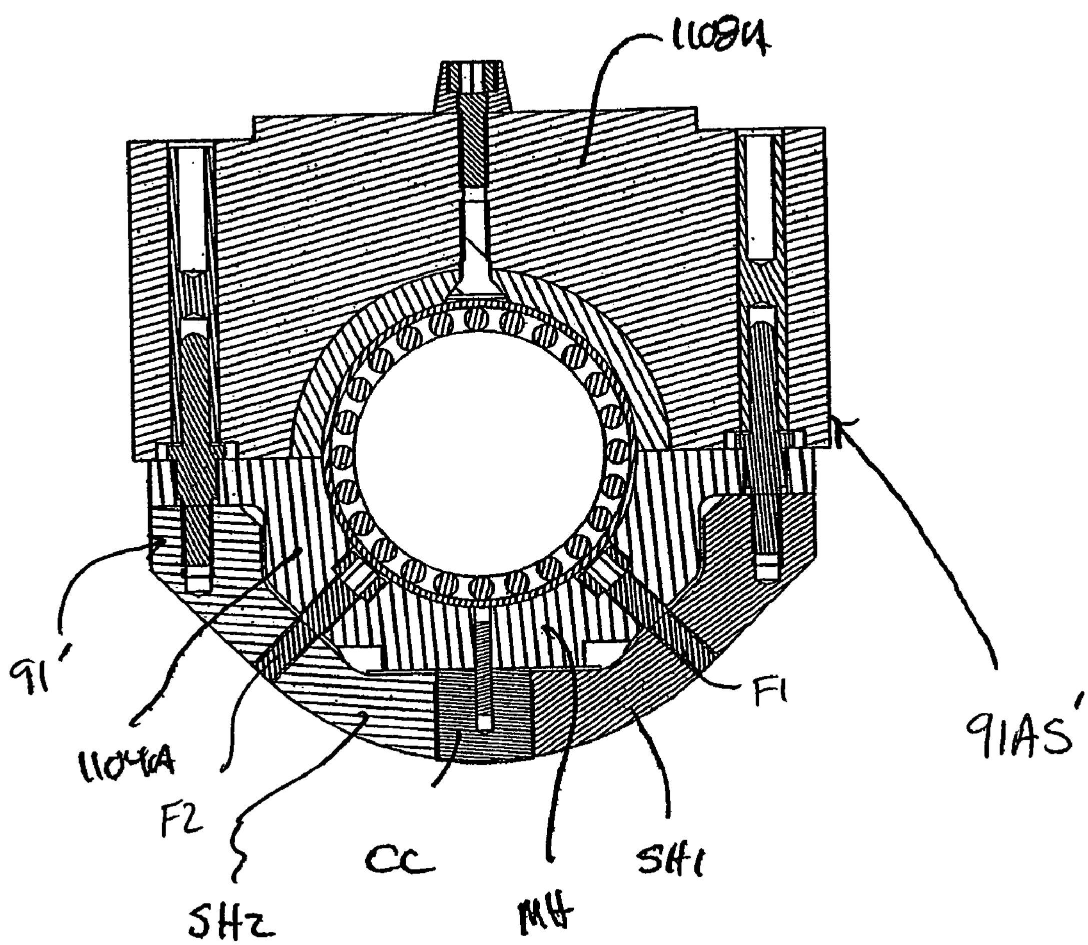
FIG. 17 shows a cross-sectional view taken along cross-section line B-B in FIG. 13.

FIGS. 15 and 17 are representative of an alternate edge sealer assembly 91' embodiment. This second embodiment 91' of the edge seal assembly has its components represented by the "A" reference versions amongst FIGS. 8 to 59 together with FIGS. 62 and 63. As seen there are general similarities between the edge sealing means embodiments of edge sealer assembly 91 and edge sealer assembly 91' and thus the emphasis below is on the differences.

Figure 9:
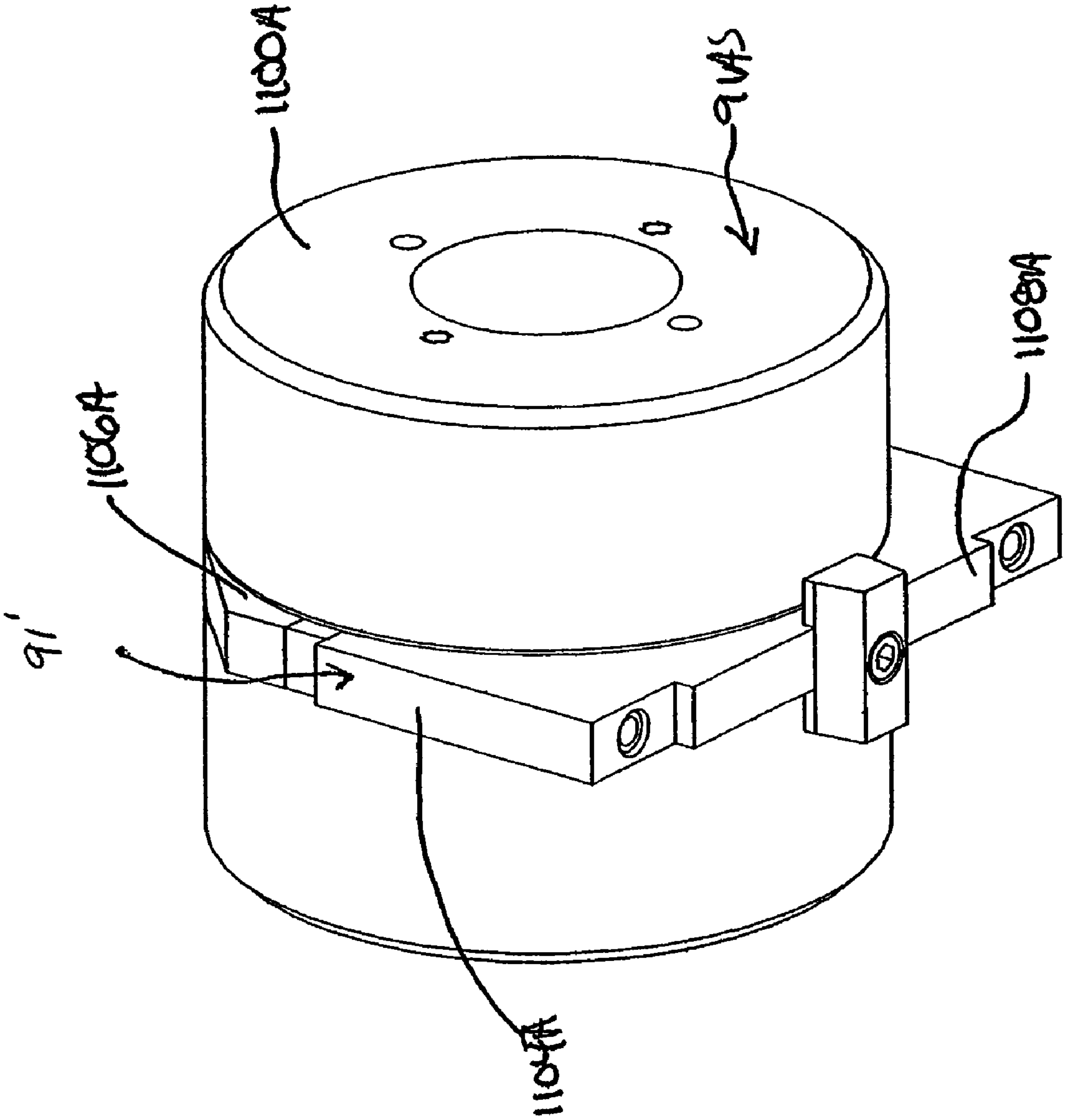
FIG. 9 shows a first perspective view of a second embodiment of edge sealer assembly from the electrical contact side.
Figure 10:
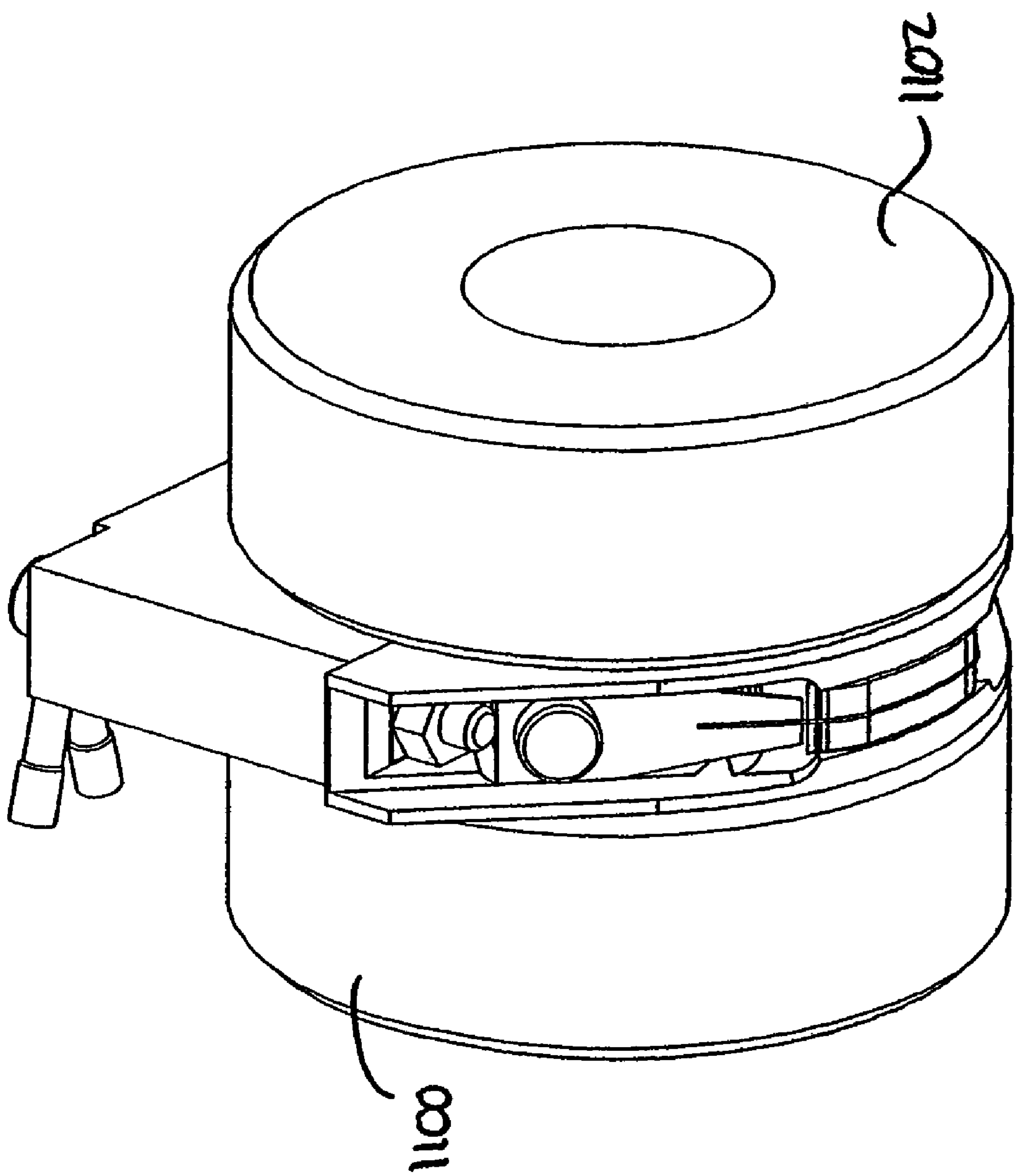
FIG. 10 shows a second perspective view of the first embodiment of the edge sealer assembly from the heater element (wire shown) side.
Figure 11:
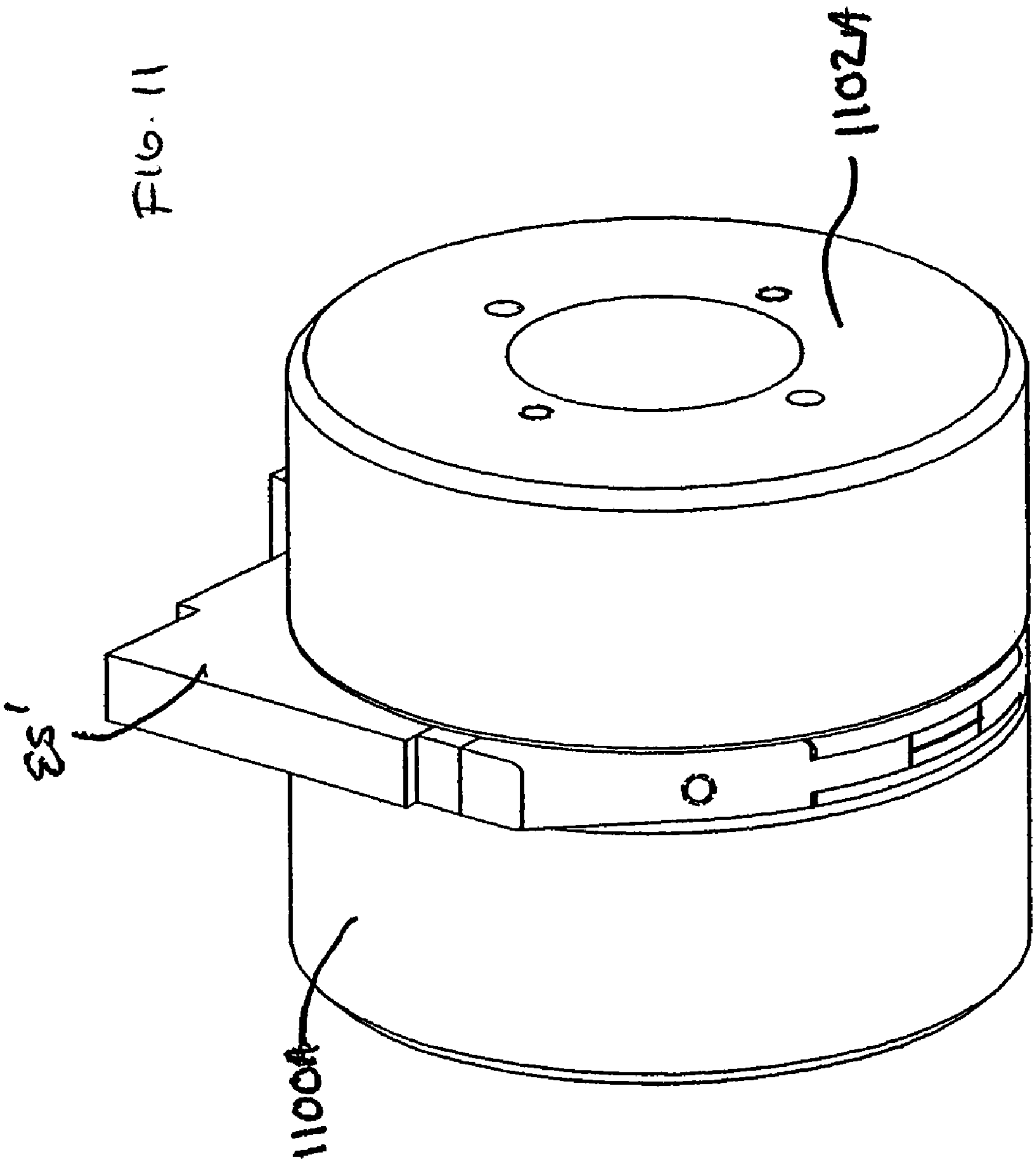
FIG. 11 shows a second perspective view of the second embodiment of the edge sealer assembly from the heater element (wire shown) side.
Figure 12:
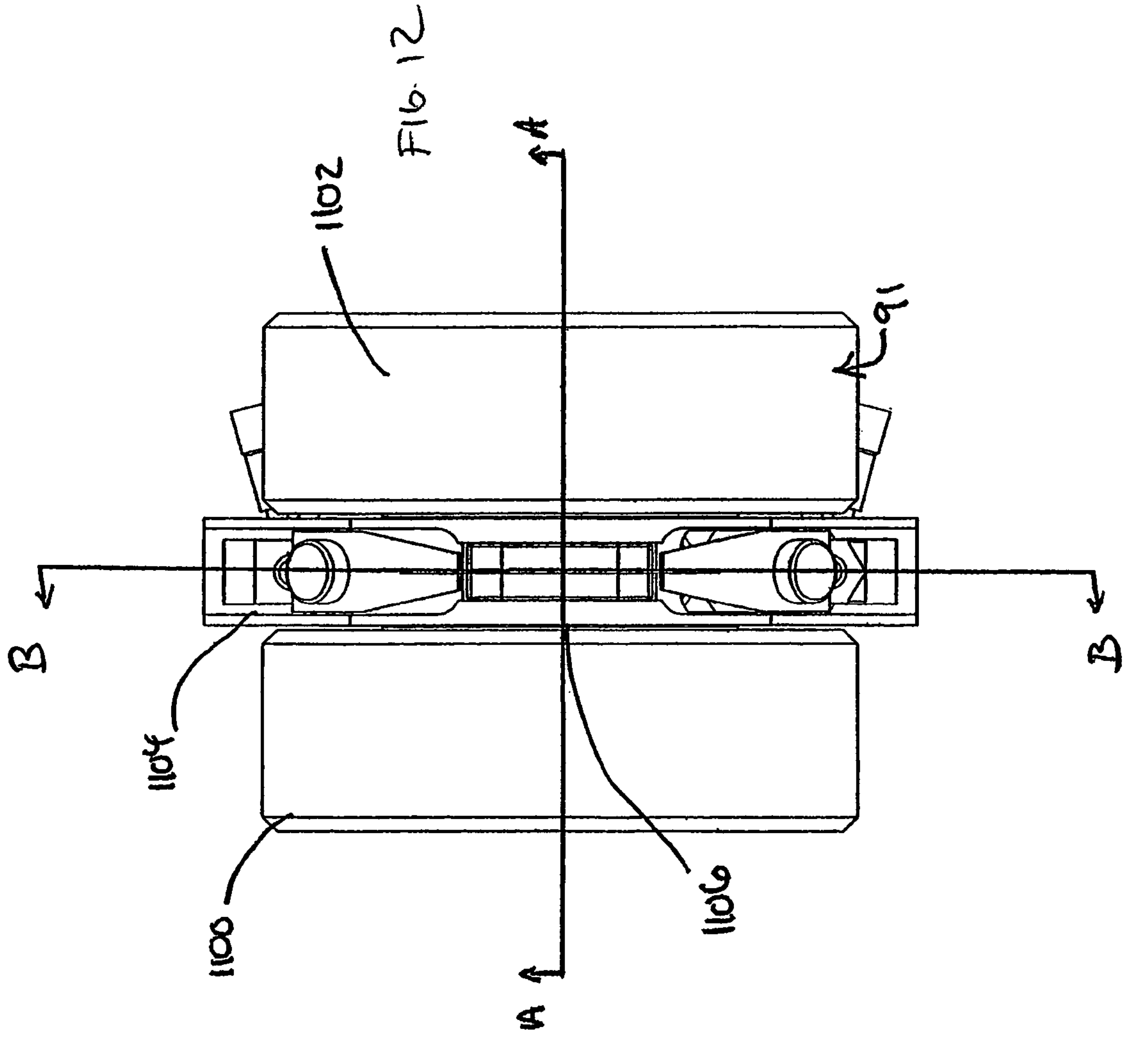
FIG. 12 shows an elevational view of the heater element (wire shown) side of the first embodiment of the edge sealer assembly.
Figure 13:
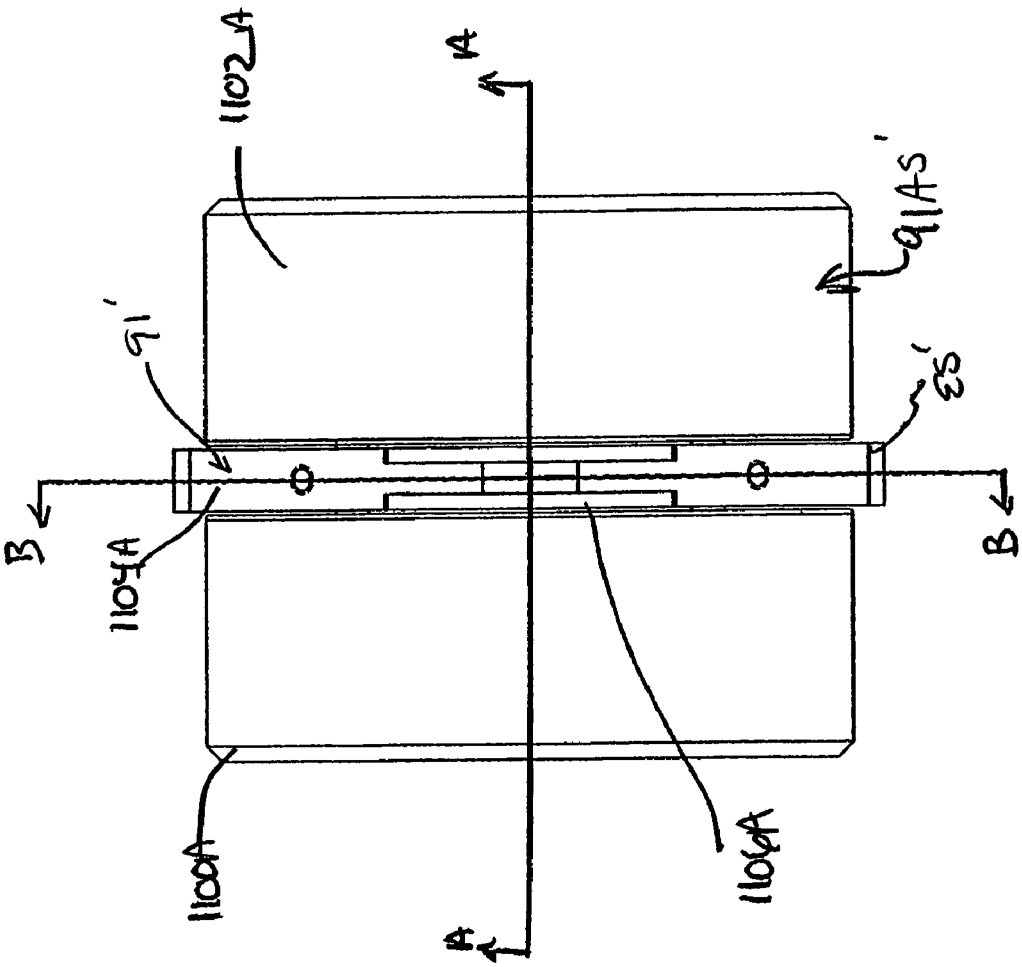
FIG. 13 shows an elevational view of the heater element (wire shown) side of the second embodiment of the edge sealer assembly.

As seen, from FIGS. 9 and 15 edge sealer assembly combination 91AS' with two part edge seal assembly 91' features a modified sleeve to roller segments clamping means featuring components which include annular wedge ring P1, threaded block P2, and threaded cylinder P3 with threaded fastener FS is associated with external block P2 and internally threaded with cylinder P3 and with annular wedge ring P1 completing the connection due to sleeve 122A being fixed in position there under with fastener 1132A received in the opposite, internal end of threaded cylinder 3.

Figure 33:
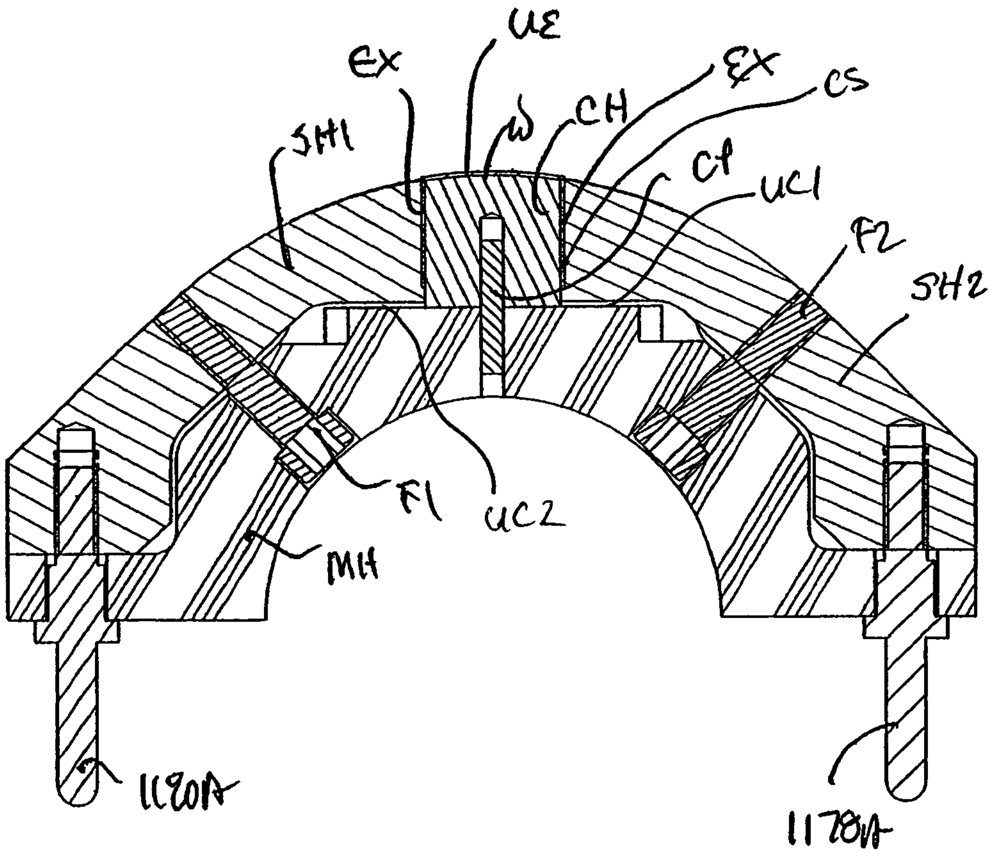
FIG. 33 shows a similar cross-sectional view relative to FIG. 31.
Figure 34:
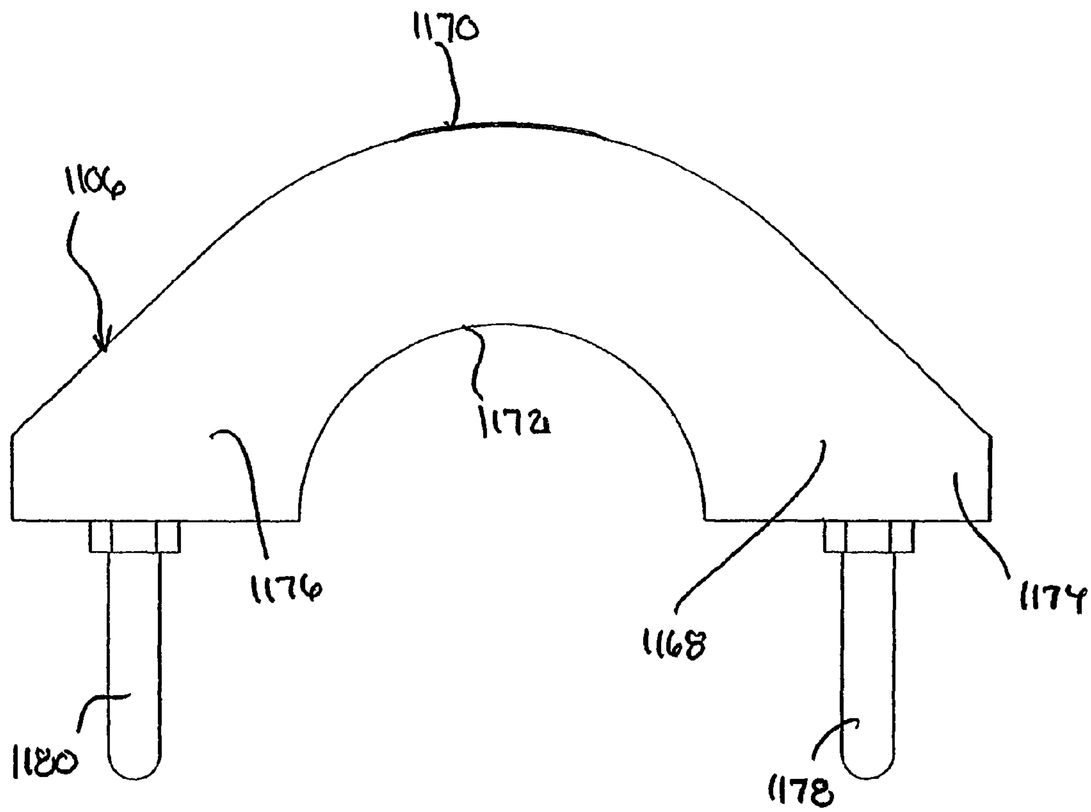
FIG. 34 shows a side view of the arbor assembly or edge sealer first embodiment of the edge seal assembly.
Figure 35:
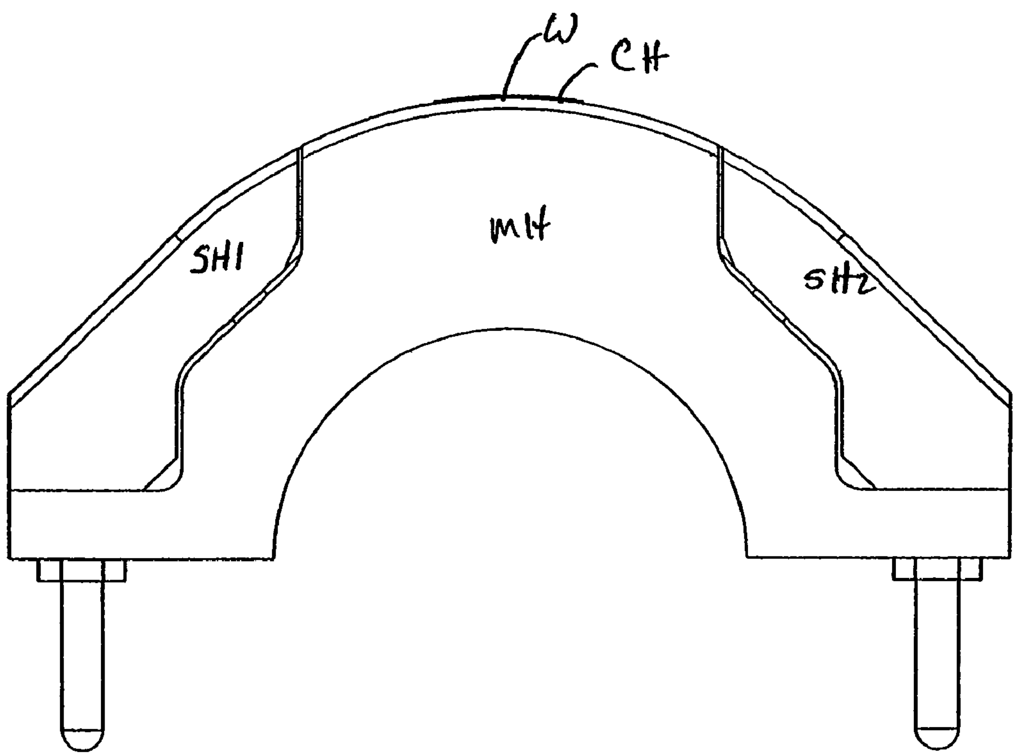
FIG. 35 shows a side view of the arbor assembly or edge sealer of the second embodiment.
Figure 36:
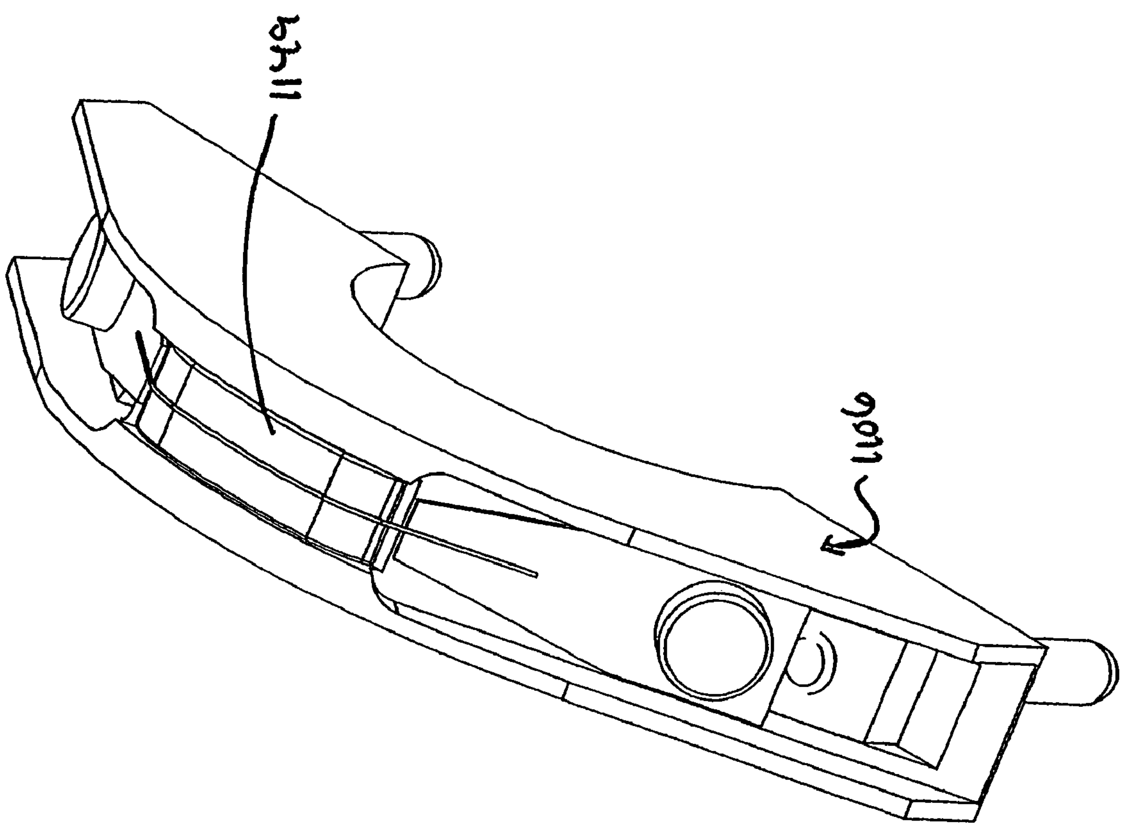
FIGS. 36, 38 and 40 show alternate perspective views of the edge sealer of the first embodiment with FIGS. 36 and 40 illustrating the seal wire tensioning means.
Figure 37:
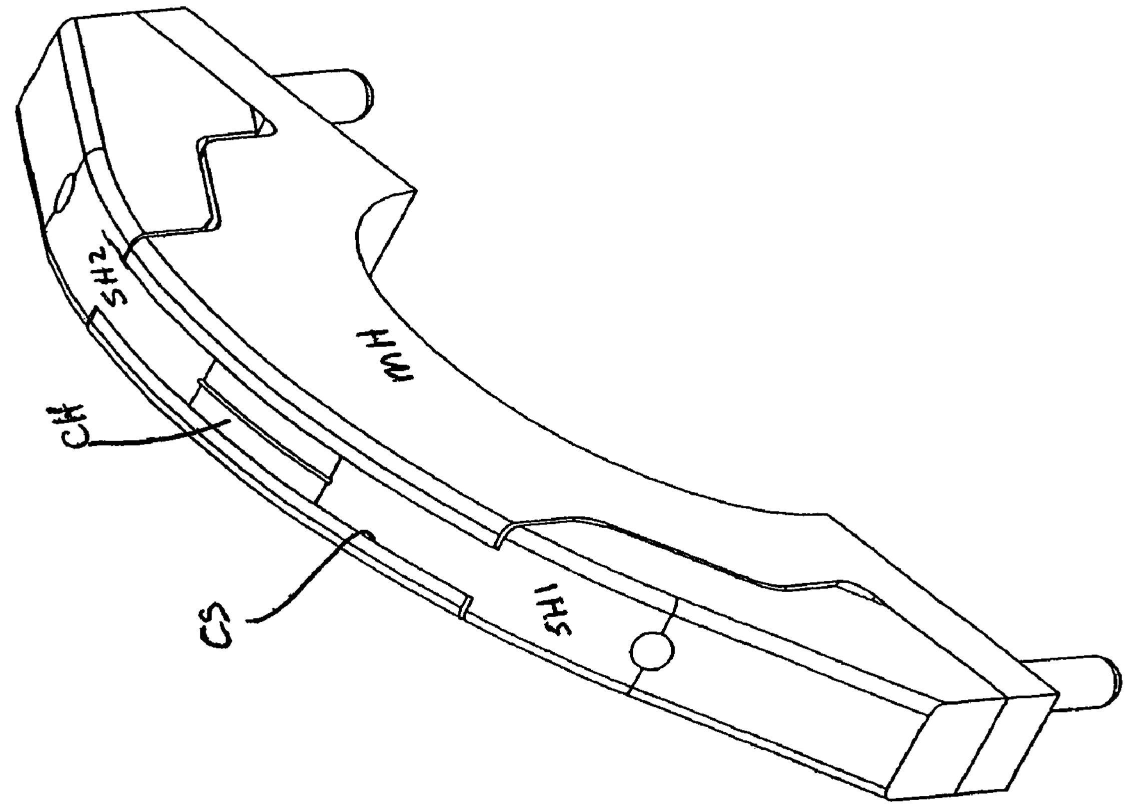
Figure 38:
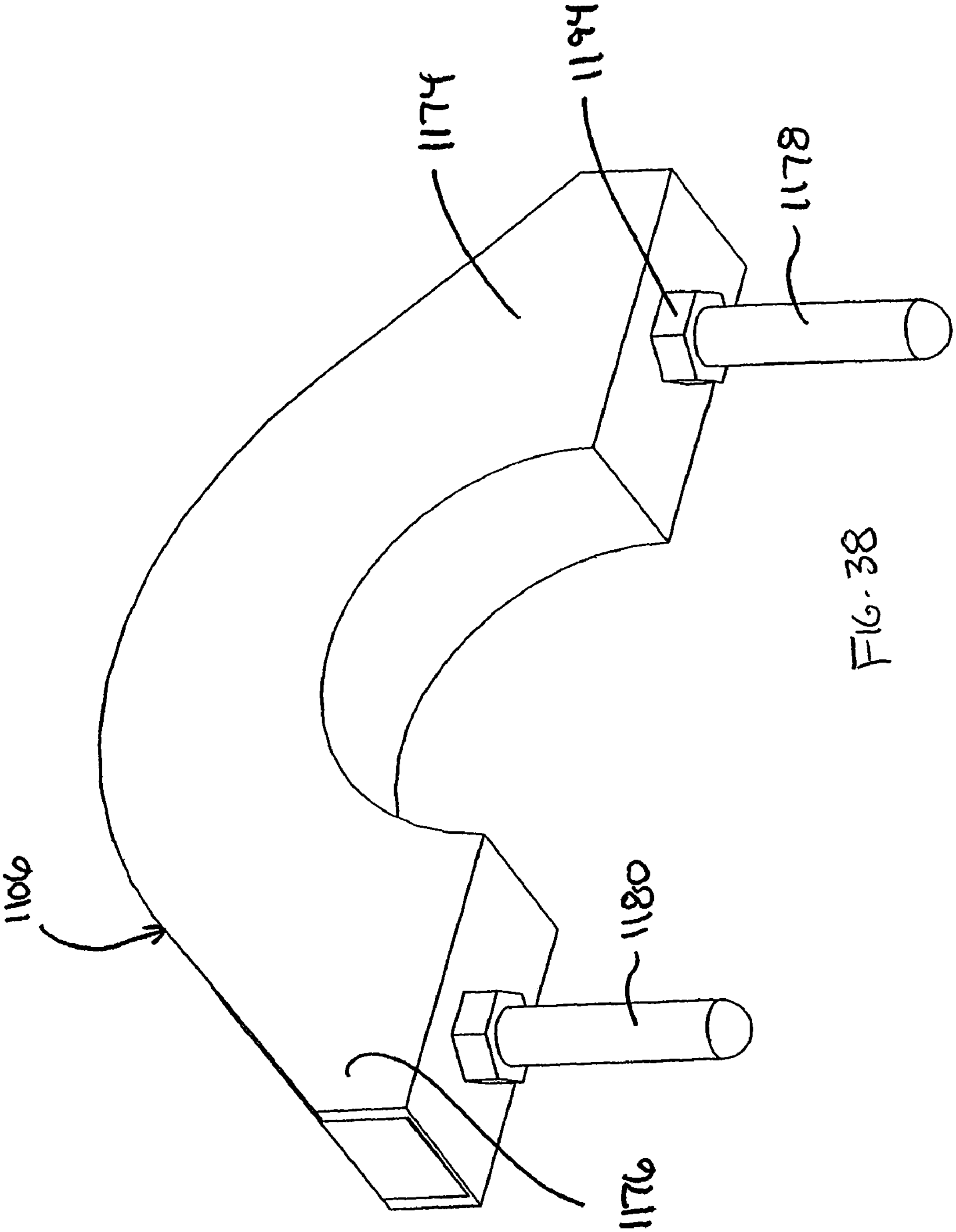
Figure 39:
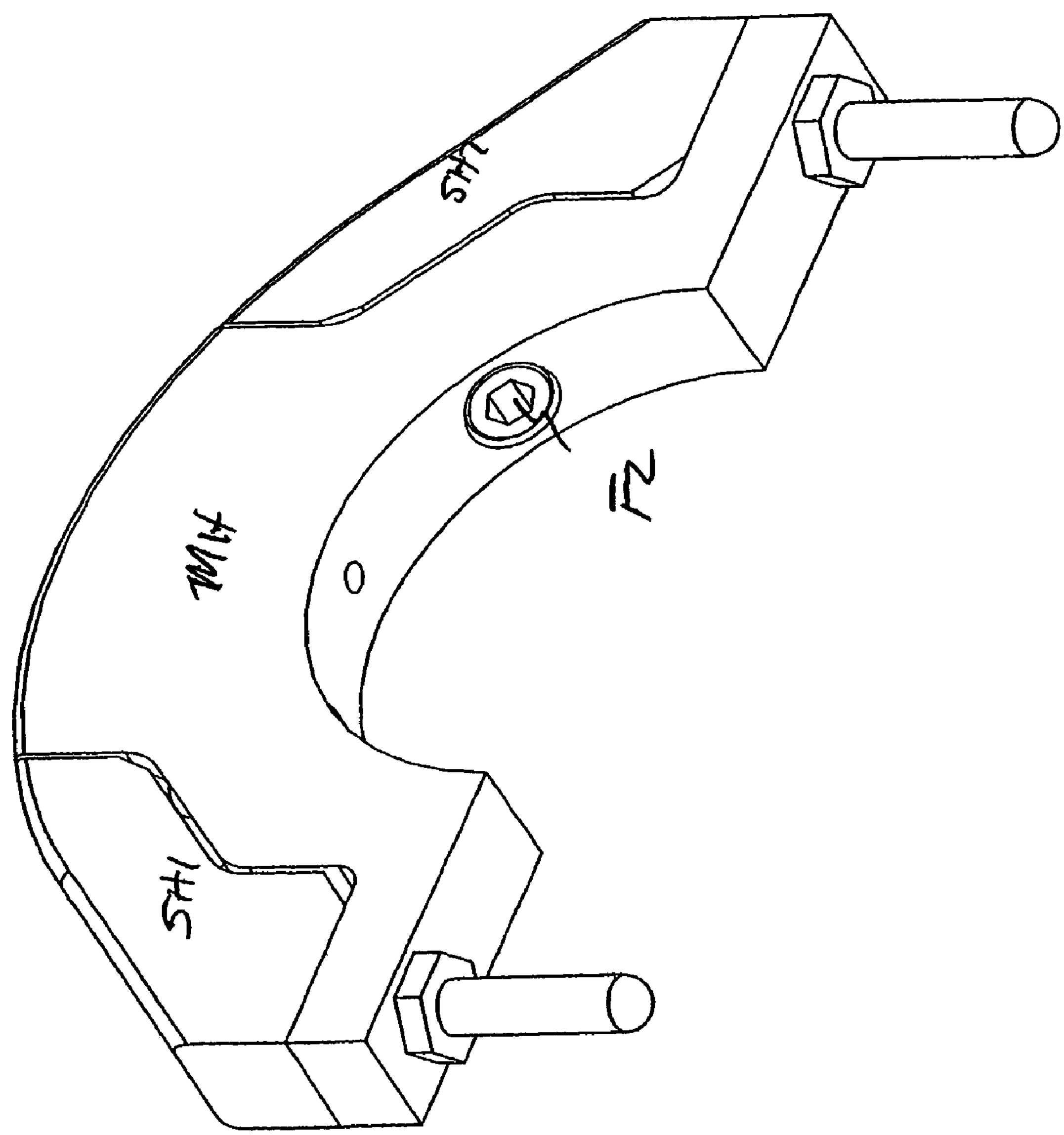
Figure 40:
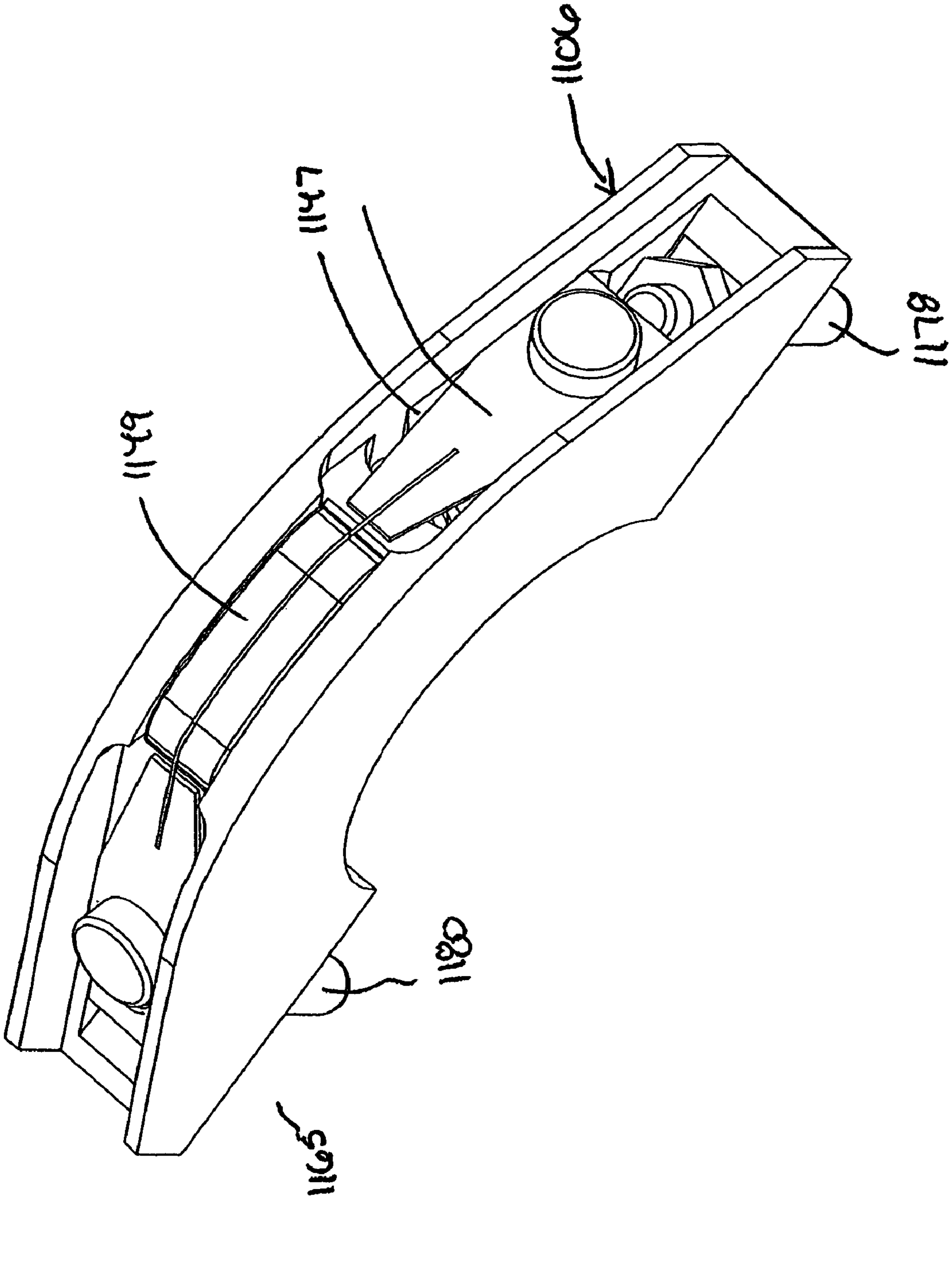
Figure 41:
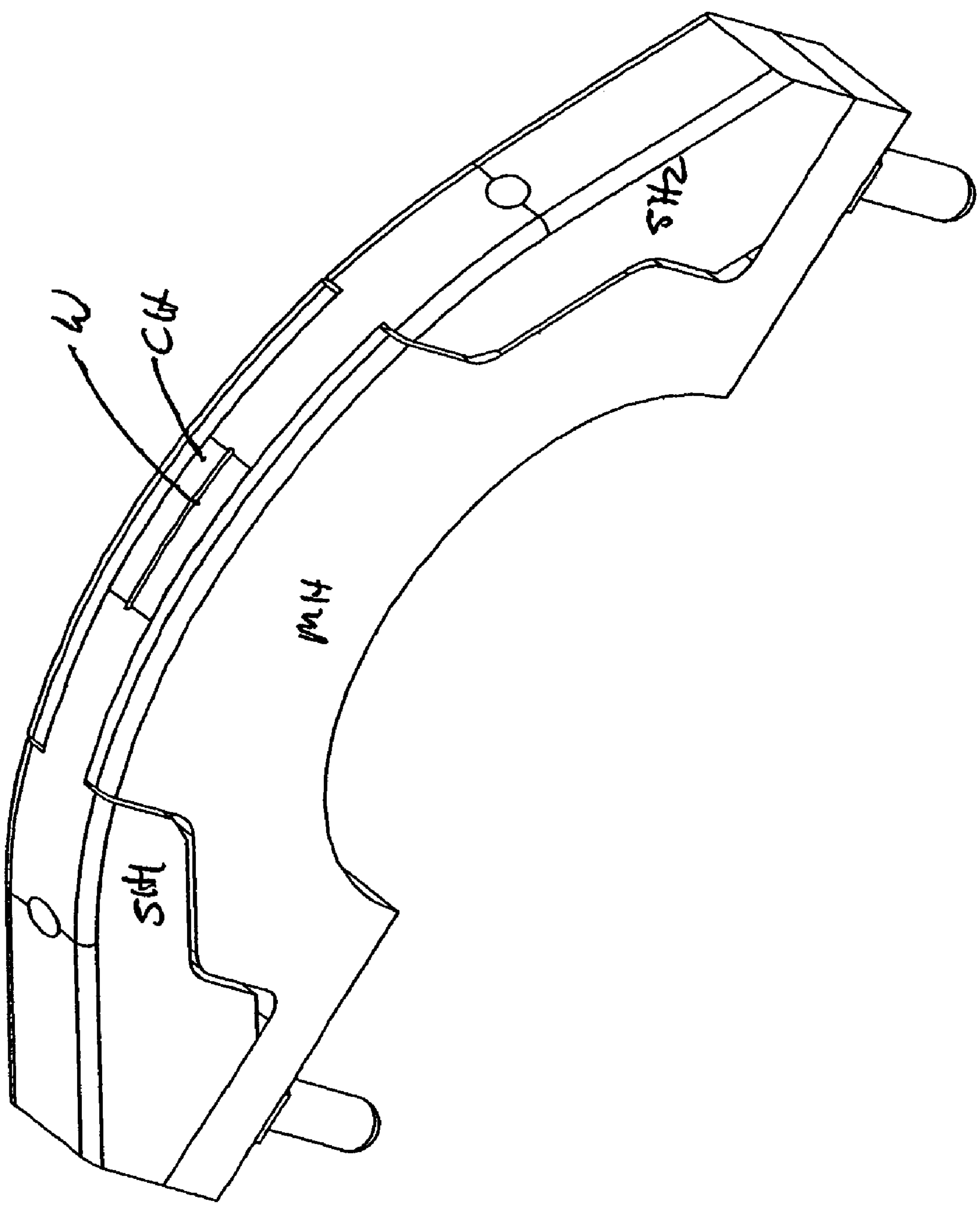

As further seen from FIGS. 15, 17, and 33, the edge sealer assembly combination 91AS' represents an alternate preferred embodiment from, for example, the standpoint of symmetry in design to the left and right of ceramic insert head CH of the same ceramic described above or of, for example, VESPEL brand high temperature plastic of DuPont is received within the central reception cavity CS defined by main housing MH having pin connectors 1178A and 1180A as shown in FIG. 33. Shoes SH1 and SH2, together with fasteners F1 and F2, are used to secure in position insert head CH (e.g., a sliding friction positioning is suitable between the interior most ends of the shoes). Shoes SH1 and SH2 are thus designed as positioners that are used to sandwich head CH within slot CS with fasteners F1 and F2 being utilized to secure shoes or positioners SH1 and SH2 to housing MH. Head CH supports heater wire segment W with upper end UE conforming to the head's CH convex curvature CC and designed for reception within groove or slot Wg shown in FIG. 62. The shoes SH1 and SH2 are formed of a conductive material so as to provide for an electrical conduction of current from the pins, 1178A and 1180A to head CH. Heater wire segment W preferably has, in addition to its upper exposed, central section, two side wire extensions EX that are placed in contact with the interior ends of the shoes to complete the circuit running from one of the conductor pins (e.g. pin 1178A to an adjacent shoe which receives the conductor pin and which has its interior end in contact with wire extension EX) such that the electricity passes through the wire, through the opposite shoe and then out through the opposite conductor pin. Because rollers 1100 and 1102 are of a non-conducting material together with the arbor housing unit supporting the shoes, there is sufficient electrical insulation provided relative to the conductive shoes when the edge seal assembly is assembled. Also, the fasteners F1 and F2 are received within the main housing MH formed of an electrically insulating material and upon drawing in the shoes against the housing the interior end of the shoes compress the wire extensions against the opposing sides of the insert head, so as to provide both a good electric contact and facilitate the position retention (with or without the use of position pin CP). The odd numbered Figures from 25 to 59 show individual components of edge seal assembly 91' shown, for example, assembled in FIG. 17, with the noted added "A" to reference numbers sharing some similarity with the earlier described embodiments.

Figure 53:
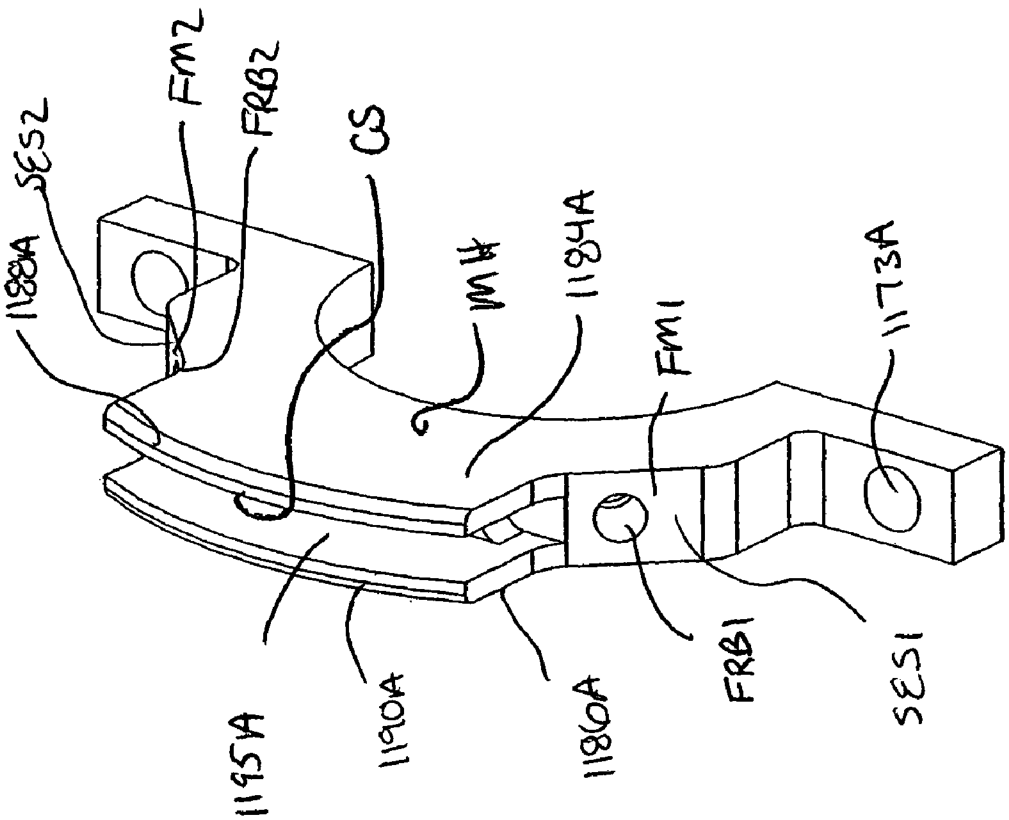
Figure 54:
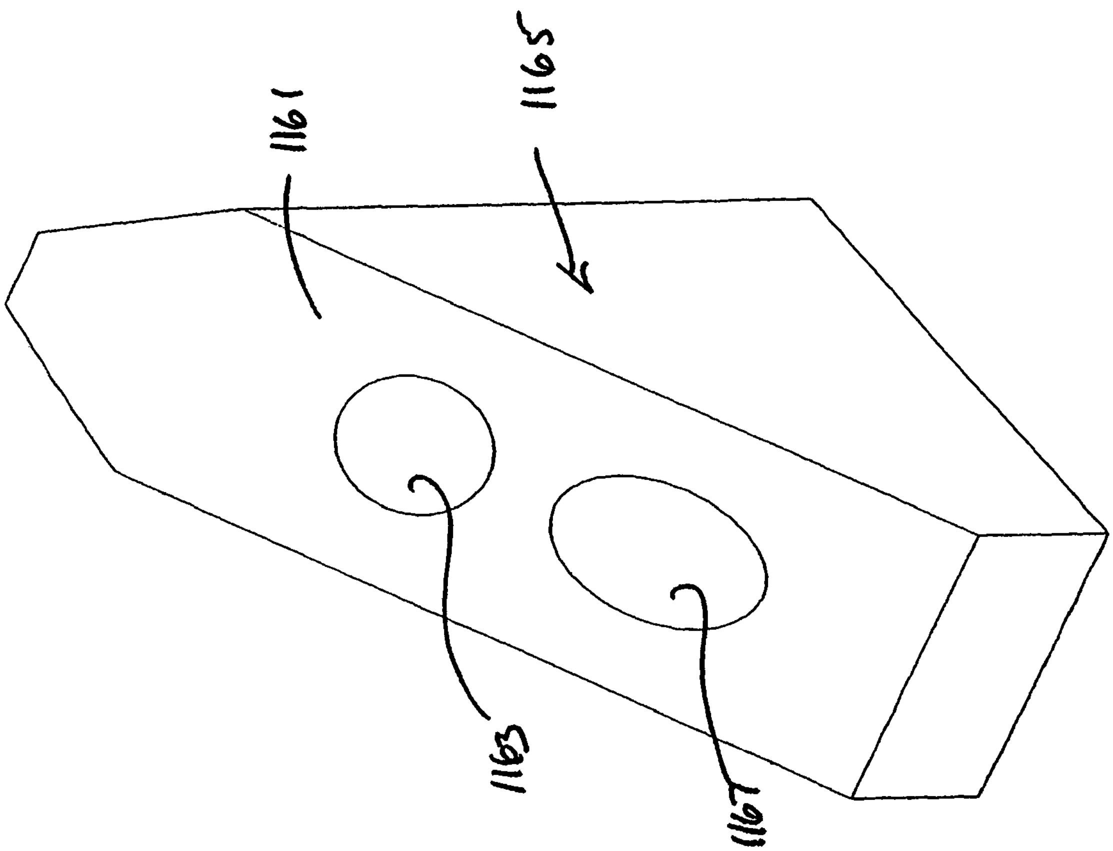
FIGS. 54, 56 and 58 show perspective views of the wire end connector of the first edge seal embodiment.

FIG. 53 shows main housing MH for the edge seal assembly 91' shown in FIG. 17 and includes an intermediate cavity 1195A formed between side walls 1184A and 1186A in similar fashion to the edge sealer assembly 91. Side walls 1188A and 1190A which are preferably curved in length and planar in width at the exposed upper surfaces are represented by rims 1188A and 1190A.

Figure 55:
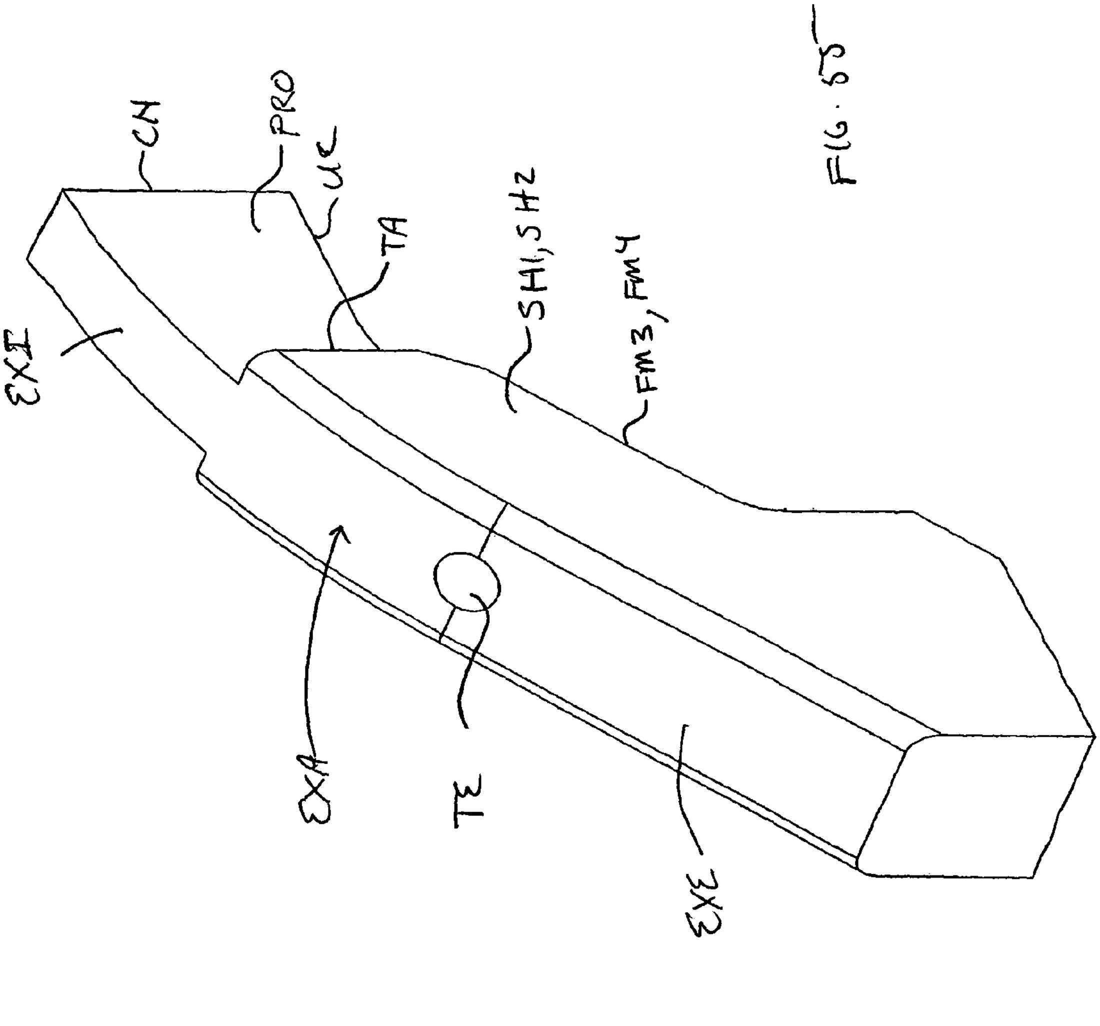
FIGS. 55, 57 and 59 show perspective views of a shoe conductors of the second edge seal embodiment.
Figure 56:
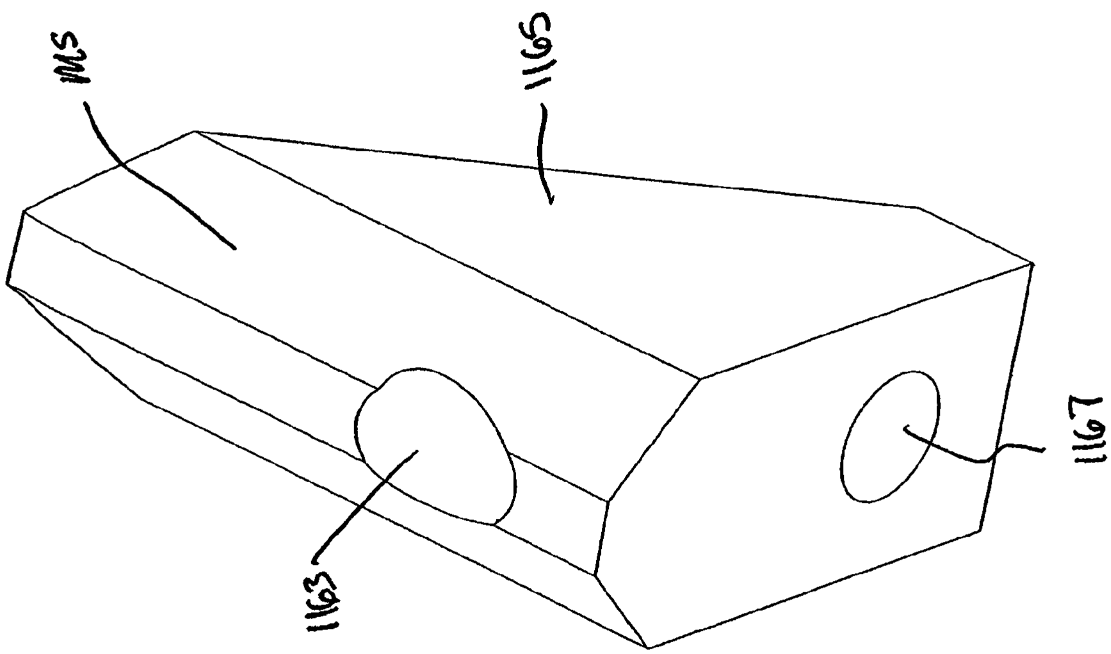
Figure 57:
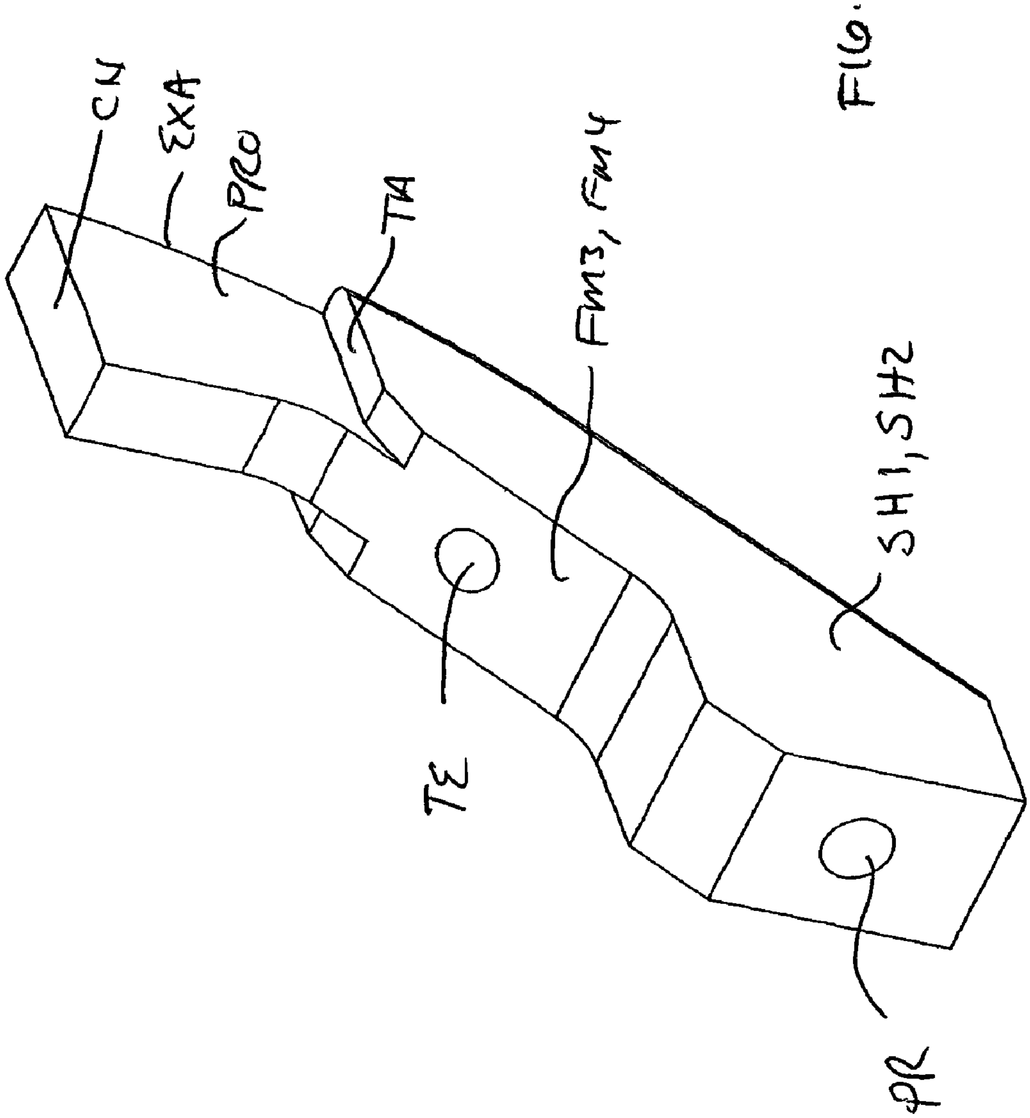
Figure 58:
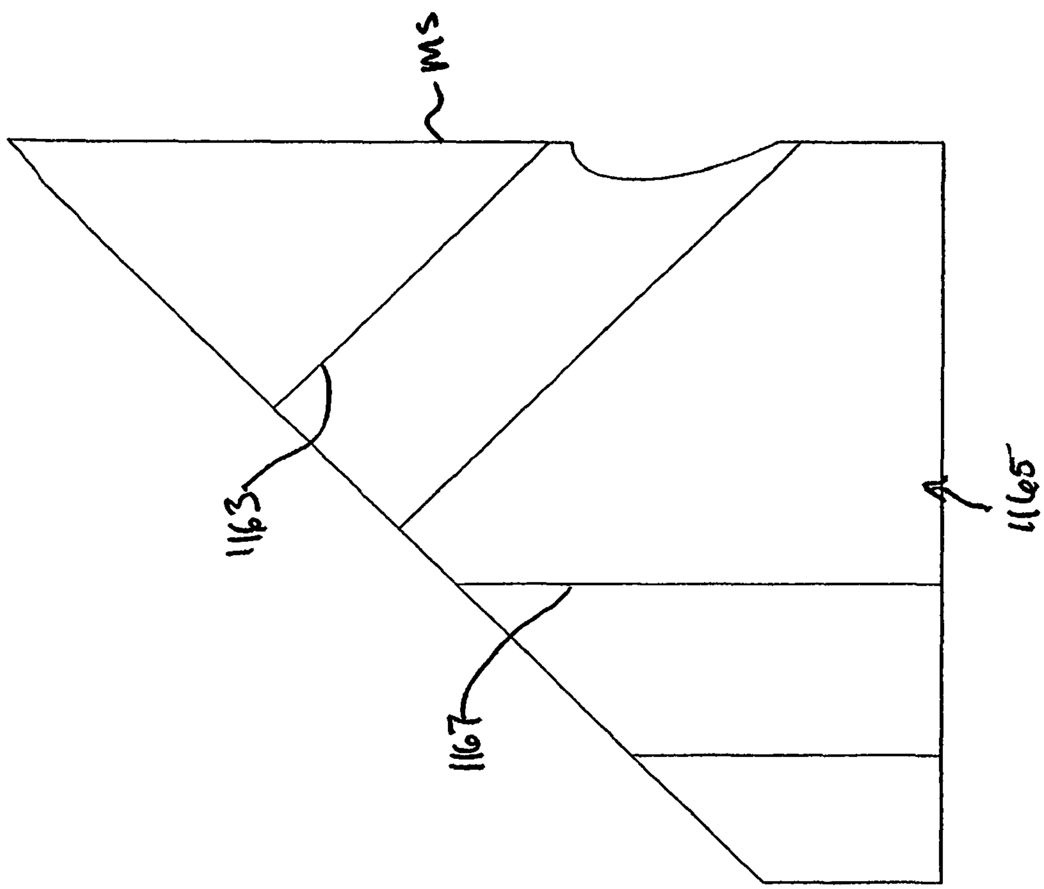
Figure 59:
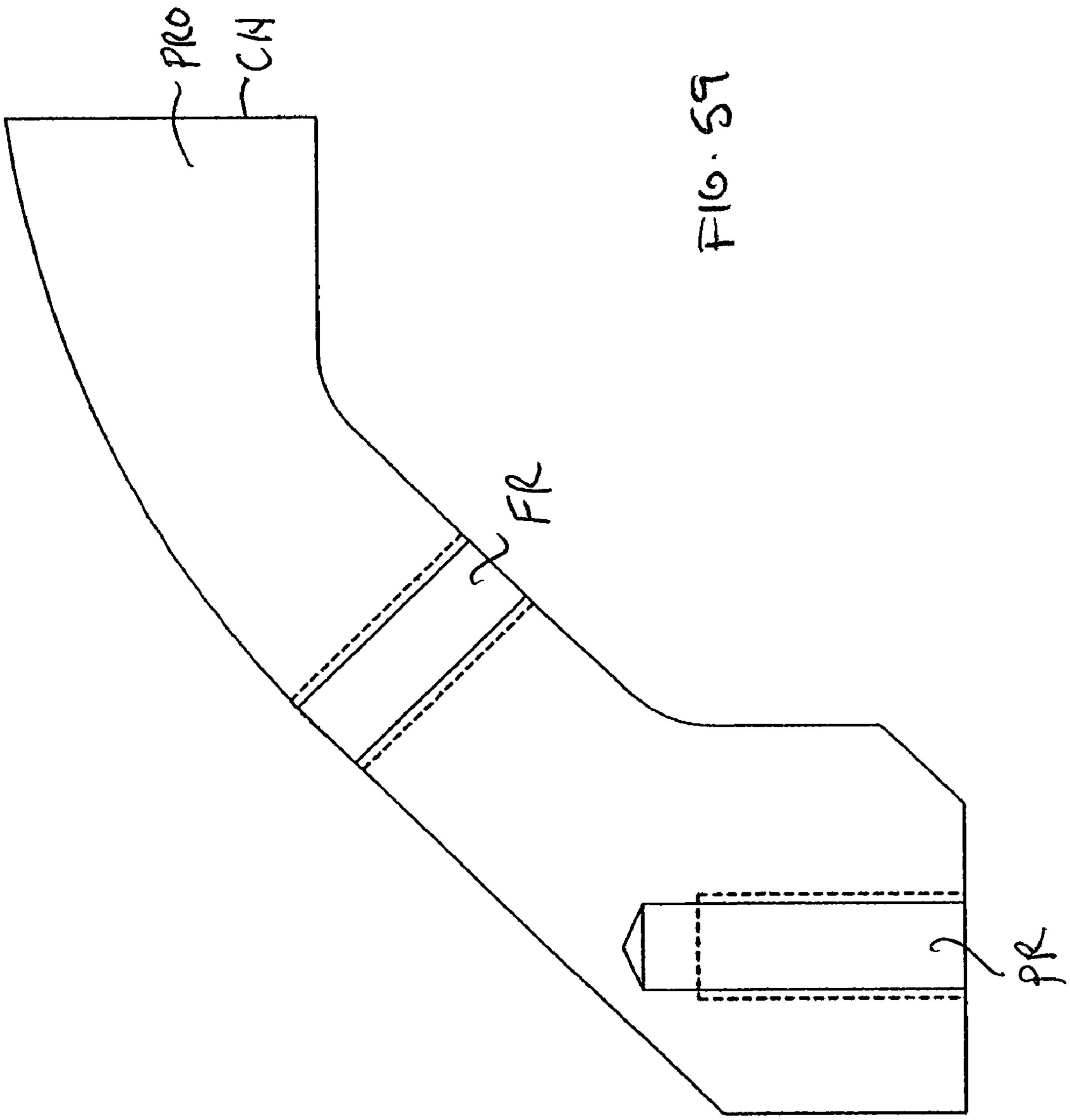

FIG. 53 further shows non-walled end sections SES1 and SES2 that have an exposed arched surface designed to generally correspond in shape to shoes SH1 and SH2 as shown in FIG. 17. This includes planar flush mount surfaces FM1 and FM2 having apertures FRB1 and FRB2 through which fasteners F1 and F2 (FIG. 33) extend until received by threaded apertures TE (FIG. 55) formed in shoes SH1 and SH2. As shown in FIGS. 55 and 57 shoes SH1 and SH2 are each formed with conductive pin receipt apertures PR and planer surfaces FM3 and FM4, respectively, around the opening for threaded aperture TE receiving fasteners F1 and F2. FIG. 55 further show stepped shoulder TA from which extends out the thinner width projection PRO having a width dimensioned for sliding friction contact with side walls 1186A and 1188B. The exposed surface EXA of the shoes has an interior portion EXI that is also designed to match the curvature of rims 1188A and 1190A as seen from FIGS. 33 and 35. The exposed surface EXA preferably extends in continuous fashion from interior portion EXI into portion EXE. Projections PRO have an underlying contact surface UC1 which is preferably a planar surface design. Surface UC1 rests flush on planar surface UC2 of main housing MH defining the base of cavity 1195A. Projection PRO for each shoe also preferably has a contact edge CN designed to come in electrical communication contact with the heater element or heater wire side extension extending down the opposite side walls of insert head CH. Thus shoes SH1 and SH2 act to sandwich the insert head CH and the two side extensions Ex of wire W in position and in a electrical communication due to the conductive nature of shoes SH1 and SH2.

Figure 62:
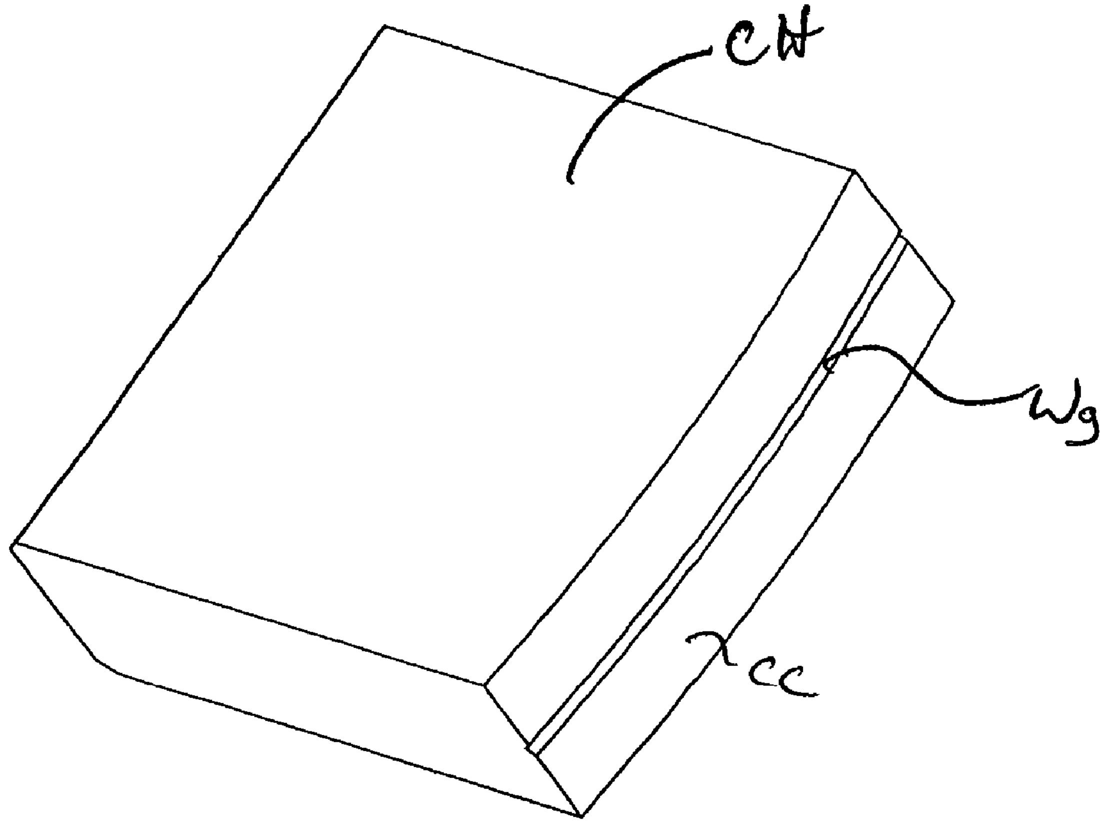
FIGS. 62 and 63 illustrate the insert head used in the arbor assembly of the second edge seal assembly embodiment.
Figure 63:
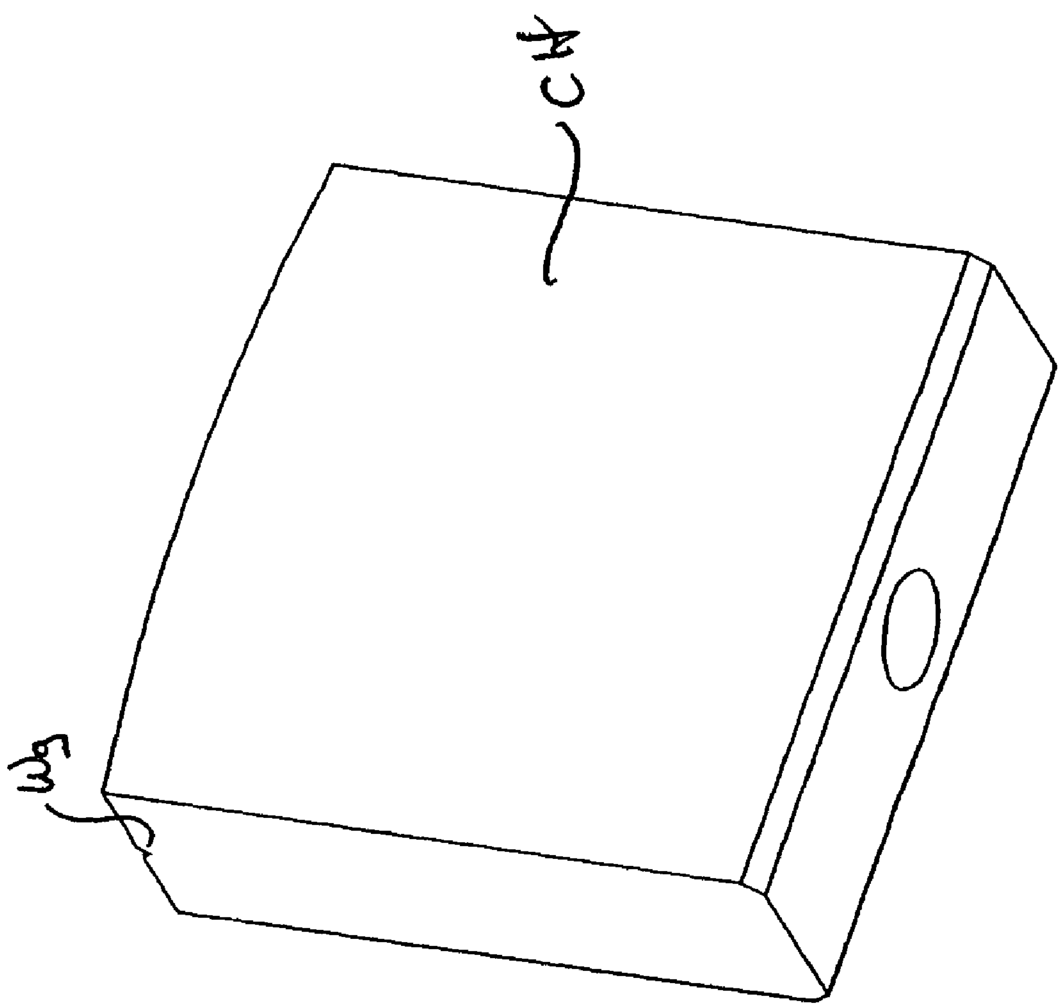

FIGS. 33, 62 and 63 further illustrate insert head CH having an exposed film control surface CC with central groove Wg extending over its entire length for receiving the exposed upper portion UE of heater element W such that upper portion UE is recessed to some degree along the preferably ceramic material insert head CH. Also the exposed portion UE follows the curvature of heater element W preferably generally following the curvature of the rims 1188A and 1190A and the shoes exposed interior portion EXE (FIG. 55) so as to present a generally flush, continuous and planar in width film presentation (e.g., direct contact) surface.

Figure 86A:
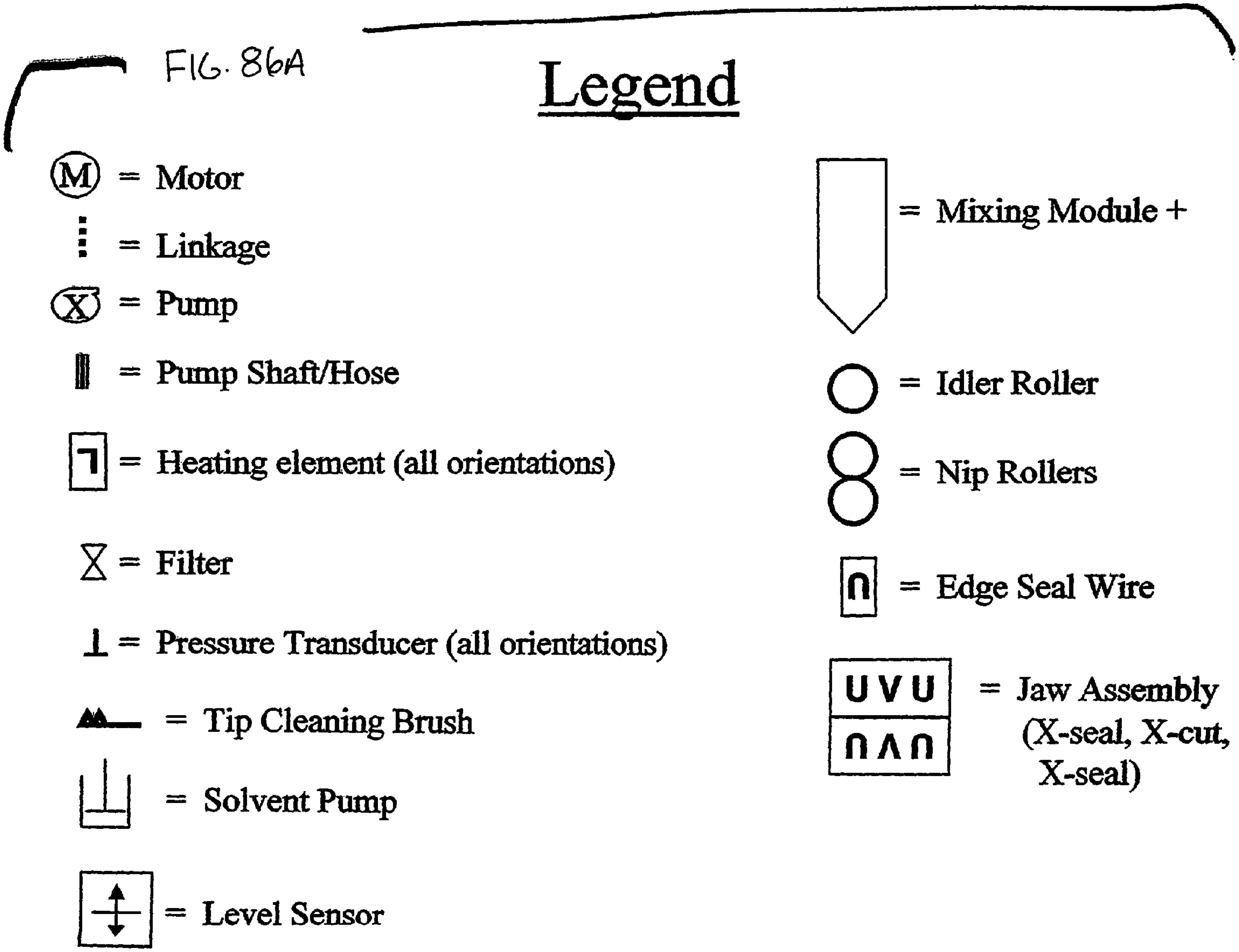
FIG. 86A provides a legend key for the features shown schematically in FIG. 86.

FIG. 86 shows an overall schematic view of the display, controls and power distribution for a preferred foam-in-bag dispenser embodiment which provides for coordinated activity amongst the various sub-assemblies like that for the foam-in-bag dispenser system described above (and for which component reference numbers are provided in addition to the key legend of FIG. 86A). In FIG. 86 edge sealer 91 is schematically presented in relation to other foam-in-bag assembly components.

Figure 68:
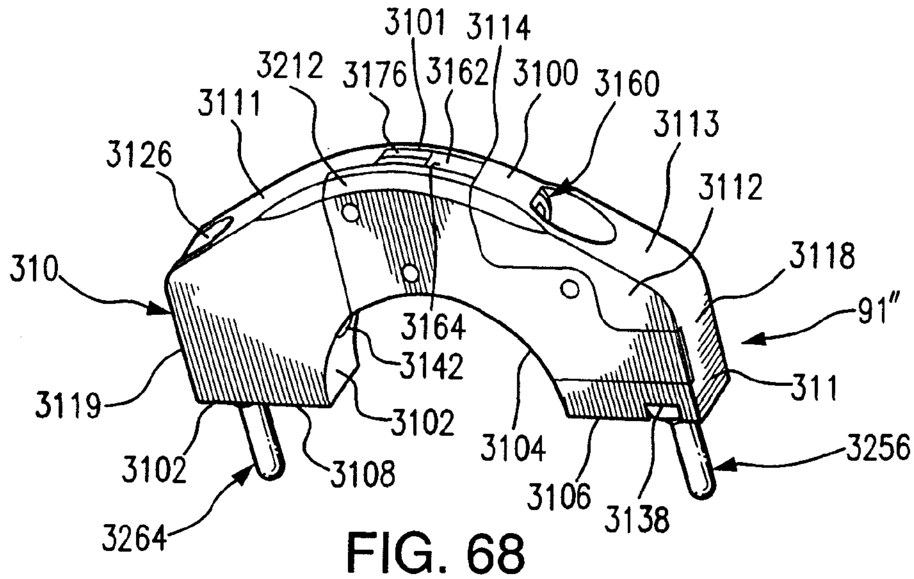
FIG. 68 shows a perspective view of a third edge sealer embodiment of the present invention for use with an edge sealer assembly.

FIG. 68 illustrates third embodiment edge sealer assembly 91" of the present invention which, in a preferred embodiment, is configured as an arbor assembly like the two above described first and second edge sealer embodiments utilized with roller mounts in edge seal assembly combinations 91AS' or some alternate mounting means to place the sealing device at the desired position relative to the film material being sealed. Edge sealer assembly 91" comprises edge sealer 310 housing body or "arbor body" 311 which, in the illustrated preferred embodiment, is formed of an electrically conductive material (e.g. steel) and as a monolithic body with a film-side peripheral edge 3100. A steel arbor body also provides the benefits of low flexibility (e.g., steel, as in a hardened steel, is in the order of 100 times stiffer than "Acetal" plastic). Edge 3100 is preferably formed of an overall convex contour with a less convex or planar intermediate face or presentation section 3101 being provided (or, in an alternate embodiment, the intermediate face has a convex configuration matching the contour extending to opposite sides or various other support housing configurations can also be provided depending on intended usage and environment including straight presentation faces in the housing). In the preferred "arbor" version of edge sealer 311, there is further included opposite side or underside arbor body edge 3102 which is shown to include an intermediate concave section 3104 and left and right, more planar, base extensions 3106 and 3108. As described above, the concave section provides a rotation bearing sleeve or rotation shaft reception recess such that the edge sealer and its presentation face can be maintained stationary in the preferred drag past film/stationary sealer arrangement (although the edge sealer of the present invention can also be utilized in other environments as in non-stationary sealer environments and uses such as where the heat sealer is moving either relative to a stationary film material or a moving film material either in a common or non-common direction of movement or where both the material and the sealer are stationary when placed in position as in a clamp arrangement or where each is fixed in position, but one or the other is provided with ability to flex or adjust under a bias or spring force upon deflection). Base sections 3106 and 3108 provide for surface contact with an arbor support base, such as arbor support base 1108 described above for the first two edge sealer embodiments. While shown as having releasably connected “two part” supporting means to accommodate the drive shaft, edge sealer assembly 91", like the earlier embodiments, can take on a variety of forms such as a supporting means for the heater insert that is more of a “single part” that is attached to example to a fixed or moving component in an overall film sealing device such as a moving arm.

Figure 71:
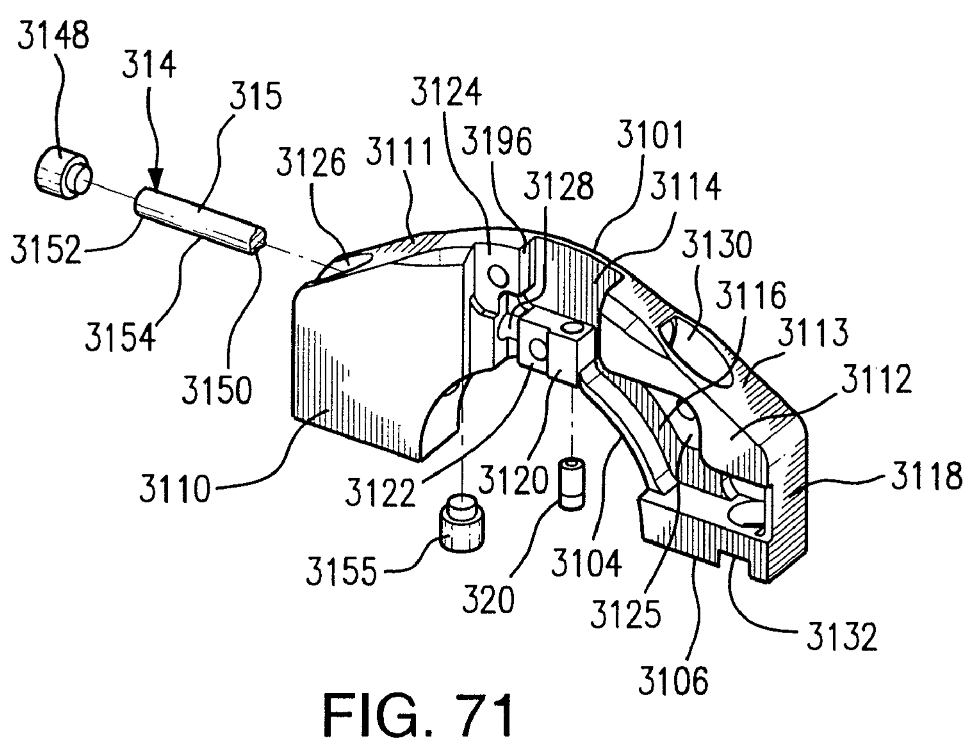
FIG. 71 shows the arbor housing or arbor body together with some of the inserts that are inserted into the arbor body.

Support body 311 further includes thicker peripheral edge surfaces 3111 and 3113 of thicker body sections 3110 and 3112. As shown in FIG. 71, the thinner face edge section 3101 and underlying wall 3226 (FIG. 72) define an insert reception recess 3114. FIG. 71 also illustrates contact bridge reception cavity 3116 extending from just inward of side wall 3118 of the arbor body and opening into recess 3114 at its opposite end. Reception cavity 3116 has an upper covering represented by an upper region of thicker section 3112 and a lower covering represented by a flange portion defining on its underside concave intermediate section 3104 and on its upper side a lower region of the thicker section 3112 directly above base extension 3106. There is further featured first and second engagement block sections 3120 and 3122 that are positioned to define the base of recess 3114, and having an intermediate thickness or depth relative to the thinner wall section 3101 and thicker wall sections 3110 and 3112. A third intermediate thickness engagement block section is represented by block 3124 in FIG. 71 and falls in thickness between thicker section 3110 and the recess defined by thinner wall section 3101. Fourth engagement block section 3125 is shown also in FIG. 71 as being formed in thicker wall section 3112 between peripheral edge surface 3113 and bridge reception cavity 3116.

FIG. 71 further shows insertion cavity 3126 extending into thicker body section 3110 and opening out at a boundary region of peripheral edge surface 3111 and side wall 3119. As seen from FIG. 69, insertion cavity 3126 extends horizontally into thicker wall section 3110 and opens out at interior outlet reception cavity 3128, which extends to second engagement block section 3122. On the other side, within thicker wall section 3112, there is provided insertion cavity 3130 which opens out at peripheral edge section 3113 and, as shown in FIG. 69, also extends horizontally until opening out into heater element support insert (and contact bridge end) reception recess 3114, and preferably at a vertically spaced relationship relative to insertion cavity 3126 (cavity 3130 shown as having a central axis of elongation at a higher level than insertion cavity 3126 in the preferred embodiment).

With reference to FIGS. 69, 71, 72 and 74, there is depicted insertion cavity 3132 extending up into base section 3106 and including an expanded diameter section 3134 opening out at exposed surface 3136 (FIG. 74) and defining notches 3138 and 3140 in the front and rear face surfaces of base section 3106, and a smaller diameter section 3139 that opens out into bridge reception cavity 3116. As seen, insertion cavity 3132 extends vertically and transversely to the direction of elongation of cavities 3126 and 3130. There is further formed in housing body 311, insertion cavity 3142, which also extends vertically and is formed in thicker block section 3110 and intersects cavity 3126 in a middle region between outlet recess 3128 adjacent engagement block 3122 and the opening of cavity 3126 at surface 3111. Insertion cavity 3142 also opens out at the concave surface 3104 of underside 3102 and preferably terminates at its opposite end internally within block section 3110 above cavity 3126.

Figure 69:
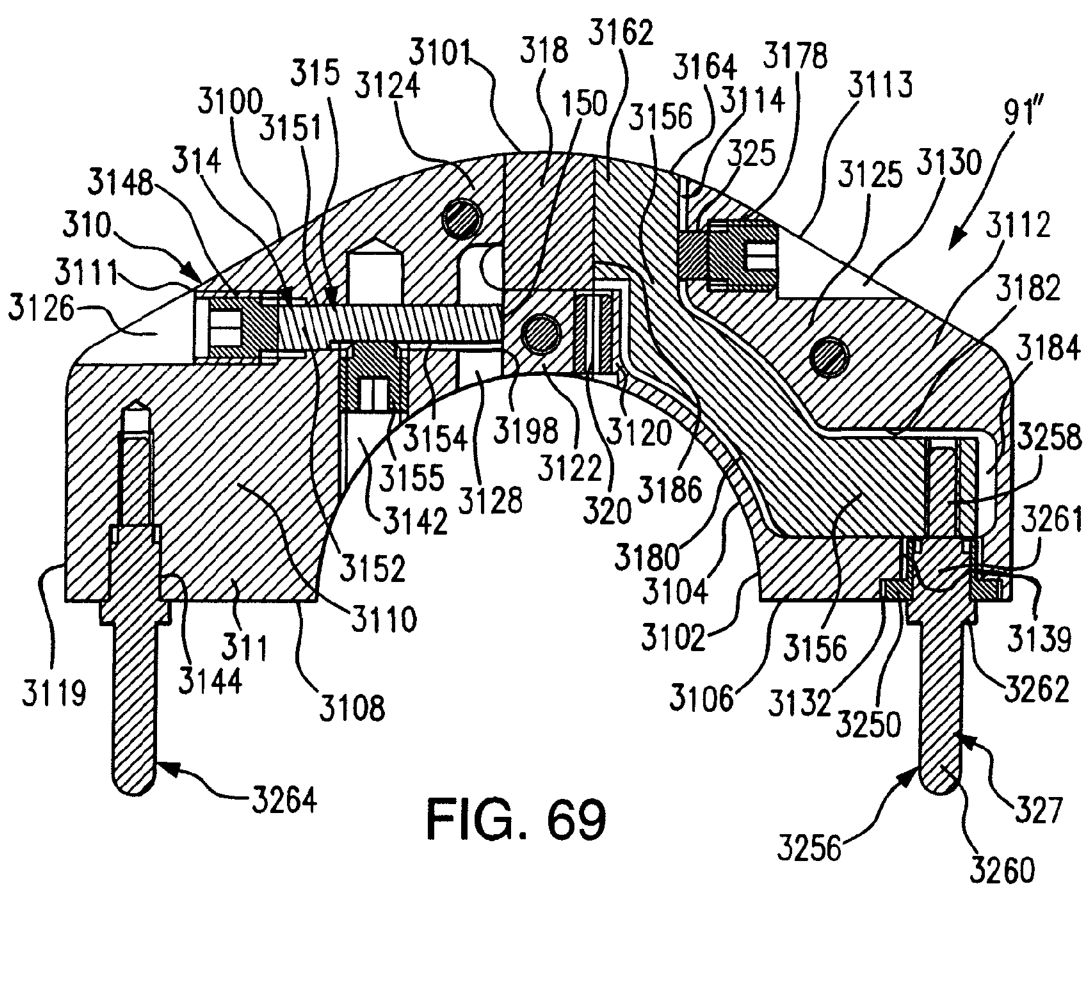
FIG. 69 shows a cross-sectional, bisecting view of the embodiment shown in FIG. 68.
Figure 70:
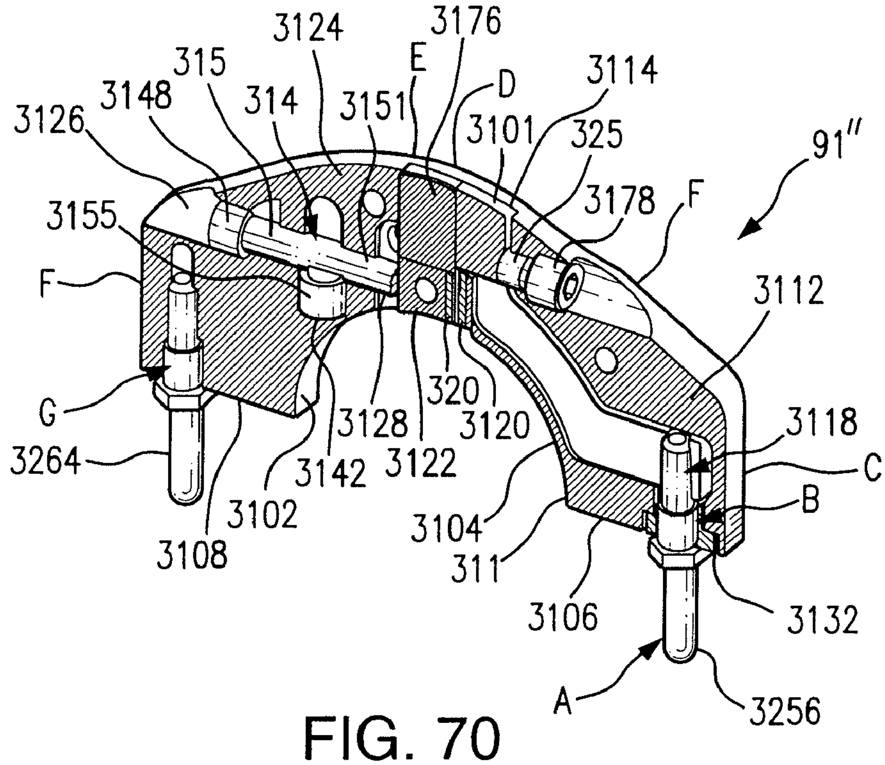
FIG. 70 shows a partial cut-away view of that which is shown in FIG. 68.
Figure 74:
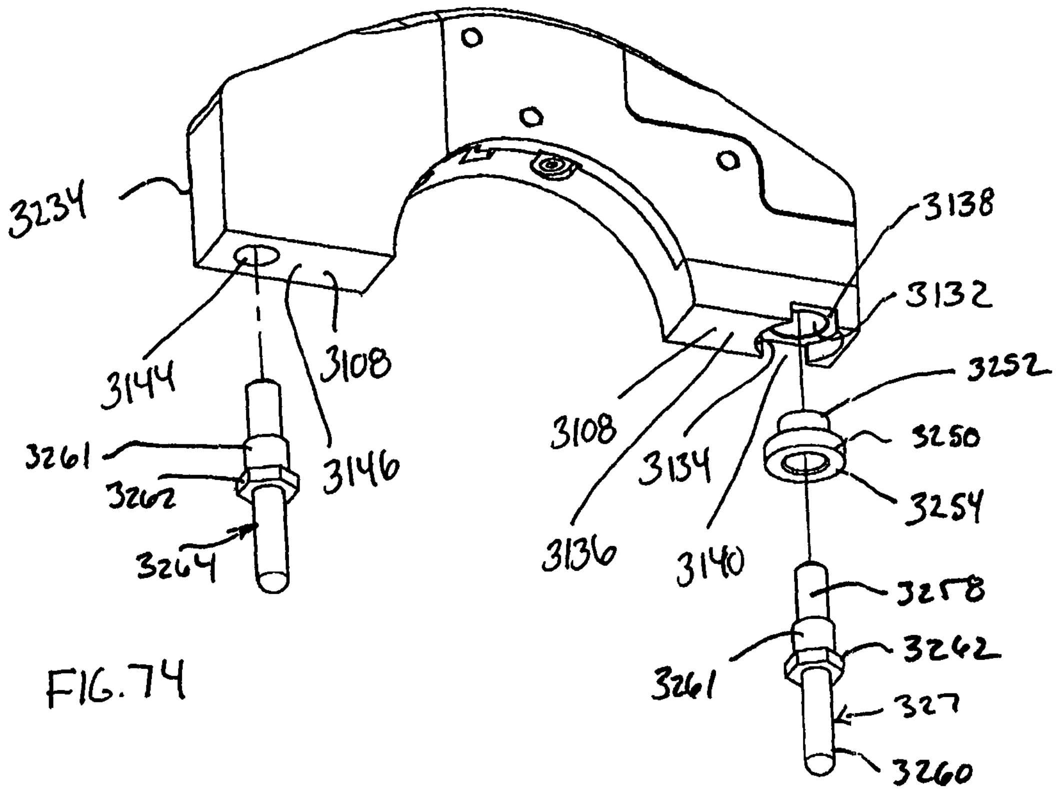
FIG. 74 shows a view of an assembled FIG. 73 with additional contact posts and contact insulator shown in an exploded view presentation.

FIGS. 69, 70 and 74 further illustrate insertion cavity 3144, also extending vertically, as in parallel fashion, with cavity 3132, and extending into thicker block section 3110 with an interior end encased within block section 3110 and an opposite end opening out at exposed surface 3146 (FIG. 74) of base extension 3108.

FIG. 71 shows an initial assembly stage starting with housing body 311 and some of the assembly components and prior to the providing of additional components to completely assemble the edge sealer 311 embodiment, with a preferred general sequence of assembly being described below. That is, as shown in FIGS. 69, 70 and 71, there is supplied positioner or position retention means 314 comprised of heating element contactor 315 and position fixing device 3148 with both shown ready for insertion into cavity 3126 (FIG. 71) and in a final position in FIG. 70. Contactor 315 is inserted into insertion cavity 3126 such that its interior end opens out into outlet recess 3128 immediately adjacent a side wall of second engagement block section 3122 as shown in FIGS. 69 and 70. Position fixing device 3148, which in a preferred embodiment is a screw fastener, provides position fixing means for the contactor 315 (e.g., an arrangement in which a desired compression level is achieved between an interior contact end 3150 of contactor 315 and a heating element section sandwiched between contactor 315 and block section 3122). In a preferred embodiment, contactor 315 is slideably received within cavity 3126, while position fixing device 3148 is an independent set screw that has a threaded exterior which threads into threading provided at the insertion end of cavity 3126 so as to achieve the above noted (e.g., horizontal) position retention means arrangement for positioner 314.

As shown in FIGS. 69 and 70, in a preferred embodiment, positioner 314 comprises a generally cylindrical rod or pin member for contactor 315, having a thicker region 3152 (e.g., an uninterrupted cylindrical section) with a diameter generally conforming to an intermediate step-in or lesser diameter section 3151 of cavity 3126 (positioned internally to the set screw reception threaded region receiving set screw 3148). Contactor 315 has an outer fastener abutment end for contact with the set screw 3148. Contactor 315 also preferably has stabilization configuration portion 3154 that extends across cavity 3142. Cavity 3142 also receives stabilizer 3155 which, in a preferred embodiment, is another fastener designated for threaded insertion into cavity 3142 as in the illustrated set screw 3154 (e.g., one that is preferably just the same in design as screw 3148).

Stabilizing configuration section 3154 is shown in a preferred embodiment as being an elongated notched section of the contractor rod 315 presenting a planar surface for contact with stabilizer 3155 as it is placed in its final position (e.g., threaded further into insertion cavity 3142 until contact is made between the upper end of set screw 3155 and the planar surface 3154 of the notched positioner pin 3150).

FIG. 71 further illustrates the providing of heating element insulator 320 into housing body 311 which, with the preferred use of a resistance wire as the heating element, comprises a cylindrical sleeve insulator designed for insertion into (e.g., a friction fit insertion or a threaded insertion or the like) block section 320. Other heating element insulating means as in a block that is threaded, adhered or otherwise fastened to housing body 311 or a molded or plastic insulator member such as one integrally formed in housing body 311 are also featured under the present invention.

Figure 81:
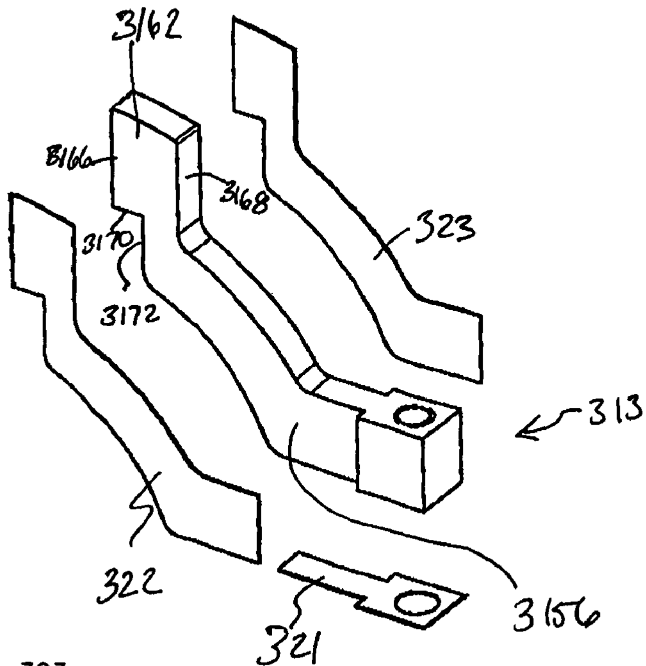
FIG. 81 shows an exploded view of the bridge contact assembly comprised of a bridged contact in contact with insulating cover sheets.
Figure 81A:
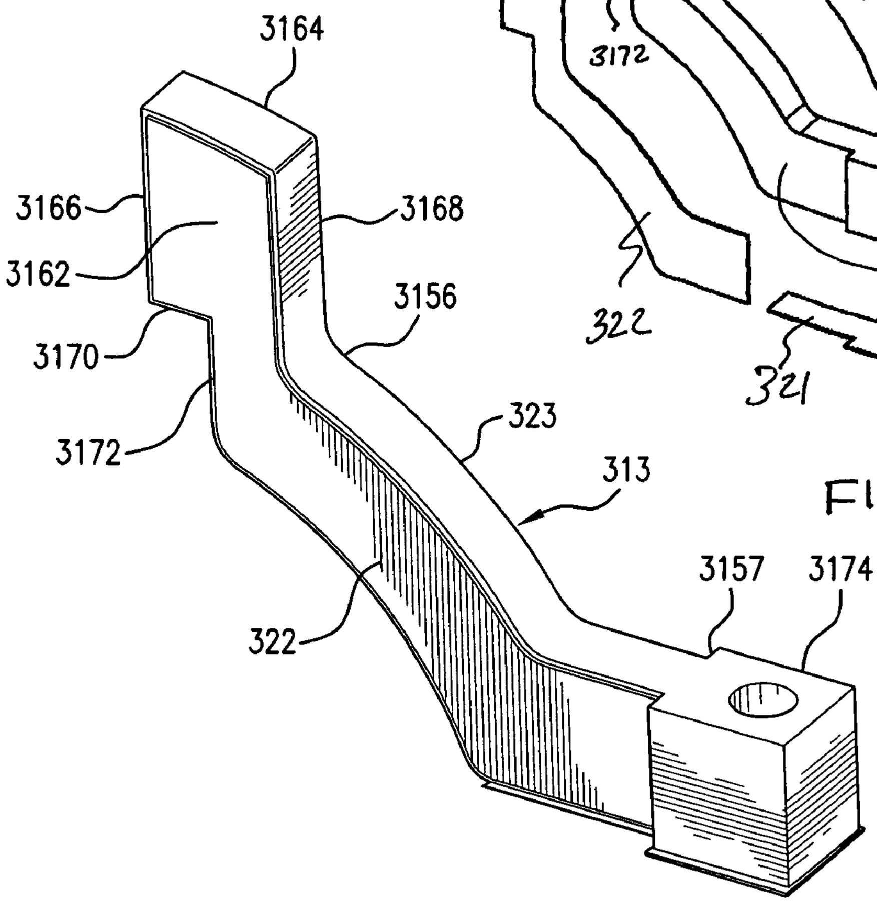
FIG. 81A shows the bridge contact in combination with the insulator sheets.
Figure 82:
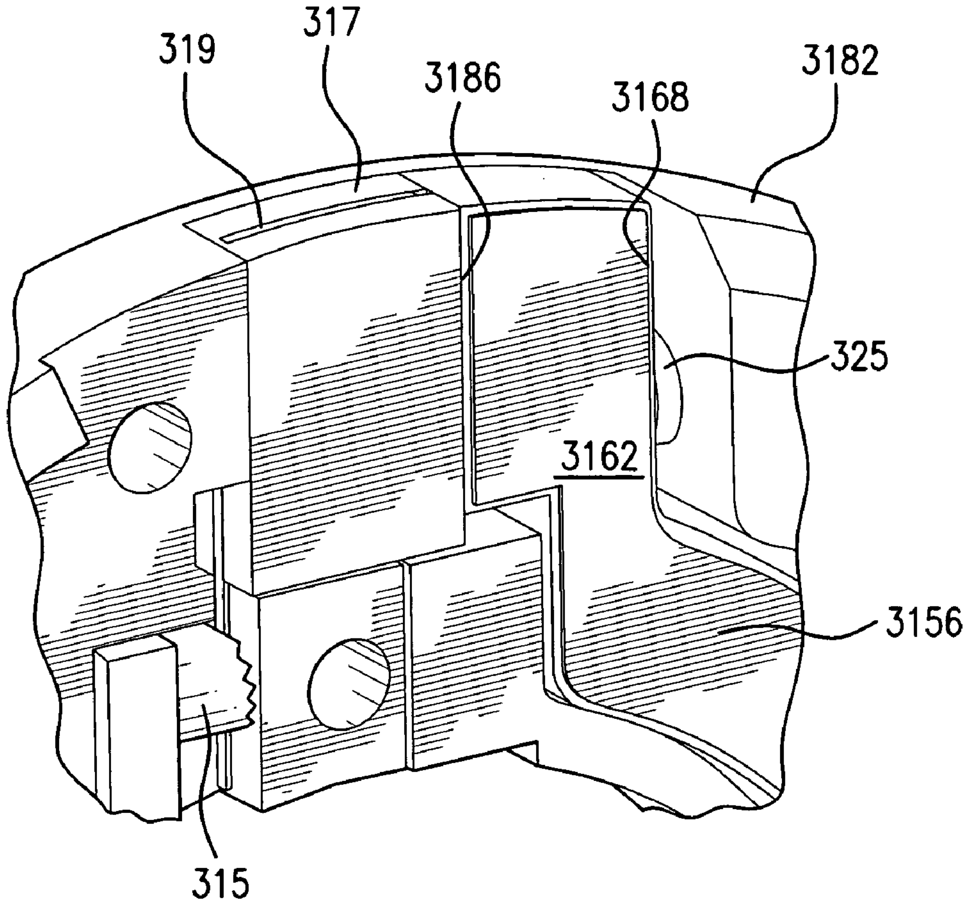
FIG. 82 shows a close up of the edge sealer with cover removed.
Figure 83:
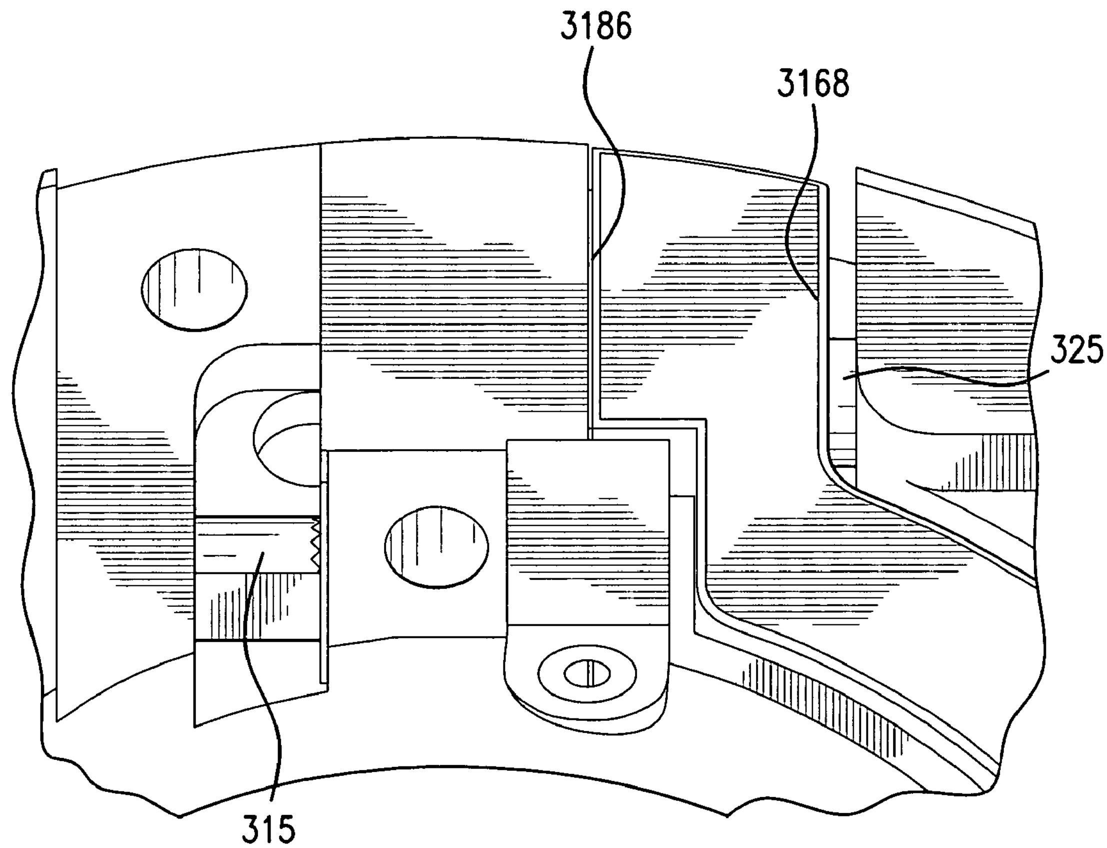
FIG. 83 shows a similar perspective view of that shown in FIG. 82 but with more of the under edge of the edge sealer shown.

FIG. 72 illustrates some additional assembly steps for which the step sub-sets illustrated and described in respective FIGS. 71, 72, 73 and 74 represent a preferred assembly sequence. However, a variety of sequence variations are possible both internally within a Figure sub-set in general and relative to the noted Figures, so long as a step does not preclude completion of the assembly process in general (e.g., the clamping down of positioner 314 into its final position before the heating element is placed for clamping in position is not a preferred sequence). FIGS. 72, 81 and 81A illustrate bridge contact assembly 313 prior to insertion into the corresponding configured bridge reception cavity 3116. With reference to FIGS. 72 and 81, there can be seen that bridge contact assembly 313 preferably includes an interior contact member 3156 and one or more exterior insulating members. In a preferred embodiment the insulating means includes the illustrated front and rear side surface insulator sheets 322 and 323 as well as initial feed-in end insulator sheet 321. The insulators are preferably sheets of insulting material (e.g., Teflon sheets) that share a common configuration with the contact portion of the internal conducting bridge body 3156, with bridge assembly 313 shown in exploded and assembled state in FIGS. 81 and 81A. The insulators are also preferably adhered or otherwise joined to the corresponding configured exposed sections of bridge contact 3156 so as to insulate the bridge assembly from the conductive housing body 311. A variety of other insulating means can also be utilized as in spray or molded on insulating layering or coating.

Insulators 321, 322 and 323 are preferably formed as to provide not only an insulating function but also a low friction surface to facilitate the sliding in place of bridge assembly 313 into its final resting state within housing body 311. This low friction easy slide sate is useful during a final positioner lock down stage wherein bridge assembly 313 is moved into a lock down state relative to the heating element described below. Die cut Teflon contact insulator sheeting is illustrative of a suitable insulting and low friction or easy slide into position material as it achieves good electrical insulation relative to the preferably conductive support body 311, while allowing the bridge assembly to easily slide within the support body in response to the final (or intermediate) clamping compression and fixation stage described below.

FIG. 72 illustrates position retentioner 3160 on the opposite side of body 311 which, in combination with positioner 314, provides clamping means for both retention of the heater element insertion head and the heater element 328 (FIG. 73). As shown in FIG. 72, position retentioner 3160 includes engagement head 3162 of bridge contact 3156. Engagement head 3162 is provided in one side of insert reception recess 3114 so as to have exposed surface 3164 adjacent thin wall section 3226 of housing body 311. As shown in FIGS. 81 and 81A head 3162 has interior contact wall 3166 and exterior contact wall 3168 together with a step-in wall 3170 and vertical wall section 3172 with the latter two walls conforming to a sidewall and top wall of first engagement block 3120. Intermediate body portion 3160 of bridge contact 3156 is shown as having a curvature that conforms to the curvature of concave underside 3102. As seen from FIG. 69, the configuration of bridge contact 3156 closely conforms with the configuration of bridge reception cavity 3116 with some positioner adjustment play allotted (e.g., slide forward during heater element positioner lock down) and those surfaces in sliding contact with the interior surface of housing body 311 as shown covered with insulation and thus not utilized for electrical transfer. In this way, the electrical transfer along bridge contact 3156 is limited to travel from the in-feed end 3157 and along the body of bridge contact 3156 until reaching engagement head 3162. The non-covered surfaces of bridge contact 3156 are shown spaced from the support body 311 by way of spacing gaps such as the underside gap 3180, the overside gap 3182 and the back end gap 184 shown in FIG. 69. The in-feed end 3157 has an enlarged thickness relative to the rest of bridge 3156 to accommodate contact receptor aperture 3174 which is a preferred embodiment is a threaded aperture extending vertically into the in-feed end 3157 so as to be axially in line with insertion cavity 3132.

FIG. 72 shows stack inserts 317, 318 and 319 which, in combination, provide insert head or heater element substrate 3176. The stack inserts are placed in contact in a stacked arrangement and inserted into the remaining portion of insert reception cavity 3114. A first side wall 3186 of the combination stack 3176 faces interior contact wall 3166 of engagement head 3162, while the opposite wall of combination stack 3176 faces the interior wall of third engagement block section 3124 of housing body 311 having more, or the same, or essentially the same depth thickness as the combination stack. FIG. 72 also shows position retentioner 3160 having contact positioner 325 positioned for insertion into insertion cavity 3130 and position fixer 3178, which is preferably a threaded fastener in the form of a set screw like the previous described set screws. Contact positioner 325 is preferably a non-conductive, insulating material member (e.g., a cylindrical plastic plug) that extends across overside gap 3182 (a portion of the nearly filled in reception cavity 3114) into contact with the exterior contact wall 3168 of engagement head 3162 and is fixed in position by set screw 3178 to lock in position leg 328C of heater element 328 as explained below.

FIG. 73 shows the further assembly of components in the assembly of edge sealer 311. In FIG. 73 there is shown heater element 328 positioned for insertion into supporting contact with the undersized (relative to the other stack inserts 317 and 319) intermediate stack insert 318. As seen from FIG. 69, heating element 328 is in the form of a U-shaped band of wire, preferably having a non-round cross-sectional configuration as in a polygonal cross-sectioned wire band (e.g., a ribbon wire having a rectangular or square cross-section). As shown in FIG. 69 the heater means or heater element 328 extends about three sides of the conformingly shaped peripheral surface of intermediate stack insert 318. Heater element 328 is also shown having side legs 328A and 328C with intermediate leg section 328B. Thus, upon set screw 3178 being threaded deeper into a threaded outer section of cavity 3130, there is provided fixation means or a fixation, sandwich arrangement comprising combination support stack 3176, leg 328C, and interior contact wall 3166 of engagement head 3162. Also, the lower region of that same leg 328C of heater element 328 extends through insulator 320 and preferably extends out and terminates in the opening out region 3186 of insulator reception cavity 3188 for receiving insulator 320 best shown in FIG. 69 and FIG. 74 (e.g., leg 328C extends out a sufficient extent to provide for gripper (e.g., pliers) engagement). In this way heater element can be tensioned to the desired state before being fixed in a desired operational state by locking down of positioner retentioner 3160.

The intermediate section 328B of the U-shaped heating element 328 extends across the top surface of intermediate stack insert 318 while the combination of stack inserts or head insertion 3176 is placed in a relationship of position retention with the adjacentmost (e.g., vertical) wall surface 3196 of engagement block section 3124 helping define reception recess 3114. The upper region of heater element leg 328A is also placed in a sandwich arrangement between wall 3196 of block 3124 and stack insert 318. As shown in FIG. 69, the lower portion 3198 of side heater element leg 328A extends within outlet recess 3128 wherein it is clamped against block section 3122 by way of compression contactor rod 315 of positioner 314. In a preferred embodiment rod 315 of positioner 314 has an enhanced retention surface as in a serrated face 3200 on its positioner contact surface. Thus, when the illustrated hex set screw 3148 is threaded deeper into insertion cavity 3126 and into final adjustment position relative to rod 315, the serrated end 3200 of rod 315 is placed into contact with section 3198 of leg 328A to lock the U-shaped sealing wire band in place. In this way, the sealing wire band 328 can be locked in place at one end region and pulled taught by pulling on the opposite end of wire band 328 extending within open-out region 3186 and through insulator sleeve 320. While either of the positioning components of the combination (e.g., left and right) clamping means can be placed in its fixing positions first, it is preferable that the positioner with rod 315 be first utilized then the next one. For example, sealing wire band 328 is pulled taught, and then it is locked into its final ready-for-use state upon being placed in its final compression state relative to the heater element leg 328C by set screw 3178 and plug 325. Thus, by having bridge contact 3156 fit loosely within reception recess 3116, the heater element or sealing wire band 328 in the illustrated embodiment can be inserted between the stacked insert combination 3176 and the respective juxtaposed wall 3196 of the housing body 311 and wall 3166 of the bridge conductor engagement head 3162 prior to clamping wire band 328 in place. The stacked inserts define a seal wire band reception groove and the ability to fix in position one end of the band 328 firmly while being able to pull the second band to its desired tension state prior to final lock down is helpful in that during the band wire 328 positioning process the band wire 328 is pulled to near its yield stress point but not beyond to allow it to fit tightly into groove 3202 (See FIGS. 76 and 77) formed by the size and configuration relationship between the stack inserts 317, 318 and 319. The usage of curved corners in the middle stack plate also helps in this regard as there is avoided a sharp edge extension into the wire during the tensioning of the heater wire. Also position fixer 3152 is used to prevent rod 315 of positioner 314 from rotating when position fixer or set screw 325 is tightened on the opposite side. This facilitates avoiding damage to the sealing band 328 which could occur if the serrated face 3200 of the preferably hardened tool steel positioner rod 315 were able to rotate against the seal band or alternate form of heater element. As seen, the planar notch surface 3154 is sufficiently long as to allow for the non-rotating slide adjustment, during the positioner lock down stage. The independent pin 315 and position fixer screw 3148 arrangement allows for the tightening down without having to have rod 315 rotate which is why, in a preferred embodiment, a unitary threaded screw that is sufficiently long to achieve the positioner lock down upon threading state represents an example of a less preferred embodiment. On the opposite side, a plastic positioner 325 is forced into position by way of a preferably steel set screw 3178 for firm threaded engagement with housing body 311 via threaded insertion cavity 3130. Contact positioner 325 is made of a non-conductive or insulating material to maintain electrical isolation between the housing body 311 and bridge contact 156. The clamping force provided by set screw 3178 against positioner 325 and thus also bridge conductor engagement head 3162 provides an advantageous high contact pressure relationship while rod 315 is maintained in stable position with the help of stabilizing screw 3155. This high clamp pressure contact relationship provided by the opposite side clamping means correlates into a strong and stable retention as well as a low resistance connection with the conductive heating element 328 and conductive housing body 311 on the one side of stacked insert combination 3176, and the heating element 328 and insulated bridge contact 3156 on the opposite side of stacked insert combination 3176. The ability under the clamping means of the present invention for clamping the pertinent portions of the heating element to its underlying support represents an advantageous feature of the present invention because in previous designs there was a deficiency in the ability to get sufficient force between the wire fixing components and/or maintain a low resistance connection.

Figure 75:
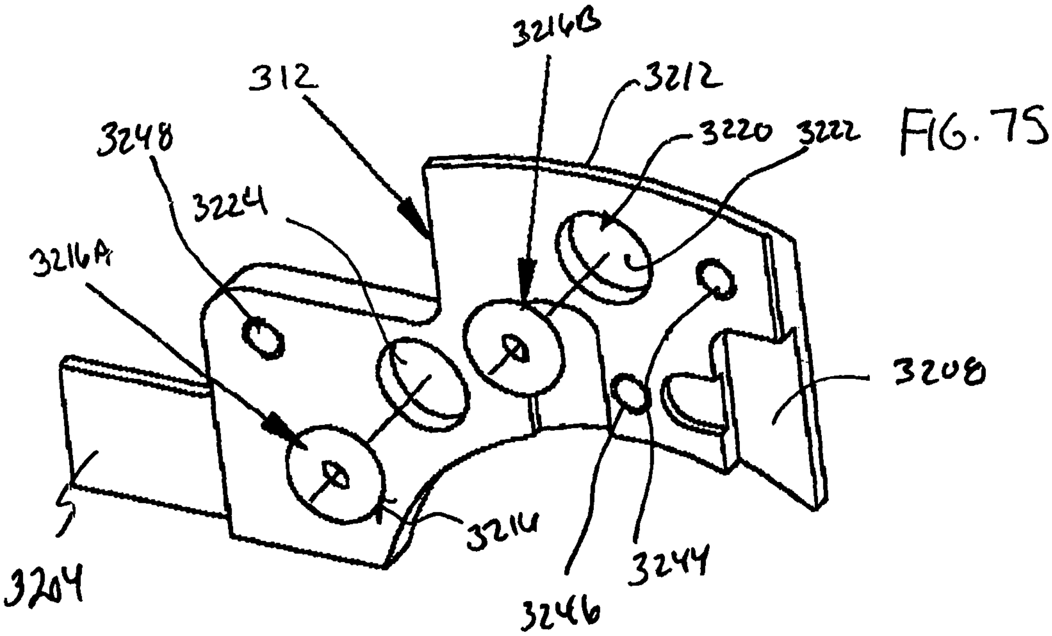
FIG. 75 shows the cover side plate for the arbor assembly.
Figure 84:
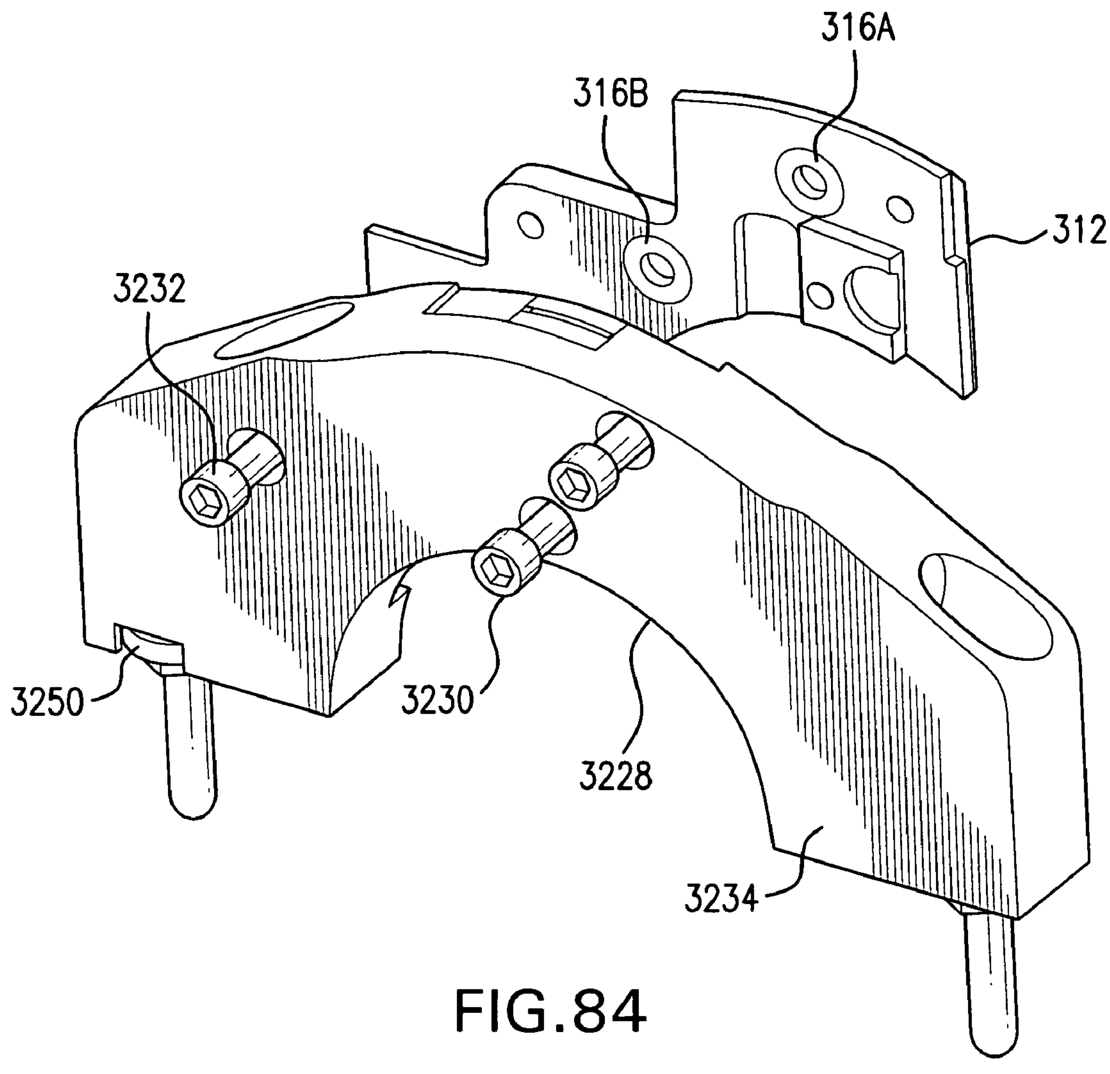
FIG. 84 shows an exploded view similar to FIG. 23 but from the opposite side such that the seal (o-rings shown) are visible.

FIGS. 73 and 75 illustrate cover plate 312 having projection portion 3204 designed for reception within a corresponding notched section that forms a portion of bridge reception recess 3116 and which also provides a reception area for in-feed end 3158 of bridge contact 3156. As seen from FIG. 75, there is further provided recessed section 3208 designed to conform to blocking 3210 positioned adjacent outlet recess 3128 and third engagement block 3124 as seen in FIGS. 72 and 75. Upper edge 3212 of the cover 312 is designed to conform with upper edge 3101 and a portion of thickened edge section 3111. Curved wall edge 3214 is designed for correspondence and finish contact with concave section 3104. In addition on the interior side of cover 312 there is further provided one or more compression members 3216 with a preferred embodiment including two individual compression seals 3126A, 3126B (e.g., o-rings) held in position by compression seal receiving means 3220 which in the illustrate embodiment comprises receiving recesses 3222 and 3224 that are of a depth and dimension to retain compression members 3126A and 3126B in position while still presenting a compressable portion outwardly away from the covers interior surface. The compression members 3126A, 3216B are positioned such that when cover 312 is in position relative to the conforming surfaces of housing body 311 the compressable compression member 3216B places the stacked insert combination 3176 into a compressive state relative to wall 3226 (FIG. 72) (defining the interior surface of reception recess 3114 and thin edge surface 3101) upon fasteners 3228, 3230, 3232 being utilized to secure cover 312 in place. A preferred embodiment uses screw fasteners designed to extend through fastener openings 3236, 3238, 3240 (shown in FIG. 73) formed in the smooth face side 3234 (FIG. 84) for threaded engagement with threaded apertures 3244, 3246, and 3248 formed in cover 312.

The other compression member 3216A of compression means 3216 is used to secure bridge contact 3156 in position within recesses 3116 relative to back interior wall 3249 (FIG. 72) (e.g., the insulated sheet on that side being placed in a compressive state with interior wall 3249), of course other fastening means and fastener arrangements (e.g., screws arranged in opposite direction), can be utilized to fasten cover 312 to housing body 311. The fastening means is preferably such that there is initial cover position retention ability under a slight compression state (e.g., not fully threaded in screws) during the stage of tensioning the one-end clamped wire by pulling it into its final rest position relative to the stacked insert combination and the final clamping position of engagement head 3162 to lock the sealing wire into final operational state. Once this is accomplished, a final cover closure fixation step is undertaken wherein compression members 3216A and 3216B are put into a final compression state. Alternatively the final compression sate of compression means 3126 can be imposed and then the final tensioning step carried out or after the final tensioning step and before the final fixation of the heater element 328. The low friction insulation film of bridge contact 156 provides for final adjustments while under, for example, an intermediate compression state (prior to full fastener attachment) and relative to the noted alternatives, provides for end head adjustment even under maximum compression state achieved with screws 3228, 3230 and 3232.

FIG. 74 illustrates additional assembly steps associated with edge sealer 311 including the insertion of the dual diameter contact post insulator 3250. Contact post insulator 3250 has smaller diameter section 3252 for inserting into the interior portion of housing body insertion cavity 3132 for a preferred friction retention state. An enlarged diameter portion 3254 is also provided and is received in the corresponding, notched expanded diameter section 3134. Electrically conductive contact means 327 includes (opposite ends of electrical path) first and second contacts 3256 and 3264, each preferably being in the form of a conductive plug as in the above described "Multilam plug". Plug 3256 is shown having threaded end section 3258, plug-in section 3260, intermediate section 3261, and threading facilitator 3262 (e.g.,a multi-sided integrated nut). With reference to FIGS. 69 and 70 there can be seen threaded end section 3258 threaded within threaded aperture 3174 in-feed end 3158 of bridge contact 3156. Contact post insulator 3250 (e.g., non-conductive plastic) has its smaller diameter section 3252 and enlarged diameter portion 3254 insulating the intermediate section 3261 from the conductive support body 311; and the enlarged diameter portion also provides for insulation of the flanged threading facilitator from contact with an underlying surface of support body 311. In this way post insulator 3250 provides electrical insulation between housing body 311 and multilam plug 3256 on one side of edge sealer 311. Plug 3256 is electrically connected to bridge contact 3156 while maintaining electric isolation from arbor or housing body 311 so that there can be supplied electric current to one side of the heating element such that current can flow across the exposed sealing surface of the sealing heating element and reach there without being short circuited.

Second conductive contact 3264 is preferably the same as conductive plug contact 3256. The conductive plug 3264 screws directly into the arbor body on the opposite side (relative to electric transfer) across heating element 328. As shown, conductive contact 3264 is fastened directly into base extension 3108 of arbor body 311 providing an electrical connection to the opposite side of wire band 328 through the support body itself (e.g., metallic thicker wall section 3110). FIG. 70 provides a good view of the direct conductive attachment of plug 3264 while its opposite side conductive plug 3256 is in electrical contact with bridge contact 3156 only. The electric current path through the housing body 311 is illustrated in FIG. 70 showing edge sealer 311 with the side cover 312 removed. In FIG. 70, the lettered arrows "A to G elucidate the path of electrical current through edge sealer 311." Arrow "A" represents the location where an electrical current enters the support body 311 through electrically conductive contact 3256 which is preferably a 2.8 mm Multilam Plug. This plug fits into a mating socket on a support base assembly which supports edge sealer 311 to form edge sealer assembly 91". As shown in FIG. 69, the multilam plug 3256 passes through post insulator 3250 shown as a plastic bushing that electrically isolates the plug from housing body. The electrical flow past non-conductive insulator 3250 is labeled at point "B" in the above electrical diagram. Plug 3256 has threaded end 3158 that attaches into the base of the preferably steel bridge contact block 3156 which electrical exchange point is labeled as "C".

The bridge contact block 3156 is preferably is made of solid steel and conducts electrical current very efficiently to its engagement head 3162 end of the contact bridge block. At point "D" the contact block makes electrical contact with heating element seal band leg 328C as the band 328 is folded or positioned on the upper edge of the three piece ceramic insert combination 3176 or some other alternate support means. Seal band 328 conducts current along its length, starting at the aforementioned bridge contact block contact location (point D) and then conveys electrical current passing through heater element 328 to the "support body" portion directly at the opposite side of the ceramic insert or heater element support 3176 as represented by point "E". Electrical contact is made along the leg 328A of the band passing along the grooved ceramic insert on the "E" side as well as where the seal band 328 is clamped by the serrated face 3200 of the preferably steel rod 315 as represented by point "F". From there the electrical current passes in support body 311 itself which body is shown as the largest component of the edge sealer 311 in a preferred embodiment. Current flows from the seal band 328 through the support body as represented by "F" and finally to the second conductive plug, which is represented by point "G". The second contact plug 3264 on the edge sealer is preferably identical to the other plug and can connect to a preferably identical mating socket of, for example, an arbor base body such as arbor base body 1106 described above. In this way the electrical feed circuit is complete and can be controlled by a controller or the like to set the sealing temperature at the desired level. Also, the exposed region of heater element 328 represented by intermediate band section 328B can be seen as being positioned between contact points D and E within a grooved upper exposed surface of insert head 3176. A separate conductive element can be utilized to provide an electric current path from steel rod 315 to second conductive plug including a symmetrical dual bridge arrangement. However, the illustrated embodiment provides a less complex/less components system which is preferred.

Figure 76:
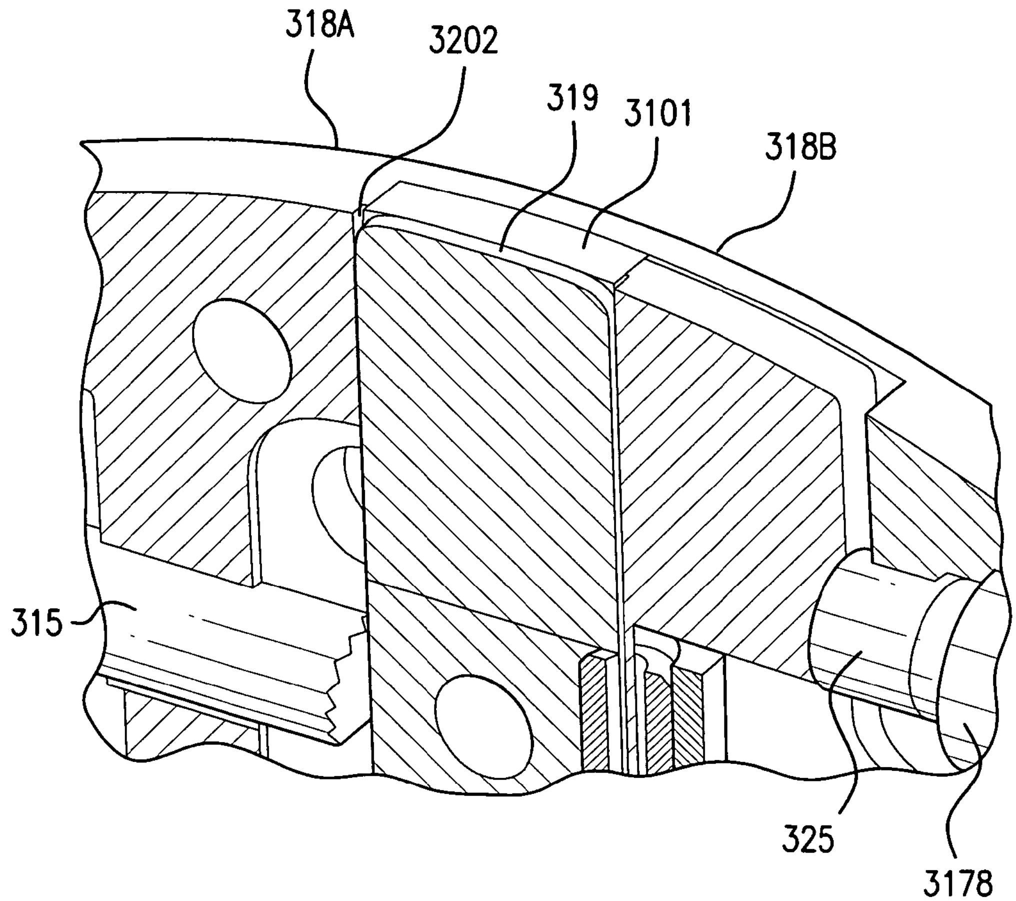
FIG. 76 shows an enlarged view of the upper central region of that which is shown in FIG. 69.
Figure 77:
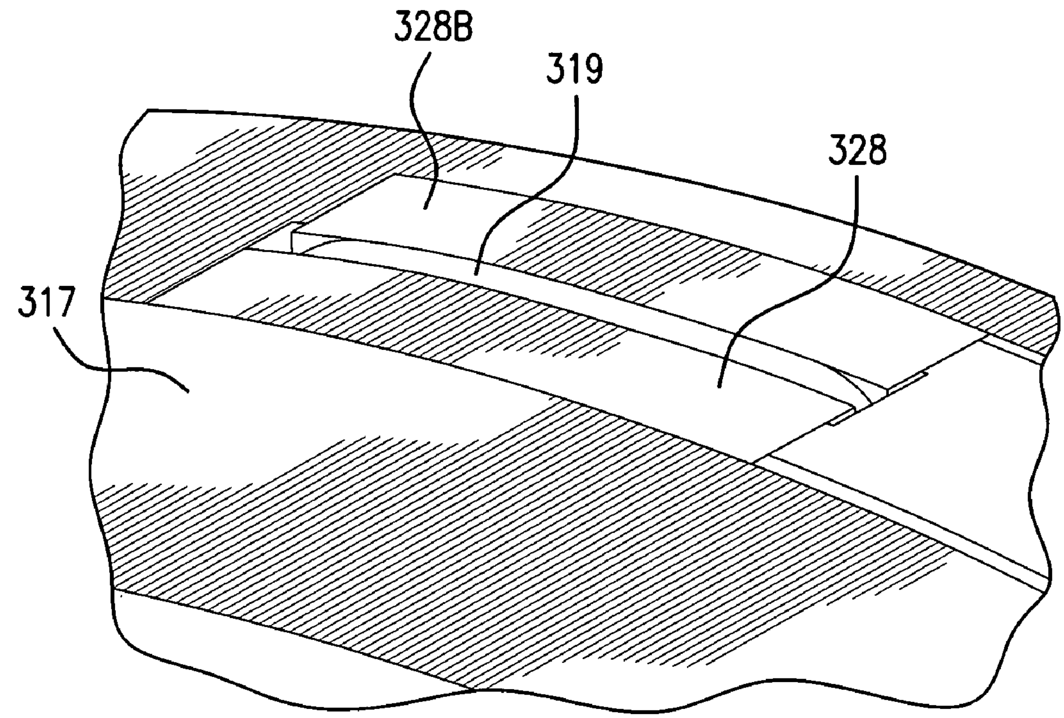
FIG. 77 shows an enlarged view of the central upper region of that which is shown in FIG. 68.
Figure 78:
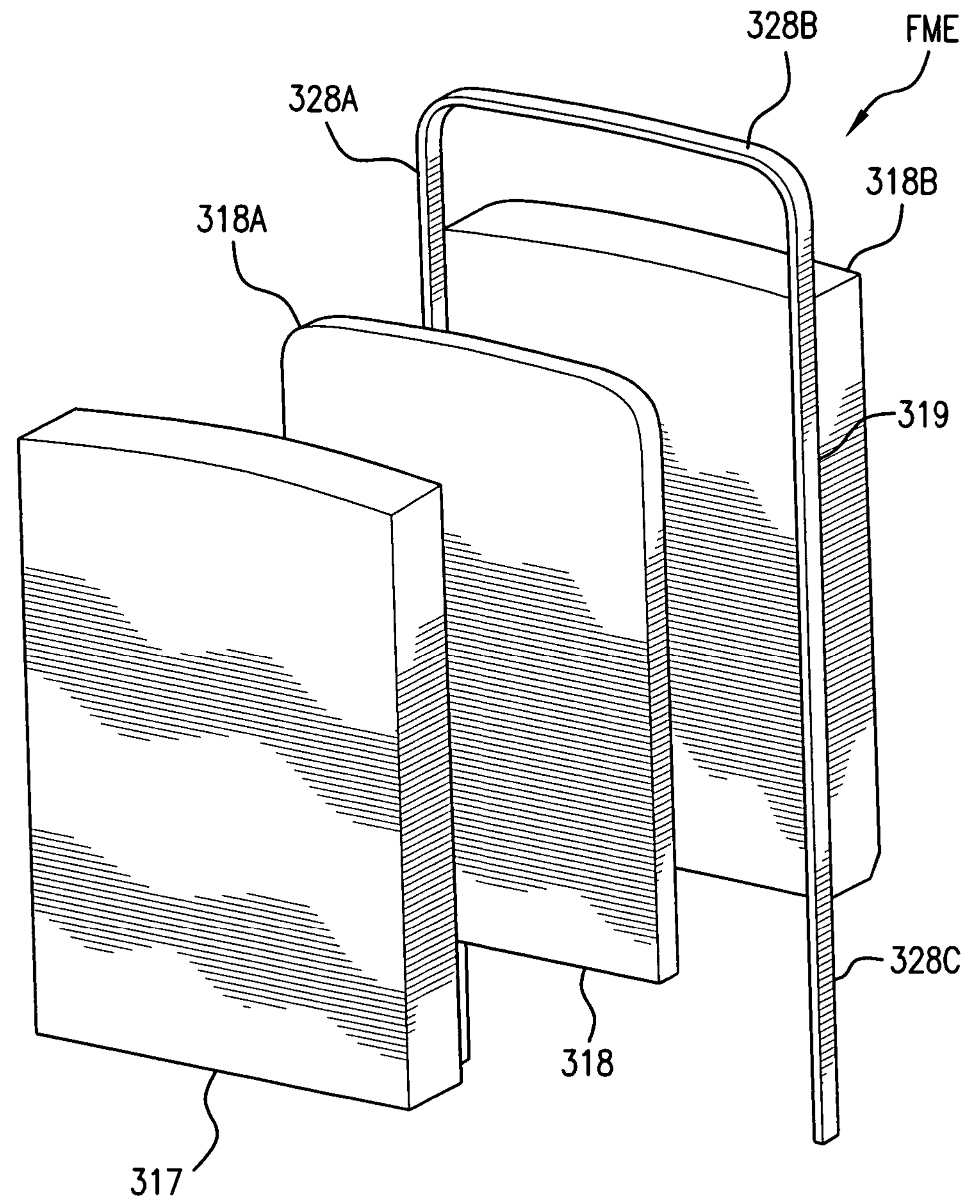
FIG. 78 shows an exploded view of the stack inserts with seal band heater element.
Figure 79:
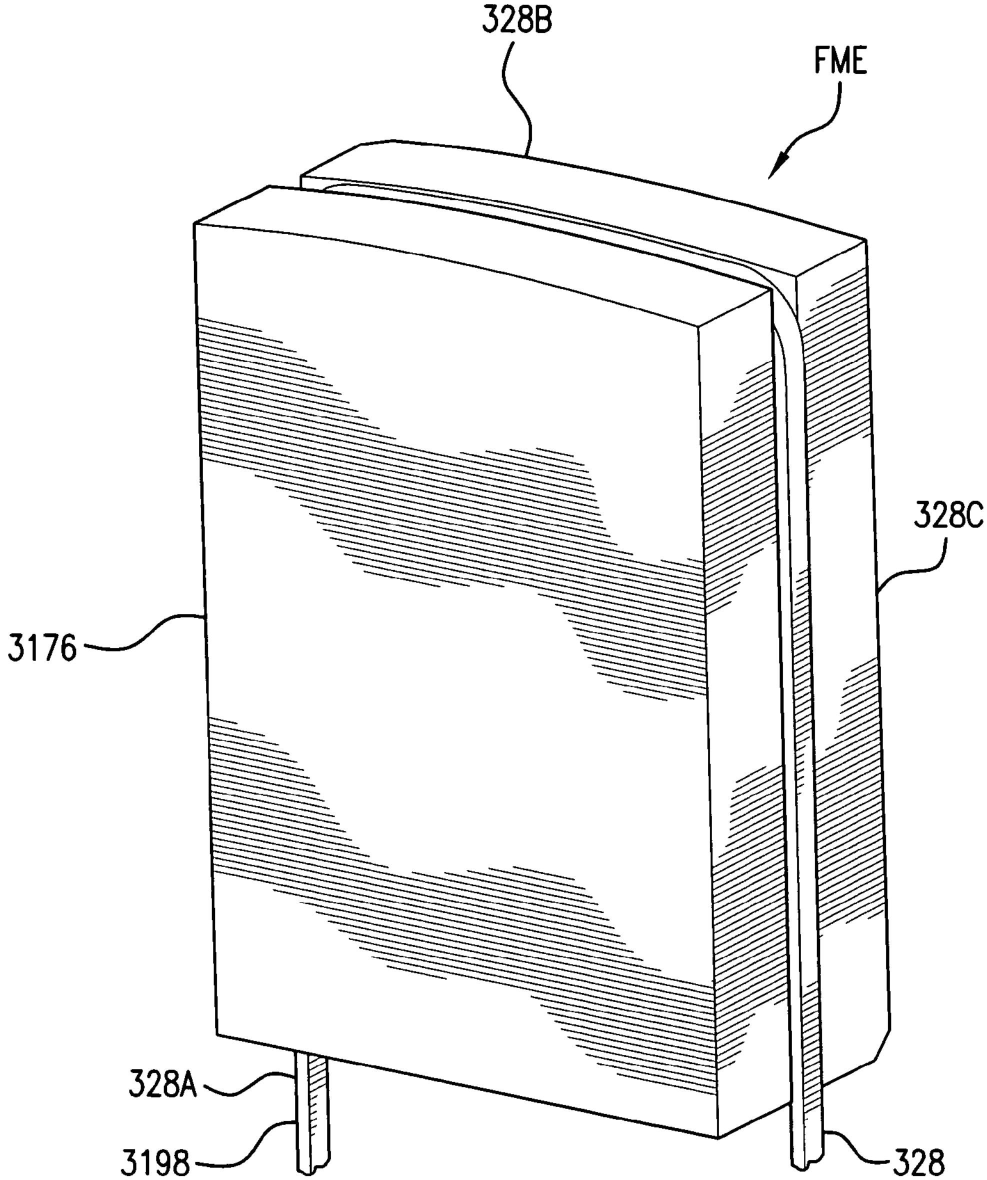
FIG. 79 shows the stack inserts and seal band in an assembled state.
Figure 80:
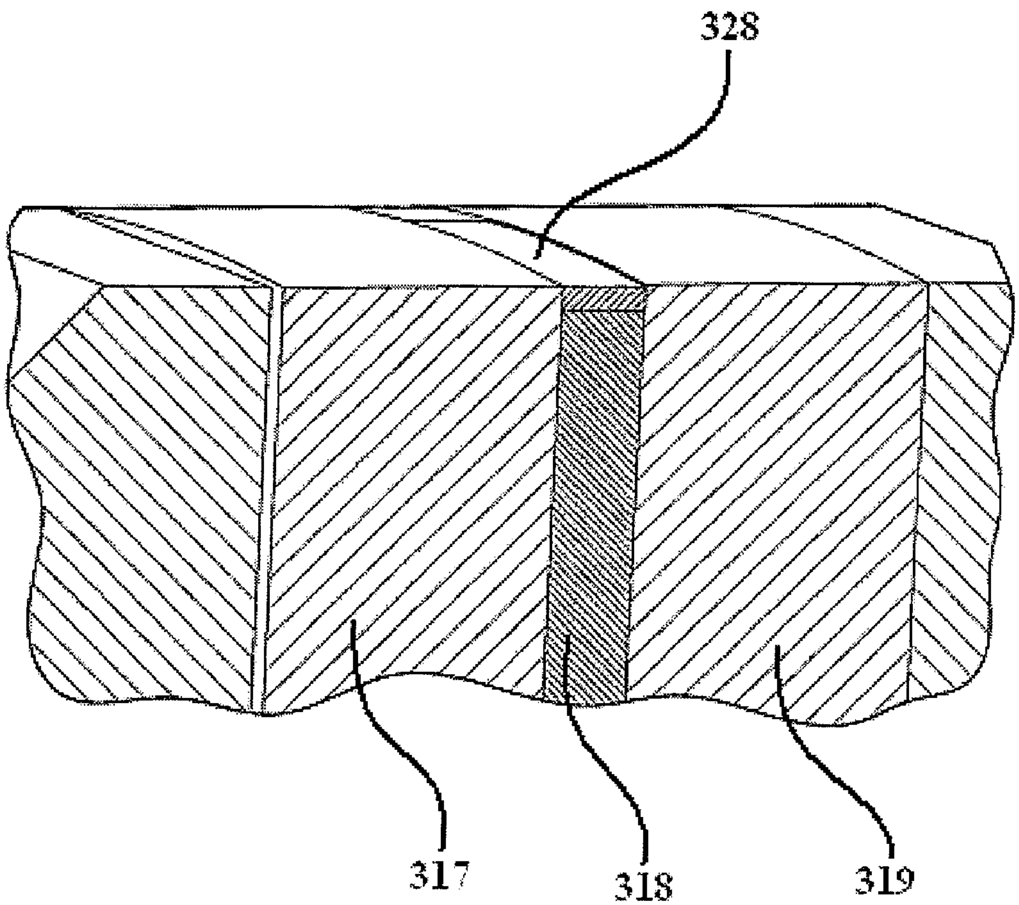
FIG. 80 shows a cross-sectional view of the arbor seal face.

In addition, the cross-sectional illustration in FIG. 76 shows contact positioner 325, that is preferably made of PEEK (polyetheretherketone engineered thermoplastic (e.g., Victrex® PEEK plastic)), which is an easily machinable, robust engineering plastic that can withstand high compression loads generated by set screw 3178. In FIG. 76 there is also illustrated the radius or rounded opposite top corners 318A, 318B in middle (ceramic) state insert 318. The radiused (e.g., non-sharp edged) corners are preferably provided by way of a rounded (e.g., a continuous curve) corner arrangement for what would otherwise be the top, left end right corners of stack insert 318. The outer sandwiching inserts 317 and 319 preferably have full corners which helps in position maintenance across the thickness of the stacked insert combination 3176. The radiused corners 318A, 318B for middle insert 318 helps heater element band 328 sit flat within reception groove 3202 that is preferably provided by having middle insert 318 of a lesser height reach than at least one and preferably both of exterior stack inserts 317 and 319. The ability to have seal band 328 sit flat and flush (common plane) provides for improved seal formation. Also, since insert recess 3114, which receives insert head 3176, opens out to the environment, there is preferably provided cover supported compression means as in compression members 3216A and 3126B which are preferably formed of an elastomeric, high friction material as in a rubber o-ring to provide a compression function relative to the thickness of housing body 311 to preclude slippage via elastomeric compression, for example, relative to individual stack inserts and also relative to the combination of inserts (head insert 3176) for situations where edge sealer 311 might be oriented in a fashion where gravity could otherwise cause a fall out of the combination insertion stack 3176. Further, the opposite side plates and recessed groove forming intermediate stack plate arrangement is preferred as this arrangement avoids heat degradation to exterior components, and provides good positioning retention to the heater element received between the outer preferably side abutting plates. Alternate arrangements are also featured under the present invention as in a solid monolithic insert head such as those described for the earlier embodiment (preferably inclusive of the rounded corner and flush band presentment of the heater element such as via a groove) with reliance on the substrate as in reliance on a stacked insert head with adjacent housing walls, which help in side retention or a dual or triple stack arrangement. As an example, a wall of the housing main body is positioned to one side with or without an insulator, or a yoke type arrangement with the housing formed of a first material, a grooved yoke body of a second material and the underlying heater element support of a third material with the first, second and third materials having lower intermediate and higher high relative temperature resistance values as in the third material being a ceramic and the yoke being a high temperature resistant plastic such as that described above.

The embodiment represented by the arrangement shown as edge sealer 311 is preferred, however, since it can consistently produce seals that are stronger, require virtually no maintenance, perhaps for the entire life of an average product-in-bag system in the field, and can do its job is a fraction of the space required for similar sealing methods, minimizing mechanism size, weight, and the linear sealing distance required to make an edge seal. In addition, edge sealer 311 is easy to assemble and inexpensive with no moving parts. Once assembled an edge sealer such as 311 is considered generally impervious to the heat generated by its sealing band, which was the driving factor in limiting the life of older designs. The edge sealer 311 is also considered generally impervious to the wearing effects of, for example, high density polyethylene HDPE film that may drag over it in some embodiments. Also, edge sealer 311 is fully functional in many environments without having to use tape (e.g., Kapton tape) over the seal band, which was a maintenance headache with the older designs as it would wear out quickly. In a preferred embodiment, the intermediate insert 318 of the combination stack 3176 (and preferably also each of inserts 317, 318 and 319) is formed as a ceramic material that provides constant position support underneath the sealing band, avoids creep, and provides an extremely long life. Also, the ceramic insert used in preferred embodiments of the invention is generally unaffected by the heat of the wire, and is of a type that avoids any wear upon contact with the moving web of bag film. For example, in many film applications there is used a small amount of aluminum oxide (a.k.a. Alumina) which gives the film a "silver" color. However, aluminum oxide is a very hard material, so it will eventually grind down anything that is not of sufficient hardness it rubs against. Aluminum Oxide is so hard that it is typically used to make grinding wheels for industrial applications. Zirconia modified with Yttrium Oxide is an example of a suitable ceramic material for heater insert 3176 (e.g., a monolithic component for edge sealer assembly embodiments 91 and 91' or a stack arrangement of common material stack inserts such as used in edge sealer assembly 91" and which is well suited for use with aluminum oxide containing film material. Alternate embodiments include the use of different material for individual stack inserts such as certain plastics for some or all of the stack inserts or different ceramic type material for the stack inserts (e.g., a ceramic stack insert with a higher heat resistance level for the intermediate stack piece, and exterior stack inserts with a higher abrasion level but lower heat resistance or a hybrid ceramic/plastic arrangement). For reasons described herein an all ceramic head insert stack 3176 is preferred. (In lab testing utilizing an edge sealer like 311 the ceramic inserts of Zirconia based ceramic were able to survive intact even after 100,00 bags' film were dragged past the insert). Ceramic inserts of this type like the noted Zirconia based ceramic can also withstand temperatures in excess of 4000° F. which is considered by the inventors far higher than anything that the seal band can generate in preferred usages. For example, in a preferred embodiment, the seal band 328 is made of a nickel chrome alloy which will melt at about 2500° F. Therefore, the preferred seal band material operating at with the above noted parameters is considered not to be able to generate temperatures that could damage the Zirconia based ceramic inserts (e.g., a higher melt temperature of 1.3/1 or above and more preferably about 1.6/1).

An additional feature of a preferred embodiment of the invention is that the heating element or sealing wire 328 is a flat band or ribbon of wire (e.g. a polygonal cross-sectioned resistance heating element) It has been determined by the inventors that for intended sealing, round wires generally do not work that well, unless they are covered with tape to help dissipate the heat generated and avoid ribbon cutting. That is, in order to make an arbor seal work well with a round wire, it is helpful to cover the wire with tape, to "soften" the cutting edge effect that the wire naturally provides. Kapton tape is considered one of the better tape materials for this purpose and it provides a life of, for example, about 800 bags on average. Teflon tapes work well also, and will in fact provide a better seal than Kapton tape while it lasts; but Teflon wears out in less than, for example, 100 bags, which is too short a life for many preferred applications. Once the tape covering wears out, the seal will tend to ribbon cut the film, and seal quality will normally deteriorate to an unacceptable level. This means that the machine operator must replace the tape to restore seal quality. Although, the tape replacement operation is relatively simple for the earlier inventive edge seal embodiments and inexpensive, history has shown that many operators will not carry out a maintenance step such as tape replacement. That is, the inventors have developed a belief that wires with a circular cross-section are very good for cutting, but not for sealing. Flat bands are preferred for sealing applications, although conceivably under the right environment a band wire could be used for cutting. One reason for the preference for round wires when cutting and band wires for sealing is that round wires have a relatively sharp edge in contact with the film; in comparison with, the truly flat profile presented by a flat band (a flat band under the present invention preferably is a single plane configuration but other embodiment include, for example, multi-plane profiles as in central flat and downwardly sloped ends as well as nearly or essentially flat with some roundness but of a very large radius to avoid the ribbon generated problem described above and with the bottom shape being even more variable). Efforts have been made by the inventors to incorporate a flat band into earlier edge seals designs, but has not met with the desired level of success until the advent of the preferred edge sealer 311 which has a preferred orientation with the band being flush with the adjacent surfaces of the insert(s).

Figure 85:
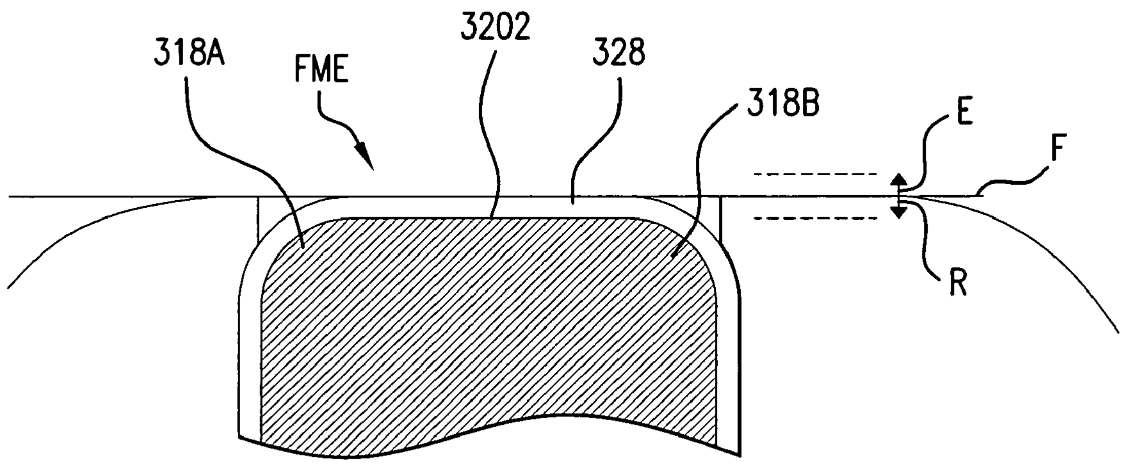
FIG. 85 shows a schematic presentation of a heater element (along its length) and insert captive recess flush level relationship.
Figure 85A:
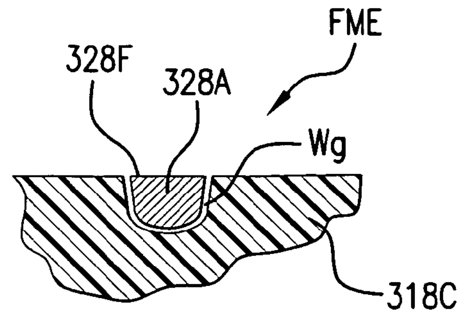
FIG. 85A shows an alternate embodiment of a heater element and substrate combination or fusion means featuring a plastic material substrate (solid, non-stack substrate) and a curved bottom heater element (shown in cross-section).

As represented schematically in FIG. 85, it has been found by the inventors that when the flat seal band is made to be truly flush or essentially flush (see examples below with essentially flush including truly flush and the additional ranges described below) relative to the adjacent surfaces of the ceramic insert(s) or adjacent supporting body portion(s) for the heater element, there is obtained good seals. Thus, the exposed surface of the seal band section 328B in a preferred design should not be proud of the plane represented by the exposed surfaces of the adjacent supporting body portion for the heater element as in not proud or outward beyond 0.0005 of an inch and more preferably not proud by more than 0.0002". If the band sticks up farther than this it can more readily ribbon cut the film. Also, as illustrated schematically in FIG. 85, the seal band's exposed surface should not be recessed more than 0.001" and a recess limit of about 0.0005" below the surface of the adjacent supporting body (e.g., adjacent ceramic insert stack) is the preferred limit. If it is recessed more than this, the sealer can have difficulty making a good seal. In this regard reference is made to FIG. 85 showing recess 3202 provided by insert stack 318 and the exposed faces of adjacent insert stack members 317 and 319. The depth of groove 3202 (formed by making middle insert to a specific dimension relative to the inserts 317 and 319 which are also made to desired specific dimension) is designed to match the thickness of the sealing band 328. While a grooved unitary insert body (e.g., a single ceramic body) may be utilized, to form head insert 3176, the preferred ceramic material for forming heater element support 3176 is extremely difficult to machine absent the use of expensive equipment and precise tolerance is difficult to achieve in such a setting. The stacked arrangement provides for rapid and less expensive achievement of the desired seal band positioning and support means of the present invention. The above "recessed" and "proud" dimensions, measured in tenths of thousandths of an inch are indeed small, but should be taken into consideration in the context that in many sealing applications an effort is being made to seal two layers of film together, each layer being approximately 0.0009" thick. In a preferred embodiment, the maximum recess dimension below the ceramic exposed surface plane is, for example, 30% to 100% of a film layer thickness with the preferred 0.0005" being 56% of the film thickness, and the maximum proud dimension is, for example, 10 to 60% of a film layer being bonded thickness with the preferred of 0.0002" being 22% of the film thickness. A flush or 0% arrangement is preferable.

Changes to the design will affect these numbers significantly. For example, if you make the seal band narrower than the 0.0156" used in a preferred embodiment of the present application, you would have to keep it closer to the surface than the 0.0005" off flush dimensions specified in the above description. In addition to making the seal band essentially flush with the surface of the ceramic inserts there should be no gap between the edge of the seal band and the side wall(s) defining the groove in the ceramic insert head. An actual contact on each side is preferred and can be achieved under the tensioning means arrangement described above where one end of the wire is fixed while the other one drawn by pulling around rounded corners being preferred to avoid cracking and/or a break in the (wire while avoiding any side bulging due to compression by the sides). Gaps between the seal band and the ceramic provide a place for the molten plastic to escape away from the seal area of the film. This migration of the molten plastic into this gap can weaken the seal, because there is less plastic in the seal zone to make it thick and robust. For this reason, a contact of the side of band to stack insert adjacent wall is desirable or a gap of less than 0.0005". The seal band used in the current design is preferably under 0.02" wide and under 0.006" thick, with 0.0156" wide by 0.0048" thick being preferred. Various other seal band configurations and dimension are also featured under the present invention, with the above representing one of the preferred embodiments for the seal band. The above width upper end value is considered to be based to some extent on suitable power source usage as a wider band (e.g., twice the preferred value) may not work with some systems as the drive circuit is not able to push enough power into the band to make a seal (e.g., a band width of 2× the above noted preferred width can lead to drive circuit inability in some foam-in-bag systems). However, if a wider seal band is desired than it can be utilized bearing in mind the potential need for an increase in the drive circuit power. The trade off and benefits with a wider band width include the notion that a wider seal band requires more electrical power to make a seal, because it has to melt more plastic than a narrower band. Sealers that use wider bands are, however, less sensitive to the band being recessed in from the surface of the ceramic insert, because the film will be easier to push into a wider groove than into a narrow groove.

A three-piece plate or insert stack design for the ceramic insert is very helpful in achieving a groove width of tight tolerance as, without a three piece insert arrangement, it is more problematic to fabricate a ceramic based insert to the precision required to make the seal band work to provide good seal quality. As noted, because of the nature of the ceramic materials desired for use or alternate high heat resistant substrate material or materials (e.g., composites) it is not generally practical to cut a groove with sharp inside corners into a solid body of ceramic material of this hardness. It is believed that diamond grinding wheels are needed to cut Zirconia, but even they wear out very quickly. For example, a circular grinding wheel of diamonds with square corners between the peripheral grinding face and the two parallel side faces will wear such that the sharp, square corners become quickly rounded. Thus such a grinding wheel cuts a round bottom groove instead of a flat bottom groove with sharp corners between the base of the groove and its side walls, which can lead to difficulties in achieving the desired flushness levels in a preferred embodiment of the invention. By contrast it is relatively easy to grind or form ceramics such as Zirconia into flat plates with tight tolerance on heightened thickness, using for instance, surface grinding equipment that is very similar to machines used to grind metal plates or initial manufacture techniques (as in crystal growth, extension, pressing or casting), although a final grinding or processing step after formation is typically required to achieve the tolerance levels desired. The three plate design of a preferred embodiment of the present invention takes advantage, among other things, of this exterior or exposed surface grinding advantage, and avoids the problem of cutting a groove with sharp corners entirely. By doing the things described above in relation to the seal band and the insert underneath it, there is no longer a need for tape over the seal band on the preferred embodiment represented by edge sealer 311. A long, maintenance free life without taping or cleaning can thus be obtained under the preferred edge sealer assembly 91" of the present invention.

Also, the housing body 311 of the preferred embodiment of the present invention, is much more rigid than, for example, the Acetal plastic bodies used previously. For example, housing body 311 can be made out of hardened tool steel so it flexes and bends much less than the earlier relied upon Acetal based bodies. A lack of rigidity in earlier support body design's was a significant problem for previous sealer designs (e.g., the noted tool steel is 100 times less flexible than Acetal plastic). A benefit of a more rigid body like that used in sealer 311 is that electrical connections to the seal band are solid and much more consistent over time and are not subject to subtle variations in assembly technique. This rigidity level of design makes it easy to maintain tight dimensional clearances and tolerances even with the stresses produced by the various clamping screws or fasteners.

In addition, electrical connections to the seal band are made with a much stronger clamping method under sealer 91". This insures that the wire will make good electrical connections at each end to minimize the problems of lost or intermediate connections experienced in earlier seal designs. One factor in the edge sealer's improved clamping function lies in the use of a single set screw that drives the engagement head of the bridge contact block 3156 with essentially pure orthogonal force, into the sides of the stacked ceramic inserts combination 3176 (the spacing between it and the housing body 311 and Teflon slide surfaces facilitating this clamping movement). This put a maximum load onto the ends of the seal band that are trapped in that area without any unwanted, off orthogonal side loads that could tend to make the sealer body 311 bend and possibly cause intermittent electrical contact. In comparison, the earlier inventive sealer design such as sealer 91' relies on two socket head cap screws installed at 45 degrees to the centerline of the housing body, which, while suitable for many uses, can lead to the noted electrical connection problems. It is believed by the inventors that these off orthogonal screws delivered as much side load and compressive load which caused the noted connection problems and a connection of this type was not able to provide as much direct force to the ends of the wire as the new, single set screw design can. An additional feature of sealer 91" is that the sealing band can make electrical contact with the bridge contact 3156 as close to the sealing surface of the ceramic insert as possible. This arrangement minimizes the size of the hot-spot that may occur in parts of the sealing band that do not contact the film. Sealer 91" is a design well suited for such minimization, because of the superior clamping methods described previously. An additional advantage of the preferred sealer 91" embodiment is that all of the sealer parts will be reusable since they are not of the type that will wear out in contact with the moving web of film and are generally unaffected by the heat of the sealing band. The only exception to this may be the seal band itself, but the preferred sealing band material has a long life and can outlast many systems as well. For example, the inserts have run the above-described seal band in edge sealer 91" for 140,000 test bag cycles with no significant wear. Another preferred feature in sealer 91" is the above-described use of side cover compression means such as the noted o-rings mounted into the side plate cover to press parts together for tight fit and tight control of groove width in the insert stack as there is avoided relative plate sliding (although each stack insert is preferably designed to have a matching configuration (common bottoms and width), but for the lower height in the middle stack insert 318). The ability to maintain the correct groove width in the insert stack assembly is beneficial in maintaining good seal quality. Another preferred feature of sealer 91" is insulating bridge contact 3156 with insulation means as in the described die-cut Teflon tape sheets secured to bridge contact 3156. The insulator sheets, are provided for electrical isolation between the "housing body", and the contact block 3156. If the housing body and the contact block come into electrical contact they can short circuit the seal band and the sealer will completely lose its sealing ability. Sealer 91" also preferably features a wire positioner with serrated teeth to grip the wire on the side opposite an adjacent contact block of housing body 311. The wire positioner which is forced into one end of the seal band with, for example, a set screw, utilizes its serrated contact surface to secure one end of the seal band to a specific location on the housing body. By securing the seal band in this manner, the assembler of the sealer can pull hard on the opposite end of the seal band which extends through the hole through the center of the wire insulator. This tension on the seal band is beneficial in getting the heating element to sit flat and square into the groove in the ceramic insert stack 3176. As has been previously discussed the position of the seal band with respect to the ceramic insert is highly influential on sealing performance. A metal, pour mold arrangement, wherein the seal band is poured in while in a fluid state and thus solidifies (e.g., relative to a fixed in place three piece laminate stack assembly) is an alternate embodiment, but the removable seal band with the pull tensioning ability is preferred as for example, easier control over the flushness quality.

Another beneficial feature of the preferred sealer 311 design is the radius on the upper corners 318A, 318B of the middle insert 318 of the stacked insert assembly 3176. This radius helps to lay the seal band down flush with the ceramic surface when the assembler pulls on the loose end or ends. Without this radius the seal band can bunch up as it tries to make the sharp bend around these corners. When the seal band bunches up or kinks in any way, it can protrude above the surface of the adjacent ceramic inserts by, for example, more than a preferred 0.0002" maximum allowance and increase the chance of the ribbon cutting phenomenon. The corners can also induce cracking in the heater element.

The new sealing techniques associated with sealer 311 and its sub-components and associate methods disclosed above can also be used in many other types of machinery besides the illustrated foam-in-bag system. As just a few examples, edge sealer 311 (and the earlier inventive sealer embodiments as well) are suited for us in inflatable air bag systems—in common use today in void fill packaging applications. Prior art inflatable air bag machines generally utilize some sort of edge sealing technology to make their air-filled bags. The sealer technology describe herein is useful in these machines by, for example, providing a high quality sealer that is efficient in design to provide reliable sealing device in a very small package.

There is another class of air-inflatable packaging materials that are based on layers of plastic film that are sealed in such a way as to create an interconnected labyrinth of air-filled chambers between two sheets of plastic film. When inflated, many of these products look like bubble wrap. However, unlike bubble wrap this new class of product often arrives at the customer site in a sheet-like, un-inflated form, so they take up much less storage volume than bubble wrap. The user then inflates the product with air or other fluid through some sort of passageway that allows air pumped from the machine to fill the interconnected chambers, using a another sealing devices, then seals off the passage way to trap the air inside. The sealing techniques and methods described herein are beneficial to these kinds of machines. An additional example, of machines that make plastic bags in large quantities that might also benefit, include, for example, plastic bags that are used everyday by almost everyone (supermarkets) and are manufactured by a wide variety of machine types many of which can benefit from the sealer technology described herein. Garbage bags manufacturing is another example of usage of the sealer technology of the present invention. A further example is found in food packaging (or other product manufacturing) where, for example, a partially formed bag is filled with a product which is then sealed within the bag (e.g., a pouch) until the desired seal bond is formed. These are but a few examples of applications suited for the inventive sealer subject matter of the present invention.

Figure 85B:
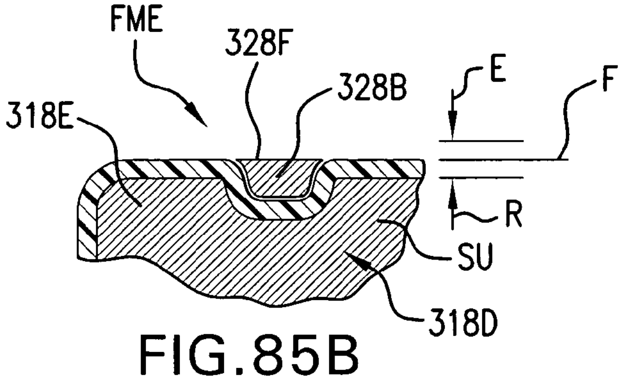
FIG. 85B shows an alternate embodiment of a heater element and substrate combination featuring a metallic substrate with, coating (e.g., plastic or plastic composite) and a substantially V-shaped heater element.

FIG. 85 shows a preferred embodiment featuring a film material bonding device or sealer fusion means FME comprising a heater element and a heater element support substrate such as the above-described one having a stacked insert head. FIG. 85 also shows a heater element embodiment having a rectangular cross-sectioned heater element and a heater element support that is formed of a material that is well suited for handling the high temperature of the heater element and/or avoiding an undesirable degree of creep and/or alteration in its heater element support position in use (e.g., avoids flexing). FIGS. 85A to 85F show alternate embodiments of sealer fusion means FME comprising a plastic material substrate (solid, non-stack substrate) heater element support 318C with groove Wg formed for receiving heater element 328A. Heater element 328 is preferably in wire form in similar fashion to the FIG. 85 embodiment, but it has a curved or convex (e.g. semi-circular), in cross section, shaped bottom received by a preferably corresponding shaped groove Wg in the substrate and having an exposed, flat or planar film presentation surface (preferably a contact surface) 328F which is also preferably within the "flush" parameters described above in FIG. 85 with plane F being a true flush state with the exposed, adjacent surface of the supporting substrate and/or housing receiving the supporting substrate and a planar across the width surface 328C, and plane R and plane E representing the preferred limits for having the exposed, upper surface 328C fall below and above the plane represented by the exposed surface of the supporting substrate having a groove Wg in which the heater element is received as within the "flush" parameters described above for the other embodiments. Heater element support 318C in FIG. 85B is preferably a body that is non-stacked as in a monolithic or one common piece body and is shown formed of a plastics based material (e.g., all plastics or a plastics composite material) of a type suited for the high heat environment and which preferably avoids too much a degree in creep and flexing as in "VESPEL" plastics material.

Figure 85E:
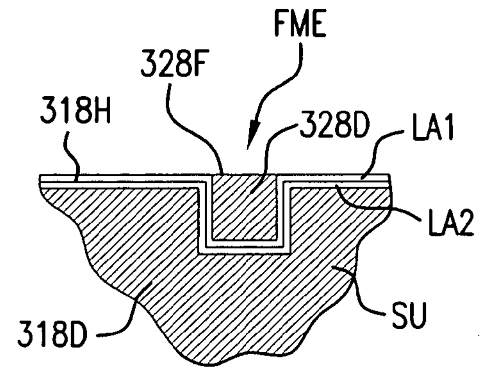
FIG. 85E shows an alternate embodiment of a heater element and substrate combination featuring a metallic substrate with outer laminate layering and a polygonal recess receiving a correspondingly shaped heater element.
Figure 85C:
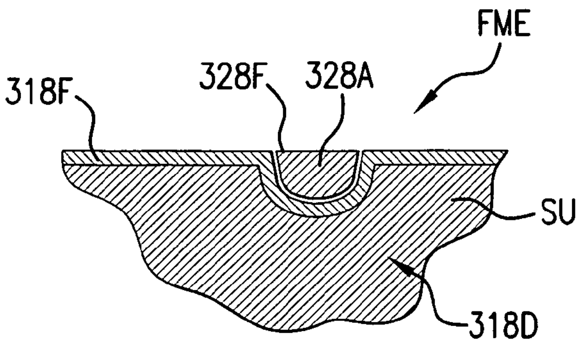
FIG. 85C shows an alternate embodiment of a heater element and substrate combination featuring a metallic substrate with a coating (e.g. ceramic) layer with a semi-circular cross-sectioned heater element.
Figure 85F:
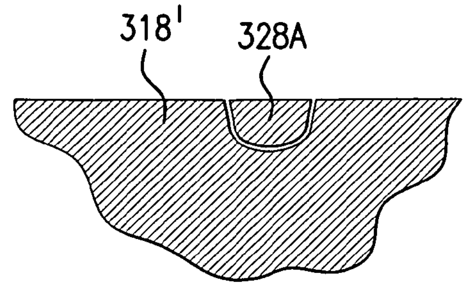
FIG. 85F shows an alternate embodiment of the fusion means featuring a monolithic ceramic substrate with a semi-circular groove formed directly in its exposed surface.

In an alternate embodiment shown in FIG. 85F rather than a stacked ceramic substrate as in FIG. 85 there is featured a monolithic or single unit ceramic body 318' into which is machined a suitable groove Wg into the solid piece of ceramic (similar to the earlier described embodiment shown in FIG. 62). In the embodiment of FIG. 85F the groove is dimensioned so as to receive or fit a seal wire so that the seal wire's exposed surface is relatively flush with the sealing surface. Having a curved cross-sectioned groove can make groove formation in the ceramic body easier, as explained above. Thus, as the embodiment of FIG. 85F features a semi-circular cross-sectioned heater wire, the groove in the ceramic is preferably made semi-circular in cross section to match that configuration. Also, in this embodiment, a seal wire can be fabricated from a round wire that is machined to form a flat on one side for flushness and good sealing. The circular, unmachined, side of the wire is fit into the groove cut into the ceramic substrate such that the flat side becomes the sealing surface. It is easier to cut a round groove into a ceramic material than it is to cut a sharp cornered groove, and thus, while potentially requiring an added machining step, the ceramic reception groove is more easily formed to the desired dimensions.

FIG. 85B shows an alternate embodiment of fusion means FME comprising a heater element support 318D having a base metallic substrate SU with coating 318E defining the film or seal material presentment surface that lies flush with exposed surface 328F of the heater element. In the FIG. 85B embodiment substrate SU is a metallic substrate as in an aluminum or steel body with a coating better suited for handling the high heat temperature and/or better suited as a presentment material to the material to be sealed as in a ceramic based coating and/or a more electrically insulating quality material. In the FIG. 85B embodiment there is illustrated a substrate SU of aluminum and coating of Teflon Impregnated Hardcoat. Hardcoat is basically a thin layer of Aluminum Oxide that is plated onto the surface of the aluminum. Aluminium Oxide has ceramic qualities so it is not conductive, has excellent wear properties, and resists heat quite well. Hardcoat is preferably applied in a thickness range between 0.0005" and 0.005". The inventive subject matter also includes a monolithic ceramic body with groove for the heater element formed therein but as noted above under current preferred machining processes forming a groove to the desired dimensions (e.g., square cornered) can be difficult. Thus, like the stacked embodiment, an advantage lies in forming the base substrate out of a metal that is easier to machine during formation of the groove to the desired dimensions prior to the coating layer application. Also, FIG. 85B shows the coating being applied to multiple surfaces of the insert head as in providing a non-conductive coating in the areas where insulation is desired while avoiding application in the areas where the conductiveness of the insert head is desired. Also, FIG. 85B shows a different configuration for the heater element which again is matched by the groove formed in the support and figures a substantially v-shaped heater element. This is illustrative of the surface under the exposed surface 328F can take on a wide variety of forms under the present invention.

FIG. 85C shows an alternate embodiment of a heater element and substrate combination featuring a metallic substrate with an exposed surface covering 328F that is integrated with the main body represented by SU but having different qualities as in a surface treatment process including for example an oxidation layer formation embodiment. FIG. 95C is also illustrative of alternate coating techniques as in deposition as in a chemical vapor deposition or electric charge (EDM) based deposition process is also featured under the subject matter of the present invention which again can help avoid tool wear or the like in the formation of the groove in the main body of the substrate.

FIG. 85E shows an alternate embodiment of fusion means FME with its heater element and substrate combination and that features a metallic substrate with outer laminate layering and a polygonal recess receiving a correspondingly shaped heater element. FIG. 85E illustrates a substrate machined from a solid piece of, for example, steel and then coated in a number of different plating processes to provide a coating formed of layers LA1 and LA2 preferably having similar properties to the Aluminum Hardcoat (e.g. essentially non-conductive to a charge provided to the main body of the substrate and thick enough to provide the non-conductive quality).

Figure 85D:
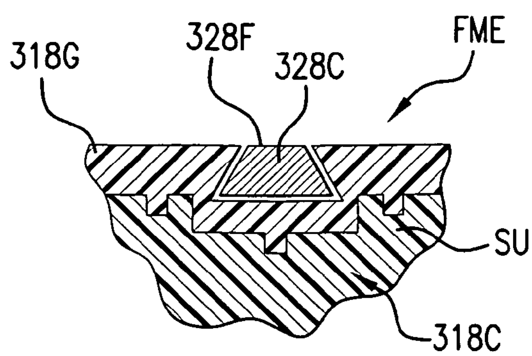
FIG. 85D shows an alternate embodiment of a heater element and substrate combination featuring a substrate with an upper layer of a different material, having a dove shaped recess for receiving a correspondingly shaped heater element.

FIG. 85D shows an alternate embodiment of fusion means FME with its heater element and substrate combination and that features a substrate with an upper layer of a different material better suited for presentment to the material being sealed as in a first plastics base material (e.g., a less expensive, less durable in the noted environment plastics material) and an exposed covering layer 338G formed of a second material (e.g., a more durable plastics material). In the illustrated embodiment featuring two different plastics material the covering can be applied with an overmolding process and there is preferably providing an irregular contact surface to promote better attachment at the boundary. In the FIG. 85D embodiment there is also shown a recess for the heater element formed at the same time as the upper coating (as opposed to for example a subsequent machining step) having a dove shape recess for receiving a correspondingly shaped heater element. This provides for easy insertion and retention while, for example the side legs of the heater element are placed in the desired position relative to the position retention means such as those described above and used to compress the legs into the sides of the insert head for heater element position maintenance. The above is illustrative of but some of the various fusion means workable under the present invention.

FIGS. 90 to 98 illustrate an alternate embodiment of edge seal assembly 4000 used in conjunction with an alternate embodiment of an edge sealer retention means 4002 which represents an alternate design to the edge seal retention means provided by edge sealer assembly combinations 91AS and 91AS' described above. In the embodiment featured in FIGS. 90 to 98, edge sealer retention means 4002 provides a support for the edge seal assembly 4000 such that the latter is properly positioned relative to the material to be sealed as in film material being drawn by the nip roller set 4004 shown in FIGS. 94 to 96 which shares similarities to those earlier described but includes some differences as discussed below.

Figure 28:
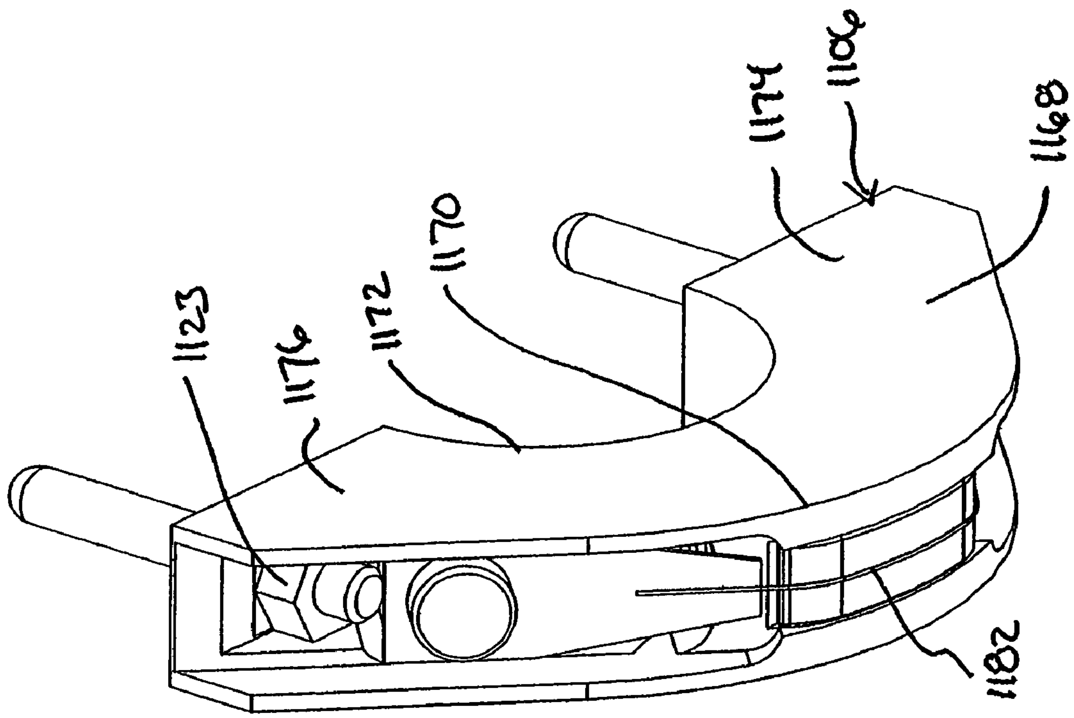
FIG. 28 shows a perspective view directed at the heater wire side of the edge sealer of the first embodiment of the edge seal assembly.
Figure 29:
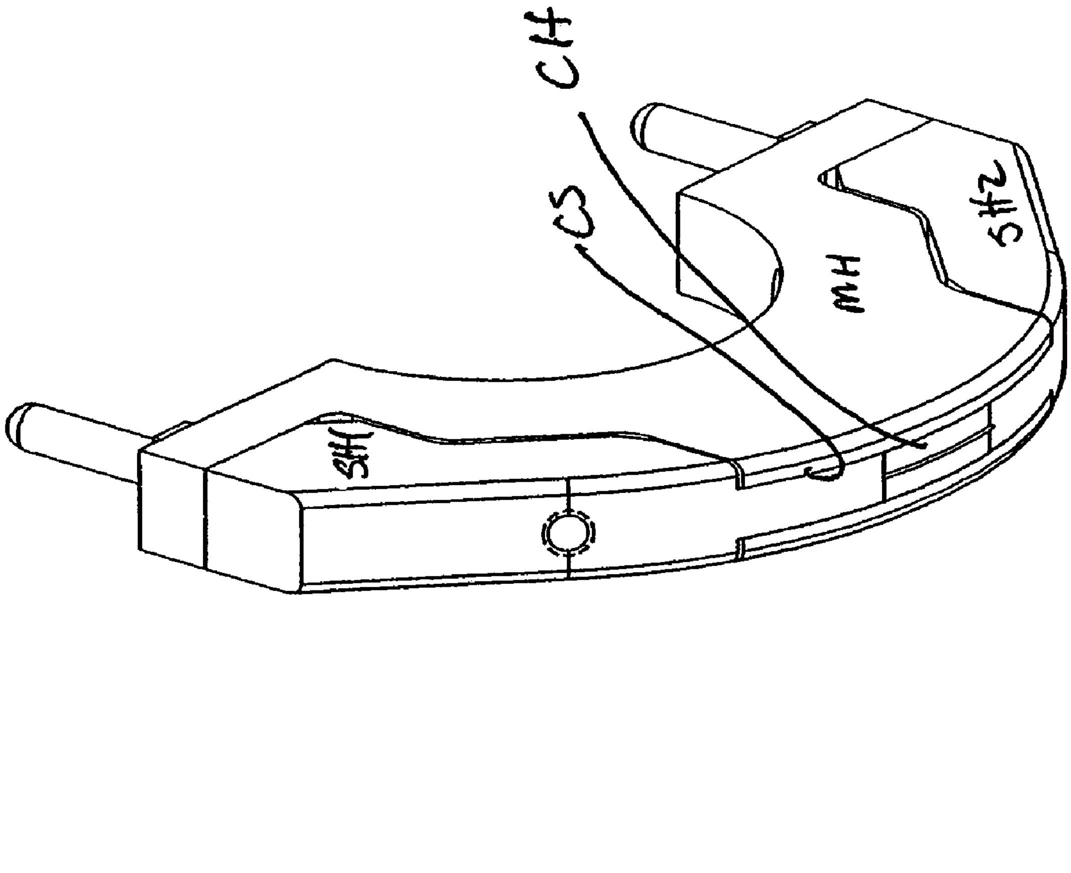
FIG. 29 shows a perspective view directed at the heater wire side of the edge sealer of the second embodiment of the edge seal assembly.
Figure 30:
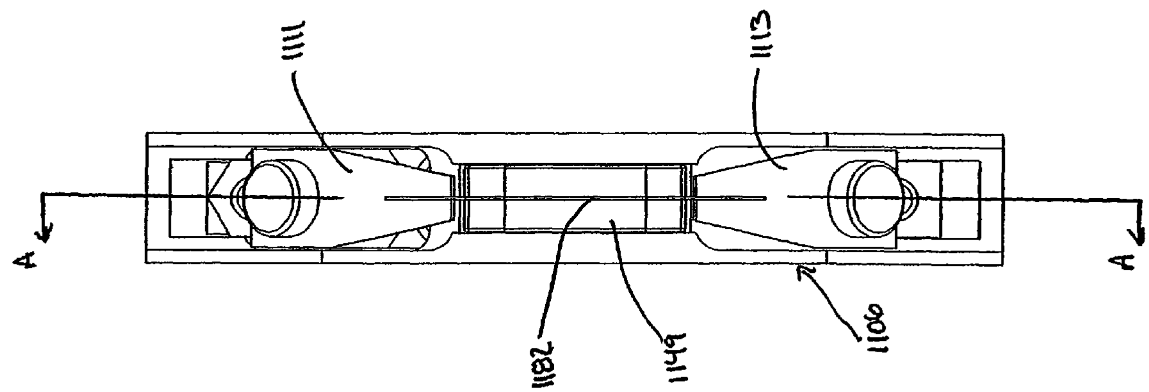
FIG. 30 shows an elevational view of the heater wire side of the edge sealer of the first embodiment of the edge seal assembly.
Figure 31:
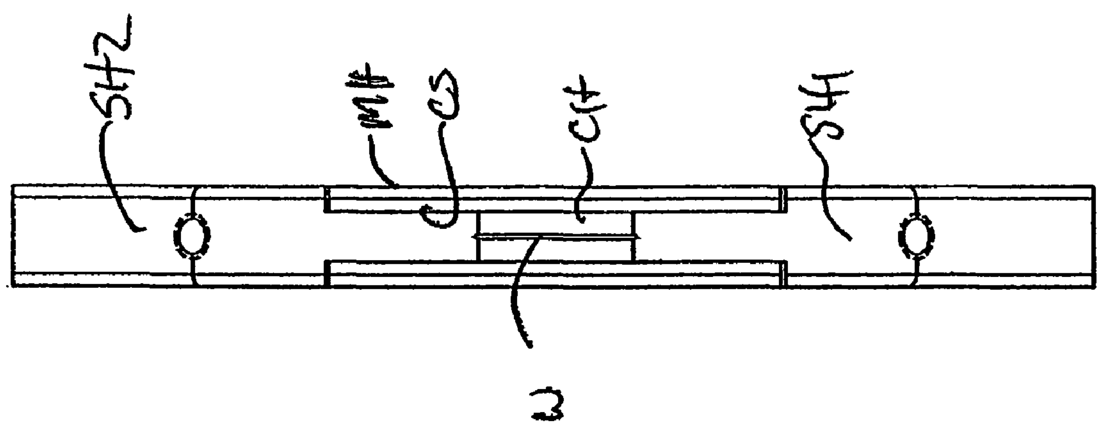
FIG. 31 shows an elevational view of the heater wire side of the edge sealer of the second embodiment of the edge seal assembly.
Figure 94A:
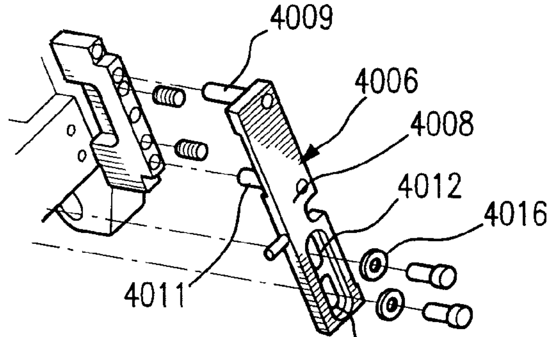
FIG. 94A shows an enlarged view of the right side of FIG. 94 with edge sealer retention means.
Figure 91:
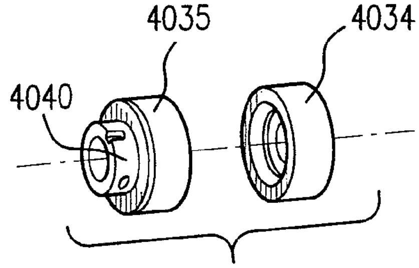
FIG. 91 shows an assembled view of that which is shown in FIG. 90.
Figure 92:
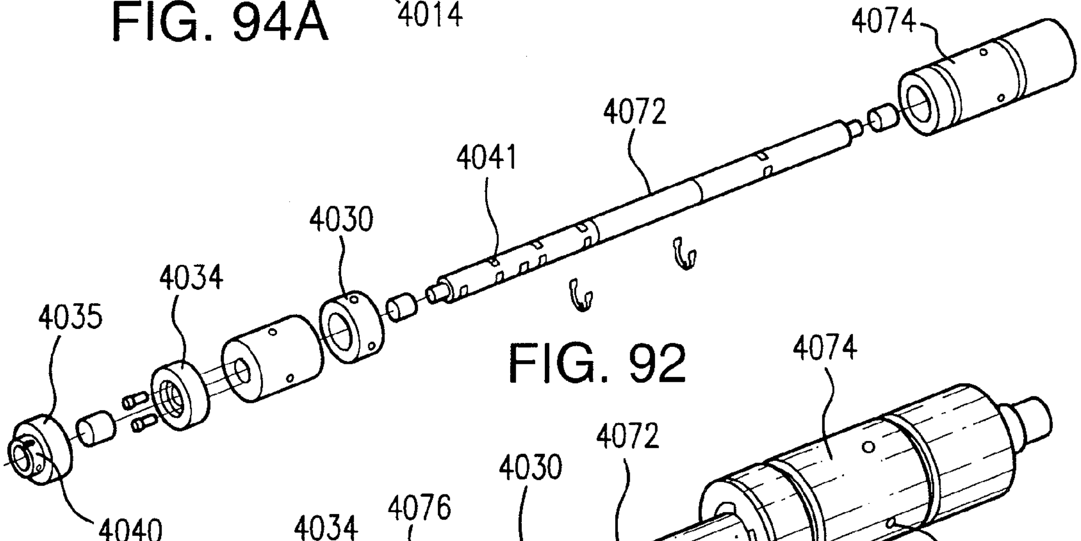
FIG. 92 shows an exploded view of the shaft and rollers supported on that shaft.
Figure 93:
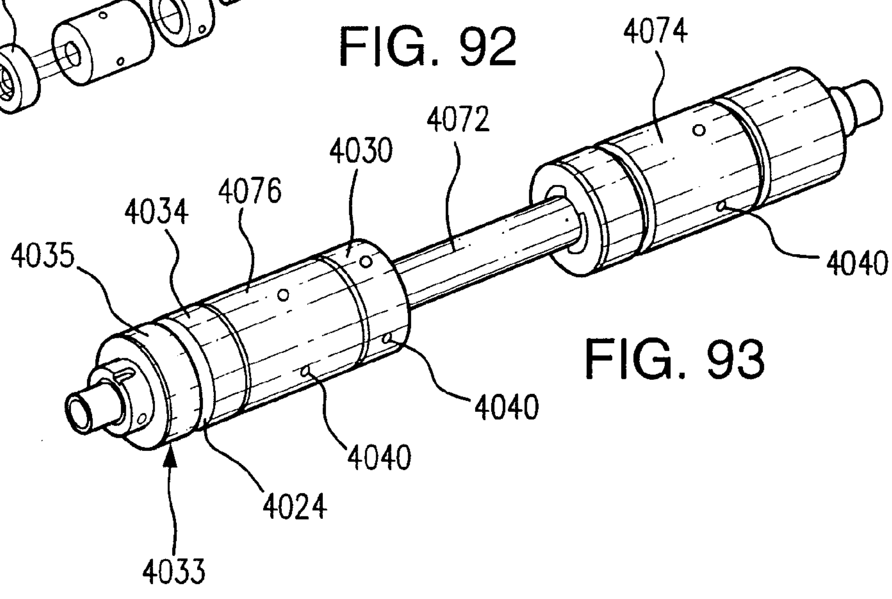
FIG. 93 shows an assembled view of that which is shown in FIG. 92.
Figure 94:
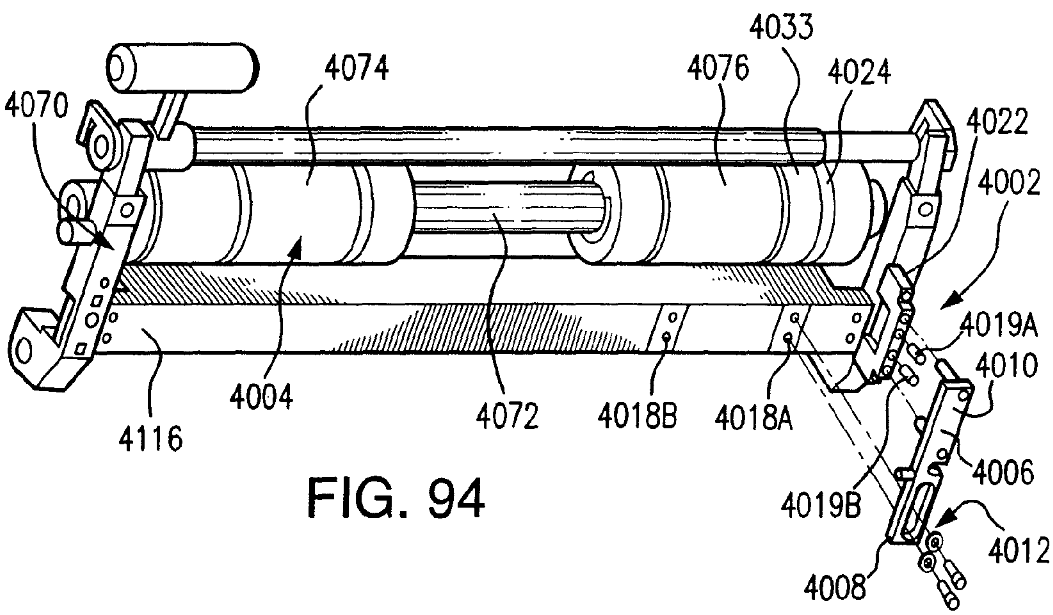
FIG. 94 shows the rollers and shaft combination of FIG. 93 mounted on the flip open access means of a product-in-bag assembly (with product including for example air, foam, food, etc) and the edge sealer assembly retention means in exploded view.
Figure 95:
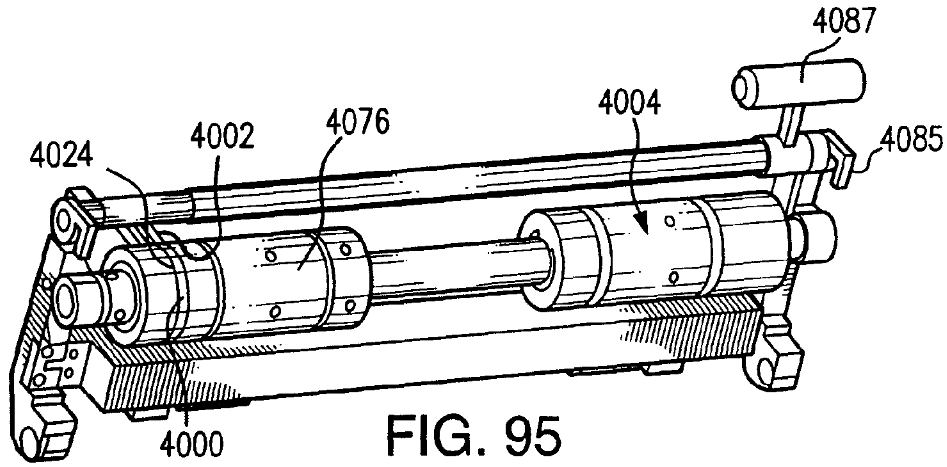
FIG. 95 shows a fully assembled view of an opposite side of that shown in FIG. 94.
Figure 96:
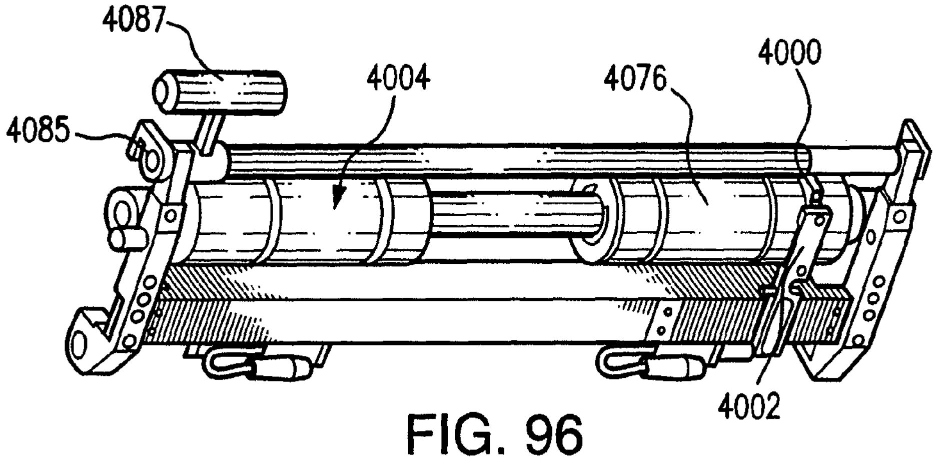
FIG. 96 shows a fully assembled view of that which is shown in FIG. 94.
Figure 97:
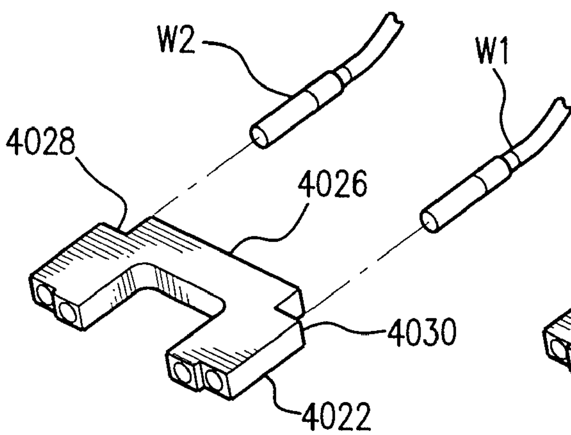
FIGS. 97 and 98 show pre and post insertion of the electrical feed wires extending to the base block of the edge sealer assembly.
Figure 98:
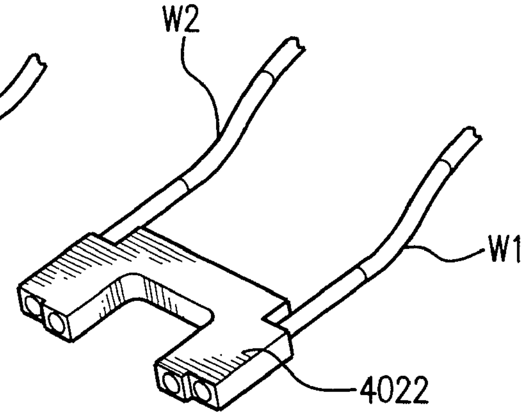

FIGS. 94 to 96 illustrate hinged access door means 4070 which is similar to that described above for the earlier embodiments and comprises driver roller shaft 4072, supporting left and right driven or follower nip rollers 4074 and 4076 and is supported by side frames 66 and 68 (shown in FIG. 2). While in a latched state the upper ends of pivot frame sections 4071, 4073 are also supported (locked in closed position) by door latch rod 4085 with handle latch 4087. In place of the roller mount described for the earlier embodiments, edge sealer assembly is supported by retention means 4002 which comprises retention member 4006 which is shown in the form of a plate member 4008 having vertically adjustable securement means 4010 which is shown in greater detail in FIG. 94A. As shown, retention member 4006 includes posts 4009 and 4011 extending inwardly and securement means 4012 which includes slot set 4014 and fasteners 4016. Fasteners 4014 extend into corresponding reception apertures 4018A which are formed in cross-cut seal support block or jaw 4116 which is similar to cross-cut jaw 116 described above and is thus positioned forward of a vertical plane passing through the nip roller contact location and below the axis of rotation of drive shaft 4072. End seal jaw 4116, which preferably is operationally fixed in position, is shown having a solid block base of a high strength (not easily deformed over an extended length) material that is of sufficient heat wire heat resistance (e.g., a steel block with a zinc and/or chrome exterior plating), and extends between left and right frame structures 66 and 68. As with seal jaw 116, jaw 4116 supports the one or more cross cut and/or seal wires used to form a cross-cut and/or seal in the film being fused. Alternate jaw location(s) for retention member 4006 is also featured under the present invention subject matter. While plate member 4008 can be made thin enough for flexing, it is preferable to make it of a relatively inflexible material and thickness and to rely on one or more bias members (e.g., springs or elastomeric members) 4019A and 4019B to provide a degree of flexibility or floating capability in edge seal assembly 4000 in a direction transverse to the shaft 4072 axis of elongation relative to edge sealer support base or arbor base 4020 forming part of the below described edge sealer assembly 4000. Thus, edge seal assembly 4000 is well adept at accommodating variations of film material travel of a single plane (e.g. deviations in a front to back direction from a vertical plane) and also maintains a desired compression state on the film material being sealed despite wear of a roller, etc. In the illustrated embodiment the spring adjustment in edge sealer 4000 is accommodated by pins 4009 and 4011 which extend into the upper and lower extremities of an intermediate region 4026 of the back end of base block 4022 (FIG. 97), which back end also is shown having holes for receiving springs 4019A and 4019B. Base block 4022 of edge sealer assembly 4000 also preferably has electrical connection means as in a recessed centralized electrical post extending within a cavity at shoulder 4028 and 4030 into which are inserted wire connector plug-in ends 4028 formed at the end of the electrical feed wires W1 and W2 which plug-in ends have a female reception port for the internalized electrical post (a variety of other plug in arrangement are also featured as in a lined aperture in the base block and a conductive male post in the wire end, etc.). FIG. 28 shows plug-in ends 4028 received within the back of base block 4022. To provide for a supplemental edge sealer or a different located edge sealer relative to the jaw 4116 there is further provided second aperture set 4018B which is provided of a different location along the length of jaw 4116.

Edge seal assembly 4000 has a recessed region through which shaft 4072 is free to extend but unlike the earlier embodiment does not rely on a bearing or shaft bearing and preferably has a free of contact relationship with shaft 4072. Edge sealer assembly 4000 is received within a recessed or slotted region formed in roller 4076 at a location suited for providing the desired edge seal in, for example, a bag being formed. The edge seal assembly 4000 preferably has an edge sealer like that of FIG. 68 with a modified arbor base 4022.

Reference is made to FIG. 90 to 93 to illustrate the providing of edge sealer assembly accommodation recess 4024 in roller 4076. As shown therein roller 4076 is comprised of interior sub-roller 4030 which is fixed to shaft 4072 via set screws 4040 which extend into contact with recesses 4041 in shaft 4072, and intermediate sub-roller 4031 also designed for fixation to the shaft set screws 4040. At the outer end of sub-roller 4031 is provided exterior sub-roller 4033 which has an intermediate area defining accommodation recess 4024. Exterior sub-roller 4033 is shown as being made up of two spaced apart roller segments 4034 and 4035 which are shown assembled in FIG. 91 and in exploded view in FIG. 90. As shown in these figures, sub-roller 4034 is preferably provided with cup-shaped member 4036 having threaded apertures for affixation to the intermediate sub-roller 4031 which is secured to the shaft 4072. Thus, like the earlier embodiment sub-roller 4031 moves with the shaft. The cup-shaped member 4036 is capped off by apertured, flanged cap 4037. Sub-roller 4035 comprises cup-shaped member 4038 and apertured, flanged cap 4039 arranged in mirror image fashion and fixed by way of shaft mount 4040 having set screws which contact the shaft and provide fixation for the cup shaped member 4038 having axially extending threaded apertures for attachment to the mount 4040. A spacer 4044 is also preferably provided across slot 4024 and within the apertured flange caps and cup-shaped members. The flange cap member can be formed of a variety of materials including insulating, low friction (but durable) plastics material or of a metal material, etc. with a preferred side-to-side contact relationship with the edge seal assembly or a spacing can be provided to increase the material type options.

Mounting of sealer assembly 4000 is readily accomplished by mounting base block 4022 onto the mounting pins of retention member 4006 and then securing plate 4008 with securement means 4010 to the desired one of the jaw aperture sets and then making the desired vertical adjustment with slots of the securement means at play. With this combination in position the edge sealer such as that shown in FIG. 68 can be readily plugged into position for edge sealing.

Figure 99:
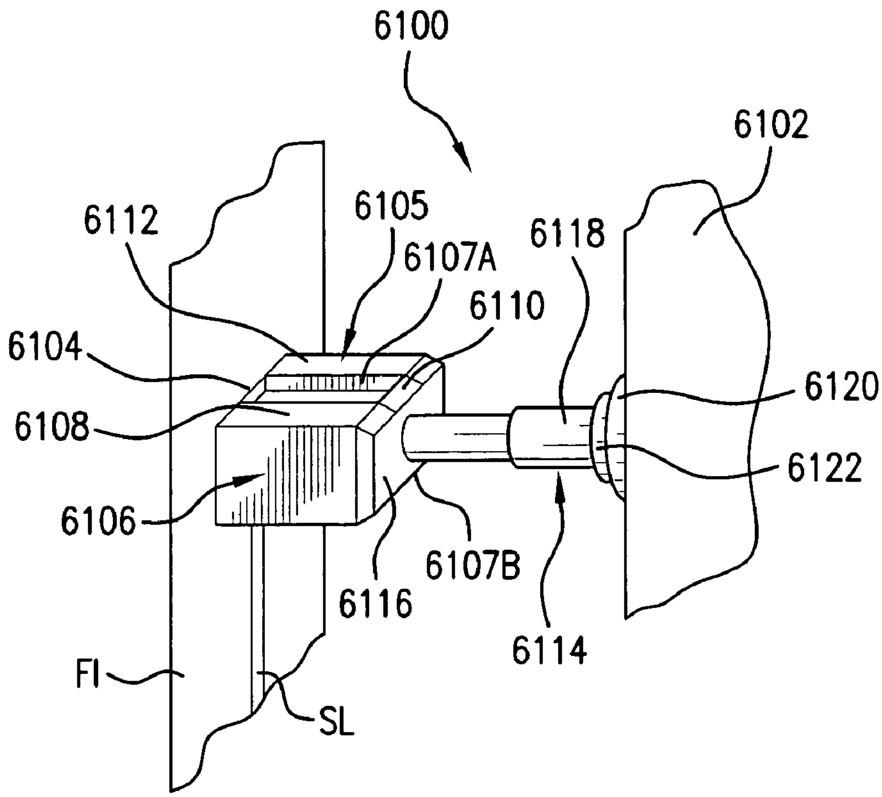
FIG. 99 shows an alternate mounting means embodiment for a heater element substrate of the present invention.
Figure 100:
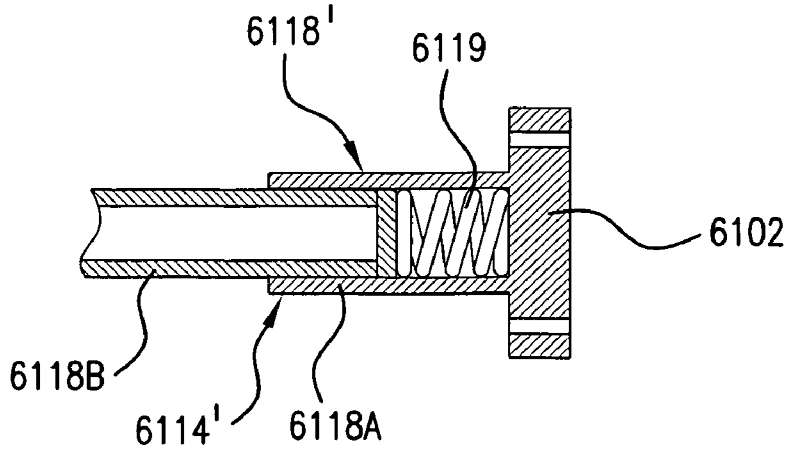
FIG. 100 shows an alternate embodiment of the mounting means in FIG. 99 wherein there is provided biased deflection potential in a support shaft component of the mounting means.

FIGS. 99 and 100 illustrate additional embodiments of an edge sealer with emphasis on mounting means for placement of the edge sealer heater element is a desired state relative to the film being sealed. For example, in FIG. 99 there is illustrated sealer device 6100 shown in relationship with film FI in which is formed seal SL and a supporting component 6102 as in a component of a product-in-bag assembly (e.g., a support plate attached to a fixed jaw component of an end sealer assembly). Seal SL can be formed by movement of film past the sealer device movement and/or film movement. In FIG. 99 sealer device 6100 comprises heater element 6104 (e.g., a ribbon wire as described above) arranged flush relative to its supporting substrate 6105 which includes substrate head 6106 comprised of either a unitary head or a multi-component head as in the multi-stack arrangements described above. FIG. 99 shows a preferred multi-stack combination featuring a three stack of plates 6108, 6110, 6112, with plate 6110 being a shorter intermediate plate defining a heater element reception groove in which heater element 6104 is received as in the embodiments above. Substrate 6105 further comprises mounting means 6114 which includes back plate 6116 and support shaft 6118 extending from plate 6116 and having flanged connection base 6120 secured to component 6102 via fasteners 6122. FIG. 99 also illustrates heater element fixation means 6107A and 6107B which hold side legs of the heater element in position and can be, for example, adhered (e.g., one before and one after wire tensioning) to hold the wire in the desired state; alternate fixation means as in wrapped or mechanical fastening are also featured under the present invention.

FIG. 100 shows a less rigid mounting means 6114' to which the substrate head can be attached which is similar to mounting means 6114 and can support a similar or different heater element support head as that in FIG. 99. Mounting means includes adjustment means for allowing some degree of extension/retraction adjustment in the supported heater element relative to the film and a preferred counter pressure region provided by a component to the opposite side of the film FI as in a roller surface (not shown). In the embodiment shown the adjustment means includes a telescoping shaft 6118' comprised of fixed shaft component 6118A and adjusting shaft sleeve 6118B and a biasing device which is show in the form of a spring but can take on other forms as in an elastomeric pad or fluid damp pot. Also rather than a telescoping arrangement an adjustment means can be placed in series with the other components as in a deflecting support or a deflecting pad (e.g., one positioned on plate 6116, etc.)

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

The invention claimed is:

1. A sealer device for use in fusing film material, comprising:

a heater element;

a substrate which supports said heater element, said substrate defining a recess receiving said heater element, and said substrate including a heater element support surface which is of a ceramic material;

a housing which supports said substrate, and said heater element having a sealing surface that is a flat sealer presentment surface facing the film material that is essentially flush with a film presentment surface of the substrate or the housing relative to the film material being fused, and which substrate or housing film presentment surface borders the recess, and wherein said recess and heater element are dimensioned as to have a common configuration contact surface arrangement which avoids any side-to-side gap formation therebetween, wherein said substrate is a ceramic substrate having an exposed surface and which recess is defined by a reception groove in said substrate that is dimensioned to receive said heater element; and said ceramic substrate is comprised of a plurality of stacked ceramic insert plates sized for forming said reception groove and wherein said plates include an intermediate plate and two exterior plates each having an interior side wall in contact with the intermediate plate, and with an upper edging of said intermediate plate being spaced farther from the film material when the sealer is in use than upper edging of the exterior plates such that respective portions of the interior side walls of said exterior plates define a sandwich arrangement relative to said heater element positioned between the respective portions of the interior side walls and supported on the upper edging of said intermediate plate.

2. The sealer device of claim 1 wherein said film material is plastic film material and said heater element is a resistance wire.

3. The sealer device of claim 1 wherein essentially flush includes having a maximum recess dimension between a sealer presentment surface of the heater element and an adjacentmost exposed film contact surface region of said presentment surface of the substrate or housing that is 30% to 100% of a film layer thickness being fused and a maximum proud dimension between the sealer presentment surface of the heater element and said adjacentmost exposed, film contact surface region that is 10 to 60% of the film layer thickness.

4. The sealer device of claim 3 wherein the maximum deviation from a true flush state is 0.0005" of an inch or less.

5. The sealer device of claim 4 wherein the maximum deviation is 0.0002" or less.

6. The sealer device of claim 1 wherein said heater element has the flat sealing surface as well as a curved, in cross-section, bottom region received within a recessed region formed in said substrate.

7. The sealer device of claim 1 wherein said housing includes mounting means for securement of said sealer device to a product-in-bag forming device and wherein said mounting means includes a reception cavity in which said substrate is inserted.

8. The sealer device of claim 7 wherein said sealing surface is placed in direct contact with plastic film material used in bag formation and free of a tape or other material heat protective covering.

9. The sealer device of claim 1 wherein said sealing surface, which presents a flat surface across a width of said heater element, has a curvature in a direction of elongation of said sealing surface.

10. The sealer device of claim 1 wherein said heater element is a ribbon heat resistance element presenting the flat surface toward said film.

11. A sealer device for use in fusing film material, comprising:

a heater element;

a substrate which supports said heater element, said substrate defining a recess receiving said heater element, and said substrate including a heater element support surface which is of an electrically insulating material;

a housing which supports said substrate, and said heater element having a sealing surface that is a flat sealer presentment surface facing the film material that is essentially flush with a film presentment surface of the substrate or the housing relative to the film material being fused, and which substrate or housing film presentment surface borders the recess, and wherein said substrate comprises a set of three stacked plates with an intermediate one of said stacked plates having an upper edge facing that is set back farther from the film material when the sealer is in use than upper edge facing of each of the two exterior plates, and the two exterior plates are positioned on opposite sides of said intermediate plate such that interior side walls of said exterior plates and the upper edge facing of said intermediate plate define the recess receiving said heater element.

12. The sealer device of claim 11 wherein said set of three stacked plates are each a solid body of ceramic material such that three ceramic plates are in the stack.

13. The sealer device of claim 11 wherein the heater element is a heat resistance wire in the form of a U-shaped ribbon band that has an exposed, upper surface defining the flat sealer presentment surface, an opposite, under surface supported by the upper facing of said intermediate plate, and two side edges sandwiched between interior side walls of said exterior plates.

14. The sealer device of claim 13 wherein the U-shaped ribbon band has an intermediate portion defining the flat sealer presentment surface and legs extending off from ends of the intermediate portion in a direction away from the film material when the sealer is in use.

15. The sealer device of claim 14 wherein said intermediate plate has rounded corner edging which come in contact with transition portions of said U-shaped ribbon band, which transition portions are positioned between respective ends of the intermediate portion and legs of said U-shaped ribbon band.

16. The sealer device of claim 14 wherein the upper edging of each of said three stacked plates has a curvature that extends in a direction common with a direction of elongation of the intermediate portion of the U-shaped ribbon band in extending between the two transition portions.

17. The sealer device of claim 11 wherein said housing has a cavity that receives the set of three plates with the exposed surface of said exterior plates being flush with a surface of said housing bordering the cavity in which said set of three plates is received.

* * * * *